United States Patent
Simmons

(10) Patent No.: US 10,684,684 B1
(45) Date of Patent: *Jun. 16, 2020

(54) LIGHT MANAGEMENT FOR IMAGE AND DATA CONTROL

(71) Applicant: John Castle Simmons, Germantown, TN (US)

(72) Inventor: John Castle Simmons, Germantown, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/438,132

(22) Filed: Jun. 11, 2019

Related U.S. Application Data

(63) Continuation of application No. 15/784,225, filed on Oct. 16, 2017, now Pat. No. 10,331,207, which is a
(Continued)

(51) Int. Cl.
*G06F 3/01* (2006.01)
*H04N 13/339* (2018.01)
(Continued)

(52) U.S. Cl.
CPC ......... *G06F 3/013* (2013.01); *G02B 26/0808* (2013.01); *G02B 26/0816* (2013.01); *G02B 27/0093* (2013.01); *G02B 27/0172* (2013.01); *G02B 27/0179* (2013.01); *G02B 30/26* (2020.01); *G02B 30/36* (2020.01); *G09G 5/02* (2013.01); *G09G 5/10* (2013.01); *H04N 1/00129* (2013.01); *H04N 13/324* (2018.05); *H04N 13/339* (2018.05); *H04N 13/344* (2018.05); *H04N 13/383* (2018.05); *H04N 13/398* (2018.05); *G02B 2027/014* (2013.01); *G02B 2027/0112* (2013.01); *G02B 2027/0118* (2013.01); *G02B 2027/0127* (2013.01);
(Continued)

(58) Field of Classification Search
CPC . G06F 3/013; G02B 27/0093; G02B 27/0172; G02B 27/0179; G02B 2027/0112; G02B 2027/0118; G02B 2027/0138; G02B 2027/014; G02B 2027/0187; G09G 5/02; G09G 5/10; G09G 2320/0626; G09G 2320/0666; G09G 2320/0686; G09G 2354/00; H04N 5/7755
See application file for complete search history.

(56) References Cited

U.S. PATENT DOCUMENTS 3,211,047 A * 10/1965 Heimberger ............... B60J 3/06
359/486.02
5,801,808 A * 9/1998 Abraham ................. A61B 3/12
351/221
(Continued)

*Primary Examiner* — Dmitriy Bolotin

(57) ABSTRACT

Methods and devices for improving visual perception in challenging vision environments and for some with low vision conditions (including age related macular degeneration, AMD) are disclosed. A plurality of frequently co-pathological conditions that together make undistorted, clear and bright vision challenging are dealt with by managing the nature, amounts and patterns of light reaching the eyes while managing the sensitivity and dynamic ranges of the eyes. For example, the sensitivity of chromophore response to particular wavelengths and the instant status of the visual transduction system are, in some embodiments, measured, monitored and managed.

18 Claims, 31 Drawing Sheets

Related U.S. Application Data continuation-in-part of application No. 15/400,040, filed on Jan. 6, 2017, now Pat. No. 9,791,926, which is a continuation of application No. 15/201,584, filed on Jul. 4, 2016, now Pat. No. 9,576,556, which is a continuation of application No. 14/215,199, filed on Mar. 17, 2014, now Pat. No. 9,392,129.

(60) Provisional application No. 61/801,708, filed on Mar. 15, 2013.

(51) Int. Cl.

| | | |
|---|---|---|
| *G02B 26/08* | (2006.01) | |
| *H04N 13/383* | (2018.01) | |
| *H04N 13/398* | (2018.01) | |
| *H04N 13/324* | (2018.01) | |
| *H04N 13/344* | (2018.01) | |
| *G02B 27/01* | (2006.01) | |
| *G09G 5/02* | (2006.01) | |
| *G02B 27/00* | (2006.01) | |
| *G09G 5/10* | (2006.01) | |
| *H04N 1/00* | (2006.01) | |
| *G02B 30/26* | (2020.01) | |
| *G02B 30/36* | (2020.01) | |
| *H04N 5/775* | (2006.01) | |

(52) U.S. Cl.
CPC ............ *G02B 2027/0138* (2013.01); *G02B 2027/0174* (2013.01); *G02B 2027/0178* (2013.01); *G02B 2027/0187* (2013.01); *G09G 2320/0626* (2013.01); *G09G 2320/0666* (2013.01); *G09G 2320/0686* (2013.01); *G09G 2354/00* (2013.01); *H04N 5/7755* (2013.01); *H04N 2201/0013* (2013.01); *H04N 2201/0084* (2013.01); *H04N 2201/0089* (2013.01)

(56) References Cited

U.S. PATENT DOCUMENTS

| | | | | |
|---|---|---|---|---|
| 6,140,980 | A * | 10/2000 | Spitzer | A61B 3/113 |
| | | | | 345/8 |
| 8,956,396 | B1 * | 2/2015 | Friend | A61N 5/0622 |
| | | | | 607/88 |
| 9,392,129 | B2 * | 7/2016 | Simmons | G02B 27/225 |
| 9,530,382 | B2 * | 12/2016 | Simmons | G02B 27/225 |
| 9,576,556 | B2 * | 2/2017 | Simmons | G02B 27/225 |
| 9,791,926 | B2 * | 10/2017 | Simmons | G02B 27/225 |
| 10,073,266 | B2 * | 9/2018 | Osterhout | G06F 3/03545 |
| 10,275,024 | B1 * | 4/2019 | Simmons | G02B 27/225 |
| 10,331,207 | B1 * | 6/2019 | Simmons | H04N 1/00129 |
| 2010/0103371 | A1 * | 4/2010 | Sarver | G02B 5/1876 |
| | | | | 351/159.01 |
| 2011/0255051 | A1 * | 10/2011 | McCabe | G02C 7/104 |
| | | | | 351/159.6 |
| 2013/0033485 | A1 * | 2/2013 | Kollin | G06F 1/1637 |
| | | | | 345/419 |
| 2013/0141693 | A1 * | 6/2013 | McCabe | G02C 7/104 |
| | | | | 351/159.56 |
| 2016/0033771 | A1 * | 2/2016 | Tremblay | G02B 26/10 |
| | | | | 345/8 |
| 2016/0062121 | A1 * | 3/2016 | Border | G02B 27/0172 |
| | | | | 359/630 |
| 2016/0109709 | A1 * | 4/2016 | Osterhout | G06F 3/03545 |
| | | | | 359/614 |
| 2016/0116745 | A1 * | 4/2016 | Osterhout | G06F 3/03547 |
| | | | | 359/614 |
| 2016/0116979 | A1 * | 4/2016 | Border | G06F 3/013 |
| | | | | 345/156 |
| 2016/0131912 | A1 * | 5/2016 | Border | G02B 27/0176 |
| | | | | 345/8 |
| 2016/0212404 | A1 * | 7/2016 | Maiello | A61B 3/032 |
| 2017/0075143 | A1 * | 3/2017 | Saylor | G02C 7/104 |
| 2017/0371179 | A1 * | 12/2017 | Scherlen | G02C 7/10 |
| 2018/0035101 | A1 * | 2/2018 | Osterhout | G02B 27/017 |

* cited by examiner

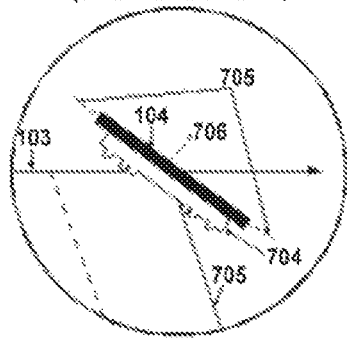
Fig. 7A
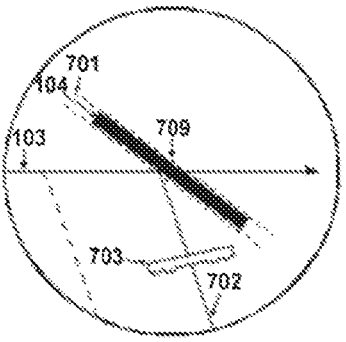
Fig. 7B
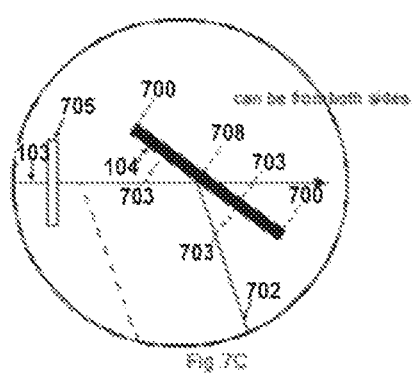
Fig. 7C
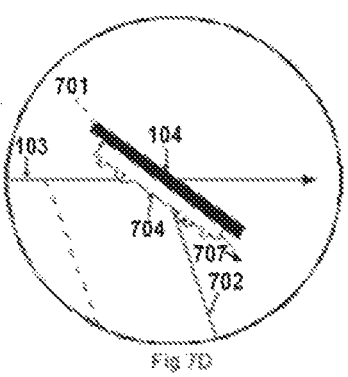
Fig. 7D
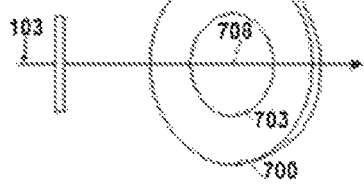
Fig. 7E
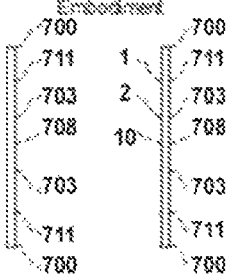
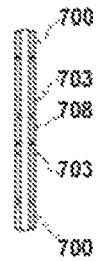
Fig. 7F

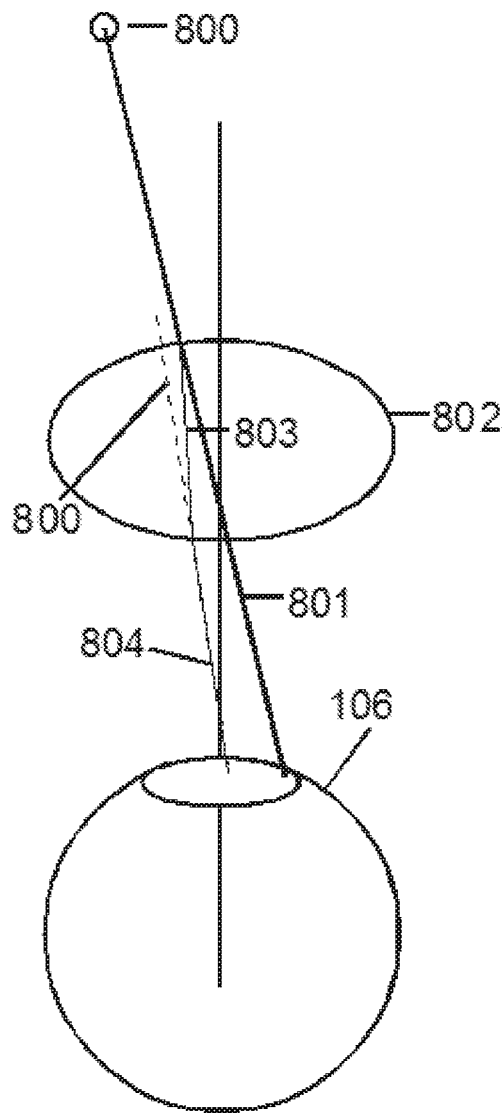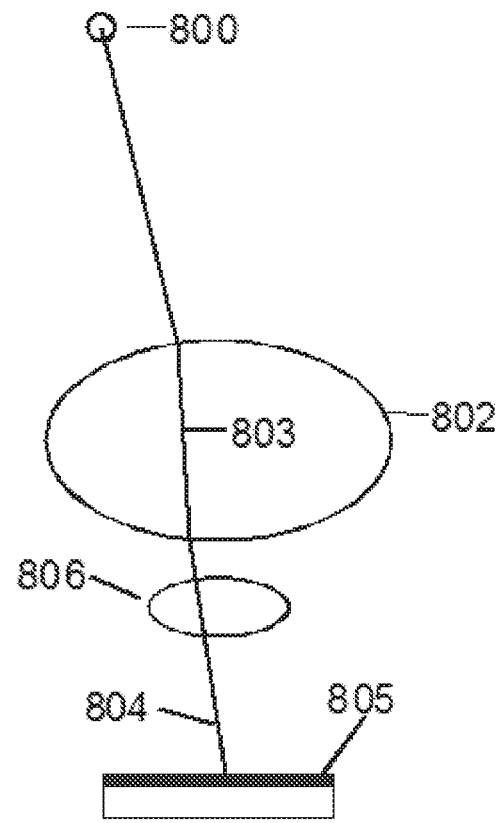
Fig. 8A
Fig. 8B

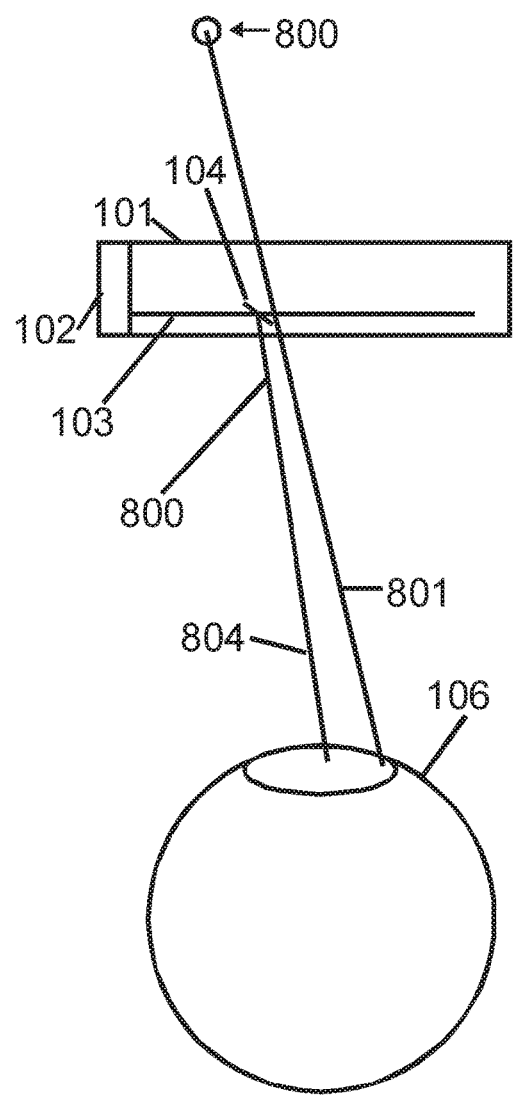
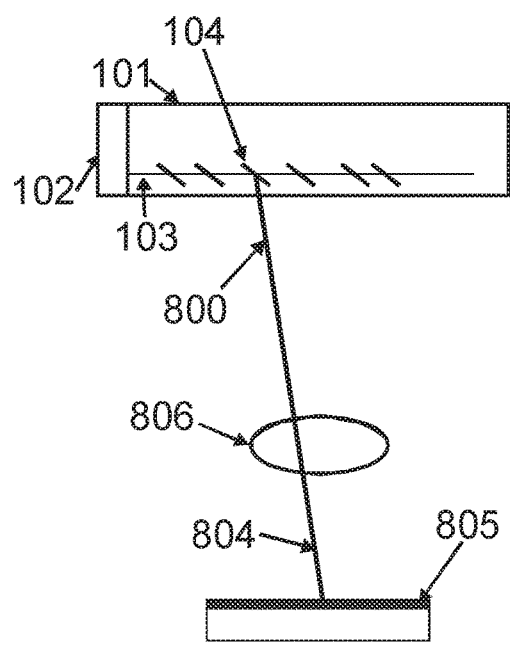
Fig. 8C
Fig. 8D

| | | | | | |
|---|---|---|---|---|---|
| Eye | 1 | C | | Left (L), Right (R), LB or RB | C=Character |
| Ximg | 9 | N | 4 | Row location | N=Numeric |
| Yimg | 9 | N | 4 | Column location | |
| Distance | 4 | I | | Eye to screen dist. | I=Integer |
| Xshift | 9 | N | 4 | Signed value for shift in x for correction | |
| Yshift | 9 | N | 4 | Signed value for shift in y for correction | |
| SDLx | 9 | N | 4 | Adjusted location to display this pixel in x coordinates | |
| SDLy | 9 | N | 4 | Adjusted location to display this pixel in y coordinates | |
| xAzimuth | 9 | N | 4 | Signed azimuth value (e.g., from center of eye FOV) | |
| yElevation | 9 | N | 4 | Signed elevation value (e.g., from center of eye FOV) | |
| SDLxAzimuth | 9 | N | 4 | Shifted location's azimuth (e.g., from center of eye FOV) | |
| SDLyElevation | 9 | N | 4 | Shifted location's elevation (e.g., from center of eye FOV) | |
| SubFOVminutesX | 10 | N | 4 | Angle (in minutes) subtended by the area around the location (xAzimuth, yElevation) indicative of area width | |
| SubFOVminutesY | 10 | N | 4 | Angle (in minutes) subtended by the area around the location (xAzimuth, yElevation) indicative of area height | |

LIGHT MANAGEMENT FOR IMAGE AND DATA CONTROL

CROSS REFERENCE TO RELATED APPLICATIONS

This application is a continuation of and claims full benefit of and priority to U.S. patent application Ser. No. 15/784,225 filed on Oct. 16, 2017 which is a continuation-in-part of and claims full benefit of and priority to U.S. patent application Ser. No. 15/400,040 filed Jan. 6, 2017 which is a continuation of U.S. patent application Ser. No. 15/201,584 filed on Jul. 4, 2016 which itself claims full benefit of U.S. patent application Ser. No. 14/215,199 filed Mar. 17, 2014 which itself claims full benefit of provisional application 61/801,708 filed Mar. 15, 2013.

All of these applications are entitled "Light Management for Image and Data Control" and all are referred to and incorporated herein by reference in their entirety.

BACKGROUND

Light management as a medical tool has progressed in recent years as extensively detailed in the parent patents to this one. A plurality of co-pathological conditions that together make undistorted, clear and bright vision challenging are typically dealt with in a piecemeal fashion. For AMD, the distortion, retinal insensitivity is exacerbated by consequent shortfalls in edge detection and image recognition. Worn displays that magnify where the viewer is looking are helpful. Light therapy may have some valid applications. Much progress has been made on the pharmaceutical side but, beyond the helpful image magnifiers and voice-response readers, little is available in the form of devices to improve reading, driving and facial recognition. Although foundational elements from the previous patents make up the bulk of this disclosure, continued below them are additional methods and devices for improving vision for some with low vision conditions including age related macular degeneration (AMD). These are dealt with by managing the nature, amounts and patterns of light provided to the eye in display embodiments. For example, a worn embodiment, to provide an improved image of the view ahead, modifies the frequency mix of incoming light, the relative intensities of light to different retinal locations and the color perception of the wearer while undistorting certain kinds of progressive distortion.

BRIEF SUMMARY OF THE INVENTION

The current invention pertains to an approach applicable to a new visual display technology for providing superior display characteristics for ordinary televisions, computer monitors, giant screen displays and display systems that can be worn like ordinary glasses. It can also provide 3-D as well as 2-D imaging in flat screen displays and curved displays (for providing a surround image with very large FOV). The 3-D images can provide more of the brain's cues for depth perception and spatial sensing than binocular-overlap-based 3-D imaging. Thus, it provides true depth perception (not the misimpression of depth perception that comes from a partial system such as the familiar binocular overlap or other twin image techniques such as shutter-driven gaming glasses) applicable to genuine immersive simulation enabling improved hand-eye coordination. Also, in doing so, the well known spatial sensory disconnects are eliminated along with the disorientation, headaches, etc. that come from receiving mixed spatial signals.

Although any essentially collimatable or near collimatable light source may be an applicable component for the current invention, many embodiments of the current invention are described herein as being a form of laser projection. In one example embodiment applied to viewing a natural scene with an overlaid image, laser light passing through a plate (like glass) longitudinally (traveling inside the plate and being essentially parallel to the surface inside the plate) passes through optical elements in the plate that have the same RI as the plate. Thus, said optical elements do not create substantial boundary conditions, reflection, diffraction or refraction. However, when activated, an area in the plate analogous to a pixel (i.e. emulating the effects of a positioned light source coming from a position perceivable as a pixel in a display), exhibits a shifted RI resulting in controlled redirection of the light passing through it. These paths of redirected lights reach the eye of the user and are perceived as an image. Due to the potential for wavefront reconstruction, the image so viewed can be true 3-D.

It is an object of the current invention to provide a unique and useful display medium for superior performance in very small flat displays, curved displays, giant screen displays (including highway billboards where captured sunlight, being collimated, is an optional light source to overcome bright light viewing conditions) and worn displays that look like ordinary glasses.

It is also an object of the current invention to provide a display medium that allows an unimpeded view of the natural scene along with the video image to be displayed. The "scene" is what would be left to see if the display were removed from the user's FOV.

It is also an object of the current invention to provide a display medium with reduced power usage and enhanced resolution.

It is also an object of the current invention to provide a displayed image that can always be in focus to the wearer of the current invention regardless of the instant focal plane of the current POI in the natural landscape. This will prevent the viewer from necessarily having to change focus to view the displayed image and then focus again to view the natural view. This will also prevent the safety issues incumbent in a system that leaves critical environmental cues out of focus while viewing displayed images.

It is also an object of the current invention to provide a display in one embodiment whose image can only be seen from one point in space, being un-interceptable prior or post observation.

It is also an object of the current invention to provide a worn display medium that accommodates less than perfect eyes by providing the accommodation correction of the scene image needed responsive to less than emmetropic vision while simultaneously protecting the projected image (rather than distorting it with eyeglass lenses whose prescription is inappropriate for the current virtual distance of a displayed virtual image).

It is also an object of the current invention to provide a display medium with a consistent mediation of diffraction issues, including at a pixel level, even for less than emmetropic eyes. (For example, an astigmatism requires a graduated focus that must also be taken into account with any present focused diffraction correction.)

It is also an object of the current invention to provide 3-D worn imaging that, rather than providing the brain with conflicting distance and spatial relationship cues, provides accurate and spatially consistent cues for natural perception without nausea or disorientation.

It is also an object of the current invention to provide a new screen display mechanism that enables superior resolution, brightness, and power efficiency with a minimum of the physical overhead or space requirements that make current displays too bulky or large for many application.

It is also an object of the current invention to provide, for data communicated through light transmission, an improved and attenuated selective data switching mechanism and method.

BRIEF DESCRIPTION OF THE DRAWINGS

FIG. 7A-F illustrate more complex examples with each showing different wirings for selectively creating a gradient of charge across and electro-optic element e.g., 703 and 704 in all of A-F which can be photonic crystals or other EO RI-shift-enhancing layers inserted in the path of a beam-splitter(s).

FIG. 8A illustrates the use of a cylindrical lens, 802, in the assembly for astigmatism.

FIG. 8B illustrates the use of a CCD (a charge coupled detector camera element) in place of the eye for receiving the image. This is applicable to a calibration strategy described herein.

FIG. 8C illustrates a means by which an image from a plate, 101 can be made to create an image appropriate for, here, and astigmatism.

FIG. 8D illustrates a CCD replacing the eye shown in FIG. 8C applicable to calibrating and testing the effectiveness. This may be done through a lens, 806.

FIG. 18 is an exemplary data structure for a lookup table (LUT) as an illustration of the kind of data needed for certain kinds of distortion correction.

DETAILED DESCRIPTION OF THE INVENTION

Figure 1A:
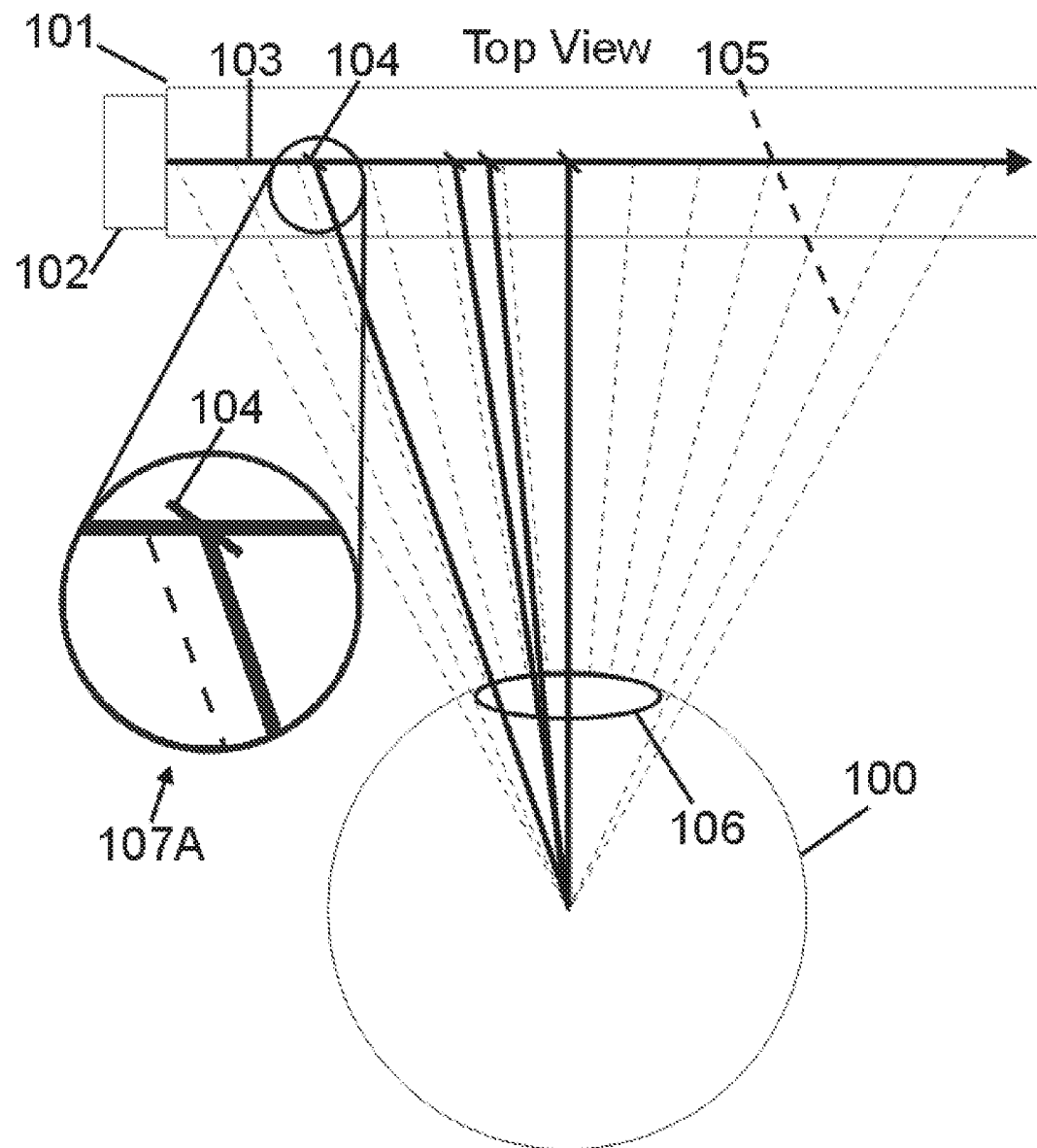
FIG. 1A is a drawing of a single transparent plate directing light from a laser light source to a single eye.

The current invention, which relates to both still image and video embodiments, is not limited to creating images made up of a raster-like compendium of rows of displayed image data. It is, in fact, applicably conducive to numerous useful departures from that theme. However, at times herein it is simpler to explain the concepts of the current invention in that simplest embodiment without thus limiting the scope of the current invention. Also, it is not the intent of this disclosure to distract from the description of the unique components of the current invention with discourses on devices and techniques already well known to those skilled in the art of display imaging. Thus, for example, the process of capturing an image with a camera in digital or analog, processing that image, delivering that image to a display at a geographic location and even calculating the characteristics of that still or transient image into a series of desired pixel locations with brightness, contrast, color and, optionally, spatial depth is not considered in any detail herein. Also, both the well-established and the emerging concepts for directing the activation of an area of a display (e.g., applying a charge to a display element location via a matrix or combination of electrical leads or applying forces or energy related to an area for the purpose of changing the RI or conductive characteristics of an area) are, except for the degree of detail required by one skilled in the art, left to the rich set of all such process that are understood to deliver such data and energies to key components of the current invention.

Refraction controlling components: The current invention relates to an image display process that makes frequent use in multiple embodiments of a class of devices and materials that are defined herein as light-directing elements (LDE's). These defined elements, through representative of a variety of methods and materials, allow the controlled modification of effective refraction and/or diffraction (in some cases, e.g. some holographic applications, only diffraction is required while in some others diffraction is used along with refraction to control the nature of the light). Some nomenclatures for some LDE's emphasize their phase shifting or light slowing attributes but those skilled in the art understand that, properly configured, these can both attenuate and accrete a current RI. Embodiments of the current invention can employ any form of LDE's capable of directing light as described herein and as is apparent according to the current invention's stated approach. A number of appropriate activating stimuli include electrical charges, heat (often effected through an electrical charge), light, pressure or any effective means for such LDE modulation.

Some well-known applicable LDE components include methods for modifying the RI and having the capacity to change conditions very rapidly. One subset of applicable LDE components are EO's. For example, lithium Niobate (LiNbO$_3$) has become one of the more common EO materials used for amplitude modulating fiber optic communications systems operating at data rates exceeding 10 gigabits per second.

Some LDE examples: Spatial Light Modulators (SLM's) use a plurality of LDE's. Many use EO components from liquid crystal (including ferromagnetic liquid crystals), to many solid transparent crystals rated by their range of potential attenuation and accretion such as GaAs, KH$_2$PO$_4$, NH$_4$H$_2$PO$_4$, CdTe, LiNbO$_3$, LiTaO$_3$, and BaTiO$_3$. Lithium Niobate (LiNbO$_3$) has become one of the more common EO materials used for amplitude modulating fiber optic communications systems operating at data rates exceeding 10 gigabits per second. Its speed of attenuation/accretion (adjustment rate) and the comparatively broad range of refraction indices that it can be directed to achieve make it a strong candidate for display applications. Indeed, the SLM is, in itself, both an assembly of LDE's and, as a unit, a LDE—i.e. an entity that, upon command, can modify the RI for a specific region or a group of regions. Also, chalcogenides, liquid crystals, photopolymers, etc. can be part of the current invention as LDE's. Though some of these LDE's, if used to replace a more common LDE such as an EO element in the drawings, require modified wiring paths or even light activation, these will be obvious adjustments within the current invention understood by those skilled in the art.

In the preferred embodiment, the logic circuits controlling these actions are made up of controllers (or more extensive computer assemblies) that direct the LDE's with transparent electrical circuits such as indium tin oxide (ITO). Power for these assemblies may be provided by onboard batteries, other stored energy devices such as capacitors, direct connection with power from local utilities, or even the more recent transmitted energy devices for wirelessly passing energy to devices over short distances (sometimes used currently to power or recharge devices surgically implanted into humans).

A Basic Embodiment

FIG. 1A is one very simple embodiment of the current invention viewed from above. While other embodiments vary greatly in size, shape and viewing distance, this embodiment illustrates one side of a worn display that looks much like a pair of worn eyeglasses. Here an eye, 100, is looking through one of the "panes", 101, of the "glasses" (only one pane of which is shown here). The perspective of FIG. 1's view is from above that viewer whose pupil is labeled 106. The "viewer" is herein defined to be the person using the current invention and here we are looking down on one eye area of a viewer wearing a display in a form resembling worn eyeglasses.

Beamsplitter Example:

In the particular embodiment of FIG. 1 essentially collimated light from a light source, 102, proceeds along the path identified by the line 103 through LDE optical elements, e.g., 104, which are, in the instantly described embodiment, EO beam-splitters (BS's) in one or more of a variety of shapes and being activated in the preferred embodiment by transparent leads. In the arena of man-made light there is no such thing as perfectly collimated light. Thus, when we refer to "essentially collimated light" or even to "collimated light" it is intended to mean that the divergence or convergence of the light is reasonably small where reasonably small is defined by the task. Here, the task is to minimize light noise from internal reflection and maximize the energy transmission efficiency of the light through the plate. Thus, here, essentially collimated light is sufficiently collimated to keep noise and signal at acceptable levels. Essentially collimated light may be provided, of course, by lasers but it may also be provided by any light source that is appropriately conditioned. That conditioning, depending on the light source, may include optical collimation/decollimation with lenses to better collimate a beam, spatial (e.g. pinhole) filtering, polarization control/filtering, and bandpass or other frequency filtering. Some light sources are already conditioned by the nature of their manufacture. For example, the refractive nature of the shape of some LED bodies has a collimating effect and, thus, the LED by itself could be called a "conditioned LED source". Light that is either inherently collimated (like laser light) or that has been conditioned to be essentially collimated or that is by its nature adequately organized in its dispersion of light to illuminate without creating excessive noise in the system will be called herein "collimation controlled" light, "essentially collimated" light, "approximately collimated" light, "light having a limited divergence" or, for convenience herein, simply "collimated" light. For economy of space, leads are not drawn. However, as is normal in the industry, leads (e.g., transparent leads of indium tin oxide) can be effectively placed at the ends or from the top to bottom or in any pattern that produces the potential across the LDE and LDE's may be individually wired or wired in matrix arrays as is more common in imaging applications. Also, for economy of space, only a few example BSs are illustrated of the potentially dense and even multi-layered array in this pane. Thus, at any point in time there may also be many un-activated and, thus "invisible" BSs in each row prepared to send light to the eye (when activated) along available paths like 105 (here 105 is a dotted line and the BS not shown because it is illustrative of an LDE that is not currently activated while the solid lines towards the eye (e.g., from the BS 104) represent selective pixels of light directed to the eye from activated LDE's. In a preferred embodiment, such rows are arrayed on a plane normal to the paper in FIG. 1 and, thus, inside the plate. Thus, from the subject's point of view, there may be, for enhanced resolution and brightness, multiple layers of BSs in the plate (not drawn) visible, when activated, as raster-like rows and columns of BSs arrayed to reflect pixels of light associated with a display. The row and column arrays of different planes do not have to be aligned with each other. In fact, higher resolutions are possible where they are not since one layer's BSs (which may be seen as a layer of BS's in a plane parallel to the surface of the plate) may be placed between those of the others from the subject's viewing perspective.

FIG. 1 can be viewed as having the light, after reflecting off of a flat BS (like those in FIG. 1A), still essentially collimated and this is essentially the case particularly for larger pixel embodiments (lower resolution requirements/larger BSs) or where short wavelength light is used, or both. However, for embodiments with very high resolution requirements and long wavelengths, diffraction increases and implementers will then select from a number of both diffraction control and diffraction-exploiting components described herein to both accommodate and use diffraction for better imaging. Arrow 107A points to an enlargement of the indicated area in FIG. 1A illustrating a reflected path.

Figure 1B:
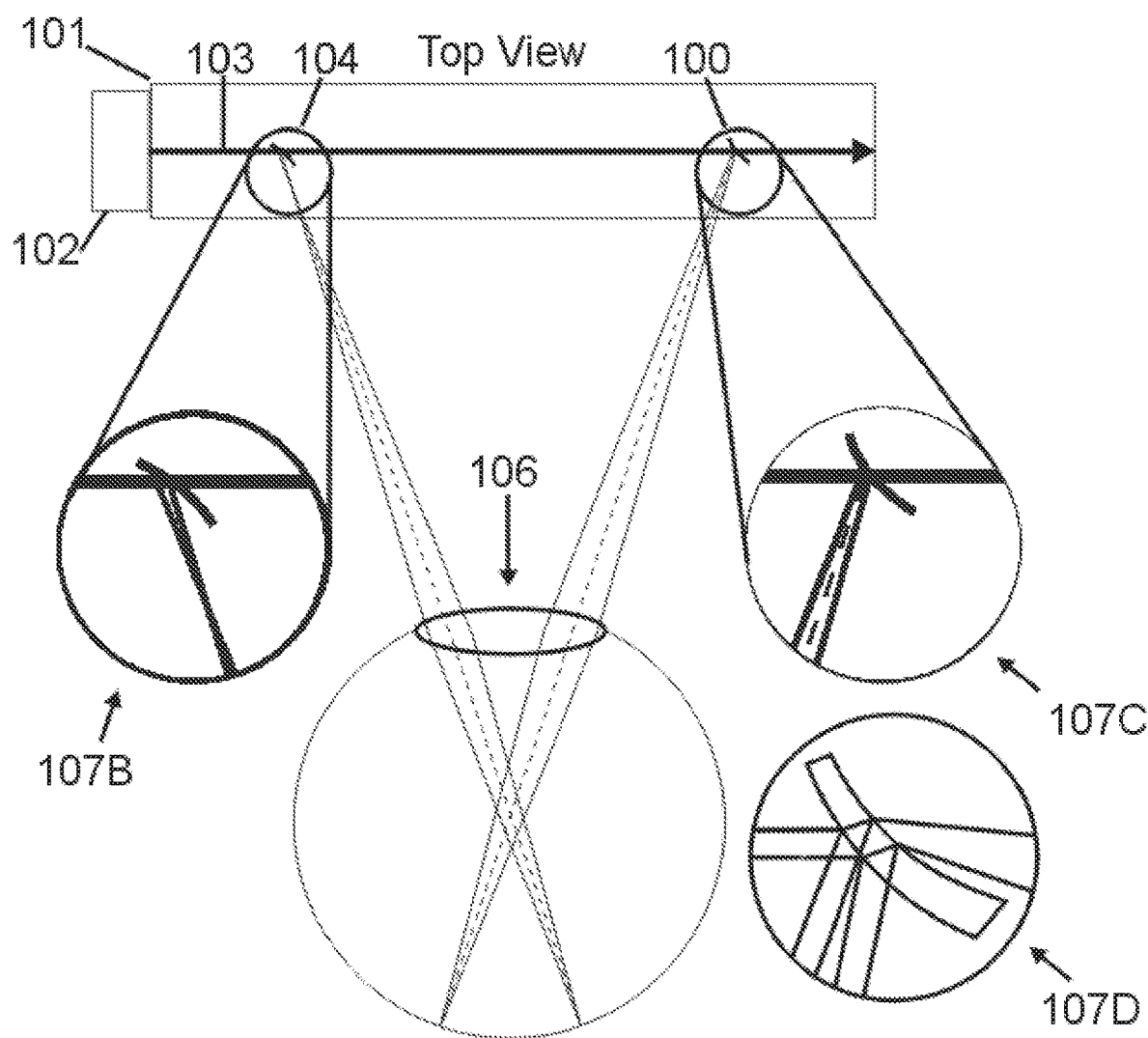
FIG. 1B additionally illustrates additional reflected divergence patterns.

The embodiment reflected in FIG. 1B illustrates the use of non-planar beam splitters any number of which are applicable embodiments of the current invention. For example, FIG. 1B illustrates a curved beamsplitter shown enlarged in the 107B inset. Arrow 107C points to an enlargement of another indicated area having an LDE with a different curve shape. Arrow 107D points to enlargement of that LDE in the enlargement indicated by arrow 107C. This further enlargement, 107D, is intended to better describe, and generally exaggerate for ease of viewing, the refraction of light passing through a curved BS having a slightly different RI than the surrounding transparent media. These also illustrate that various beamsplitters and different shapes thereof can be used in the same assembly.

Figure 1C:
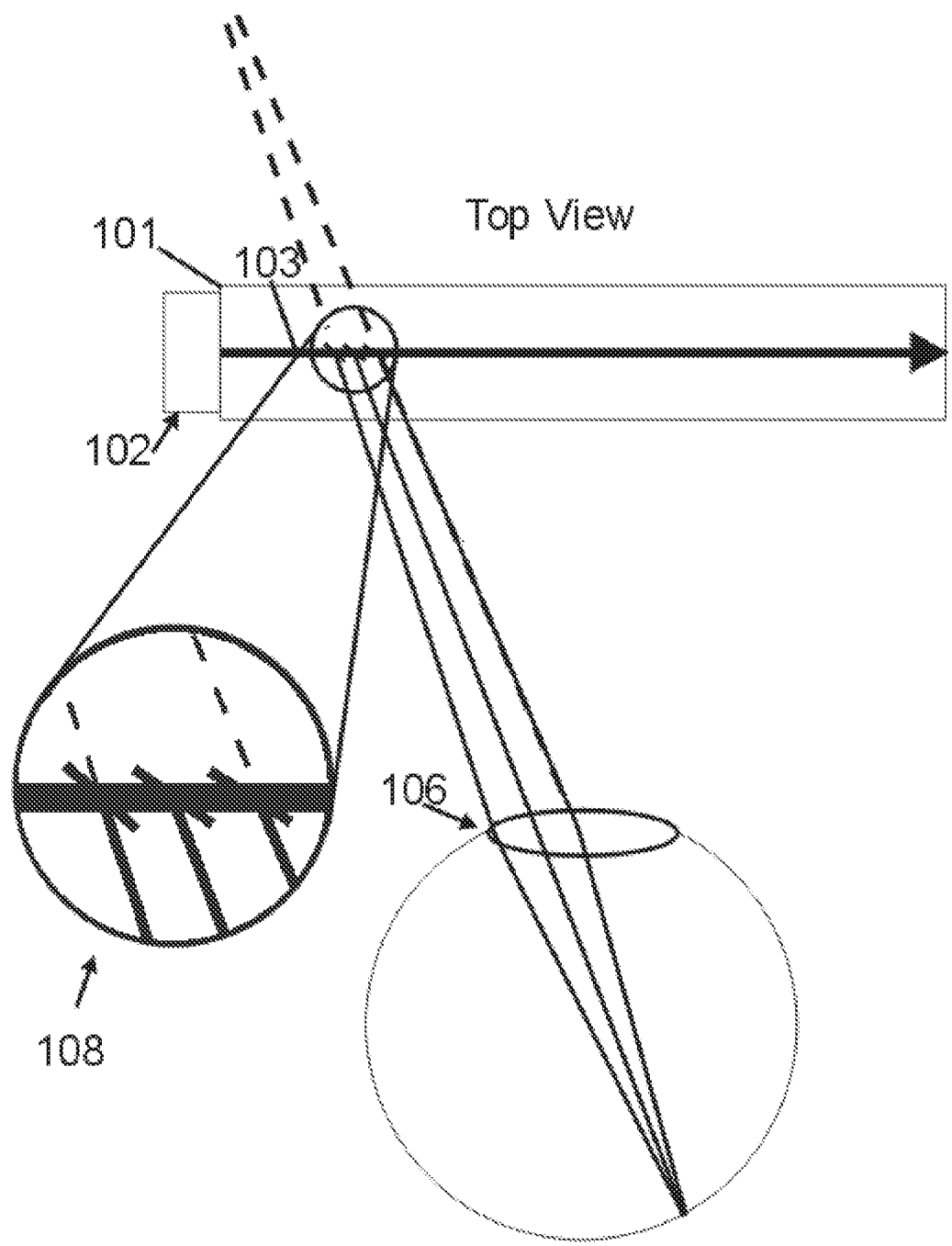
FIG. 1C illustrates how the eye might perceive this as a distant object.

This also illustrates (and FIG. 1D further illustrates) that any number of beamsplitters of different shapes and attitudes may coexist without excessively affecting each other as long as, for a given ray, there is not excessive refraction caused by too many activated beamsplitters sharing one ray at one instant. FIG. 1C illustrates how the activated reflections of the light, 103, from multiple BS's (shown better in the enlargement indicated by arrow 108) can be perceived as coming from a single distant point (indicated by the intersection, not shown, of the extended dotted lines extending up and to the left) when the eye focuses this essentially diverging band of light that enters the pupil, 106, to essentially a single point on the retina. This provides a superior sense of depth perception (even when binocular-overlap-based 3-D, as described herein, is already provided) because the accommodation of the lens of the eye required to bring it to proper focus is the accommodation perceived by the brain associated with the distance to the point where the dotted lines (leading to a perceived point in the distance) would intersect. Thus, when light enters the pupil with a degree of divergence equivalent to the degree of divergence of light from a point at a given distance, the brain's 3-D perceptions, based on the lens accommodation required to bring a viewed target into focus, perceives that the light is coming from a point at that distance.

Figure 1D:
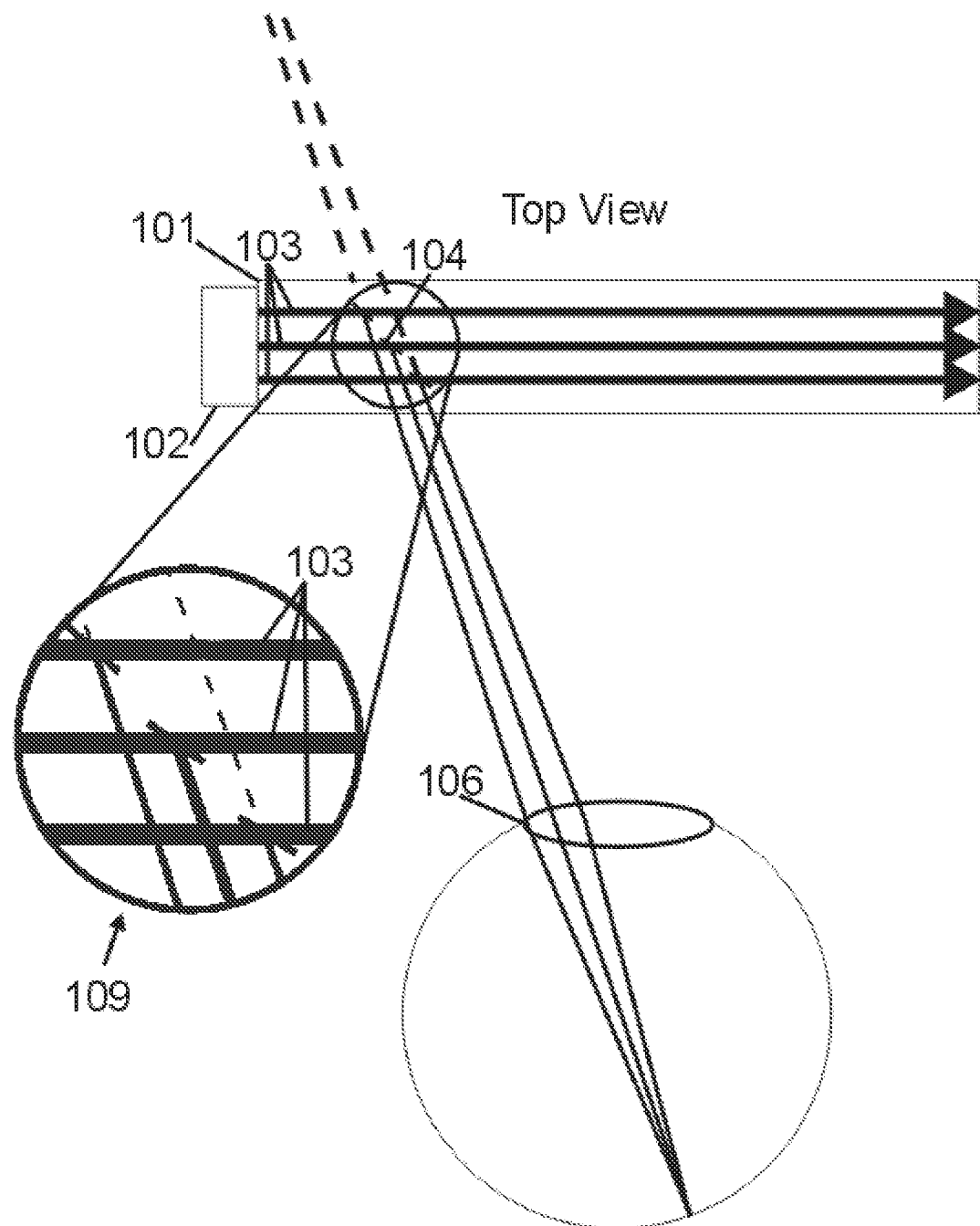
FIG. 1D further illustrates the perception of an image distal to the viewing plate.

FIG. 1D further illustrates this process and is different from FIG. 1C only in that, in this illustration, the BS's activated to create the light to be perceived as coming from a distant point are arrayed in different cyclopic planes (used herein to describe planes normal to the viewer's cyclopic optical axis) rather than laterally (e.g., potentially sharing the same photon in the path of the light, 103). Arrow 109 points to an enlargement of the circle-indicated area traversed by the light, 103 (shown here as three conceptual rays for illustration). The dotted line can also be seen in this enlargement. Of course, there can be any number of LDE's (BS's and other LDE's described herein) combining and participating to create light that appears to the viewer to be coming from any single point despite the fact that those LDE's can be placed at a variety of distances from the viewer in different locations within the plate (alternatively referred to as pane herein), 101. This capacity to create light in multiple chosen directions that appears to emanate from each point in a viewer's view effectively provides complex wavefront reconstruction directly analogous to that of a hologram. (A hologram creates a complex wavefront reconstruction with large numbers of overlapping effective gratings through diffractive redirection of light.)

Light Source Embodiments:

While a hologram requires light that is both collimated and in phase for the diffractive redirection of light to effect the desired wavefront reconstruction, neither is a requirement here. For example, in the four examples of FIGS. 1A-C, the single narrow shaft of light, 103 could be a particular beam from an essentially point sourced isotropic emitter (centered in the light source 102 preferably with appropriate optics and filtering) whose path encountered the BS's shown. Obviously, other rays like 103 from the same point sourced isotropic emitter but leaving the emitter at different angles, could encounter different LDE's in the plate at angles specifically chosen to direct this differently angled light. However, essentially collimated light can reduce internal reflected noise and increase lighting efficiency. Also, lasers are relatively inexpensive and place a very high percentage of their energy at a single chosen wavelength (have a narrow full width half maximum, FWHM) which enables better diffraction management and reflectivity control. Thus, in the particular embodiment of FIG. 1A, we can also see the light source, 102, as a source of essentially collimated light, 103, passing through the plate, 101, to encounter at least some BSs, like 104. Of course, not drawn are any number of additional BS's whose instant RI is the same as that of the plate and are thus invisible (i.e., not having a boundary condition and thus not redirecting the light). The light emitted may be somewhat convergent or divergent but, in the preferred embodiment, it is essentially collimated. One excellent such light source, as discussed herein, is the laser. The terms "collimated", near-collimated, effectively collimated, and largely collimated all reflect herein some of the variations in different applicable embodiments of the current invention related to light that is not necessarily parallel but whose degree of collimation is potentially controllable for better imaging.

The light may be expanded and recollimated to service a larger area, where desired, by any optical means e.g., lenses to cover a broader area. Thus, the collimated beam may be narrow or broad and thus may encounter one or more rows of EO components simultaneously (only one row is shown here, and only a thin representation of them, to allow space for details). The light travels its route inside (typically between the layers of) the plate. Much of the stray light from the light source that might pass through the surface of the plate is partially confined by total internal reflection (TIR) due to the angle of approach. However, the preferred embodiment is not dependent upon TIR. Other rows of EO components are, of course, normally understood to be above and below the plane of the paper in FIG. 1A as well as in additional planes both more proximal and more distal to the eye, 100, than the singular path, 100, that is illustrated. There are numerous examples of collimated light sources applicable to the current invention including but not limited to laser diodes and a variety of uncollimated light sources matched with collimation optics to achieve essential collimation or controlled divergence or convergence.

Light Paths: The light may be expanded and recollimated to service a larger area, where desired, by any optical means e.g., lenses to cover a broader area. If the essentially collimated light strikes an activated BS like 104 in FIG. 1A (which is enlarged in 107A) a portion of the light, 103, will reflect through the pupil of an eye 106 based on the angular attitude of said BS.

Laser Diode Row Selection:

Some embodiments of the current invention employ a separate light source for each row of LDE's. One such embodiment has an array of laser diodes, like 102 vertically along the left edge (from the perspective of the eye) of the plate, 101 in FIG. 1A. By thus stacking the diodes vertically with emission to the right (analogous to raster rows), each beam would traverse a path along a row similar to the path shown for 103 except that they would be many of these mutually parallel beams in a plane normal to the paper. This is useful, for example, in embodiments where switching the light source on or off for a row is used to select a row in the plate for temporal activation of any selection of LDE's in that row.

This allows activation of a single electrode column (i.e. a vertically oriented electrode e.g., from an array of ITO columns in a plane parallel to the plane of the light rows thus creating, from the perspective of the eye, a matrix of horizontal ray rows and vertical electrode columns), to enable/activate a single pixel area (at the intersection of the activated beam and the activated electrode column). In one such embodiment, this results in the application by the activated electrode column of a charge to one side of the LDE with said charge flowing through the LDE to an uninterrupted sheet of electrode (e.g., ITO, on the other side) carrying the other charge or a ground. This optional embodiment can significantly reduce the number of conductor leads required.

Itinerant Laser Beams:

However, in a preferred embodiment, a single laser diode is useful in illuminating numerous rows by embarking upon an itinerant path. For example, in FIG. 3A the laser beam, 103, emitted by light source, 102, can be made itinerant with front-surface reflectors on both sides, like 302 in FIG. 3A, directing the beam to continue in rows (as shown here) or other arrangement to service a large number of LDE's with a single diode. Each itinerant path (two paths are shown here with two sets of lasers) may be ended with a trap, 303. The frame, 304, covers all but the viewable area inside the boundaries of the viewed area 305.

The beam can widen and acquire refracted noise after passing an activated BS. However, because the activation shift in RI is normally so small (normally inducing visible reflections due to the available light source brightness but leaving the continuing beam largely unaffected), in most implementations the same beam can simultaneously be reflected by multiple activated BSs before having the route terminated by a light trap, 303, before another route is begun.

Figure 3A:
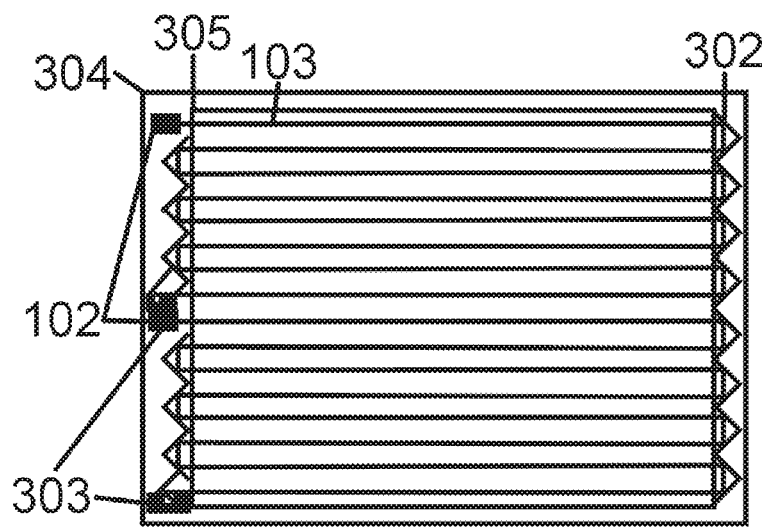
FIG. 3A illustrates, from the perspective view of a user's eye, and embodiment of a plate with a laser beam from a laser, 102, traversing the area of the plate in a raster-like path as it is reflected by mirrors like 302 along an itinerant route.

For a worn application, FIG. 3A can be understood to be seen from the perspective of one eye looking through the plate (i.e. the vision axis is normal to the plane of the paper) as in FIG. 1A. For a standing display, such as a large screen monitor or highway billboard, the cyclopic vision axis is essentially normal to the paper as both eyes view the display. Thus, it is possible to view FIG. 3A as the eye's view in FIG. 1A since the paths of FIG. 3A pass through numerous rows like the one traversed by 103 in FIG. 1A.

The essentially collimated beam can, of course, be routed by a number of applicable means to achieve the same goals including sharing a laser beam by passing through a sequence of BS's with a graduated degree of reflective coating on the left reflecting to the right. These can be ordinary, non-EO, BS's with graduated, e.g., by degrees of vapor coated aluminum, reflectance for beam balancing. The light can either be trapped on the right or routed with reflectors on the right to be used for other purposes including serving as the reference beam for a Holographic Optical Element (HOE) or other holographic element later in the process.

Figure 3B:
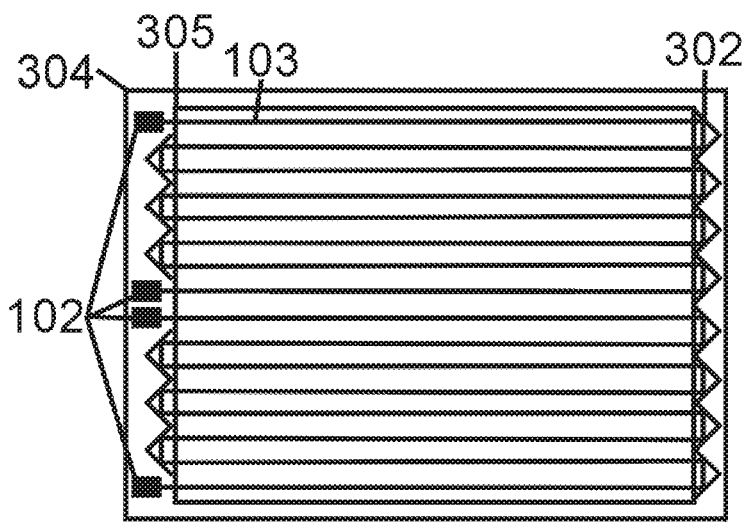
FIG. 3B. Provides additional laser(s) which can provide light which travels the path backwards as compared to FIG. 3A.
Figure 3C:
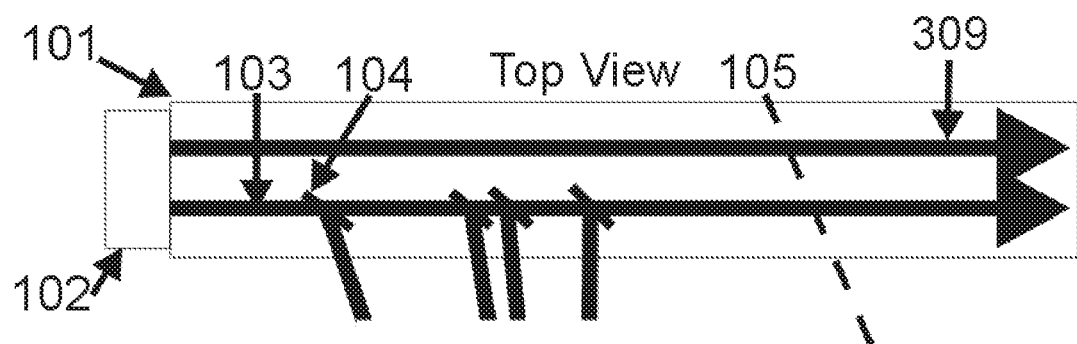
FIG. 3C illustrates light passing through the plate, 101, analogous to the plate of FIG. 3A showing light traversing in one direction from being selectively redirected towards the eye by the reflective subcomponents in the plate.
Figure 3D:
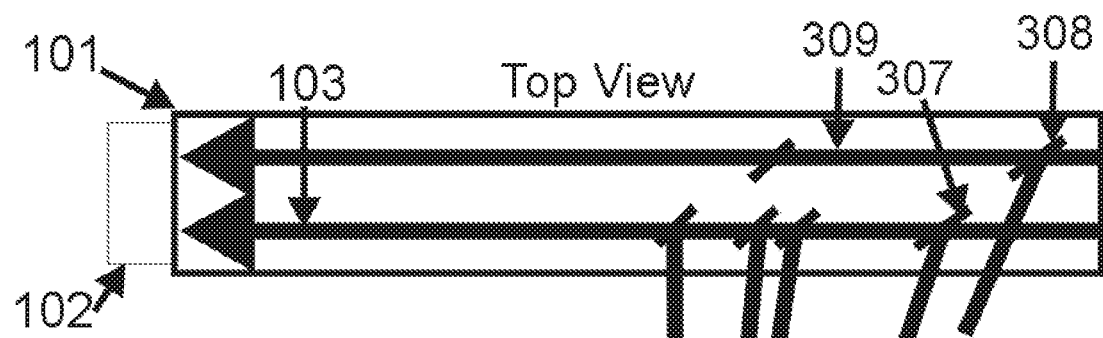
FIG. 3D illustrates light traveling in the opposite direction and the different effects that this can be used to accomplish as it encounters different reflective components from a different angle.

By optionally replacing the traps, 303 in FIG. 3A with another laser diode like 102 as illustrated in FIG. 3B and alternating the activations of these two directionally opposed lasers, a two-way light path sharing the same rows is made effective. The lower (the one we just changed from a trap, 303, to a diode) diode's light will trace back upstream the path of the upper diode optionally separated in time. This allows software selection of an LDE to occur during the cycle filled by the diode that provides the most favorable reflection characteristics. For example, as can be seen in FIG. 3C (which has a viewing perspective, like FIG. 1, from above the viewer whose vision axis is in the plane of the paper), the light is passing to the right which favors, in the preferred embodiment, the reflective angles of the LDE's on the left side (a few of which, like 104, are visible (as is the light they reflect downward on the page) because they were chosen to be activated during this side of the cycle). At the same time or alternately cycled, FIG. 3D shows the light is passing to the left and LDE's like 307 were selected for the desirability of the angle of incidence allowed by the leftward path of the light. Also note in FIGS. 3C and 3D that the laser beam 103, though shown here servicing only one narrow row of LDE's, can be alternatively considered here to be a single beam optionally broad enough to service a plurality of LDE's when they are chosen for activation.

The top view of FIG. 3 only shows two planes where LDE's are located (one for 103 and 1 for 309). However, there can be a number of planes (or other geometric shapes) containing and providing light to LDE's. This greatly increases the potential for providing a large number of LDE's to service a single perceived pixel of a viewer's view which is supportive of more complete wavefront reconstruction for 3-D, the potential for parallax-based depth perception in embodiments where the user's head can move without moving the plate (e.g. television and billboards), higher resolutions, and more complex colors (where multiple LDE's sending different colors appear to be coming from the same point in the user's perception thus combining the colors).

Of course, implementers of the current invention can certainly use simple, single, non-reversed, beams no more complex than FIG. 1A yet still itinerant via reflectors and use BSs in a row that are all tilted essentially towards the same quadrant. For example, the BSs in FIG. 3C have Cartesian angles in the plane of the paper (with respect to the x axis which is understood to be the beam, 103) of greater than $\pi/2$ (tilting towards the $2^{nd}$ quadrant) while the angle of the LDE's activated in FIG. 3D are less than $\pi/2$ tilting towards the $1^{st}$ quadrant. Though not necessary, this can be used to optimize reflectivity. For example, activating BSs on the far right side of FIG. 3C with BS's having angles that will divert light into the pupil (BSs tilted towards the $2^{nd}$ quadrant but having an angle of incidence so small that less reflection results) suggests an opportunity for implementer adjustments to accommodate the larger variations in amounts of reflection driven by angle of incidence based upon Snell's law. This lower reflection due to small angle of incidence can be also be alternatively (without being so selective in LDE placement) or additively accommodated with adjustments in duration of LDE activation, amount of charge used, polarization in embodiments where light polarization is rapidly adjusted, instant light source brightness and paired BSs, often in separate planes of BSs, contributing to the same pixel.

Finally, for each such pair of opposed lasers, one can be replaced with a front surface mirror normal to the rays of light from the other laser thus reducing assembly, power requirements and parts cost but maintaining a potentially continuous dual direction illumination of time-chosen BSs to be activated. For example, the two light sources, 102 in the left center of the screen in FIG. 3B can be replaced by front surface mirrors. The single laser for each route can also be left on continuously in embodiments where laser on/off switching is not being used to select a row (or column) as described herein. Depending on display size and level of activity, more or fewer itinerant routes than the 2 shown in FIG. 3B may be chosen by implementers.

Also note in the perspective of FIG. 3C, which illustrates a second path, 309, for a beam of light to travel through with this path being more distal to the eye than 103. FIG. 3D illustrates one embodiment where there are only two planes of itinerant beams with the most distal plane containing the path that contains LDE 308 (positioned in this example for a leftward beam in path 309) and the more proximal plane containing 307. Separation of light path can optionally be by choice of light-path plane (one tracing an itinerant route perhaps from bottom right to top left while the other plane has light on an itinerant route from top left to bottom right.

Preferred Embodiment of Itinerant Route

The preferred form of one of the simplest embodiments uses dual direction rays in a plurality of paths itinerantly traversing a plane with said rays originating from a laser and being mirror-reflected back. BSs are arrayed in the plate, 101, at angles so that they can be activated by software, effect a reflective surface from that charged activation and, thus, direct the light upon the chosen path to be viewed as an image component. This simplest embodiment can be configured to use the laser's timed activation as a part of the BS row or column selection process (as described herein), or, have all activation selection effected (without the need to flash a laser on and off) via charge carriers (like ITO).

Or, for applications where light escaping through the distal surface of the plate is not an issue, the laser for each route can be allowed to stay on continuously as needed and coming from both directions at the same time via reflection or lasers at both ends of the same path. Then, light from the "wrong" direction may strike an activated BS intended for reflecting another direction and thus reflect light harmlessly away from the viewer. Spinning mirrors, etc. as is common in display optics for time-based selection of light path can also be used to scan BSs as an alternative applicable embodiment. These can still operate in time-separated periods so that a BS is only activated when reflection is desired.

In a preferred embodiment, as shown in FIG. 1, the rays tend to enter essentially normal to the cornea (or close thereto) to minimize penciling/diffusion and reflective loss and represents, through an array of LDE's, an image for some or all of the FOV of the eye even as the eye moves and the pupil selects a different view of the incoming light. However a single-direction ray embodiment (e.g., parallel rays) and any other subsets wavefront patterns from LDE's are also fully functional embodiments of the current invention.

Figure 4A:
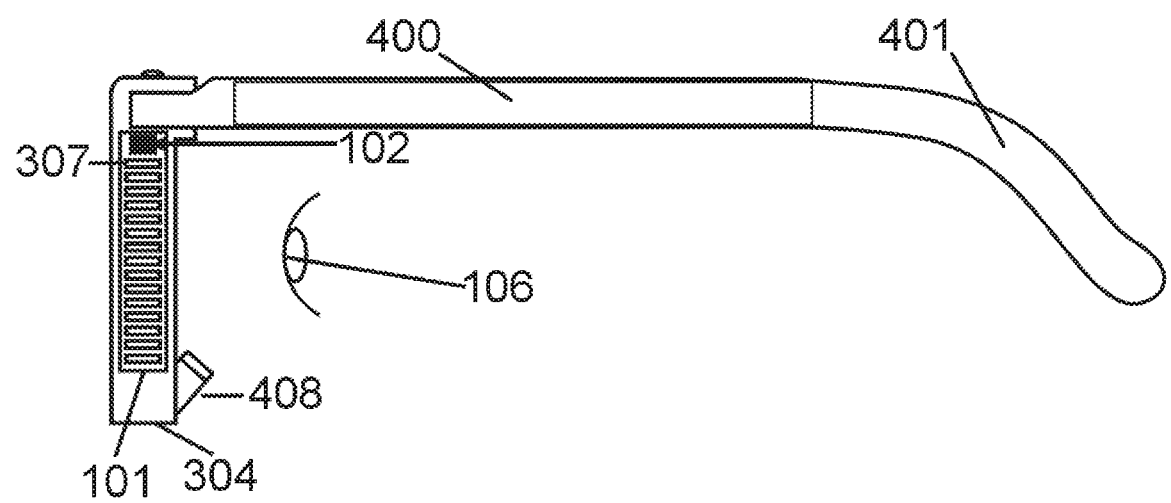
FIG. 4A provides a side view of a plate being mounted in the frames of ordinary glasses.
Figure 4B:
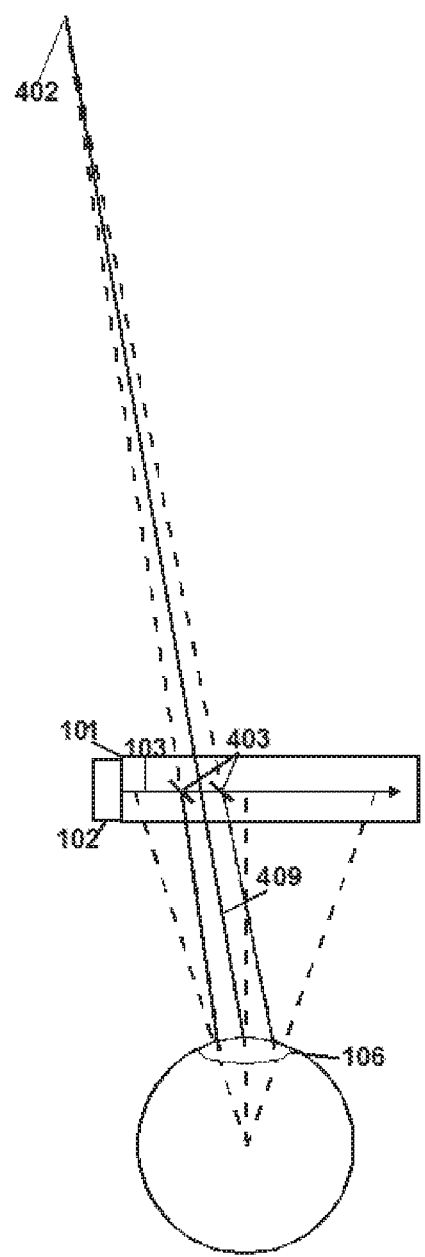
FIG. 4B includes an apparent displayed point in the distance (significantly distal to the eye and the plate) responsive to redirecting elements in the plate.
Figure 4C:
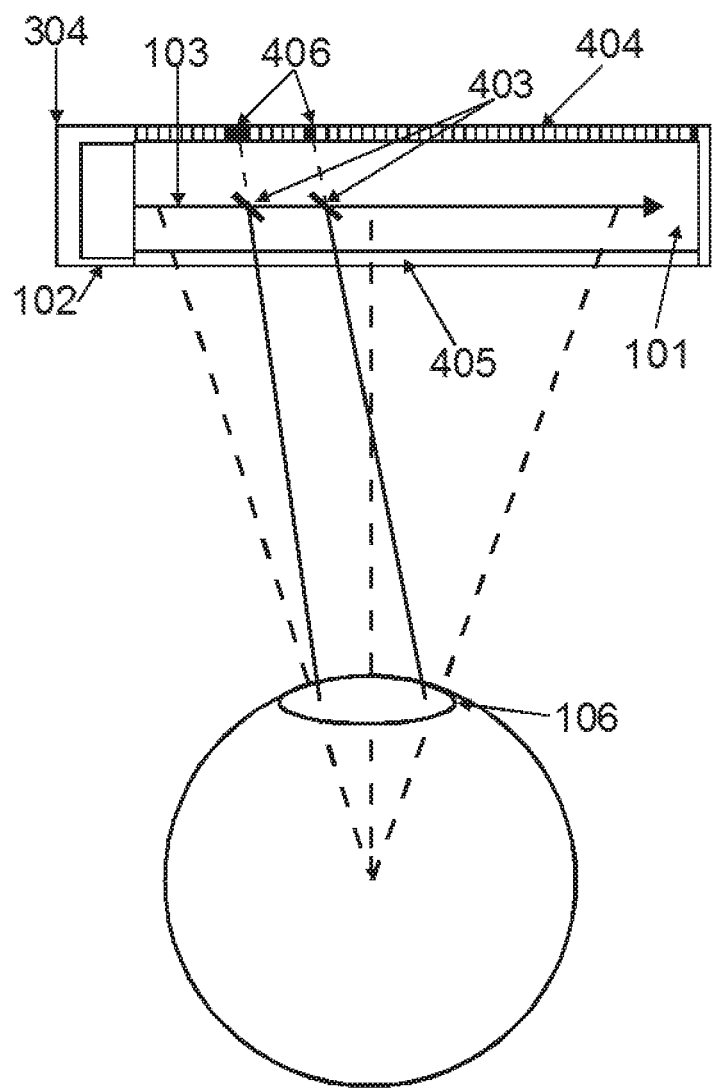
FIG. 4C further illustrates the means for acquiring a bright image in the assembly of FIG. 4B.

As can be seen in FIG. 4, there are more complex optional combinations of LDE's e.g., BS' optionally available for creating a full display image than the simple "one LDE per each radiating 'pixel'" approach. For example, FIG. 4B illustrates a virtual POI (a point of interest in space), 402, to be displayed by activating two or more (two shown here) LDE's, 403, in the path to that POI from the eye. In FIG. 4C the imaginary lines to 402 are removed but the subject "sees" 402 as the proper eye accommodation for the distance to 402 brings the brightest central part of rays reflected from the two BS's, 403, together. Of course, the different images arriving upon the other eye can, and typically will, include the proper binocular overlap to eliminate the disconnect often associated with 3-D displays (between a clashing lens accommodation and binocular overlap in the brain causing headaches and disorientation). This and further 3-D options are described herein. This multiple LDE/"pixel" reproduced approach can also be effective when only a subset of the image (even 2 rays) is thus produced since even that subset will blur (hit at substantially disparate points on the retina) in the eye's perception unless the proper eye focus (and thus sense of depth) is accomplished.

The eye pans and tilts around viewing this array viewing simultaneously the scene view and the related display view together. Each of these narrow shafts of reflected light is analogous to the at least the central cone of beams from a physical isotropic emitter that reaches the round pupil (the base of the cone). Thus, the LDE array creates an image on the retina for those areas whose associated BSs are "activated".

Figure 5A:
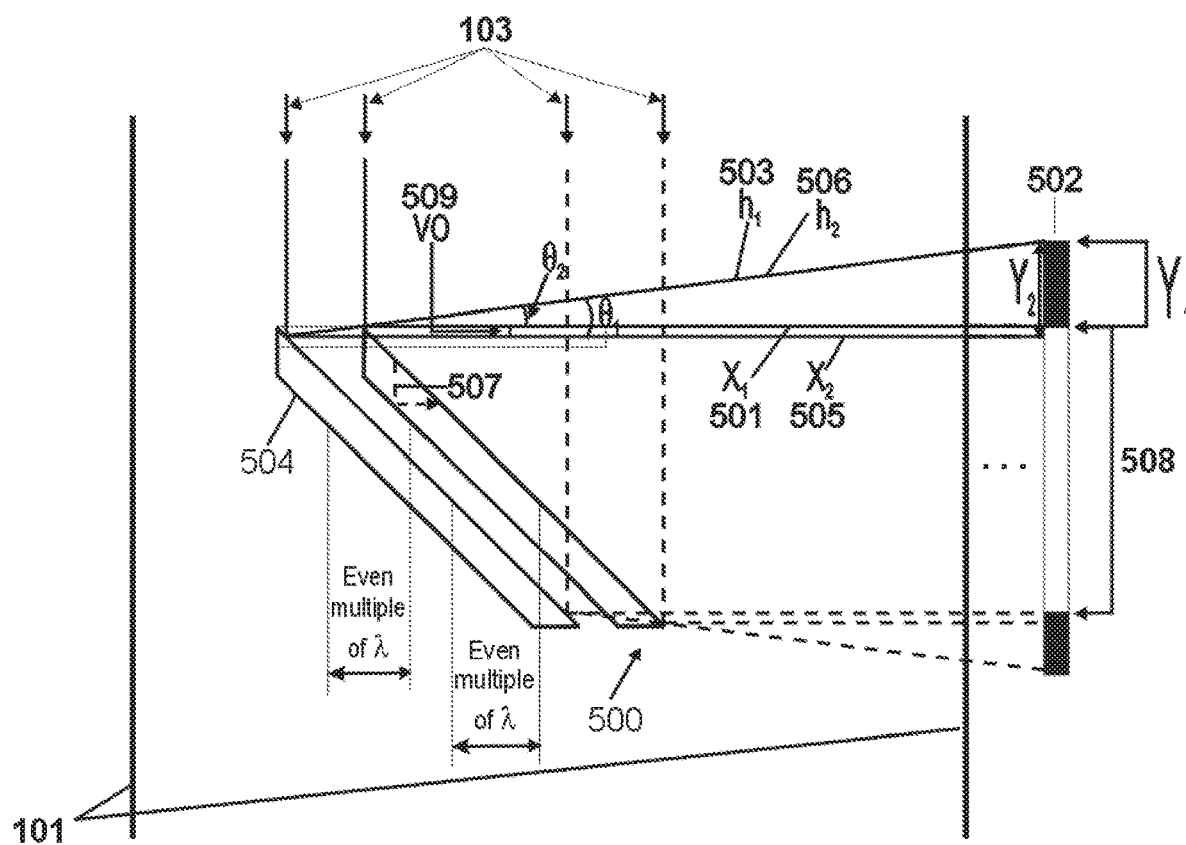
FIG. 5A illustrates an assembly configured to minimize constructive interference.
Figure 13:
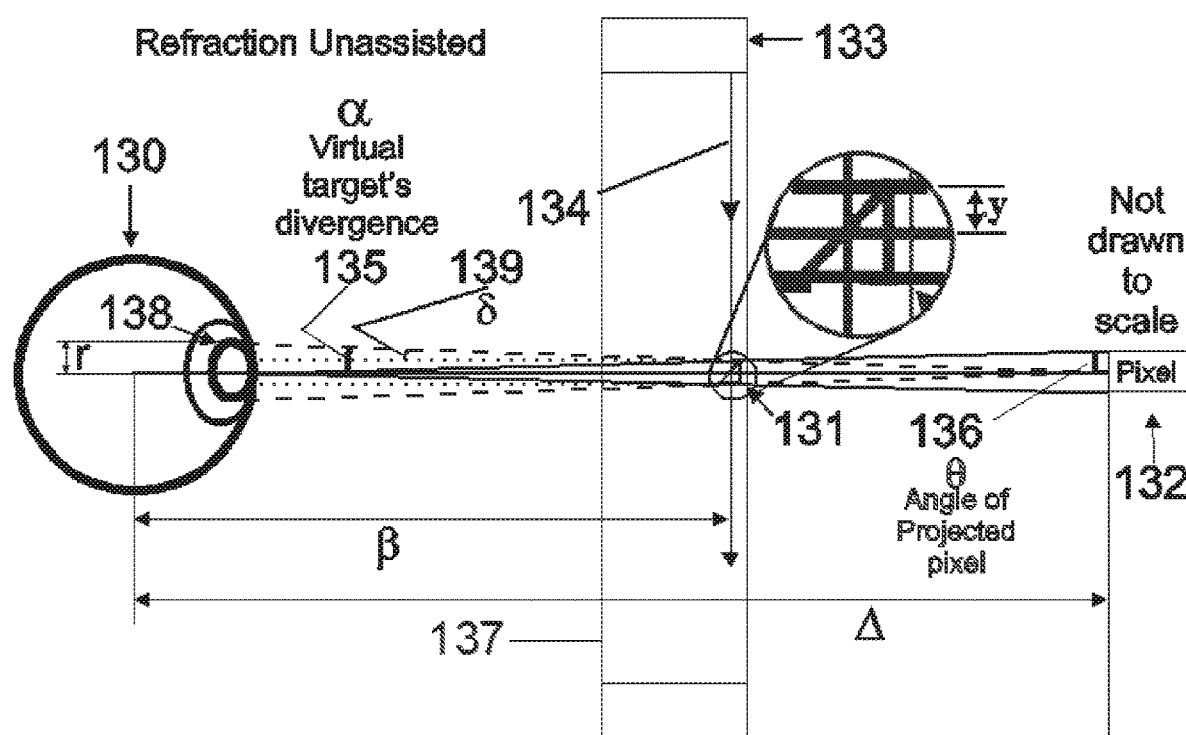
FIG. 13 illustrates some the geometry associated with light-directing elements.

Although the BSs are drawn with single lines in FIG. 4, the "dual image" (reflectance off of both sides of the BS) may be eliminated where desirable by other shapes such as the triangular-solid BS' shown in 131 in FIG. 13) so that any reflection from subsequent surfaces encountered retrace the source beam or exit rather than being directed to the eye. However, in several embodiments, the thickness of the BS is used to both control and exploit constructive and destructive interference (effectively elements of brightness) and diffraction as described herein. Its thickness can be controlled using known deposition and other formation processes to be very thin or be very thick. In one embodiment configured to minimize constructive interference in the two layers, the path of the light reflecting inside the BS (between the surfaces), e.g., 507 in FIG. 5A, is an even multiple of the predominant wavelength of the light so that light reflecting off of the back is in phase with the light reflecting off of the front. Where angle of incidence and angle to target result in back reflected rays having a different phase, the implementer can choose a thickness that, for the path determined by those angles, the difference to the target from back and front-reflected light is essentially in phase (a disparity that is an even multiple of X).

The light reflected geometrically from the surfaces of the two BS' is constructively in phase resulting in a central bright spot surrounding the central geometrical area of reflection. This is good. Also, because diffracted light from 504 will, where coincident with light diffracted from 507, be out of phase having traveled a greater distance. This creates a darker fringe around that central bright area e.g., the dark area of the cross sectional illustration of 502. This is also beneficial (maximizing the contrast around the area of the geometrical reflection). This is discussed in more detail below.

Plate Invisibility

The transparent plate (drawn in rectangular form here so as to simplify this particular example to the non-corrective lens shape), 101 in FIG. 1, is preferably located to have its surface essentially normal to the vision axis of an eye looking straight ahead whose iris, 106, receives the scene view (rays from the scene view are not drawn) that has traveled through the transparent plate from the world in front of the viewer. Although some embodiments will not include this scene view, it is usually described herein as included for simplicity.

The plate, 101, in this example may be a solid with the appearance of a plate of glass or a combination of a solid shell with a filler such as a liquid, optical cement or gel, etc., contained inside, normally with these elements having essentially the same RI when no image is being projected. The term "medium" herein with regard to the plate or its filler will refer to the contents of the plate whether that content is simply the plate itself (a solid) or any material inside a shell.

Thus, at the default RI (where no image is being displayed), the optical elements, having the same RI as the surrounding media and components, do not create boundary conditions, reflection, diffraction or refraction. There are also potentially large numbers of additional other planes normal to the paper and parallel to the plate surface being populated by rows or patterns of LDE components inside the plate. These additional layers of BS' are not drawn here for simplicity and because, when they are not activated they do not refract or reflect light (and are, thus, invisible). However, when an area in the plate analogous to a pixel (i.e. emulating the effects of a positioned light source coming from a position perceivable as a pixel in a display) is activated, it exhibits a shifted RI resulting in controlled redirection and optional processing of the light passing through it. These paths of redirected light reach the eye of the user and are perceived as an image. Due to the potential for wavefront reconstruction, the image so viewed can be 3-D.

Exceptions to RI uniformity at default values: The outer surfaces of what is called, herein, "the plate", 101 in FIG. 1, do not have to have the same index of refraction as the RI-matched "contents" between the outer surfaces. In fact, other planes of transparent element parallel to the front of the plate can also have a different RI without destroying the effect. Though it is advantageous for the RI of all elements in the plate to be the same, the refractive shift will, with many contents/shell mismatches, be about that of ordinary eyeglasses. Also, at least one side of every conductor pair may, in certain unique embodiments (such as those where light diode switching contributes to row or column activation area selection), be a single uninterrupted layer of conductor rather than a conductor trace linking a row (or column) of EO components. Thus, a general exception to the homogenous RI rule exists for an uninterrupted layer, e.g., a ground layer, which is essentially flat or uniformly curved (e.g., being matched to a number of uniquely charged or uncharged leads on the opposite side of an array of EO areas or components to effect an array of EO light modulators perceivable as pixels), the RI of this uninterrupted surface does not necessarily have to match other components at default. This is analogous to putting a flat plate of glass in front of a pair of glasses. It may have a different RI but the image, while not as pure as without the plate, is not destroyed.

Activation e.g. from Table Via Conductors

The activation of LDE optical elements are effected in this example embodiment by a charge on opposing sides, ends or edges of the EO component as chosen by the implementer. In general, the ideal path through the LDE is the shortest if you want to maximize RI shift and thus pixel brightness (which isn't always the goal). Indium Tin Oxide and other transparent conductors are routinely used to route and apply electrical charges in such applications to LDE components.

The processes of converting a still or video image into a set of pixel intensities and routing a charge relative to each of those pixel intensities to arrayed locations via conductive leads, matrices and hybrids is not extensively detailed here as it is well known by those skilled in the art. The ideal amount of charge required for a particular pixel intensity will vary by EO material, angle of incidence, chosen light polarization characteristics, period of activation, intensity of the light source and diffraction (determined by BS shape, size and the effects of combined BS cooperation in the same light vector). Thus, as described further below, it will be normative for different pixels in different locations desiring to produce the exact same intensity (e.g., in flat-fielding calibration) to receive either different (both calculated and experientially attained) charge amplitude values, different charge durations, different light intensities, even varying polarizations, different combinations of pixel partners (where two of more EO components cooperate to paint a single pixel), or combinations thereof. Thus, the designer of a system will typically calculate or model, using the known characteristics for the components used, a most-ideal set of component characteristics for different component areas. For example, in a preferred BS environment, the angular attitudes of the BSs are all geometrically calculated to reflect their beam towards some common point in space that could intersect with the vision axis of an eye. That is, each of the BSs arrayed at different azimuths, elevations and, optionally, depths around the eye, can all be assigned attitudes (for proper angle of incidence) such that all of the beams would, if the eye or eye-simulating sensor were not in the way, cross essentially at a single point thus effecting a convergent image of the arrayed LDE's.

Calibration

However, although these calculations are easily made, tolerances and errors in manufacture make calibration necessary. While the well known art of calibration is not novel to or tediously taught by the current invention, at least one calibration process makes this a welcome task by enabling a uniquely accurate embodiment that is forgiving of errors in design and manufacture as well as deformations and misadjustments from later use/misuse. Once the arrayed LDE positions have been calculated and fabricated, the assembly can be calibrated by a net receptor (virtual eye sensor in testbed) at varying light-source intensities, durations, charges, combinations of LDE's, etc. such that the calibration curve(s) can be used directly by controller software to select values for brightness-controlling elements, etc. for each effective display pixel to be activated (a process well-known to those in the image processing field). While use of calibration curves and their application to calculating appropriate light attenuation or accretion required to get a desired output from an actual system is well known, it is particularly useful to, as part of the calibration process, to also test essentially all logical combinations of activations and simply capture the light characteristics and apparent pixel locations that result in the virtual eye (e.g., charge coupled device (CCD)) based on position, divergence (here related to the size of the stimulation area upon CCD nodes analogous to a circle of confusion for a single pixel), and intensity. For example, a calibration assembly may comprise a plate like 101 in FIG. 1, whose proximal face is normal to and centered upon the vision axis of a lens and sensor (e.g., a camera in place of an eye). These calibration data can be converted into algorithm(s) or other logic responsive to the calibration. Thus, the net calibration can incorporate and subsequently at least partially correct for all sources of error since all sources of errors contribute to the net final actual arrival points of light. This relationship between sensor-received light and the LDE activations that resulted in them provides a path from desired results to the activations that effect them.

Or, in the preferred embodiment, these calibration results are simply organized into a table. However, though the table example is a valuable means of simplifying principles of a complex operation with data normalization, faster response times can often be achieved with other well-known software methods that accomplish the same retrievals or calculations in any number of applicable ways. The table, in its most basic form, relates each LDE or team of elements related to the display of a "pixel" to actual performance in situ (here defined as in the natural position within a test environment appropriate to calibration for the worn environment). Thus the effects of direction, degree of divergence, brightness, apparent location (pixel location), etc. is, now, stored as actual rather than calculated/estimated with reflection angle errors. Such tables can be normalized and structured in any number of ways one of which is reflected in the following very simplified data structure:

Data Format for Calibration:

Where row and column is the actual apparent (to the viewer) row and column based on the center of the cluster of nodes on the CCD (whose CCD row and column can be used to identify the row/column of a FOV responsive to the activated LDE's); optionally brightness-centered. The primary database key is row+column (using the well-known data key normalization protocol for stacking a plurality of key elements into a single search/SQL value). The row and column of an imaginary screen (related to the pixels of the CCD) define an obvious method for identifying the perceived azimuth and elevation of image portions from the perspective of a properly placed eye. Ideally, the calibration CCD or combination of CCD's used has significantly more pixels than the display of the current invention so that multiple CCD pixels can more effectively represent a divergent beam from one LDE (or teamed LDE's forming one pixel) and, of course, in color embodiments, capture net resulting color from the LDE or teamed elements. Thus, in a preferred calibration process, each individual or teamed LDE (multiple LDE's to form a given pixel) can be activated in logical combinations and the results captured. Note: there can be multiple records with the same row and column value because there are multiple combinations of teamcodes that will result in the same apparent pixel location in the displayed image. This can be extremely useful in allowing software to select a different combination of LDE's for the same pixel either to increase brightness (activating more than one set) or to activate leads that aren't already in use in the instant display cycle, etc.

Teamcodes identify, directly or indirectly, the LDE's to be activated to produce a given row/column pixel by identifying directly or indirectly (directly in the preferred embodiment so that no interpretation is required for the subsequent lead activation) electronic leads to be activated or by any other identifiers determined to be used by software to identify those activations. For example, teamcodes can be an embedded series of lead numbers (the preferred embodiment) or a pointer (index key) to a related database containing teamcodes for the row/column.

Thus, when software seeks to "light" a display pixel (i.e. activate the best LDE(s) to reflect light that will appear to come from the apparent location; i.e. a row and column of the viewers FOV), a table record for that row and column is sought by the primary key. Teamcodes for the thus-acquired record(s) (there can be many to select from for the same pixel) provide the information needed by anyone skilled in the art to activate leads leading to the LDE's of choice. Of course, the table option is only one of many applicable embodiments responsive to calibration and controlled fabrication.

Relative intensity is a value (or set of values, optionally keying to a supplementary database in less preferred eMbodiments) relatable to the actual brightness as received on the testbed CCD when the teamcode-indicated LDE's are activated. Since light source intensity can be varied, this value can be used by software as a relative term to be used by software to decide on activation term (e.g. a longer term to achieve more brightness for the same charge) or a modified charge amplItude). Also or alternatively, this field can simply point to related database values for combinations of activation periods, polarities, charge amplitudes, etc. to even better enable software to direct the appropriate brightness of a pixel. Multiple CCD pixels receiving light from a calibration activation pass can represent a divergent beam from one LDE (or teamed LDE's forming one pixel) and, of course, in color embodiments, capture net resulting color from the LDE or teamed elements.

Divergence

Divergence is a value indicative of the divergence of the light emanating from the teamcode-selected LDEs. In one form this may be stored simply as the number of or cross-sectional range of testbed CCD pixels receiving a threshold-surpassing amount of light resulting from a given LDE or LDE team activation. The threshold is based on an implementer-chosen brightness cutoff that limits the inclusion of nearby (from central) CCD pixels (center may also be identified with respect to brightness). Any implementer-chosen thresholds are applicable and may be guided by experience, common sense, signal contrast goals and/or others such as the Rayleigh Criterion based on resolution objectives design as is widely understood. Although many such applicable methods and more apply for the identification of the peripheral boundary of the threshold of inclusion, in the preferred embodiment it is simply calculated as the circle around the center of that area on the CCD surrounding the center of the Airy disk that comprises 84% of the total power received by the CCD responsive to the currently activated LDE's. The center of the intensity pattern on the CCD is found by common means and a representative line segment is identified from that center to (or significantly towards) the most distal portion of the CCD (this accommodates centers that occur at edges and corners of the CCD and choosing horizontal (for convenience and fewer pixilation issues) paths on the CCD speeds the simple calculation). The data is normalized by summing the intensity of the line segment and considering it as a relative value for total power. Then the intensity values are summed for pixels along that row (or other pattern) from the center until that sum is 84% (or other chosen value) of the full line segment's intensity value or other implementer-chosen indicator relative to power. The distance, r, between the CCD node at the center and the node whose intensity measurement brings the total (between and including these two points) to 84% defines the radius of the estimated Airy disk. The half angle of divergence, a, can be calculated as: (this simplified and non-limiting example does not consider the interaction of a lens-based testbed camera but, instead, the simple placement of a CCD proximal to the point of proper eye placement such that the reflecting parallel light creates a largely non-divergent geometric image plus diffraction on the CCD).

$$\alpha = \mathrm{Tan}^{-1}[(r-\sigma)/d]$$

where σ is the radius of the geometric optical reflection from the LDE, r is the radius of the entire area/circle of active image on the CCD and d is the distance to the LDE from the current center node.

Though divergence data can be stored in many forms, in the preferred embodiment divergence will be calculated at calibration time (prior to final data storage) and recorded either as the effective half-angle of divergence, α, or, in the most preferred embodiment, the apparent distance, D, to the POI implied by this divergence. E.g., $D=r/\tan(\alpha)$. Also stored are either azimuth and elevation represented by the POI or an equivalent row and column value on a plane, or any other notation, such that the location in space of the POI is identified with the appropriate LDE's. Thus, after calibration, the apparent location and (at least for 3-D applications) the distance of each LDE and many combinations of LDE's upon activation is known.

Then, for example, when the software needs, in order to produce a given image, to light a given pixel (by activating one or more LDE's) to create light that appears to come from a point of origin relative to that pixel row/column position and to have a given distance (which can vary in 3-D applications), brightness, color, etc., the table is consulted. In the example embodiment, the table, normally resident in memory, can be keyed on, for example, row+column+divergence (or distance since divergence is a function of distance) in a "find-nearby-values" mode to find the "records" with teamcodes for activating LDE's that will appear to come from the desired azimuth, elevation and distance (also color e.g., if the light source is not variable). The amount of light source brightness, length of activation or both (along with a long list of other brightness controls described herein) are now, based on the relative brightness value in the chosen record can effect the desired brightness. Thus, based on these thus-calculated and calibrated values, the appropriate charges are applied to the teamcode-designated leads activating LDE's and light is redirected to the eye.

Of course, some embodiments, particularly non-3-D embodiments, will not be concerned with distance but will store some values appropriate to the application that identify a perceived pixel and the LDE's that can effect it.

Image Formation: Scene+Disp

In many head-worn displays that provide a scene view, that view has a narrow FOV limited by the characteristics of the display providing the scene image. However, in most embodiments of the current invention the viewer sees the wide FOV and high resolution of the scene via ordinary light from the scene passing through the plate to the eye. The scene view is unimpeded by the display elements. In embodiments where the scene view is precluded by equipment implementers, such as by a distal opaque layer either temporal or static, the laser display functions still perform as described. However, in some embodiments, such as night vision glasses or when the natural light from the scene does not pass through the plate, a captured camera (typically worn, not shown in FIG. 1A) image of the scene is displayed as the wide FOV display image in the appropriate spatial location using the display technology of the current invention. Overlaid upon this can be other displayed images such as analytics and text.

The dotted lines in FIG. 1A do not represent reflected light from activated BSs (only a few BSs are illustrated for simplicity) but are potential path indicators illustrating the general radial (convergent towards the eye) nature of the array in this particular drawn embodiment. This 2-D representation of a 3-D assembly describes an array of BSs that potentially provides a pixel of light from each azimuth and elevation (pan and tilt) of the eye (within a prescribed resolution and FOV). Thus, a kind of dot-matrix/row&column (analogous to raster) image is provided with that image being projected on the retina in inverse form. Note in FIG. 1A that some of the dotted lines fall outside the instant range of the pupil as drawn and, thus, that the plate can and normally will provide image rays from wider azimuth and elevation sources to be seen when the eye rotates or saccades beyond the fixed drawn position of FIG. 1A. This allows the wearer to look around and see a continous image as the eye scans the combined wavefronts: i.e. the image being constructed artificially along with the natural wavefront of the scene view.

In FIG. 1A, 4 beamsplitters are shown creating the illusion of 4 points against the scene from the 4 rays seen as solid lines entering the cornea 106. The positions of these dots of light against the natural scene will be determined by the angle of the beamsplitter with respect to the collimated beam and the eye and its position in the plate. A collection of these dots is perceived in the brain as an image against the natural scene. (It will not be repeated for each embodiment but it is understood that the scene can also be blanked thus limiting the user's view to the projected image.)

Dealing with Both Sides of a BS

Of course, the beamsplitters, as drawn in FIG. 1A, normally have two effective surfaces or boundary layers with shifted RI's resulting in reflection. These surfaces can be close enough to produce a pair of beams so proximal as to serve as one pixel yet enjoy the benefits of increased (combined) reflectivity while being adequately distal to each other to minimize destructive interference following well understood techniques familiar to those skilled in the art. Although not the primary factor, selecting a BS thickness for a given embodiment will benefit from choices resulting in little intensity loss due to phase-shifting-driven destructive interference. Depending, of course, on the wavelength of the light source, this can be accomplished by a difference in path length to the eye that is normally not ½ of the wavelength and/or such that the path inside the BS is long enough to make the two vectors strike the retina adequately apart as is commonly worked out by those familiar with such optical effects. For example, the path of the light, 103, inside the angled BS can be a near exact multiple of the wavelength of the light source. Alternatively, the second surface can be normal to the itinerant beam (or otherwise reflect the beam away from the eye responsive to a non-parallel nature of the two BS surfaces) to prevent any noise from the second surface.

Non-Transparent Component Placement

Figure 2A:
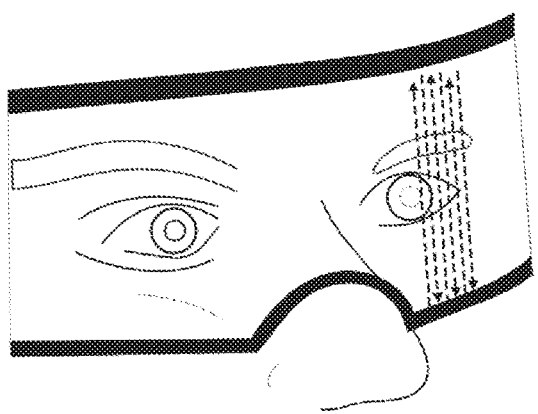
FIG. 2A illustrates one embodiment of a single continuous curved plate providing an unbroken view of the forward view (the wearer's view of the scene ahead).
Figure 2B:
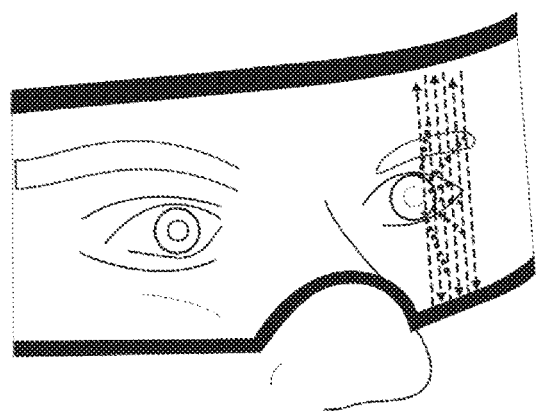
FIG. 2B illustrates the same curved plate but additionally shows rays being directed towards the eye as they are redirected by the subcomponents in the plate.

Non-transparent components may be placed in the edges of the plate (e.g., in the frames of ordinary-looking glasses like the ones shown in FIG. 4A), or single wide view plates providing an uninterrupted landscape view for both eyes simultaneously, e.g., the curved plate shown in FIG. 2, or in potentially large flat screen laser-projection TVs.

Without moving parts, without lenses aligned with other lenses and with the potential for effective mechanical fixation and protective sealing, the assembly can be ruggedly insensitive to fog, inter-component misalignments, impact and water. There are several embodiments with increasing levels of resolution and color selection which will also be described herein. Scalability: Tiny worn displays to 2-D and 3-D billboards. Also, virtually all embodiments of the current invention are scalable. Thus, the plate may also be, for example, 3 m (meters) wide and 2 m tall to form a large screen "standup" display capable of both 2-D and 3-D images viewable up close or far away. Indeed, very practical embodiments of the current invention include screens large enough to be in the form of a highway billboard. To deal with the need for brightness in sunlight, existing sunlight may be ported into the light path, 103 in FIG. 3A, via a beamsplitter near the light sources, 102, in the usual manner which allows either or both sources of light to follow the paths shown in FIG. 3A. Of course, the light sources can also be physically switched when the sun comes out or when the light becomes dim by all ordinary means. Acquiring sunlight as the sun appears to move with a servo sun-tracking assembly and redirecting this sunlight into the path is well understood by those skilled in the art and not recapitulated here. Diffraction of the very bright sunlight on the LDE's, although this can also be dealt with via many of the diffraction control methods described herein can be simply managed by reducing it with larger LDE's (easier to do in a very large display with big pixels) and increase diffraction where desired (as described herein) by reducing the size of some or all of the LDE's.

Figure 15:
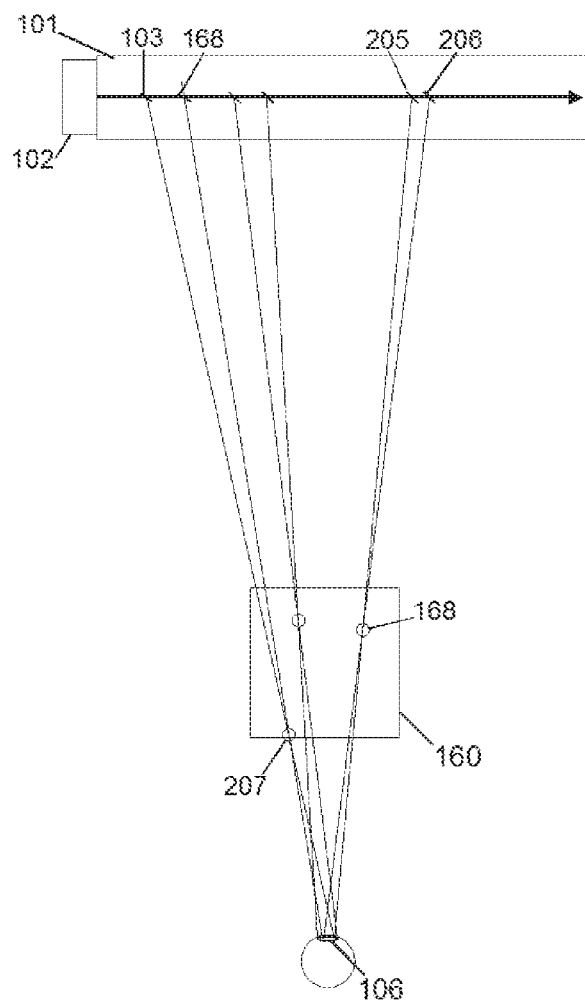
FIG. 15 illustrates an apparent 3-D image location frame.

FIG. 15 illustrates an apparent 3-D image location frame, 160 which simply identifies an area within which the apparent image may be located (here the image appears to be located between the screen in the viewer. This simply illustrates (by the circles locating line of sight intersections in the image location frame, 160), where the image, originating from the plate 101, will be perceived. For example, LDE's 103 and 168 redirect light along paths which intersect in the circle, 207. From the perspective of the viewing eye at 106, the light appears to emanate from 207. Thus, the distance from the eye at 106 to 207 is the perceived distance to the apparent "pixel" at 207. Also, 207 will appear closer to the viewer than 168. This is applicable to any kind of display from a television screen to a large billboard. In each, the perceived image will appear to appear between the plate 101 and the viewer. The substantial power of these concepts for providing depth perception in an image is further illustrated in FIG. 4B. For example, as FIG. 15 illustrates that a portion of an image can be seen to be substantially in front of the screen (between the screen and the viewer), so FIG. 4B illustrates that, potentially simultaneously, all or some of the image can also also appear to be far behind the screen. The sum of the range from far behind the screen to far in front of the screen represents a large range of potential perceived depth. Also, there can be many, many LDE's. If you cannot fit enough in one plane in the plate to meet the needs of an embodiment, you can add essentially any number of additional planes parallel to and within the plate, 101 (just make the plate thicker to make more room or the paths of light more discrete) filled with LDE's. Thus it is also possible to provide the benefits of a wavefront reconstruction not unlike that of a hologram which allows you to move your viewing perspective and still encounter enough light seeming to be coming from a single point yet containing photons heading a number of directions (which permits lens-accommodation-based depth perception, binocular-overlap-based depth perception, and parallax-based depth perception). Similarly, by providing enough LDE directed photons to represent enough of the rays of a wavefront reconstruction, the viewer in FIG. 4B and FIG. 15 could move his head and still encounter rays analogous to the ones drawn in these figures (but directed to the then current areas occupied by the viewer). This, of course, also enables these displays to provide these effects to multiple simultaneous viewers at multiple locations in front of the screen.

Color may be provided by any practical means including multi-chromatic light source with filtering, diffraction or sequential control to separate colors in time (such as a spinning color wheel) feeding the light source. Also, color-separating gratings optionally associated with EO components and, of course, red, green and blue laser sources are other good alternatives as are color selective modulating elements (i.e. ITO excitation of an RI modulator that also changes color). Where the light source provides multiple colors, e.g., multiple lasers, each laser (or other color source)

may be positioned to follow a path populated by LDE's whose activation will cause that color to be reflected. Color can also be time-selected where the light source provides one color while LDE's intended to display that color are activated (are caused to be reflective by having an RI different from that of the surrounding media of the plate), and another color while LDE's intended display that color are activated. Also the known practice of inserting holographic and other gratings in the path of light to select color and the use of holograms otherwise described herein for use in light direction can also be used to select color are useful optional embodiments of the current invention. Thus, all technologies capable of providing colored light (whether the light sources are unique to each row or those that follow an itinerant path to service multiple rows) are all applicable to the current invention. Control of colors actually display may also be accomplished by the separation of multispectral light after LDE's have redirected it. For example, in a time-based separation strategy, white light may encounter the LDE's but, before it reaches the eyes, it is filtered to transmit a chosen color. The old standby color wheel, for example, is often used to place a green filter in the path when the light image passing through it is the green component of an image. Similarly, of course, for the three color system example, the same is done for red and blue. Of course, it is also possible to combine these different approaches to color provision into a single embodiment.

Thus, the current invention is also an eminently flat screen technology (despite the fact that, prior to the current invention, flat screen and laser projection wouldn't work together). Standup display embodiments, like worn embodiments, may optionally be enabled with eye-tracking (ET). It can be expensive or impossible to provide a dense LDE-provided wavefront of rays to every point in a large area so means to select a smaller area to send light to allows for better discretization. Eye-tracking is to be used in such situations to locate the eyes of each viewer so that appropriate LDE's are selected to send light to the locations of those eyes (rather than wasting LDE's sending light to areas for there were no eyes). On worn displays eye-tracking cameras are preferably mounted in the glasses while for standups they are preferably mounted on the standup display. Also, for embodiments applied to large screen TV's and billboards (which are understood to include billboards with moving video images), I tracking and be applied not only to more efficiently provide LDE-directed light only where there are eyes looking but can also be applied to tracking moving eyes. For example, a billboard, in order to provide a 3-D image that appears to be suspended in front of the viewer may track the movement of that viewer to redirect LDE-directed light to where the viewer is currently.

Eye Box, FOV and Eye Relief

In one preferred embodiment the FOV is similar to that of an ordinary glass lens in a pair of glasses and at least 80 degrees. Choice of FOV affects eye box. For this described embodiment, we minimize eye relief (distance from eye to optic) to maximize eye box keeping it to about 9 mm. In a typical optics environment (ordinary glasses) sized like ours this would suggest an eye box with lateral diameter over 40 mm but we will not do that well because at this point we aren't presuming full wavefront reconstruction. Thus the eye box will be less that 40 mm and how much less will be determined by the amount of wavefront reconstructed.

In the plan for the first prototype eye box (lateral tolerance) should be about 10-12 mm but that is manageable with good glass frames. Also, because the light's divergence is controlled, the eye relief (axial distance) tolerance is also well within the ability of glasses frames.

Computer Hardware, Software and Basic Logical Methods:

Except as described herein, software for the processing and display of video images is a process understood by those familiar with the art and, thus, processing details that are normally understood or obvious to someone skilled in the art are not explicitly detailed here.

The basic function of addressing a conductor matrix and applying a charge to one or more nodes, for example, is neither a new process nor the novel focus of the current invention. Thus the current invention's applicable embodiments include every practical means for activating any of the arrayed LDE components. The system's software interrogates image data and reproduces it.

Computer:

Similarly, computer devices capable of running the software described and otherwise appropriate for the functions listed are not limited to any given application specific integrated circuit (ASIC), processor, controller or collection of processing means; all are applicable. The computer assembly does, however, have to run the software and have operative connection to activation control hardware. This activation control hardware, familiar to implementers in its many embodiments currently used to select, direct and apply charges to display devices, spatial light modulators, etc., and those that will be designed later, are all applicable to the current invention's task of applying charges in a timely manner.

Communications:

In embodiments for display of information not captured by the worn assembly, a communication device, e.g., a wireless data transmitter, coupled to a wireless receiver in the worn frames or nearby, delivers image data to an on-board processor, also in the frames or operatively connected, which selectively activates LDE components in the plate(s) to display pixels of light. Some processing may also optionally be offloaded to a nearby processor by the same or a similar wireless communicator. However, for remotely received video data, in the preferred embodiment, preparatory processing is accomplished before the image data is sent to the worn assembly. For example, a subject may watch a remotely captured video image wherein that image is being assimilated by well understood (and thus not duplicated here) processes such as clock-directed sample and hold (S/H) circuits and image processing all resolving to values for color and intensity for each pixel of data to be displayed in rows and columns. Even the specific choice of which nodes to charge/activate may be made remotely to minimize footprint and processing overhead in a worn processor.

Thus, for images captured by the worn assembly, all of the typical image processing may be processed by processors in the worn assembly with parts optionally offloaded for remote processing by that wireless coupling. For remotely supplied video data, however, the preferred embodiment of the worn assembly receives data already in the form of either pixel data (location, brightness and, optionally, color) or the lower level instructions (specific to the subject's unit). Example embodiments of the latter are EO component matrix location, charge to be applied and, optionally (when data regards smaller units of time than the default frame rate suggests e.g. for duration-based brightness control), duration of charge application. This allows the worn assembly to simply apply the given charge to the given conductor matrix location for either the typical frame period or a transmitted-data-provided period.

Software Single-Component Imaging:

Consider an embodiment with one LDE component (in the current example this is a BS) per pixel. Image reproduction, in the simplest embodiment, typically involves a video or still image which is understood as or converted to an array of pixels. Each pixel location is associated with at least one BS either by software decision process e.g., recall from a list of image pixel number (often simply row and column) vs. BS numbers (the BS that recreates the desired pixel attributes from the perspective of a properly aligned eye e.g., as based on pre-calibration on a testbed with a camera for a virtual eye).

Virtual placement (depth/light divergence) of a flat image or a 3-D image of pixels appearing to be at a variety of distances is software directed by any combination of elements such as:

choice of BS size (typically from variety of available BSs in different layers satisfying the desired positional and light divergent criteria) and other diffraction-based depth placement options. Diffraction-based divergence is explained in more detail herein.

choice of BS shape (see FIG. 4b)

diffractive controls (discussed herein)

combinations of BSs where a plurality of BS reflections will, at the appropriate eye accommodation, focus to the single point representative of a desired pixel location.

direct changes (e.g. actuation) in physical component locations (covered in detail herein).

choice of light source color (varies effective angle of diffractive divergence) which may be adjustable by implementer choice, Here, the software considers the desired virtual placement (depth as well as azimuth and elevation) based on subject/factory criteria (both fixed and context-sensitive), current subject behavior (e.g., where the subject is looking at the moment when ET capability is present) and any application specific criteria. 3-D imaging is explained in more detail below.

Multi-Component Imaging: (Matched and Unmatched Components are Discussed Separately)

There are a number of reasons for using more than one electro-optic component to represent a single pixel. Some of these include placement of images, brightness and 3-D imaging.

Placement:

As illustrated in FIG. 4 and explained herein, activating multiple EO components to illuminate a single pixel (applicable to BSs and holographic imaging EO components) is one effective way to provide virtual image placement.

Image Brightness Control.

One reason for using multiple EO components for the creation of a single pixel is for contributory brightness. As illustrated in FIG. 1 and other illustrations herein, a pixel may be created by any kind or shape of electro-optic material. Choosing multiple near or contiguous EO components (being near and effectively in the same plane or effectively sharing a vector from the eye) causes their reflectivities to combine for a brighter pixel image. Also, as illustrated in FIG. 4, multiple pixels may contribute to the display of a single pixel even if they are far apart.

In one applicable embodiment the software, preparing to choose EO components to paint a pixel, may simply table select from the manufacturer's table of which BSs direct light that appears to come from the azimuth and elevation associated with a pixel location to be illuminated. These tables may be updated or modified on-the-fly during calibration or by subject-specific configuration preferences.

Brightness is, of course, also additionally or alternatively software controlled by variation in charge to EO components, variation in how long the charge is applied as well as the software selected shape, size, coatings and angle of incidence of EO components chosen. In the simplest application, the intensity value of the pixel to be illuminated is software directed to be directly proportional to the charge applied. Control of image brightness can use one or many of the effective controls optionally available in the current invention.

Corneal Entry Angle Selection:

Although it is not necessary, the essentially normal angle of incidence of BSs, e.g., as shown in FIG. 1A, maximizes perception of brightness by minimizing light lost due to corneal reflection and some diffusion.

Light Source Management:

Controlling the light source output or nature.

Light source management is one effective method for controlling image brightness. Also, by separating the frame into many shorter sub-frames and activating different EO components with variations in light-source brightness (e.g., by spinning wheel filtering, power management to the light source, polarization shift attenuation or other forms of brightness attenuation) between the sub-frames, pixel brightness can be controlled. Also, brightness can be controlled with even minor shifts of light source wavelength (the longer it is, the more of it is reflected to be perceived as brightness.

Reverse Charging:

Increasing brightness control range with a reverse charge. There are many methods of brightness control of the EO component or components used to illuminate one pixel of the display that are considered elsewhere herein. These include choice of charge, EO material (can theoretically be a different material for each different EO component), duration of charge, size of BS, shape of BS, number of BS' for one pixel, comparative darkness of the background, change of light wavelength, adjustment of light source output, change of light source, thickness of EO component (the thinner it between the opposing charge sources, the more effect the charge has upon RI), etc. Yet another way to increase brightness involves increasing EO component reflectivity range.

Each EO component has a maximum change in RI that it can reasonably accomplish within the inevitable voltage limits of a production system. Thus the RI difference between the uncharged component and a fully charged one defines an RI range for the component we'll identify as R. Thus, with a chosen set of charge polarities, the RI range is 0-R (or zero to R). However, if you reverse the polarity of the charges, the range becomes –R to 0. Thus, by selecting, for one or more EO components, an EO material whose "–R" RI is the default RI for the system, then, in the default condition you actually provide a full reverse charge for minimal RI just to achieve the default RI in order to be transparent to the system. Then the charge can vary from full reverse to full normal thus providing a range of RI's essentially equal to 2*R. Thus, more capacity for brightness is achieved (approximately doubled) through more capacity for an RI shift above the default RI. Reverse charging is particularly appropriate for applications where the unit can be easily removed or circumvented upon loss of power.

However, using methods understood by all skilled in the art, more substantial or application-appropriate brightness can be achieved using any combination of these broader factors. Another significant reason for using multiple components is for 3-D imaging which will be explained in detail further below.

Shaped EO Components:

Shaped LDE components, e.g., those enlarged in 107B in FIG. 1B, are useful for controlling the end divergence of the light.

Selective Pixel Activation:

In FIG. 1A the BS' are made from electro-optic (EO) materials and have transparent conductors. In the "default" condition the refractive index (RI) of the BSs are essentially the same as the usually non-conductive (or non-activated) surrounding media and any conductors with which they are surrounded. The term "default RI" as used herein will be understood to mean an RI that RI-adjustable (e.g., electro-optical) components are caused to approach when there needs to be a minimal difference in RI between the components inside the plate. Typically, this is the RI of components in the path of the FOV whose RI is not substantially modified in real time in the normative process.

Thus, unless an EO is activated by the transparent charged leads to have an RI different from that of the surrounding elements, the invisible BS' have no effect, refractive, reflective, or otherwise, on the itinerant beam of light passing through the plate. At this default state, the wearer's view is undistorted and the wearer's FOV is undiminished. The conductor leads (referring here to any electrical connections of any material that are either clear with an RI adequately close to the default RI to minimize impact or are made adequately invisible by any combination of their RI, their narrow diameter, or their choice of placement) are, in the preferred embodiment, arrayed in the well-known "rows and columns" in order to allow selective activation of a node by selection of a row and column to apply charge to. However, any format or method of selectively activating the BS is applicable. One alternative format involves a potentially flat conductor layer for one polarity rather than the familiar array of conductor traces such as, for example, where the EO components are holographic elements. Thus, the other conductor polarity may be delivered by, for example, a column-selecting trace contacting that side of a vertical column of EO components while the other side of the EO components contacts the potentially planar layer of conductor whose RI is not as critical due to its shape. To select a row, in this particular embodiment, a diode for each row is provided which is activated by the processor at the same time that the column is selected by the vertical trace elements whose charge flows through the EO component to the conductor layer. Thus a single pixel is activated by row and column. Such a conductor layer can serve as a conductor for two layers of EO components, one on each side of the layer. However, most of the discussion herein surrounds the more traditional matrix of conductor traces applying a charge to both sides.

When it is desirable for a pixel of light to appear against the scene, a BS, perceivable as a pixel to the wearer, is software selected for the relative azimuth and elevation of a beam it would reflect to the eye. With the BS now selected, a charge is momentarily applied to it, sending light to the eye that appears to be coming from a point in the scene.

Alternatively, groups of BSs may be selectively software-activated to recreate subset elements of a virtual cone of light representative of those rays that might isotropically emit from a single point in the scene and thus form a cone of light with the cone base defined by the diameter of the pupil as illustrated in FIG. 4*b*.

The very slight change in BS RI results in a very partial reflection. Considering the small change in RI responsive to charged EO materials at moderate voltages, it is fortunate that we only want a tiny portion of the itinerant laser beam to be reflected from a selected BS (since even a small diode laser is too powerful to be fully deflected into the eye for long periods of time.

EO Component Mapping for Calibration and Mass-Production Enablement:

An explanation is overdue for just how one could inexpensively mass-produce (stamp, etch, burn or deposit) such complex BS-based devices and make each BS' reflected ray go precisely where you want it to go. The fact is that nothing worn by humans with different shaped heads and even variations in interpupilary distance may ever be that standardized. Further, even if they were, the many opportunities for permanent misalignment of thousands of components during manufacture and the temporal gross misalignment of the whole assembly with respect to the cyclopic axis of the human vision system would make predicting such precision at manufacture problematic (though theoretically possible given the stability of the plate once fabricated).

Thus, a post-manufacture software solution is among the effective approaches to achieving high precision with high-speed, mass-produced parts. As shown in FIG. 4, there are, potentially, many different BSs located in a wide variety of locations, including sharing the same plane, that can be used to create a single virtual pixel. In a multi-level (stacked) stamped (e.g., in planes of EO light directing components) or deposited plate, there can be even more BSs to choose from to light a single display pixel. For example, a single vector from the center of the pupil outward through the plate might encounter in different layers any number of EO components whose light will reflect back along that same vector to be perceived as the same point. Although approximate and orderly patterns with redundancy as needed for a given application is preferable, one could, in theory, even stamp thousands of randomly oriented BSs roughly oriented to deflect light towards the eye. Even in that embodiment, the equipment could then be automatically software post-configured on a calibration device that, much like the real-time display driver will do, activates one BS at a time and precisely records the resulting vector of the directed light.

This can be done by numerous lab procedures well known to those skilled in the art. One such approach is the plate testbed illustrated in FIG. 8D. Here, the plate, 101, is anchored in a known spatial reference position and each EO component is activated one at a time (or in groups) to see which array element on a nearby CCD, 805, is activated by the rays from the EO components. Ideally, the plane of the CCD is parallel to the plate and the center of the CCD and the center of the plate share a vector normal to both.

Since the CCD, plate and lens (where applicable) placement are known, the central vector of light resulting from each BS activated is easily calculated by well known laboratory calibration methods. The lens, 806, may be adjustable and even dynamically positioned to adjust focus more appropriately for the instant-activated EO component. However, for most embodiments, a fixed lens can be used. Thus the focused point of light for a given EO component on the CCD is relatable, by good spatial alignment of the testbed and common laboratory calibration procedures, to the primary central vector of the light from each EO component tested.

This vector for each BS, once captured, is extended in software to cross the virtual location of a virtual eyeball (virtually placed with respect to the physical plate like the eye, 106, in FIG. 8C. Thus, if the worn assembly happens to fit the human subject precisely as it did the virtual or physical test bed (with the subject's eyes exactly where the virtual eyes were and the assembly oriented to the standard virtual or model head exactly as the physical equipment does with the subject's head), we know precisely which BS to activate to deliver light along which vector. Then, at runtime (when a subject is wearing the InVisiVision plate, the IVV, a name used herein for the invisible, i.e. transparent, plate with an image emerging from it), this decision of which EO component to activate can be made by display software by any common means (e.g., using a table of vector vs. conductor matrix location, which identifies conductor connections to activate to cause a specific BS to reflect a given vector of light).

Then, of course, since no human subject will perfectly match the configuration/calibration testbed that recorded the resulting vectors of redirected light for each BS, macro-level alignment of the two plates to the subject's eyes will occur as soon as the IVV is removed from the box and placed on the subject. Such macro alignments of the two plates with the eyes are so well understood to those skilled in the art that they will not be covered in detail here. They may, for some applications and subject-demographics, be as simple as the subject using adjustment screws or verniers to properly fine-tune the orientation and attitude of each plate manually until a clear, unwarped image is observed.

A few enhanced configuration alignment methods include:

Scene Camera: Providing a scene camera (for capturing the natural view before the subject) whose displayed image will overlay the natural scene (viewed right through the plate) making misalignments visually obvious and easily adjusted either by manual screw adjustment or computer assisted adjustment.

ET: For certain other applications where ET (using tiny monochrome cameras in the rim of the IVV "glasses" assembly for worn embodiments) is either already provided for another function or is otherwise practical, the ET software can automatically and without requiring subject expertise, activate several BSs, wait till the subject fixates briefly upon it and use the several responses to recognize the spatial relationship between a plate and an eye. Then either:

Automatically direct the actuation of a vernier or other physical adjustment to approach (servo) the correct alignment of the plate until it is in perfect physical alignment or With that known spatial relationship, recalculate the table (or other BS selection method) so that each BS is now known (and called up) based on its actual and precise vector of directed light to the eye.

Where the geometry of the eye is not perfect (myopia, hyperopia, corneal or lenticular astigmatism, etc.), this can be accommodated by separate lenses or even modified paths as described below with "Virtual Corrective Lenses".

On-Board and/or Remote Processing:

A processor or processors for receiving an external image (graphics, video, text, etc.) and for directing which BSs are activated at what times, along with control of associated devices and functions, may be in typically small (e.g. Application Specific Integrated Circuits; ASICS) processor component(s) as part of the glasses assembly. Alternatively, some or all of the processing may be performed by remote connection (wireless or wired) with the addition of a communications link (preferably wireless) between the glasses and external processing components.

Eye-Tracking (ET):

ET associated with LDE arrays is applicable to expanding the functionality of multiple embodiments and functions including computer-assisted calibration, treating presbyopes, providing always-in-focus, self-prescribing emmetropic glasses by calculating the distance to the intersection of the eyes' instant vision axes and adjusting the focal power of the LDE array used (e.g., lens-emulating SLM's) and adjusting the corrective focus accordingly, facilitating better vision for some with macular degeneration (MD), enabling a moving virtual lens for potentially more complex correction of astigmatism and enabling a single shaped EO component to more precisely cover large areas with range-to-POI knowledge.

In the preferred worn embodiment, a tiny camera mounted in or on worn glasses-rims captures an image of the eye. In some applications, infrared (IR) LED's are provided and mounted beside each camera to illuminate each eye enabling dim-light applications and increasing accuracy because the reflections (IR glints) on the eyeball are well-known additive tools for accurately capturing the attitude of each eye. With the attitude of each eye and a known spatial relationship with the physical components, the approximate range to the instant POI can be calculated. Standup display embodiments are similarly optionally enabled. In the preferred of such embodiments, the ET camera and optional IR lamp are mounted on the display itself. This, in addition to all the other ET-enabled enhancements, makes more efficient display possible based on well-understood facial location recognition (e.g., eye and nose positional registration). Here, the display software receives from the ET camera both the attitude of the eyes and their approximate location using well understood methods. Thus, the display can optionally recreate a subset of the 2-D or 3-D full wavefront for more efficient use of light (brightness efficiency), improved processing efficiency (less processing required when fewer EO components are selected) and further improvements to 3-D display by providing (through reduced general use) more EO components for multi-component imaging options.

Diffraction Uses and Control:

Summary: Diffraction, the historical bane of super-high resolution imaging, can be both useful and in need of control for the current invention's display system. As is further described in the later discussion of "3-D Imaging", diffraction from any of the EO light direction components, including BS's, is an effective means for providing divergence of light emulative of light from an isotropic emitter. The closer the isotropic emitter (be it virtual or real) is to the pupil of the eye, the greater the maximum degree of divergence of the emitted light as it enters the observer's eye. Thus, to display an image that will focus correctly on the retina when the subject is focusing at a depth where the displayed object is desired to appear, that displayed virtual emitter needs to have essentially the same degree of divergence that the virtual POI has. This also provides one of the several means that the brain uses for provision of the depth perception that is so critical to hand-eye coordination such as for a doctor performing imaging-supported surgery.

For virtual objects being displayed very near to the subject's eye but using larger BSs, for example, the diffraction may actually need to be optically increased to match the anticipated divergence.

Below is a list of some of the many applicable methods for applying and controlling diffraction:

Applying Some or all of Diffraction to Proper Depth Perception:

As described below with the discussion of 3-D imaging, diffraction is useful in the current invention as a means of creating a desired amount of light divergence reflective of a virtual POI distance. In FIG. 13 an eye, 130, has an instant vision axis that passes through a BS, 131. The parallel geometric reflection can be seen heading for the eye, 130, from 131 in the form of two dotted parallel lines surrounding the optical axis. A diffraction angle is approximated as the angle between the two dashed lines.

Thus when light from an essentially collimated light source, 133, is directed in a beam, 134, towards the BS, 131, it is reflected to the eye with the appearance of originating from the virtual point of interest (VPOI), 132. The degree of eye accommodation required to bring a, 135, the half-angle of the VPOI's virtual divergence (seen here in this 2 dimensional drawing) in focus (to a point on the retina) is essentially the same as the accommodation required to bring light from a BS or BS' essentially within the area of the dotted lines whose divergence results in a total divergence similar to a.

Note: although FIG. 13 is instructive, it must be noted that most diffraction calculations relate to an angle of divergence that presumes a central emanation while diffraction actually occurs at the boundary conditions of electromagnetic imbalance (edges). However, the degree of divergence is that value, which can be selected by multiple means as discussed herein, that requires a specific accommodation by the eye and thus the appearance of emanating from a given distance useful for placing the image at a depth. However, binocular overlap must also be managed (by well known methods) to effect the same depth perception or the current invention is no better at eliminating the sensory disconnect between accommodation-based and binocular-overlap based depth perception than some other inventions.

Thus, when dealing with diffraction from an EO component, correction for that diffraction is limited to the amount that is appropriate for the perception of distance (as described below with 3-D Imaging). Thus, while the other elements in this list can be used to reduce (or increase as needed) diffraction, they need only reduce it enough that the angle associated with the first airy disc is reduced to the degree of divergence normative for an isotropically emitting point at the distance to the instant virtual POI being displayed (as opposed to having to reduce divergence all the way to 0).

Size Management of EO Components and Diffraction Some Calculatons:

One element that drives degree of diffraction is the size of the BS or the size of the activation area of a BS or other EO component. Thus, choosing an EO component from an array of those available for its size is a method for determining the apparent distance for proper focus and depth perception. Recall that multiple layers of LDE's can be used to represent multiple depths and degrees of divergence. One stamped layer of LDE's might be dedicated to represent a handheld sheet of paper's distance (small LDE), another LDE for 2 M (a slightly larger LDE) and another for 10 M (which is near infinity and would result from choosing a larger LDE or simply a larger conductor activation area of a LDE or other EO component). Also, because these "center of cone" beams are a little less vulnerable to defocus, fewer depth-specific layers are needed for many applications.

Some Calculations for Diffraction

The current invention is not based on any single calculation of diffraction. In fact, it is not the intent here to teach any calculation of diffraction realizing that there are many, they depend on a number of inter-reacting difficult to predict and measure factors and they are all, at best, approximations.

In fact, one of the calibration methods of the current invention is creating a broad array of LDE's on each plate (based on approximate calculations of both spatial location and degree of divergence) and, using a software directed camera in place of the eye in front of a plate, activate each LDE individually, computer focus the camera lens until a minimal point is created (this is a distance value, easily calculated as is know by all skilled in the art), and create a table of:

a) x, y location analogous to pixels representative of the apparent location of the pixel to the wearer of the glasses.
b) Apparent distance Then, when desiring to create a virtual pixel at a given distance, that LDE can be table selected from a database for activation to accomplish those dual objectives.

Having said all that and not attempting to teach a calculation that will virtually always be superseded by calibration and adjustment, one method for approximating the divergence from an LDE responsive to diffraction are the well known calculations shown below. However, any calculation for diffraction is applicable to the current invention as long as it is accurate enough to approximate diffraction enough to simplify the implementer's task of creating a good array of LDE's to select from.

One approximation of diffraction degree, θ, for circular reflectors is $\sin(\theta)=1.22*m\lambda/d$ and for slit or rectangular reflectors it is $\sin(\theta)=m\lambda/d$ where λ is the wavelength of the light striking the LDE, d is the effective width of the LDE and m is the iteration. Because the central portion of the airy disc is of primary effect, 1 can be used for m.

Thus, for example, in FIG. 13 to select a desired round LDE diameter to create the appropriately divergent light representative of the distance to the virtual pixel, 132, the known degree of POI divergence, α, 135, is equal to the angle δ, 139. Thus, in addition to the geometrically LDE-reflected light populating an area representative of the central portion of the cone-shaped virtual solid angle of the POI, 132, to the eye, additional first-iteration (central Airy disc) light diffracted from the LDE will (in addition to central geometric area contribution) additionally fill or at least partially further populate the area outside the geometrically reflected portion but essentially inside the solid angle of the POI's path (dashed line shown with angle α, 135) if the diameter, d, of the LDE is based on the approximation:

$d=1.22\pi/\sin(\delta)$

Wavelength Control:

As discussed above, wavelength, which affects diffraction (the longer the wavelength, the more diffraction) can be controlled by any practical means including selective laser diode activation, color wheel selection from multi-chromatic light and wavelength modifying methods such as grating color selection, nano-dot color shift, phase-shifting, wave compression/decompression, etc. The larger the wavelength, the more diffraction is selectively created.

Choice of Virtual Distance:

Here, as described elsewhere herein, the virtual location is moved significantly to effect a large change or very slightly to more perfectly tweak a potentially granular adjustment based. Thus, a tolerance for too much or too little diffraction will be based on the depth perception and defocus limit needs of the application.

Adjusting Distance Between Eye and EO Component:

Here the effect of beam divergence on the circle of confusion is modified rather than actually changing the degree of diffraction but in many cases, the effect will be similar. The distance between eye and EO component can be adjusted by frame position control (e.g., automatic or manual vernier adjustment) or choice of alternate BS layer(s) in the plate.

Lens-Based Diffraction Reconvergence:

As discussed in some detail below under "Lenses for Vision Correction and/or Light Divergence Control, refractive post correction is a powerful and useful means for dealing with diffraction, simplifying stamping arrays (permitting simpler pattern arrays with a proximal lens) and dealing with subject prescription eyeglass needs. It is understood that any of the embodiments that incorporate lenses herein can, as applicable embodiments, have conventional lens functions provided by SLM's or holographs (e.g., holographic optical elements or HOE's using as a reference beam light from the light sources already provided for the EO component array(s) after passing through the plate by mirror rerouting or by a separate light source).

A good thing about diffraction that occurs over fixed path lengths from fixed size EO components is that it's eminently predictable. Thus, the degree of divergence can be post-adjusted refractively by either (or a combination of any of):

a.) Fixed global correction, e.g. FIG. 14A. This is applicable when the user is not viewing a simultaneously mixed scene/display image (e.g., a large screen TV application, or a worn display without a scene view or when the subject's vision correction benefits from a proximal convex lens e.g., FIG. 14A. In the latter case, the configuration software can, when the subject is farsighted (requiring a convex corrective lens), recalculate the net divergence of light from each EO component (simply calculating the refractive effect of passing through the proximal lens). Thus, the display components' general diffractive divergence (diffraction for all components can be designed to be, for some embodiment, identical or within a tolerance) can be reversed or attenuated by the easily calculated responsive convergence of the subsequent lens.

b.) Dynamic global correction. This is applicable when the user is viewing both the display and the scene but in the presence of a shutter plane. Here, the correction is still general (rather than at the pixel level) but now it is EO in nature and is only activated in timeslices where the scene is blanked out. This may be in the form of a switchably active/inactive convex lens (FIG. 14A), a group of lenses (FIG. 14E), or a SLM (FIG. 14D) proximal to the user both for reducing the diffraction driven divergence and for creating the illusion of the displayed image being at a chosen distance (which varies with voltage).

C. Pixel level correction: A Spatial Light Modulator (SLM, e.g., FIG. 14D) or an array of EO components (FIG. 10) on the proximal side of the plate selectively converge enough of the diffraction-induced divergence to manage the diffraction. This can be at a pixel level to an eye.

EO Components Arrayed for Destructive Interference and Electronic, Pixel-Level Divergence Variation:

Destructive interference is useful for reducing an EO component's envelope of diffraction to provide a more discrete packet of potentially collimated light. Advantages include a potentially brighter beam of light (geometrically reflected light is all constructive unlike normal incident beams, for example, of two coincident flashlight beams that do not result in twice the light), potentially very narrow beams and electronically adjusted beam divergence. Using two or more EO components in combination with each other (selectively activated at the same time) allows selective interference with beneficial results. The separations between the chosen EO components can be large or very small. The separation between two selected elements may be, for very small separations, simply a conductor deposition (shared for activation by an EO component on each side) which can be on the order of a micron in thickness. Two of the numerous applicable examples of EO component placement for diffraction management are illustrated below: Unmatched and matched components.

Matched Components:

Matched components often benefit from selective placement.

The example in FIG. 5A illustrates one embodiment of matched components, in this case essentially equal sized and parallel BSs. The plate whose surfaces are indicated by 101, carries a laser beam, 103, (a sampling of rays are illustrated) to encounter a first BS, 500. The BS may be small to enable a very high resolution image. Light reflects geometrically along line 501 until it reaches its target, 502. However, because it is a very small BS, it additionally diffracts light as broadly away from 501 as line 503 (this figure is not drawn to scale and diffraction may be less or more than shown in the form that is simplified for easy observation). Similarly, another ray, 103, is shown reflecting off of 504 and reflecting geometrically along line 505 and creating a diffractive envelope whose outer boundary is defined by line 506. We have chosen points such that 503 and 506 are coincident. Because both $\theta_1$ and $\theta_2$ are responsive to the diffraction of 500 and 504 (which have the same aperture), $\theta_1$, in this example configuration, is equal to $\theta_2$. Also, with a judicious choice of the distance between the BS', we can assure that the geometrically reflected light is in phase (e.g., in the current example, the lateral distance between reflecting faces is an even multiple of $\lambda$. The path, 507, inside a BS is also an even multiple of $\lambda$ and the diffracted light along 503/506 is out of phase by roughly $\lambda/2$. Thus, regardless of the distance to any target, 502, including a refracted path through an eye, the two beams will offset each other contributing no brightness to the target.

Also, this example pair of points on 504 and one on 500 also emit other non-geometrically reflected light (bad light, in the instant context) essentially from $\theta_1$ to $-\theta_1$ (that is, you could rotate 503 on the axis of its point of contact on 500 until it was coincident with 501 (where the angle of 503 is reduced to 0 with respect to 501) and then continue rotating potentially as far as another $\theta_1$ degrees. This would represent a length on 502 that is roughly $2*Y_1$ in height ($Y_1$ is the length on the target covered by projection of the angle $\theta_1$). A good choice of placement parameters can result in all of the light from these two points in all of that length of 502 being essentially mutually phase offset and thus contributing no brightness to the target. Thus, the diffracted light from these two points is largely self-annihilated leaving a narrower corridor of illumination less negatively affected by diffraction. An accounting for the beams for the two currently considered points on 500 and 504 is as follows. Every point along the length of 502 that falls between the intersection of 502 with 503 and 501 (labeled "$Y_2$") will receive, in an average instant of time, a roughly equal number of photons from the two considered points. Driven by VO, these will destructively interfere and provide essentially no brightness. This is also true for rays from the point pair that intersect with each other at the intersection of 501 with 502. It could be argued that, in this illustrative embodiment, that the diffractive beam from 504 destructively interferes with the geometric beam from 500 and this is correct. However, there are more photons geometrically reflected than diffracted from a given point (thus, after diffracted photons are offset by geometrically reflected photons, there are still many geometrically reflected photons remaining). Additively, there are, at that same point on 502, geometrically reflected photons from 504 that are fully constructive. Thus, although there is destructive interference with some of the geometrically reflected rays, this has, in this example embodiment, the beneficial effect of narrowing (darkening the edges of) the beam where the most diffractive photons travel (an advantage) while the additional photons geometrically reflected from 504 further provides brighter edges for the genuine beam corridor.

Figure 5B:
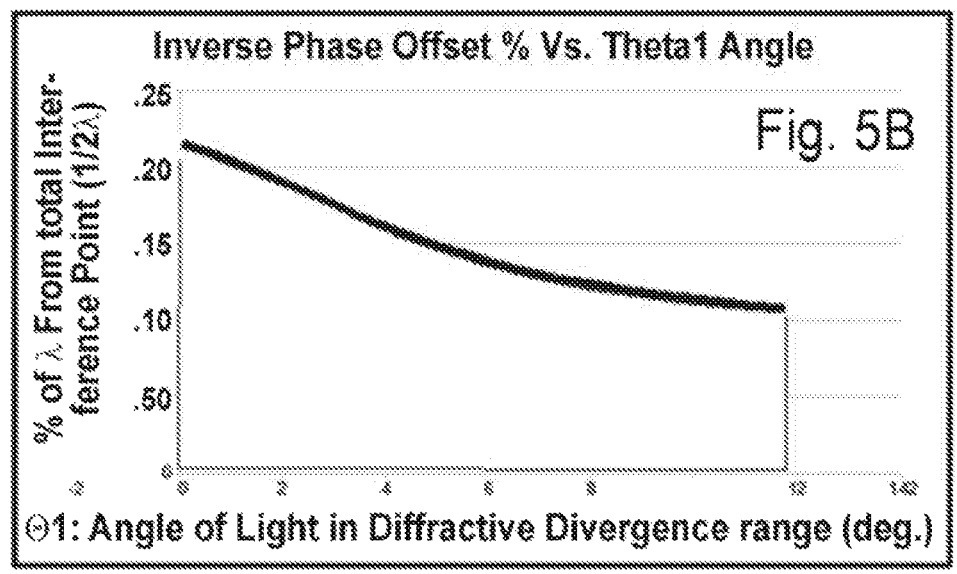
FIG. 5B and FIG. 5C are graphs illustrating the effectiveness of the assembly shown in FIG. 5A.

As will be illustrated by example, there would be no diffraction problem if these were the only two points receiving photons from 103. Fortunately, almost all of the reflective surfaces of 500 and 504 can be similarly accounted for with another similar set of paired points with the same results. It can be visually observed that the next point-pair one might consider (located some identical tiny increment below these two first points would result in continually coincident 503 and 506 as you continue to consider this and subsequent point-pairs downward along the surfaces of 504 and 500 with both still coincident and phase offset so as to contribute no light, regardless of how far the two rays travel towards the target. Also, as you again, for each new point-pair considered, rotate, 502 from the diffraction boundary, θ1, where the light is essentially phase offset, to 0 and even to −θ1, judicious configuration choices can keep the resulting interference at 502 well in the near-completely phase offset range as illustrated in FIG. 5B. Alternatively, as in FIG. 5C using different configuration options, diffracted light that is destined to fall in or very near to the corridor, where geometrically reflected (un-diffracted) light is carried, can be more contributory (constructive interference) and less destructive for an even brighter discrete light corridor (making use of diffraction contributing to the bright spot).

There is not, however, a point pair considered in this discussion for a potentially tiny fragment of the ends of 504 as drawn. The vertical component of this distance is equal to the vertical offset (VO), 509, of these arbitrarily selected points as labeled in FIG. 5A, which can be kept very small (on the order of only one wavelength or less which becomes smaller as it's brought to a focal point on the retina) with good end results. Even this potentially tiny sliver of the BSs, due to the light's proximity (ranging about from 0 nanometers to 1 wavelength) and parallel travel with the envelope beam (the widest boundary of the diffractive divergence), can be attenuated by interference with the envelope path. The value VO, driven by the distance between and size of 500 and 504 (the size, and thus the aperture, of the BS determining the degree of divergence and the distance between them determining light travels along that angle) is a key component to watch in configuring a system. Normally, this is kept very small which minimizes unmatched points and maximizes, by proximity, the opportunity for destructive interference.

Advantages in manufacturing: Some manufacturing processes create rough optical edges that are seen, from the viewer's non-micro perspective, as partial defocus or low signal-to-noise ratio. The paired and selectively interfering BSs offer options for dealing with these problems because, on the average, the irregularities in diffraction will, spaced as described, negatively interfere. For deposition-based or even some etched and stamping-based micro-forming processes, irregularities in edges may be accommodated at least in part by modifications to any combination of inter-BS spacing, slight reduction in diameter of only one BS and biasing charge to slightly favor one BS.

Dynamic Divergence Control:

The same EO components, 500 and 504, can be caused to reflect light with a variety of divergences. This ability allows a single EO component to provide light that appears to originate at a variety of distance for proper focusing and perception of depth (3-D). Particularly in embodiments like the one graphed in FIG. 5C where diffraction is damped progressively more (by destructive interference) at wider angles, the divergence of the net light emitted can be increased simply by attenuating (reducing) the intensity of one BS compared to the other. The other illustrations shown herein normally presume that the two BSs have the same charge and thus the same amount of reflection (although the charge on 504 might, in some embodiments, be very slightly higher that the one on 500 to provide the same amount of light after passing through) the Because Attenuate size by comparative charge on the 2 BSs.

Inter-Component Interference:

Depending on the amount of charge on these BSs, the light from 504 passing through the simultaneously active 500 may be phase shifted by 500 significantly enough for an accommodation. This shift is very small because the change in refraction is typically very small. This is why it is possible to use a bright laser beam whose light is destined for the eye (only a tiny portion is normatively reflected due to the minor change in RI). However, in embodiments where this is significant, said accommodation is easy and obvious to anyone skilled in the art requiring only a minor adjustment between, in the instant example, the lateral distance between 500 and 504 to assure that geometrically reflected light is still in phase.

With these point-pair and component-placement principles in place, a calculation method for configuring ideal combinations of component placements and angles for maximum diffraction management exists.

Alternative and Advanced Calculation and Graph of a Matched Component Example:

Using the example components of FIG. 5A, the length of line segment $X_1$ (between 500 and 502) is chosen, in this example calculation, as one of the characteristic determination factors. Similarly, the effective aperture of the BS in the system, driven by choice of BS size, is also selected here as a system characteristic-driving component. Finally, the lateral distance between the primary parallel faces of 500 and 504 is selected to assure that the distance is a multiple of λ. The thickness of the BSs are selected to, after accommodation, if any, for phase shifting of light passing through 500, be either an even multiple of λ or the adjusted equivalent figure. Calculations from chosen values: Based on the aperture value, the divergent diffraction, θ, of light, 103, from reflectors 500 and 504 is determined by the size and shape of the effective aperture approximated by, for a round BS effective aperture as $\sin(\theta)=1.22*\lambda/d$ and, for a rectangular one, $\sin(\theta)=\lambda/d$ where d is the effective aperture. $X_2$, 505, is the sum of the chosen value for $X_1$ and the value chosen for the distance between the primary parallel faces of 500 and 504. $VO=(X_2-X_1)*\tan(\theta)$. The length of the hypotenuse $h_2$, 506, extending from the reflection of light, 103, on 500 to the target 502 is: $h_2=(X_2^2+VO^2)^{1/2}$. Thus, the difference between the two paths of the two contributing source of diffracted light to the outer edge of the diffraction envelope (via 503) is: $P_D=VO+h2-X_1$.

However, the above only calculates the outer envelope. One example method used in the initial research here for assessing the interference of the area inside the envelope is an iterative scan of each point on 502 falling within the envelope and comparing the distance traveled by rays from the two points (in the point pair being considered) when they intersect there. In each iteration, $\theta_1$ is progressively reduced by some tiny increment (e.g. some fraction of a degree or radian) resulting in a new intersection of 503 with 502 thus redefining $Y_1$. $Y_1=X_1*\text{Tan }\theta_1$. From that $Y_1$, a new value for $h_1$ is simply calculated with the Pythagorean theorem. Also, from that new $\theta_1$, a temporary value for $\theta_2$ resulting in an intersection with the same point on 502 is calculated: $\theta_2=a\tan(Y_2/X_2)$ which enables the Pythagorean calculation of $h_2$. Thus, for each iteration reflective of a different point on 502 receiving diffracted light, the difference in the path lengths, $P_D$, of the light from the two points is calculated the same way it was for the outer envelope (now using the iterative values for values of $\theta1$ within the envelope): $P_D, =VO+h2-X_1$. Now, with the values of $P_D$ for the envelope and points within firmly in hand, the fractional $\lambda$ shift, F, is calculated for each such point on 502: $F=P_D/\lambda-\text{int}(P_D/\lambda)$. This value will range from 0 (no shift) to 0.5 (exactly out of phase for maximum destructive interference) to just under 1 (e.g., 0.9999) which is approaching 1 which is indicative of being fully in phase again. A useful calculated value for graphing the results is PFHL (percent of lambda from half-lambda) which ranges from 0% from half $\lambda$ (total destructive interference) to 50% $\lambda$ from half lambda (which is in phase). PFHL is a useful value for graphing since it cycles from 0 to 0.5 with 0.0 being black and 0.25 being white. Thus, it can be viewed as a brightness indicator (the larger it is, the brighter the interference area) or as the percentage of, away from total destructive interference.

Thus, in terms of the brightness of two beams intersecting on a target, the larger the PFHL value, the brighter the resulting net light. $PFHL=0.5-P_D$. Since the next set of point pairs (for example, the next smallest increment down and to the right from the previous points on 500 and 504) has the same results, this is a good approximation of the net effect. Also, it can be seen by the dotted lines that the same process works at the opposing edge.

Figure 5C:
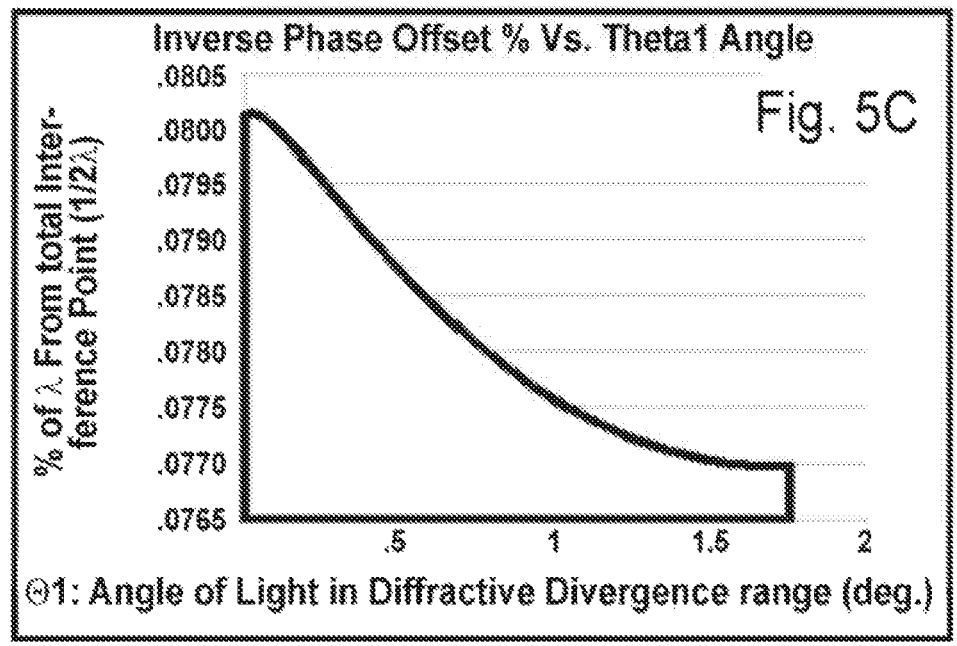

PFHL vs. those iteratively considered values of $\theta_1$ is graphed in FIG. 5B and FIG. 5C. In FIG. 5B configuration options were selected to darkly block out diffraction with diffraction. Thus, all the values of PFHL (which is maximally black at 0 and essentially in the black range for anything under 0.1) are graphed as about 8% or less away from 0 (having a PFHL of about 0.0802 or less—virtually all diffraction is self-destructed throughout the iteratively scanned range). The configuration values selected for FIG. 5B were aperture=0.02 mm (i.e. 20 microns in diameter), wavelength=500 nm, $X_1$=50 mm. These result in a VO that is only 110 nm. It is also possible, in addition to reducing diffraction, to assure that much of the diffraction resulting from 500 and 504 is, while much less contributory to radial diffraction (outside the corridor, 508) be constructive (providing brightness) with light in the corridor. In FIG. 5C the configuration options chosen cause diffracted light in the outer diffraction envelope to have low PFHL values (dark) and begin entering the white range (this example only reaches about 0.2 while 0.25 would be all the way into an essentially white range although some range identifiers are subjective and environmental-context driven). The configuration values chosen here represent only a fraction of the controls available but effectively demonstrate a very small aperture size (3 microns), a fairly typical $X_1$ (50 mm), a mid-range wavelength (500 nm) and a circular BS. Moderate changes in $X_1$ do not greatly affect the results. This is very advantageous since optics and people move.

Figure 5D:
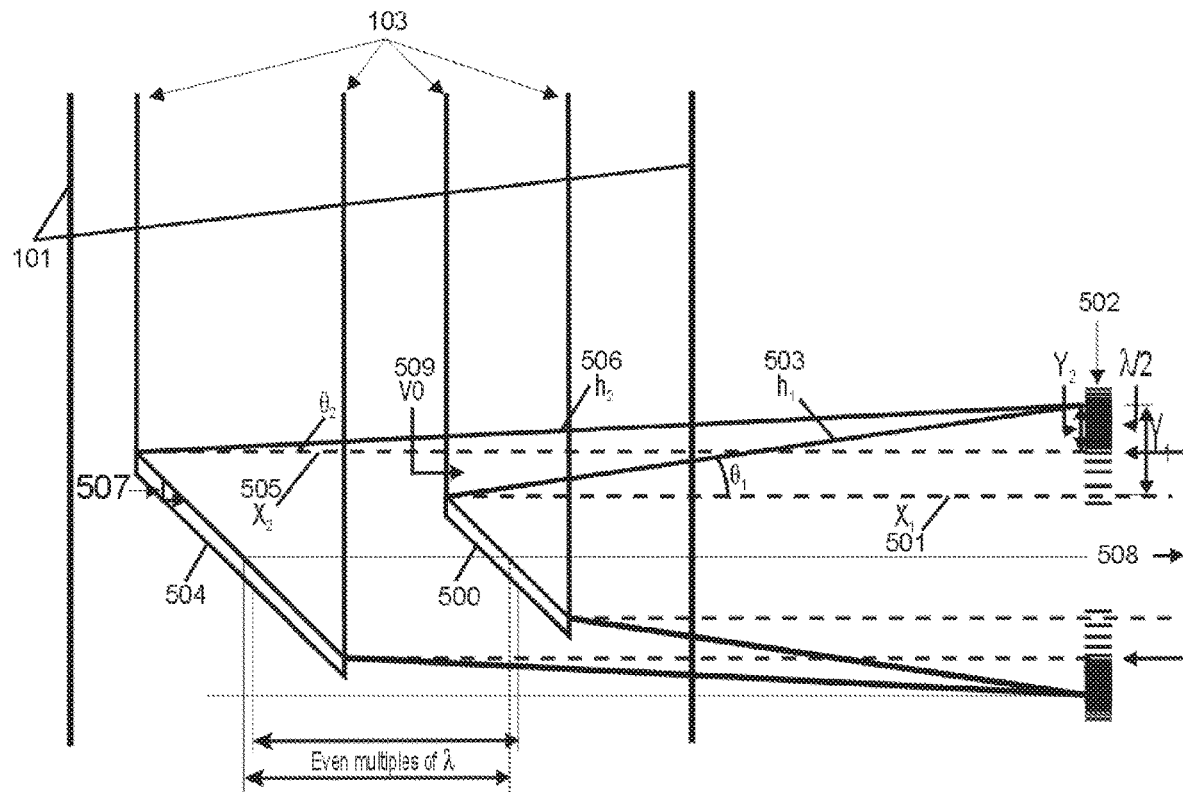
FIG. 5D is similar to FIG. 5A but the two reflective components are not matched in size.

Unmatched Components:

Unlike matched components, unmatched components may be different in size and thus vary in maximum diffraction envelope angle. In one embodiment, as illustrated in FIG. 5D, the plate whose surfaces are indicated by 101, carries a laser beam, 103, (a sampling of rays are illustrated) to encounter a small BS, 500. The BS may be small to enable a very high resolution image. Light reflects geometrically along line 501 until it reaches its target, 502. However, because it may be a very small BS, it additionally diffracts light as broadly away from 501 as line 503 (this figure is not drawn to scale) potentially leaving a spot on the target much larger than the effective aperture of the small BS, 500. (Of course, it will not typically diffract as substantially as drawn since the angles were exaggerated to be visible.)

Diffraction occurs at 500 with angle $\theta_1$ along line 503. It also occurs at 504 with angle $\theta_2$ along line 506. In the instant example embodiment the two BSs have been chosen by software and/or placed in manufacture so that the outer boundaries of their diffractive envelopes essentially terminate together where the lines 503 and 506 (and their counterparts in the lower half) intersect. Thus, for every angle $\theta_2$ between 505 and 506 (i.e. for different values for $\theta_2$ representing light reflecting from 504), there is a corresponding intersection with light from 500 with a particular degree value for $\theta_1$. Where the difference in these path lengths (after subtracting all even multiples of the wavelength and, thus, now dealing with the fractional remainders to compare the lengths by) are near $\lambda/2$, destructive interference darkens the target.

To manage the effects of diffraction to a) make the pixel look and come into ocular focus as if further away, b) permit very fine pixel size without subsequent refractive optics, c) provide a display pixel with an electronically adjustable divergence, d) increase the apparent brightness of the display pixel, or e) provide discrete packets of light for multi-packet 3-D recreation of a point in space, a second, BS, 504, (also receiving light from laser beam, 103) with a potentially different size and effective aperture is selected by software to be activated. Larger BSs will often be in the same plate for the convenience and systems efficiency of illuminating multiple display pixel areas with a single conductor signal and a single EO component (e.g., one larger BS can display larger areas of contiguous brightness and color). In many embodiments, they will also share a vector from the eye with other EO components like 500 and be available to be put into service, when needed, as a pair-member. Thus a group of BSs may be electronically selected/grouped (grouping illustrated here is a pair but any number of interacting BSs may define a pairing) in numerous combinations based on the desired effects of brightness, size and divergence. Thus, a pair like 500 and 504 may also be separated by a number of normally invisible BSs (between them and beyond them, not drawn) any of which may be selected to participate in the display of a pixel. 504 geometrically reflects a slightly broader beam (not normally as broad as illustrated, of course) along line 505 to encounter the target, 502. The pair are drawn parallel to each other and, in this illustration, at a 45° angle to 103 with reflection normal to 103. While in some embodiments, all the EO components may be so aligned, particularly in the presence of additional subsequent refractive optics e.g., FIG. 14, (due to the extreme ease of mass-stamping such arrays), they may also be at a variety of angles with similar results and manufacturing economies. It is also possible to reverse the order of the BSs (place the larger BS between a smaller BS and the target) with respect to the order shown in FIG. 5.

In that drawn illustration, light coming from the intersection of 506 and 504 has a longer path to the target, 502, than corresponding light from the intersection of 503 and 500. The BSs can be placed by implementers so that the distance between them controls the comparative phase of light reflecting from these two points to 502. For simplification of a process that has many applicable embodiments and no single required calculation method, only these two points are considered in the current illustration and the tolerance for distance shift of the light from the pair. For these two singular selected points, the path difference is calculated trigonometrically and, if BS positions and charges are chosen for narrowing the beam, an out of phase condition exists at the outer envelope boundary. The envelope is bounded by the outermost reach of the diffraction area, here illustrated as 503 for 500 and 506 for 504. The positive diffraction envelope in this illustration for 500 may be considered to extend from 506 to 505 (as if 506 is rotated $\theta_2°$ upon the intersection of 505 and 506 to then coincide with 505). 505 is an outer boundary of the bright corridor, 508, which in this illustration is equal to the aperture of the BS.

To further consider the effect of diffracted Huygens light that intersects with 502 inside the corridor (which would ideally interfere constructively near 505 with the geometrically reflected, i.e. undiffracted, light) some implementers will want to consider also basing BS positioning on calculations of the interference in the negative diffraction envelope for 500. The negative envelope is understood in this example to be a mirror image of the positive diffraction envelope intersecting the positive envelope at 505 (as if 505 were rotated clockwise on the intersection of 505 and 506 by $\theta_2°$. This "inside the corridor" negative diffraction envelope thus impacts 502 between 505 and a point below 505 on 502 by the initial magnitude of $Y_1$ as drawn. For this reason, the calculation example below considers the full envelope (both positive and negative $\theta_2$ angles) on both sides of 501. The calculation below, to illustrate the most challenging case, considers both sides of the envelope for 504 ($\theta_2$ to $-\theta_2$). If a given set of BS placements provides good dark (destructive interference) in the positive envelope and bright (constructive interference) in the negative envelope, the diffractive angle will be reduced and the bright spot brightened.

Consideration of other points by observation: If our calculations for these two sample points (one on 500 and one on 504) provide these good results, it can then be observed that there is another pair of points just below each of the two just considered receiving light, 103. The only difference in the results of geometric reflection and diffraction from these two points (compared to the ones above them) is that, at points of intersection of diffracted light from these new points, the paths for both would be, in the instant example, slightly shorter and the relative path difference slightly different. Thus, if this example calculation is used, a BS placement that is not sensitive to change in x1 within the scope of the aperture is advisable. It was not difficult to quickly find a number of placement combinations with results that are stable even with shifts in $X_1$ that are many times larger than the apertures. Thus, one method of confirming a good set of BS placements for a given set of design goals can include a consideration of two points at one end and interference calculation for the intersecting diffractive beams from the two points in the positive and, optionally, the negative envelope. Then, with adequate tolerance for change in $X_1$, (e.g., when the rays are close enough to parallel or otherwise adequately insensitive to distance change) this will be applicable for other points observed towards the center. A similar calculation from the other end of the BSs will, presuming that same calculable tolerance, also verify good results of a placement strategy. 500 and 504 are spaced such that light reflecting from one is essentially in phase with light reflecting from the other. This can be accomplished in a number of applicable embodiments. Here, the reflective surfaces of 500 and 504 are simply separated by multiples of $\lambda$ along the geometrically reflected paths. Thus, a very bright spot is created around the central axis of the assembly making this also a good example of the use of multiple BSs for creating a single, brighter (electronically brightness controlled) pixel (here, with two beams sharing a narrow corridor with a central vector to the eye).

The target, 502, is simply illustrated as a flat target rather than the actual target, the eye. The same exaggerated diffraction angles that make the BS diffraction visible also make illustrating paths through the eye difficult to illustrate at a distinguishable size: Thus, here, a simplified flat target is shown. Also, calculations similar to those shown below work with eye geometry and modified start conditions and criteria. One edge-pair interrelationship is shown here at the top of 500 and 504. It will be normative in some embodiments for each BS edge combination to be separately considered using ordinary target diffraction calculations. In some embodiments this may include unbalanced edge pairs rather than the symmetrically aligned elements of FIG. 5. Also, the BSs 500 and 504 do not have to share a lateral optical axis which bisects them both. This allows, for example, in a rectangular BS environment for each edge to be considered separately for diffractive results and control with different goals and steps. While results will vary with embodiment, the closer in size the two BSs are and the longer the wavelength, $\lambda$, the less sensitive the assembly tends to be to shifts in $X_1$. Despite some intuitive predictability, it was very useful to use brute force modeling to find good potential configurations.

Non-interference between BSs: Significant diffraction does not occur in the light reflecting from the more central areas of 504 due to its passing around (or through) 500 on the way to 502. This is because the change in RI of 500 is so small with respect to the surrounding area (in fact, the RI shifts are all so small that, if we didn't have so much more laser power than we want reflected, the process would not work as well). In configurations where BS charges and placement distances make it necessary, the slight phase shift of a reflected beam from 504 passing through 500 is simply considered in the phase matching calculation as understood by those skilled in the art (thus, in some embodiments, resulting in a slight difference in BS placement).

Calculation Example:

There are a large number of combinations of factors that can obtain a desired effect. An example using FIG. 5D, where the BSs are understood to be rectangular, is now calculated with sample results illustrated in FIG. 5E. Looking at the top edge of the BSs, we will first calculate the interrelated diffraction envelopes in a manner that assures that the outer boundary of the diffractive envelope for the primary BS, 500, essentially matches the outer boundary of the secondary BS, 504 upon reaching the target, 502.

Example parameters to test: In the example graph of FIG. 5E we let $X_1$=51 mm, aperture for 500=$A_1$=0.1 mm, aperture for 504=A2=0.131 mm and wavelength=$\lambda$=500 nm.

Since relatively small apertures were used in the above calculation, this example calculation uses larger apertures. With those parameters for a test assembly, we first calculate the outer positive envelope to see what the resulting beam will look like there using the following calculations:

θ1=a sin(λ/A1) degrees. This is an estimate of the natural diffraction on the primary BS.

θ2=a sin(λ/A2) degrees. This is an estimate of the natural diffraction on the second BS.

VO=vertical offset of the two tops of the beamsplitters= (A2−A1)/2

Y1=height of this side of the diffraction envelope=$\lambda_1$ Tan θ$_1$

If Y$_1$>VO, Y$_2$=Y$_1$−VO else Y$_2$=Y$_1$+VO (since elements may be arrayed in other ways)

X$_2$=Y$_2$/Tan θ2

Hypotenuse1=h1=x1/cos(θ1)

Hypotenuse2=h2=(X$_2^2$+Y$_2^2$)$^{1/2}$

Path difference=abs(h$_2$−(h$_1$+VO))

Fractional Shift=Path difference/λ

F2=Fraction of λ shifted=Fractional Shift−Truncate(Fractional Shift)

This ranges from 0 to 0.999 (in Airy disc band "coloring" this is white through gray, black (0.5), gray and back to white). The PFHL=abs(0.5-F2).

The above calculations only consider the outer envelope (which can be imagined as coincident with 506 in FIG. 5D. Next, we sequentially consider each point on 502 within the envelope realizing that, from each of the two diffraction points (one on 500 and one on 504 that we are currently considering), there is one vector meeting one vector from the other diffraction point and intersecting at that point on 502. One calculation for "scanning" the envelope diffraction on 502 begins with iteratively reducing θ$_2$ which rotates 506 slightly clockwise and reducing Y1. This rotated 506 now represents the path of the "first" ray inside the envelope. From this value of θ$_2$ the phase of this first inside rays from the two points are calculated using the following equations:

$$h_2 = X_2/\cos(\theta_2) \text{ This is the vector segment from } \mathbf{504}.$$

$$Y_2 = X_2 * \mathrm{Tan}((\theta_2))$$

$$h_1 = (X_1^2 + (Y_2 + VO)^2)^{1/2} \text{This is the vector segment from } \mathbf{500}.$$

The same process as above is used to compare the paths (h$_2$ is one path and h$_1$+VO is the other) and determine the PFHL. This process is repeated in tiny increments of θ$_2$ until θ$_2$ 00200=0. Then, for the negative envelope, the process continues as θ$_2$ becomes progressively negative. This can be for any period the implementers use for the task at hand but here we simply continue until the magnitude of −θ$_2$ is equal to the original θ$_2$. When these calculations are done programmatically in a loop, it is a simple matter to then vary the presumed value of X$_1$ up and down to find the tolerance for X$_1$ shift. One productive procedure is to find, perhaps in a brute force or Monte Carlo method, a combination that has a tolerance of a cm or so. This not only assures that, with BSs on the order of 100 microns, the next pair of points on those tiny BSs will fall well within the tolerance of the system (i.e. it will still have very similar interference patterns) but also that a worn assembly can move around on the subject a little without losing the beneficial effect.

Figure 5E:
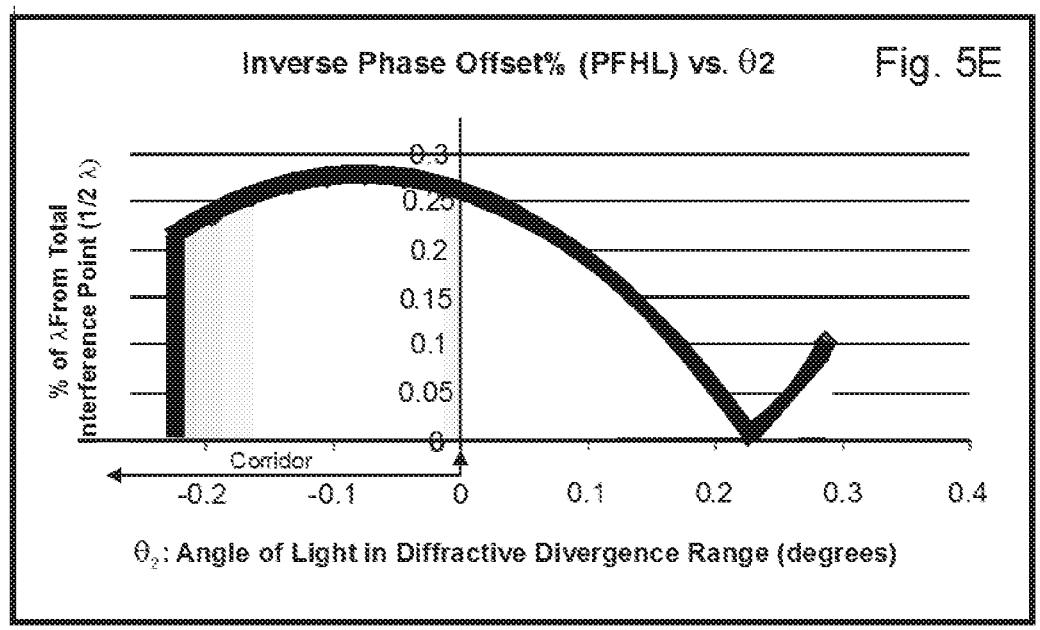
FIG. 5E graphically illustrates the effects of FIG. 5D.
Figure 6A:
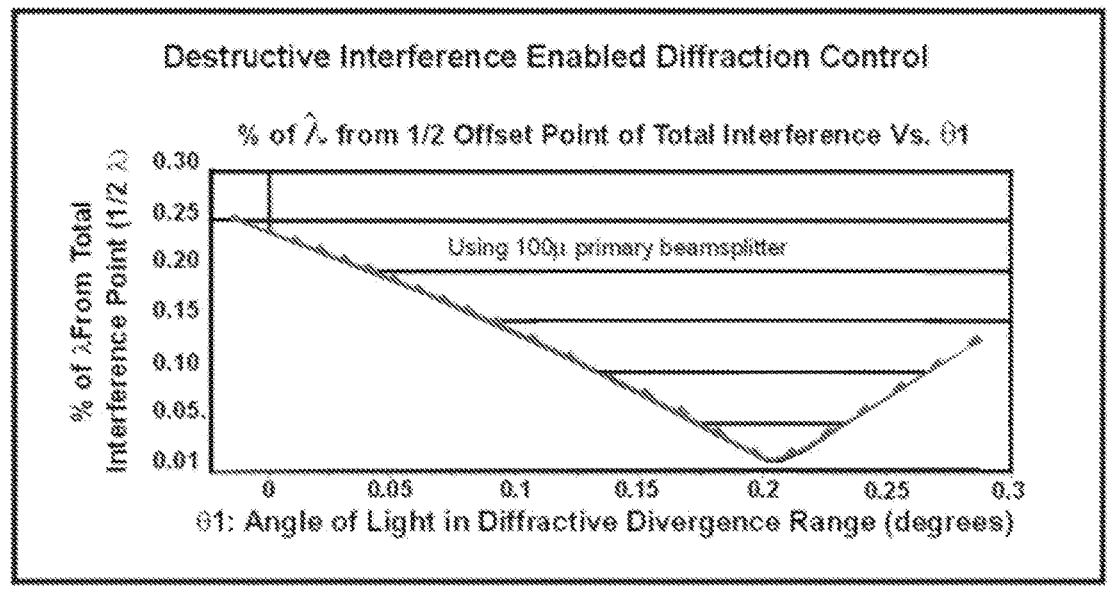
FIG. 6A graphically illustrates the effects of the unmatched beam splitter pairs in FIG. 5D. The light whose angle from center is further from 0° (to the right in the graph) is "darker" as the difference in the path lengths becomes a higher percentage of the wavelength, λ, divided by 2.
Figure 6B:
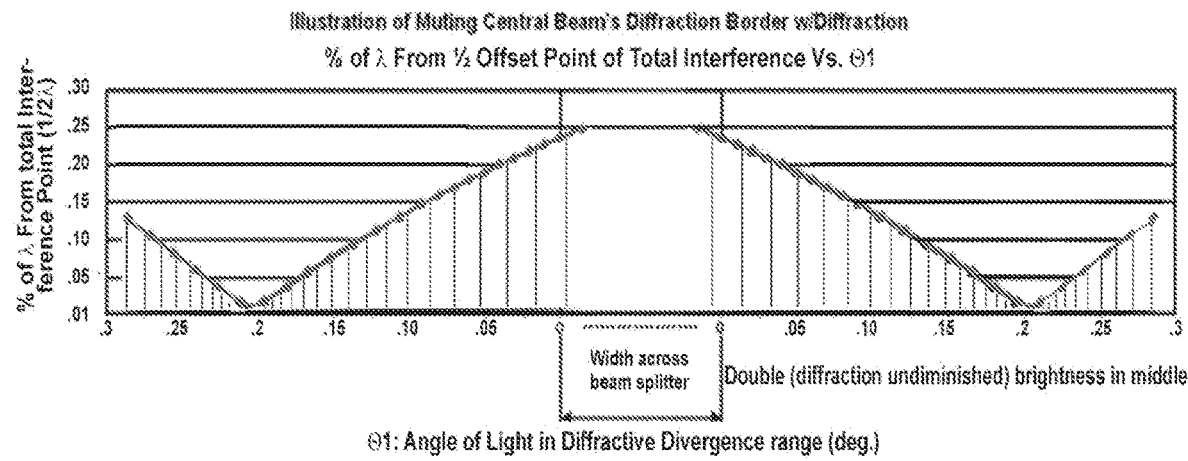
FIG. 6B uses the same data as FIG. 6A but provides a mirror image of FIG. 6A around zero on the abscissa to show symmetrically the brighter portion of the beam in the central part of the beam (further from the higher destructive interference points on the left and right of center).

FIG. 5E displays a graph using the sample data above. The abscissa is the degree of θ$_2$ and the ordinate is PFHL. The closer the PFHL was, for a given θ$_2$, to 0, the darker the area of the curve is illustrated indicative of near-complete destructive interference. Note that at x=0 the PFHL is above 0.25 and, thus, the background is white. The areas left of x=0 are in the corridor so this is good. To the right of x=0 is the positive diffractive envelope which becomes, as you get further away from x=0 (beyond the corridor wall) the diffracted light is progressively more out of phase and is, thus, displayed in gray. From roughly 0.17 and outward (the worst areas of diffractive expansion), it is displayed as black. The destructive interference can be seen to be at its maximum at roughly θ$_2$=0.227°. The parameters thus tested also perform well (i.e. the effects don't change substantially) for values of X$_1$ ranging from about 47 to 58 mm. Thus, with apertures on the order of 100 microns, the results of the two points on 500 and 504 thus considered will be effectively similar to other points on the BSs.

Thus, a much more discrete and non-divergent beam is provided. Of course, adjustments will be made to specific embodiments in production. This is only one of multiple applicable embodiments of the current invention (which also include rings of BSs, etc.) where diffraction is controlled by diffraction and interference. To grasp the efficacy of this approach, consider how holograms, made up of extremely fine effective gratings emit, instead of on the order of a steradian of net diffraction from each grating element, extremely discrete packets of light along the central axis of the path to the virtual pixel. This, is accomplished, though using a different hardware design and pattern/structural distinctions, by creating very broad diffraction angles but destroying all but the central beam with destructive interference. Those viewing the hologram and the process already described above will discover that, like the flat target, 502, the retina of the eye receiving the light through the vision system, sees the narrower beam.

Electronic Divergence Control from a Single Pixel:

Also, in addition to BS selection, the relative charge on the two BSs so selected (in either a matched BS or unmatched BS embodiment) can be used to electronically determine the diameter of the reflected beam. FIG. 5 illustrates the diffraction divergence dampening effects of dual BS interaction (one edge of the corridor is represented in the graph). Thus, by reducing the charge on one BS while leaving the other the same (or any combination of charges) you can attenuate the amount of corridor narrowing destructive interference and effect electronic control of substantial variations in beam divergence from a single pixel as needed. This is applicable both to providing proper focus for an image to an eye and for providing in a dynamic manner adequate for 3-D video, a rapidly changing apparent position for a single pixel responsive to a desired distance to be perceived for the object being displayed. Of course, binocular overlap is simultaneously controlled by long understood and common practice.

Shaped EO Components and Broad-Brush Applications for Flat BS Diffraction:

Broad-Brush Applications: Diffraction and/or Shaped Components at Work.

Broad-brush applications, though not limited to shaped EO components (the same effects can and will be selected by implementers to be executed using ordinary BSs, BS pairs, holographic-related patterns, etc.) are described here because of their great usefulness in this area. If we assume or estimate a degree of eye accommodation, or, even better, if we know it from ET, then virtually any form of EO component can paint with a broad brush. That is, one EO component or component pair, etc. can display light that appears to come from many pixels. For example, simply choosing a BS whose degree of divergence is either greater than or less than the divergence that the vision system's instant power of accommodation will bring to a point on the retina will paint a larger area on the retina. Of course, as explained elsewhere herein, this is most applicable for displaying contiguous areas of reasonably consistent brightness and color and not incorporating boundary areas associated with edge detection. Fortunately the human vision system is surprisingly forgiving in its perception of flat fielded illumination. This is, perhaps, the result of a vision system designed more around the always-available edge detection rather than being dependent upon perfect, flat-fielded lighting. Thus, it is not necessary that the level of display intensity be perfect or even that the colors of slowly transitioning color changes on, for example a wall, be perfect. However, at high-contrast boundaries, the vision system's perceptions are not nearly so forgiving. Thus, applicable implementer software options will often select an EO component specifically because it does not meet the instant or estimated eye accommodation such that the larger the disparity, the larger the area painted on the retina.

Shaped components also provide the ability to focus light with a single pixel and/or to potentially paint thousands of pixels with a single EO component. The latter can be particularly precise with ET which, in providing POI range information, allows, at those points, the precise degree of divergence that will be needed after passing through the range-accommodated eye to paint the image-representative area on the retina. Where used to cause light representative of a pixel to pass through the center of the pupil in a narrower beam, pupilary diffraction at small pupil diameters can be reduced for a sharper view. The use of shaped EO components is also useful as another method for creating a desired degree of divergence so that a subject looking at a given distance will see a sharp image and, in 3-D applications, can better perceive depth (in addition to binocular overlap, etc.). As discussed below in the context of holography, the ultimate divergence of light can be controlled with shaped EO components with and without the subsequent refraction of additional normal or EO lenses. In FIG. 1B shaped components reflect light which can be made excessively divergent either directly by being convex or, for a concave reflector, diverging after the rays cross—thus appearing to originate by divergence at the focal point. This provides another method for placing an object's virtual depth and for painting.

As already indicated, it also, responsive to intentional software design, can paint a larger area on the retina with a single electrical signal pair and a single EO component. Thus, when the image to be displayed involves a large area of essentially contiguous brightness and color (sign backgrounds, sky, walls, etc.), painting multiple pixel's areas with one EO component (whose collected light, e.g. a potentially larger convex BS can be more substantial in brightness). This is particularly precise when the software is provided ET-rendered subject focal range information so that the diopters of eye-lens accommodation, rather than an approximation, can be included in the calculation of the convergence/divergence desired. While such a process would be perceived as intentional defocus in other applications, for a known area of contiguous, similar light (areas not associated with image processing edge detection) and with the known range (from ET or other means) of current subject accommodation indicative of the diopters of refraction of the subject vision system, an eye-model calculation of the origin and divergence of light required at that very specific diopter of eye accommodation to paint a desired area of the retina after passing through that vision system (based on any eye model including Gullstrand-Legrand and more recent models well known and understood by those skilled in the art) is enabled.

Thus, applying these well known steps in one of many applicable embodiments, the software acquires the range from the ET assembly, calculates the diopters of accommodation of the instant subject vision system and then, using calculations common in VR and image processing: a.) Calculates the azimuth and elevation of the center of the area to be displayed as well as, using normal eye model calculations, the size of the image on the retina after passing through the lens. b.) Then, using normal ray tracing calculations similar or identical to those used in eye models, a vector passing through the plate, 101, is used to select (from those EO components known to exist in the plate from manufacturer or more recent calibrator key-indexed tables) BSs whose center is at or sufficiently near the vector located by the desired center azimuth and elevation (tabled by either cyclopic azimuth or separately for each eye). c.) Then, rays may be traced through the lens from available BS on that vector to find a good candidate whose rays sufficiently cover the identified area on the retina. d.) The thus-identified BS is activated.

For high speed operations, one effective method for steps b and c is to, at calibration time, pre-table index BSs using keys concatenating azimuth+elevation+rangegroup+area (or diameter in some embodiments) with near processing (finding a record that is near in the last element, area, when an exact match is not available). Here rangegroup breaks displayed POI range (and, thus, the directly related degrees of eye accommodation) into a few database-friendly pigeonholes e.g., (in cm) 1: 22-35 2:36-62 3:63-117 4:118-227 5:228-450 6:451-900 and 7: >900 cm (recalling that edge detection is not a factor here, only size on the retina of the defocused beam). Of course, a key record is created for each rangegroup for each BS (since the same BS will paint areas of different magnitudes based on the eye accommodation associated with each rangegroup). This is one of many methods for rapidly choosing the right BS for an area to be displayed. Another is to include degree of divergence and EO component size for all EO components and select the EO component by calculating on-the-fly the degree of divergence and component size that would properly paint the retinal area and select the BS from the general table of BSs which also key on azimuth and elevation. Also incorporated into any of these tables may, optionally, be each EO component's reflected brightness at a standard or ranges of charges since the shape affects the end brightness.

Broad-brush display of multiple image areas (pixels) from a single EO component or component set is not limited to shaped components. For example, a single tiny BS can be called into service by software (e.g., from one of the tables above) to use its high diffractive divergence to create a beam that is too divergent for the current accommodation thus spreading over a larger area. Or a pair of matched or unmatched (described above) EO components can be used to provide light to the eye that is more collimated than the current accommodation brings to a point on the retina. The latter case provides the ability to adjust the degree of divergence simply and electronically by adjusting the charge on one of the BSs to reduce or increase the diffraction-driven reduction in divergence. In practice this can result in additional table records or on-the-fly tweaking of a BS pair to perfection after one is table selected.

Other Shaped Component Applications:

While a very small shaped BS can be used to create a larger desired divergence with its natural diffraction, a shaped BS can accomplish the same feat without such a dependence on diffraction and with some beneficial "light collecting" characteristics. A larger shaped component, e.g., an off-axis concave BS, can both minimize the diffractive envelope (larger aperture) while controlling the degree of geometric divergence to place the object near or far in the subject's perception. For a convex, off-axis concave BS whose reflected light crosses to focus at a point between the plate and the eye, the light will appear to come from that focal point (based on divergence, at least). Also, the effects of diffraction can be minimized.

with what appears to the subject to be a very small pixel (high resolution) that is actually the result of a larger shaped EO component (low diffraction) whose shape focuses light to a small point on the retina. This may also be teamed with ET-ranging, where opted, to choose a maximally appropriate focus (by BS selection) for the instant diopters of eye lens accommodation. Here, based on the known accommodation of the eye, it assures an extremely discrete point on the retina even when the EO component is very close and larger than an ordinary BS would have to be to produce a pixel of the same size (and do so with the lower diffraction associated with a larger EO component).

Also, the shape of even flat components affects the diffraction. For example, a rectangular BSs diffraction calculation estimates diffractive beam expansion, $\theta$, with the equation: $\sin(\theta)=\lambda/d$ where d is the effective aperture. However, to increase diffractive divergence, a round aperture is commended whose calculation estimates diffraction using the equation: $\sin(\theta)=1.22*\lambda/d$. This can be accomplished simply by choosing a different BS from an array of those available or can be the result of selectively activating areas of a single BS Holographic Diffraction Control:

As described below in the discussion of 3-D Imaging and in the discussion of "Holographic Imaging Embodiments", there are multiple embodiments of the current invention that both control and use diffraction to provide superior wavefront reconstruction and extremely discrete (potentially narrow) packets of light.

Gradient Activation from Center of BS.

Here selective creation of a gradient charge from the center of a BS outward optionally minimizes diffraction by gradient-tapering reflectivity as distance from the center of the BS increases. This can be the natural consequence of a charged placed at the center of a BS and that charge naturally being less as lateral distance increases. In FIG. 7F a more complex example is illustrated, showing an edge of 3 differently wired BS'. Implementers may selectively create a gradient of charge with the most charge at center, e.g., across the BS at 708 and progressively less or none as you look towards the periphery (e.g., 703, 711 and possibly no charge at all on 700).

Grating-Surfaced BS.

Replace (and reposition as necessary) smooth surfaced flat, triangular or curved BSs, such as the ones in FIGS. 1A and B, with BSs having a grating on the side that first contacts the itinerant collimated light. The grating, discussed with Holographic Imaging Embodiments, below, is structured artificially in the EO material to create a focused or discrete collimated beam whose surface patterns/irregularities are expressed in EO material. Fresnel or similar focusing and/or diffractive patterns made of an EO that has the same RI as the surrounding media until activated. When activated, the RI shift w/respect to the formerly identical surroundings creates refraction and diffractive pattern resulting in an effectively discrete (or at least non-divergent or controlled divergence) beam to the eye. Also, this can use the reflectivity enhancements for low RI changes (as described above). Any of the commonly known convergent or divergent refractive and/or diffractive patterns are usefully applicable. Convergent effects will typically cross the light between the BS and the eye to become appropriately divergent or adequately collimated prior to reaching the eye.

3-D Imaging and Light Convergence/Divergence Control:

Many of the embodiments of the current invention potentially produce a software-selected and controlled perception of depth reflective of all of the human depth cues including the accommodation required (by emulating the degree of divergence of light from the virtual object) and binocular overlap with the scene image. Thus the wearer doesn't trip and fall by focusing at one depth to view virtual objects overlaid in the scene or to read displayed text while trying to navigate his walk. This is a common complaint of soldiers (who often take off the military versions of monocle HWD's to avoid disorientation). This is because viewing virtual objects against a scene image whose focal and binocular characteristics are different requires frequent reorientation and, from another source, can confuse and create "disconnect" headaches (due to conflicting accommodation-derived depth perception and binocular overlap depth perception) over time. 3-D display manufacturers state that it can take 30 minutes of more for the "disconnect" headaches to occur but the disorientation and negatively affected reaction times of subjects (users) wearing the equipment can be instantaneous.

Even to place a virtual road sign against the scene view (it must be perceived at some distance from the viewer), it is necessary to control the divergence of the light from the pixels to place the virtual image at a proper focal distance. For example, if the application is to display driving directional tips or enhanced night vision for a driver, the divergence must be controlled such that, when the driver focuses on the virtual sign, the traffic remains in clear focus.

Also, for true 3-D imaging where depth information is known for components of an image to be displayed, it is normative for spatial modeling calculations familiar to those in the virtual reality (VR) community to be used to determine the virtual location of a pixel in the image to be displayed. From the VR distance between the virtual point to be imaged and the pupil of a virtual eye (approximating in VR the relative spatial relationship of a physical point in the subject's FOV and the subject's eye), the degree of divergence of light from such a virtual point is easily calculated as is described in detail below and illustrated as the half-angle of virtual target divergence, c, and the dotted lines, 135, in FIG. 13.

There are multiple independent embodiments, which can be used in combination, for creating the appearance of virtual distance (ignoring, here, the obvious binocular overlap, parallax, virtual object size and pixel placement which are, of course, included in the choice of activated EO component placements). Some of these methods for creating a controlled divergence of light include shaped EO components, diffraction control, multiple cone EO components, diffraction-managed divergence as well as holographic and para-holographic management of diffraction with diffraction.

Choice of BS Size:

Even the choice of BS size (such as from variety of available BSs in different layers of the plate satisfying the desired positional and light divergent criteria) determines divergence. For example, for a given wavelength, choosing to activate a moderately sized pixel will result in a much lower angle of diffractive divergence than activating a much smaller BS (e.g., in another plane of the plate yet having the same azimuth and elevation to the eye so as to fill the same perceived pixel of image).

Shaped EO Components:

Shape can also be used to effect a desired divergence. There are, in addition to the flat and triangular-solid BSs and other shaped EO components already mentioned, a wide variety of alternative BS shapes like those indicated by 107B and C in FIG. 1 for providing a desired degree of divergence related to a perceived depth and providing a diffraction control enhancement. This divergence control is useful because, without it, the eye's lens accommodation can cause these rays (representative of the center of a cone of beams of collimated light) to arrive on the retina with a larger than desired circle of confusion. One method for accommodating this lens accommodation is shown in these curved BSs (such as an off-axis curved reflector that focuses parallel light). Diffraction's contributions to divergence and problematic issues where it impedes high resolution are discussed above and that discussion continues below. Shaped reflectors can also be particularly useful where very near-appearing virtual objects are desired These shaped reflectors (BSs) can create the degree of divergence that is appropriate by selecting a BS with an end divergence within the range appropriate to a default distance and/or a divergence driven by the eye's depth accommodation for the current point of interest (POI). This latter causes the beam to focus to a point on the retina at the eye's accommodation diopter for that POI distance. Multiple curved BSs for the same pixel position can also be stacked (tightly, like spoons, with others that are invisible when not activated) in the rows, columns, and thickness of the lens for selective divergence. This aids in both providing apparent distance and, in some embodiments and applications, diffraction control.

Diffraction Control Using Shaped EO Components:

Taking advantage of the fact that there can be many layers of BS' in a plate, which permits much BS positional overlap for pixel location, a shaped BS that is much larger than the appearance of a desired pixel can both redirect itinerant collimated light and cause it to diverge or converge towards a point. For example, a large shaped, off-axis BS (with a large aperture and small diffraction) can create a desired degree of convergence/divergence (which may also be further modified by subsequent refractive elements in the light path to the eye as described). This can be used, for example, to create very narrow (and, optionally, very bright, discrete beams of light whose effective aperture (for diffraction calculation) is a relatively large BS (and, where applicable, a large subsequent optic).

Multiple EO Components: (Paired Diffraction-Control Components Described Separately)

As described above, multiple EO components can be used both for image depth placement and for more brightness. Where the image of a pixel on the retina is very discrete (either by small EO components w/diffraction control, post EO component refraction or shaped EO components) view, for the moment, FIG. 4B with the BSs sending a very discrete beam rather than the classic cone. The virtual image can still be located (even without cone divergence) using only 2 or 3 BSs for a single pixel of a virtual image. This takes a little thinking to grasp how or why this works but consider this: if only two non-contiguous (ideally maximally separated) rays of a cone of light from a single isotropic emitter reach the retina, their separation defines the circle of confusion's diameter just as effectively as the full cone. Thus it is now possible, even in embodiments where extremely discrete packets of light are emitted, to provide (e.g., where close range hand-to-eye coordination is required, such as image-assisted surgical applications, and/or where the equipment will be worn long enough to suffer disorientation or headaches from sensor-disagreement disconnect), divergence control for the light redirected to the retina. This and other methods explained herein address this advantageous condition. Thus the degree of divergence rendered reflects the degree of divergence (sensed by the vision system's lens accommodation required) that the brain's vision system best coordinates with binocular overlap, parallax, size, etc.

Also, if the eye accommodation is at a distance substantially different from the virtual distance (for example, if 402 is nearby and the user's eyes are focused at infinity), then 402 will appear out of focus requiring an appropriate change in eye accommodation to view the virtual object. This defocus provides the proper (and particularly needed at hand-eye coordination distances) eye-lens-focus cue for 3-D perception (the binocular, cant, object perception, and parallax cues are also placed in agreement by well known worn display techniques). This should also prevent the headaches and occasional nausea in extended use that is associated with the "mixed depth signals" of binocular-only 3-D systems (e.g., lens distance perception vs. binocular overlap). It also provides the un-conflicted spatial precision needed in a hand-eye-coordination-rated 3-D display and the immersive and correct depth perception for surgical interactive display in a simultaneously shared virtual and physical image space.

Diffraction Managed Divergence:

As described extensively already, including under "Diffraction Uses and Control", degree of divergence is a vision-system cue for the distance to the POI. A single BS can, as an alternative or assist to the above, be used to create a single source of light that appears to be a central portion of the virtual cone of light from a virtual object with a depth-driven divergence. By calculating configuration criteria that employ otherwise problematic diffraction to create a desired degree of divergence, a single BS can create an expanding beam that requires essentially the same diopters of eye-lens accommodation as a real object at the virtual location.

For example, in FIG. 13 an eye, 130, has an instant vision axis that passes through a BS, 131. The height of a virtual pixel, 132, is defined by the height of BS, 131. Thus when light from an essentially collimated light source, 133, is directed in a beam, 134, towards the BS, 131, it is reflected to the eye with the essential appearance of originating from the pixel, 132. Proper control of left and right eye images, using methods well known in the art, also position, for the brain, the pixel at the same distance Δ. with binocular overlap. Disparities in binocular overlap and lens-accommodation sensed divergence result in potential inaccuracy in hand-eye coordination and possible headaches after roughly 30 minutes of use. Thus providing divergence control increases focus sharpness and sense of depth. To accomplish this in applications having moderate resolution requirements and moderate variation in the depth location of virtual images, configuration criteria are chosen that match the instant application's needs making use of the list of diffraction controls discussed above.

In one of the multiple applicable embodiments (illustrated in FIG. 13) a simple single beamsplitter, while not always the most powerful choice from the list of Diffraction Uses and Controls, can imitate light from the virtual pixel image, 132. Note that the virtual pixel, 132, which is drawn simply to illustrate what we want the reflected image from 131 to look like, is, ideally, a virtual isotropic emitter. Thus it includes rays to the eye that are parallel to the optical axis. The BS, 131, also geometrically reflects, from 134, light parallel to the optical axis that accurately emulates that parallel light. The virtual pixel, 132, also emits non-parallel light, the most divergent (greatest angle α) to the vision system being represented by the dotted lines between the pixel and the pupil of the eye, 138. When the BS, 131, is properly selected for the dimensions of its diffractive envelope (and, of course for central vector of reflection), the outer edge of the diffractive envelope approximately coincides with the dotted lines (thus emulating the outermost portions of the virtual cone of light from 132). While the inner contents of 131's diffractive envelope will not always perfectly coincide with virtual non-parallel rays from 132, they will remain within the envelope and generally not exceed the degree of divergence, α, of the dotted line. Thus, if the eye accommodates to view something at the position of 132, the light reflected from 131 will appear to come from 132. There are also many other applicable EO components and combinations of components discussed herein for managing diffraction both for proper focus and for 3-D imaging.

Calculation Example of Diffraction-Based Control of BS Apparent Distance:

Using the above example embodiment of a simple BS, (which will often be the lowest resolution embodiment), consider an application requiring graphical lines to be drawn as narrow as 1 point (0.35 mm) and displaying 6×9 dot matrix characters of text of approximately 8 point type (8 points*0.35 mm/pt.=2.8 mm height including above/below space). The image is desired to appear to be 30 cm (about 1 foot) in front of the wearer. X, the wavelength, is 500 nm.

Larger text is easier to deal with so 8 point type illustrates an example that is more restrictive than necessary. Also, the choice of λ is conservative. Smaller wavelengths in the 450 range will, of course, result in less diffraction which makes color selection/attenuation one means for adjusting the virtual image distance and also makes this a conservative illustration of the resolution and virtual distance range of this simple BS embodiment.

The virtual image of a pixel should appear to be 30 cm from the wearer's eye. This distance is shown as Δ in FIG. 13 (which is not drawn even remotely to scale to allow the BS to be visible in the illustration). When drawn to scale on a typical printed page un-enlarged, the BS will often be too small to be visible.

Assume a pupil radius, r, of 4 mm.

Thus the angle, α, of the dotted line from the center of the pixel to an edge of the eye's iris (which defines the degree of virtual divergence responsive to the virtual distance) is:

$$\alpha = a\,\tan(r/(\Delta-12.5)$$

which, in this example, is a tan(4/(300−12.5))=0.8° (rounded) where 12.5 mm is used to reduce the distance Δ by approximately ½ the diameter of the eye to start at the pupil.

Now, by choice of one or more of the diffraction-driven divergence control elements above, one may cause the BSs to have essentially the same degree of divergence as real objects at distance Δ would have (and thus require essentially the same eye lens accommodation and thus appear to be the same distance away per the brain's accommodation-based distance calculation). Thus, presuming that the binocular overlap method of depth perception is appropriately implemented (as is common in 2-image 3-D reproduction by locating a pixel for each eye with a difference in location commensurate with the desired illusion of distance i.e., along a path where a ray from that virtual object would have come to each eye) binocular overlap and eye accommodation will no longer disagree. This serves to eliminate the complaints of sensory disconnect headaches, nausea and feelings of disorientation.

One method for estimating the desired vertical (as drawn) height, 2y, of BS 131, is:

$$\tan(\alpha) = \tan(0.8°) = 0.014 = y/(\Delta-\beta)$$

$$y = 2*0.014*(\Delta-\beta)$$

where Δ−β is the distance from the virtual image, 136, to the plate plane of interest associated with beam 134 and BS, 131.

It can be observed by geometry that the angle, 139, between the dotted line parallel to the optical axis (and intersecting the top of the BS, 131) and the continuation of the dashed line from the virtual pixel, 132 is the same angle as a (since said dotted line and the optical axis are parallel with the dashed line crossing both).

Much of the parallel light from the light source, 133, will be directly reflected towards the eye in essentially parallel form between the two dotted lines drawn proximal to the optical axis and crossing the top and bottom (as drawn) of BS, 131. However, consider light reflected from the top (as drawn) boundary of the BS, 131. If the angle of diffraction from this point is equal to c, then this additionally populate the angle 139. This effect is also obviously mirrored below the optical axis so that a cone (or other shape partially depending on BS shape) of light is created that occupies approximately the cone of photons that would come from the virtual pixel, 132, had it been a real isotropic emitter. BS' can be in any shape, square, rectangular, oval, etc. but, since they are pixels whose divergent light will be focused back down by the eye to an essentially singular point (within the circle of confusion) the virtual pixel, 132 is effectively created.

Although one calculation for the height of the BS (and, of course the obviously similar diameter for round BS', etc.) was shown above, it can also now be seen that should more diffraction be needed, for example to emulate a very near virtual pixel, 2 or 3 smaller BS' (in this particular drawn illustration of a virtual pixel on the optical axis, they may be surrounding the optical axis) will still populate the same cone or other solid area and still be resolved down to a point on the retina providing the satisfying sense of depth.

However, it should also be noted that the current invention can use only one of that mentioned plurality and it will resolve to the same point on the retina. Thus, for example to create more diffraction to create a closer virtual image, even a single BS (smaller than the area shown as 131 in the beam path, 133, crossed by the "virtual rays") from the available matrix for processor selection can be activated. Even though it may not occupy the full solid angle of the virtual pixel's cone to the pupil, the part it does subtend will focus back to the same point. Of course the smaller area of light redirection will require greater brightness to fairly represent the brightness of the virtual pixel than a larger area would and that brightness can be adjusted by the processor software by any of the methods described herein or that are otherwise used including a longer LDE activation, stronger LDE charge and/or multiple cooperating LDE's.

Thus, when the subject is viewing a physical scene object at a distance Δ, the instant accommodation of the eye's lens will now (in this example by real-time selection of approximate BS size from layers of options) also accurately focus the BS light to a fine point on the retina. Also, a desired perceived depth of the displayed image in the scene is selectable by choice of LDE size (thus controlling diffraction). Also, should the subject focus far from the chosen virtual depth, the image would become blurry which is one component of the subject's perception of the virtual depth. There are approximations in all eye calculations due to its complexity and variation between subjects. However, there is room in the variables used here to substantially adjust the conditions to manage the degree of BS divergence to advantage based on alternative assumptions and calculation methods.

Calculating Diffraction

As described widely herein, the software, when attempting to create a virtual pixel at a given distance should ideally control It is also possible. as discussed herein, to limit the light reflected from 131 to emulate essentially only the parallel light from 132 and, in fact, only a beam along the optical axis narrower than the pupil. Thus this displayed image is less vulnerable both to pupilary diffraction and to minor defocus since only a tiny and uniformly central portion of the virtual cone of light from the virtual scene enters the pupil. This effect, enhanced by selective cone-ray display and other options, is also advantageous for providing a worn display device for those with cataracts. It is also applicable to improving their view of the natural scene with a projected natural scene captured by a forward scene camera.

Real-Time, 3-D Image Capture with Pixel Depth

Although two scene cameras, ideally one at each lateral extreme of the glasses frame, can be used to capture depth information as is understood by those skilled in the art and applicable to the current invention, an additional means also exists. That is, in embodiments with ET cameras mounted (e.g. 509 in FIG. 14D) in the assembly, the distance, (normally along the instant cyclopic vision axis) to the instant POI may be calculated from the intersection of the two eyes' vision axes as recognized by the camera-captured azimuth and elevation of the two eyes.

Thus, as the subject's eyes saccade around the scene, the calculated range for the instant cyclopic vision axis identifies the distance to a point in the scene. This calculation can be done a number of ways by those skilled in the art including a nasal mounting for the scene camera (in the frame of the glasses just above the nose) so that the effective origin of the scene captured image is essentially at the cyclopic origin (between the two eyes). Thus, the instant cyclopic vision axis associated with the current subject fixation identifies a pixel in the captured scene (many ET systems normally ignore 60 Hz eye vibrations and only consider more significant moves of the eyes thus reporting significant temporal fixations). Thus, an approximate depth value is known and can be stored to build a 3-D image. Even in a very active real-time environment where the image moves too fast for a built depth map for the current image to be of great use, the eye's current view displayed from the plate can provide the appropriate depth perception for essentially the foveal sub-FOV where the subject is looking by providing the appropriate light divergence and binocular image placement controls described herein.

Shutters and all Other Transmission Attenuation Components:

Also, various applicable embodiments of the current invention may include or do without shutters to temporarily block the natural view of the scene (which herein is understood to refer to the view of whatever is before the eye such as a landscape or other POI), a view of the scene overlaid with the displayed image, or a displayed image registered with elements of the scene view as if the displayed image and the scene were one reality simultaneously viewed. Any combination of these elements can be added to the fundamental elements of the most basic embodiments without amending applicability to the current invention.

In most of the illustrations in FIG. 14, the outline of the dimming array, 142, (be that an LCD, shutter array or other conditional or partial transmission method; these being considered functionally synonymous herein) is a dotted line emphasizing that it is not necessary for general use. However, the shutters (referring to all the above light attenuation components) provide extremely useful options for many applications. Placement of shutters in FIG. 14 are representative of only one of the many applicable embodiments. For example, in FIG. 14A it could be, for many applications, between the lens, 140, and the BS, 131.

Figure 14A:
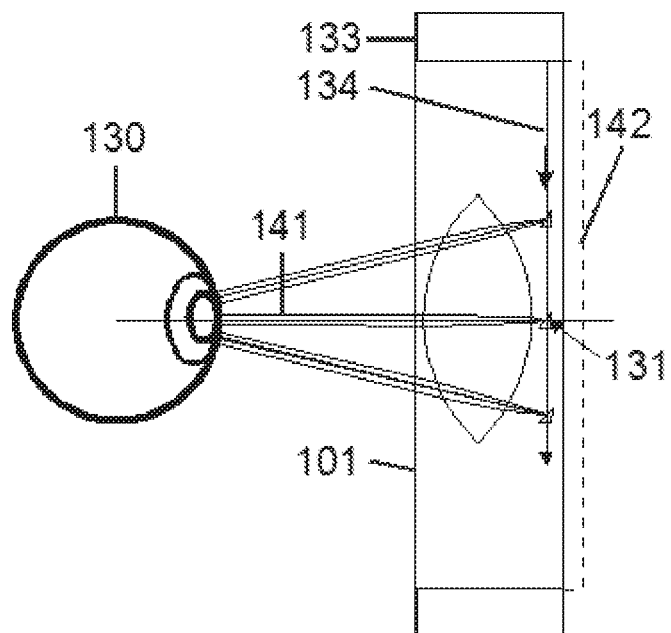
FIG. 14A illustrates fixed global correction of certain diffraction elements using a lens.

General Removal of Unwanted Scene Information:

Unwanted scene information may include an abusively bright daytime sun that would overpower a display area's ability to compete. In addition to a general area filter layer (e.g. sunglasses layer), this may be more specifically reduced (favorably biased) by briefly for a portion of a cycle, or partially blocking only the defined areas transmitting extreme brightness from the scene light (headlights at night, sun and glare during the day). This is accomplished with the addition of shutter arrays or LCD layers (the terms "LCD" or "shutter array" will refer herein to any of the numerous media capable of attenuating the amount of light transmitted through areas of a curved or planar area). These will typically be located over the distal plane of each plate (furthest from the subject). Examples of shutter locations may be seen as 142 in FIG. 14. However, although the shutter array is shown distal to the eye in FIG. 14, it can be placed in a number of orders with respect to the other components. E.g., in FIG. 14A Area-Specific Removal of Scene Information:

As summarized above, light transmission can be shutter or LCD-attenuated selectively thus affecting only excessively bright areas or light from other undesired locations. This allows the scene to be seen brightly without the blinding spots. Additionally, a dark background can be applied to an area where the displayed image needs to stand out over the scene. E.g., a rectangular blocked area behind a block of displayed text. Also, a narrow darkened area around text makes it easier to read.

For example, the pixels of a scene camera's image are registered/mapped to at least approximately associate each scene camera pixel location with the specific shutter(s) in the array that transmit light from the scene object for that pixel. Without range data or ET information, this requires approximation (and, typically, providing a darkened border around the unwanted light to accommodate that approximation) since light from scene objects at different distances will enter the eyes through different vectors. Thus, some embodiments will assume a moderate distance or a feathering of the effect to broaden the shading without fully blocking areas that should not be dimmed. An optional enhancement involves the addition of ET cameras, normally mounted in the frames of the glasses for worn embodiments, to estimate the approximate distance to the instant PO. Based on this distance, the approximate diameter of the cone of light from the POI passing through the shutter is known and this can better define the area to be blocked around the center of the bright area.

In addition to providing bright vision at noonday without the direct glare of the sun itself (via temporal transmission interruptions via the brief and/or intermittent closing of shutters where undesirable light is being transmitted), it is also applicable to dimming bright headlights for night driving.

Balancing of Scene and Display:

The shutter array (or other light attenuating elements included with the term) may also be used to adjust the ratio of brightness between the two views either by partially closing or, for on/off switching elements/shutters, remaining open for a shorter period for the view whose brightness is to be diminished. This brightness control by period limits is, of course, a common practice that is only practical when it is effected quickly enough to be perceived as reduced illumination rather than a series of flashes.

Alternating Images Using Shutters:

These shutter arrays are also useful for providing rapidly alternating scene and display images. In one embodiment a full cycle can be defined as being in two segments. In one segment of time the shutter is closed and the EO components direct light to the eye and in the other segment the shutter is open, allowing the scene view to enter the eye while the EO components may be turned off. and theThis alternating image is particularly useful in embodiments where (and if) even the extremely small refractive effects on the scene image passing through the plate are not acceptable. While individual pixels of the display image are ordinarily intended to supersede the background (scene view), for those applications where it is desirable, the scene and display image may share different "slices" of time (fractions of a cycle). Thus, when the scene image is transmitted, the BS may all be at the default (non-reflective/refractive) RI. Of course, the array may also be used to turn off the scene view for an extended period of unimpeded display viewing.

Hyper-Invisibility (General or Near-EO Specific):

Blocking the scene during a discrete display cycle (when the shutters are blocking the scene and the EO components are diverting light) also prevents any backscattered or back-reflected light from EO components from being visible by others. While backscattering and backreflection is minimal, this applies to certain military applications.

Vision Correction and/or Light Divergence Control:

There are also a number of applications that benefit from additional lenses. When the subject has an astigmatism and/or presbyopia/hyperopia/myopia, corrective lenses may be added to the assembly in a number of positions with respect to the BS arrays and switching arrays, if any. There are also applications for embodiments with physical lenses, EO lenses, SLMs and combinations thereof (all of which are considered functionally synonymous and used interchangeably herein) that benefit from the controlled divergence of directed light. This is supportive of embodiments for fully depth enabled perception and for very discrete packets of light (very thin and/or minimally divergent/convergent).

Fortunately, the diffraction of the EO components is eminently predictable based on which EO component is selected in real-time, its known size (which is the effective aperture in embodiments where all of the BS is activated), RI and coatings, etc.

Thus, for example, a single lens between the subject and the EO components that direct the light can be simultaneously useful both for precisely correcting vision (even using existing prescription glasses) and for precisely controlling beam collimation.

Figure 14B:
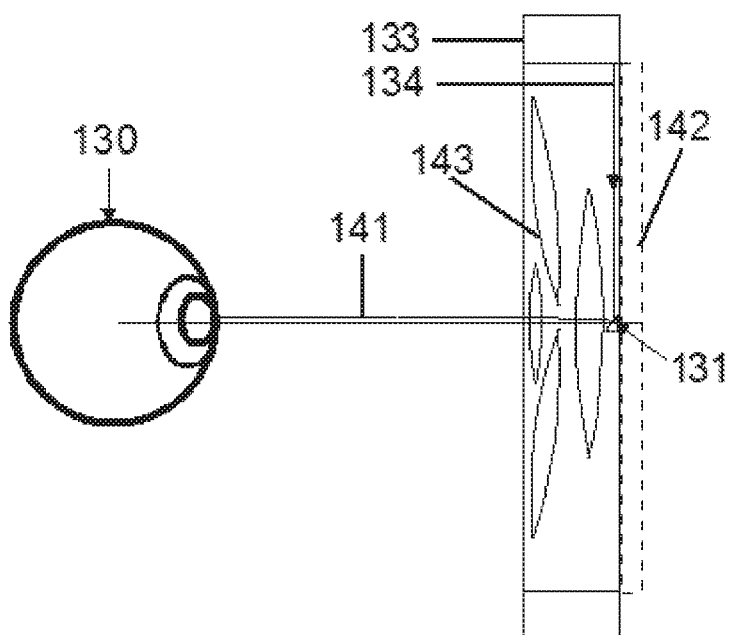
FIG. 14B illustrates fixed global correction of certain diffraction elements using a plurality of lenses.
Figure 14C:
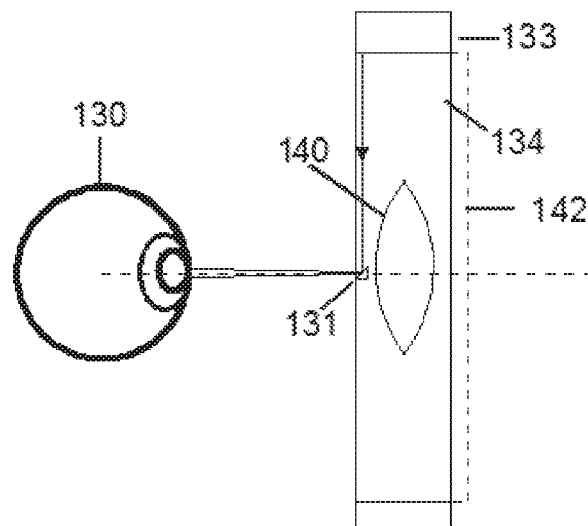
FIG. 14C illustrates fixed global correction of certain diffraction elements using a lens.
Figure 14D:
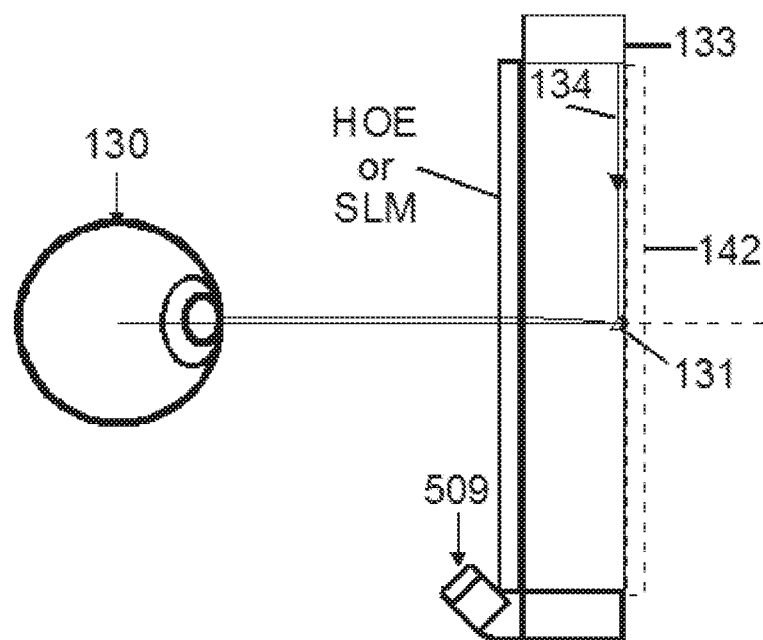
FIG. 14D illustrates an embodiment using a spatial light modulator applicable when the user is viewing both the display and the scene but in the presence of a shutter plane or other dimming means, 142.

FIG. 14D is one illustration reminding that any of the lenses displayed in FIG. 14 may be replaced by SLM's or HOE's. The laser beam(s) for HOE applications's are not drawn. Also, for embodiments using HOE's, the angle of the focusing element, Proximal Lenses, Lens Arrays and SLMs:

In FIG. 14A the proximal lens, 140, is between the BSs and the eye (the proximity reference point is the retina). The lens, 140, may be a fixed, permanent lens for vision correction. These corrective lenses may be part of the plate or precisely clipped to the rest of the assembly. Or, as shown in FIG. 14A, the proximal lens may be in the plate. This option allows the display to be "clipped on" to existing prescription eyewear. This also allows the assembly to change from person to person (even when each person has different prescription glasses) or to be sold out of the box to work with any prescription. This can, however, require an additional configuration step to spatially align the formerly separate components.

One advantage of this proximal lens embodiment is that both the BSs and the scene provide appropriate divergence and proper and jointly aligned virtual/scene origin of light. That is, all the light seems to be coming from the same scene view with the appropriate vector and distance-driven divergence. Thus, the images flow through the lens together for natural correction of a combined virtual and scene image.

Thus, in this embodiment, the shutter array, 142, is not necessary to separate the images. However, if the extremely slight refraction of the RI-adjusted BSs causes noticeable distortion, the shutters can separate the two images temporally.

EO Proximal Lenses:

Lenses between the EO Component and the eye.

Of course, the lens, 140, can also be an EO element in FIG. 14A, or an arrangement of lenses as in FIG. 14B, or an SLM as in FIG. 14D). Thus, the proximal lens, 140 in FIG. 14A may be a permanent lens or an EO lens (or lens replacement such as an SLM, GRIN array, etc.) either to correct the vision, or to adjust display light divergence, or both. Although a proximal lens embodiment like FIG. 14A does not require it, the shutter may be used in any of the embodiments to facilitate multiple uses for the same lens. For example, the lens may be an EO lens or SLM assembly and, in the first half of a cycle, RI adjusted to correct the vision while the shutters are open and the BSs inactive. Then, in the second half of the cycle, the RI is differently adjusted to control the divergence and/or diffraction from the other EO components that are instantly active.

Permanent Proximal Lenses:

Also, the lens, 140, of FIG. 14A can be a permanent lens for prescription correction and the BS and/or other EO light direction components must then be selected (from a range of those available in real time and/or at manufacture) to have a divergence that is precisely corrected by the fixed corrected lens. Thus, for example, a myope would use smaller BSs (resulting in larger divergences) than a hyperope to light the same row/column pixel (ignoring astigmatism) in this type of embodiment. The shutter array is not necessary here since the distortion is minimal and, for the most part, only present where the display image is intended to overpower the scene view. However, the shutter array may be used both to limit and balance the intensity of the scene and display images and to provide separate timeslices so as to isolate the two sets of images in time (thus eliminating even the minor potential distortion of the scene by the BSs or other EO components).

FIG. 14D illustrates another location for a SLM. One of the great advantages of the SLM is that it can theoretically replace the other SLM components (serve the same function that they do) in many embodiments and applications and can do so while providing a different RI for each instant-active BS.

FIG. 14B illustrates an arrangement of EO lenses, 143, (replaceable by SLM's) that are independently activated as needed for some or all of a frame cycle. Thus, at one point in time during a display cycle (when the scene is blocked) selected lenses are activated to a degree appropriate for the currently activated B S'.

A shutter layer, 142, may also be used to balance the brightness of the two images. This balance may be adjusted manually (e.g., a hand adjusted potentiometer on the glasses read by the software responsive to sensors e.g., an ambient light sensor) or responsive to configuration criteria for brightness and target or general ambient light sensor data.

Multiple Refractive Components: It is advantageous to have more than one refractive component (of the many applicable types of refractive components available) in the path of a directed beam, e.g., 141. In order to have a large enough aperture not to add significant diffraction and edge aberration to a beam, the radius of curvature needs to be large enough to provide this aperture. However, many refractive components, like EO lenses and SLM's have limited RI shift. Thus, activating more than one of them in the path of the beam provides greater refraction without requiring a tiny lens, many more of them to cover the same area and without creating unwanted diffraction and possible edge aberration.

FIG. 14E illustrates an arrangement of EO lenses, 143 (replaceable by any combinations of SLMs, GRIN EO lenses, diffraction gratings, etc. with effectively refractive properties), that are selectively software activated to condense/expand and/or redirect light from at least one EO component, e.g., the BS, 144. The light, 134, from essentially collimated light source, 133, actually reflects from activated BS, 144. However, due to the factory-known diffraction of BS, 144, at the known wavelength of light, 134, (which was part of the criteria for selecting this particular BS from the software-provided array of available acceptable BSs to choose from) the formerly collimated light, 134, expands in width prior to being condensed (made less divergent or more convergent) by selectively activated lenses, 143. Thus, to light a pixel from those available and make it present a pixel image of a desired size at a desired distance, the software selects the EO components that are known to (or at calibration time did) create a beam along a preferred central vector with a desired degree of divergence/convergence.

Although, to fit on a page, the perceived pixel image, 145, is very near, this is an excellent embodiment for producing a very small pixel from a very small EO component (here a BS) and yet have the pixel come into focus in the subject's eye as if it were coming from far away. The small EO component means a larger divergence that a larger EO component would have created making the pixel thus lit appear near. This is effectively mitigated by the selected condensing lenses, 143.

The converse is also true, a large pixel, e.g., from a large BS used to light many pixel areas at once with its large area (extremely useful for image areas with adequate color and brightness continuity such as areas of walls, white paper background, etc.) can be made to come into focus when the subject's eyes are accommodated to a far distance and yet have the proper divergence not only for proper focus but for depth perception at edges as well. Ordinarily a large BS would result in very small divergence presenting a focus and apparent distance applicable to a far POI. This can be corrected by activating an expanding refractive component (e.g., a concave EO lens or expanding SLM area, etc.). An example of a concave EO lens is shown located in the plate proximal to the eye and highlighted with a dotted outline. Of course, there can be many and larger concave and convex lenses and other refractive components than are illustrated.

Where the relatively minor refraction of the dynamically refractive components is a problem, a shutter array, 142, may be used to create two images in cycles: one with active light direction and refraction components and a blocked scene and the other with open shutters and an otherwise transparent plate as all potentially refractive and reflective components have the same RI.

Figure 10:
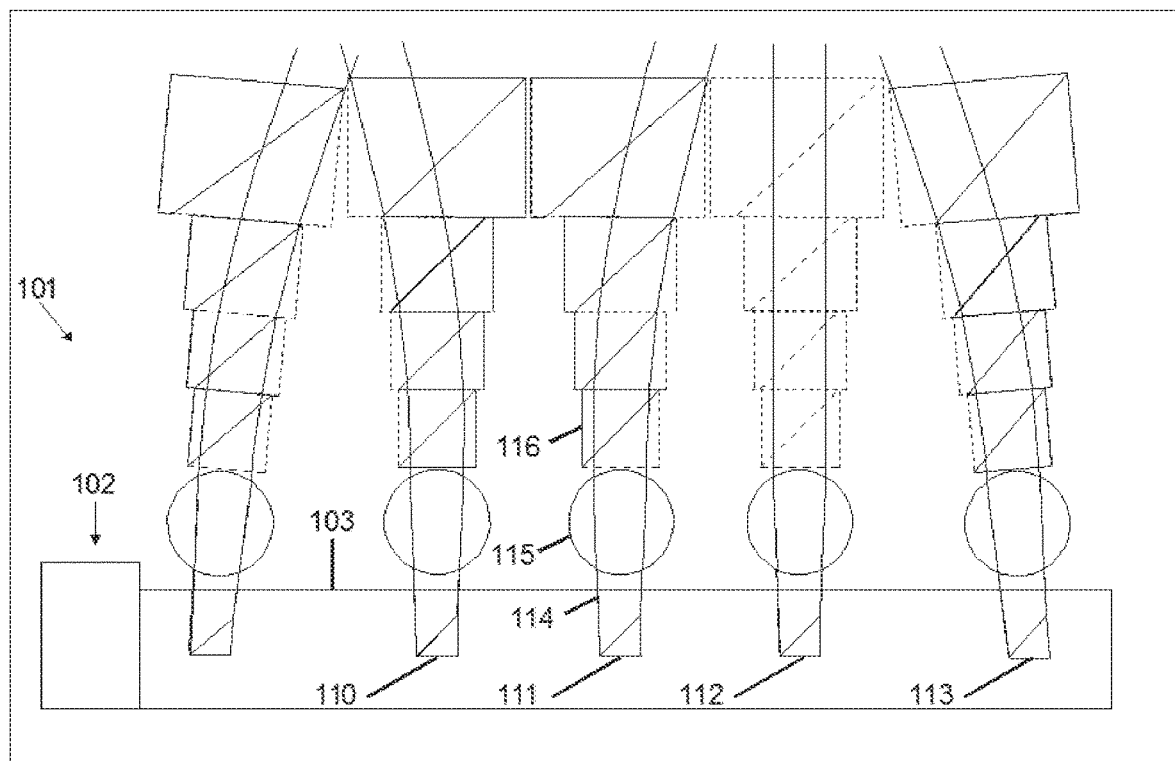
FIG. 10 illustrates one embodiment using a spatial light modulator (SLM).

Directional Proximal Lens Assembly:

Another form of proximal lens assembly is shown in FIG. 10. The eye, not drawn, is above and looking downward through the plate, 101, and, thus, receiving the light directed and modified by the elements in the plate (e.g., 111, 115 and 116). Here, at a pixel level (111 is an example of a BS representing a pixel or, in the case of a multi-BS pixel as illustrated in FIG. 4, part of a pixel), the pixel's convergence/divergence/collimation is corrected by at least one lens, 115, (which can be a GRIN, SLM, spherical lens or any practical focusing material). The light is further directed (the BS, 111 and lens, 115 already provide direction) by the subsequent refraction of selected ones (the ones currently electrically activated) of the shaped (here prism shaped) EO BS' like 116. This permits divergence control, control/use of diffraction and numerous ray direction options from a single BS. Of course, though the EO components like 116 are drawn to direct light left and right, it is obvious that rotation of any of these elements 90 degrees would redirect light into and away from the page instead of right and left in the page. Thus, combinations of directional refractors can direct the light in any direction.

Of course, all of the components drawn from the spherical lenses, e.g., 114, and above can be applicably replaced by one or more SLM's or other light directors. However, FIG. 10 provides a good and applicable illustration of the sequential redirection and light processing approach.

This embodiment can use planes of stamped or printed arrays (a cross section of which is shown) of shaped EO lenses, 115, and prisms, like 116, in the path between the BS and the eye. In one of many manufacturing options, the BS, 111, would be in one printed layer followed by a layer containing (along with conductor connections) the lens 115. Both layers are surrounded by media having the default RI. Similarly the next layer would contain the first triangular director encountered followed by a layer containing the next triangular director encountered (116) and so on.

The default RI of the elements are effectively identical to the surrounding area until selected groups of them are simultaneously activated, along with a corresponding BS to begin a dynamically directed route, to adjust the divergence to correct for the degree of diffractive-induced divergence and/or to effect a chosen divergence for depth perception. Programmatic selection of locations on planes to be activated determines the refraction of and also optional redirection of the beam.

One BS providing multiple pixels of image: This allows a single BS to represent multiple pixels (each with a unique vector) in the same "frame" of display. For example, with adequate source illumination from the light source, 102, supportive of time-division imaging in a single frame (perhaps the $\frac{1}{30}^{th}$ of a second associated with 30 fps), the BS, 111, can paint x pixels of the display image in x fractions of a frame period by changing the selection of activated elements and their degree of charge as well as optional changes in wavelength, etc. between the x sub-sessions of the frame).

Distal Lenses, Lens Arrays and SLMs:

In the distal lens example of FIG. 14C where the lens, 140, is for correction of subject vision problems, it can be seen that the BS, 131, will direct a beam that, unlike the embodiments of FIGS. 14A and B, does not enjoy the corrective benefits of 140. The scene is, however, fully corrected. This is acceptable for some applications since the light so directed can be discrete (thin) and near collimated and, in that example, is less sensitive to defocus (the circle of confusion is smaller for a given mismatch in instant subject plane and POI distance than a conventionally full cone of light that must be focused to a point). However, an additional embodiment represented by FIG. 14C incorporates through software a virtual corrective lens (below).

Shutters: The optional shutter array, 142, offers further image enhancement: As described above, it can attenuate both the general brightness, brightness of key areas and/or balance the brightness of the scene and the display. Its presence further allows the creation of timeslices (ex: 30 cycles/second in which both views have a fractional slice of each cycle) in which an alternating image reaches the eyes. In one timeslice, for the scene view, the shutters are open and the BSs are inactivated and, in the next, the shutters are closed and the BSs are activated for the display view.

Hybrid Lens Embodiments:
Internal Dynamic Refractive Element(s):

In FIG. 14F the distal side of the plate, 101, is curved to create refraction of the scene view with a concave lens for correcting myopic vision (the eye, 130, is slightly elongated). Of course, a fixed lens can also be attached distal to the plate instead of curving the distal side of the plate. Also, the shape of the curved distal side of the plate, 101, would also be convex for hyperopes and the refractive component, 146, would create divergence or reduce convergence e.g., a concave lens. A distal shutter array, not shown, adds the ability to, in addition to brightness control and balance, create two alternating images in each cycle. The dynamic refractive component, here an EO lens, 146, is invisible (as is the concave lens, 149, which is shown as inactive in the illustration) during the scene cycle when the shutter is open. In the display cycle, it adds desired convergence, varied by charge amount applied, etc., to the directed light 141.

The entering rays from the scene, 147, are first diverged by the distal side of the plate, 101, and then reconverged by the refractive component, 146. However, as can be seen by the dotted line, a slight shift occurs. Where it is problematic, this shift can be eliminated with the use of more refractivity in 146 and a proper activation of 149 to return the ray to its entry vector.

The entering display light, 134, from light source, 133, is reflected by BS, 131. Its divergence is mitigated by refractive element 146. This is useful for several applications and allows very small pixels (created by very small EO components having significant diffraction), to produce very discrete packets of light, rather than a full cone image, and seem to the subject to be very far away as described more below.

The light, 141, however, is not yet corrected for the subject's prescription. For some vision problems, the above is still adequate, especially since the light, 141, can be very discrete (narrow and often collimated) and somewhat resistant to the visible evidence of defocus. However, for those more significantly challenging environments, the light directing elements like 131 need to be selected to provide a virtual-lens corrected view which is described further below.

Internal Fixed Refractive Element(s):

For embodiments where the display image needs to be very high resolution (e.g., very small BSs with high diffraction-driven divergence) but the image is to appear distant (minimal divergence), FIG. 14F with either a fixed or dynamically refractive component, 146, (in the instant example an ordinary convex lens with RI distinct from the default RI of the other plate contents) provides another accommodating embodiment (beyond those above and below).

Obviously, for embodiments where the display image needs to be created with very large BS' and yet appear very close (the less than ideal condition), this approach works well in reverse. Here, the distal side of the plate, 101, is convex and the refractive component, 146, is either concave or it is inactive during the display segment while the concave element 149 is, instead, properly charged. As above, the slight offset created may be offset by including an additional active lens (e.g., a more proximal convex EO lens along with RI balancing to return the ray to its entry vector).

For a subject with no corrective glasses or having a corrective lens affixed/clipped to the proximal side of the plate, the assembly of FIG. 14F may also be viewed as having all fixed (some potentially off the shelf) refractive components, simplifying the design, software detail, real-time image processing and manufacturing overheads while minimizing any need for shutter arrays (except for some cases where even the very minimal BS distortion of the scene view near pixels that need to be overpowered by the display view anyway is problematic). The refractive component(s) 146 and, optionally for minimization of offset, 149 essentially offset the refraction of the distal side of the plate, 101, leaving a net effect of reducing divergence of light from light diverting EO components.

Making 146 more refractive than drawn, either by increased charge or smaller radius of curvature than the illustration, such that the dotted line meets the distal face of 149 coincident at the surface with the un-dotted entry vector, 147, and then correcting the dotted line to rejoin the entry vectors direction from that point by the refraction of an activated 149, mitigates shift offsets of entering light.) Thus, since 146, optionally combined with 149, defines a net convergent refractive system (light passing through them becomes more convergent), the EO directing component, e.g., the BS, 131, will have its natural divergence mitigated. This allows, in many embodiments, even more room for high resolution with much flexibility. (Of course, 149 and 146 can also be combined into a single solid lens but the potentially lesser refractive maximums may make this untenable for some applications.

For example, inexpensive fabrication or tiny optical parts by stamping, printing, etching, etc. make miniaturization almost a non-issue for many resolution ranges. Having too much resolution is rarely the problem so the ability to have extremely small EO light directing components, like the BSs in FIG. 14F, whose higher diffraction is minimized by a subsequent convex system with a very large aperture, is helpful. Then, the EO light direction components, can be selected in real-time and/or manufactured based upon an end light divergence tolerant of very small pixels and improved by the converging proximal refractive system.

Of course, making 149 and/or 146, dynamically diopter adjustable (e.g., EO lenses and SLMs) adds flexibility and redirection options for software to capitalize upon.

If the minimal distortion of the BSs of the scene view is a problem and a shutter array is for some reason undesirable, virtual corrective lenses (described next) may be the best solution.

Virtual Corrective Lenses:

Treating Potentially Multiple Symptoms Simultaneously:

In multiple embodiments the scene view is largely or completely provided by a displayed image of the scene as captured by a scene camera which is, at default, normally aimed along the subject's permanent cyclopic vision axis (which originates essentially between the eyes and follows a vector normal to the coronal plane). For some of those embodiments the natural scene view (light from the outside penetrating the plate) may be, by design or instant user preference, substantially diminished or blocked altogether. This includes applications providing:

Convenient and invisible worn display options for viewing images where at least one of the images displayed is the instant captured scene view.

Better vision for cataract patients without interference from ambient scene light.

More light for older subjects with diminished retinal sensitivity.

Better night driving vision by removing headlight-blindness (increasing dynamic range while eliminating whiteout) while also increasing general illumination as described herein.

Providing all of the above with true, natural depth perception even though it is produced by a display device.

Potentially simultaneous treatment of other conditions including myopia, hyperopia, astigmatism and presbyopia.

These embodiments may be used simply to provide a worn or standing video display that requires no glasses, provides a true 3-D image and/or improves vision, They may, of course do all three at once. All of the above applications and others use the current invention's EO components and redirected light to create a display image and all can use conventional lenses to correct the subject's view of the displayed image (either custom lenses or the ones the subject normally wears as described above). Alternatively, however, in all of the above cases, the display can be software amended to display the image in a form recognized by a subject with a vision impairment as a corrected image by creating virtual corrective lenses.

Myopia and Hyperopia: Focus-Based Control

Some conditions, such as myopia, hyperopia and presbyopia can be corrected simply by controlling the divergence of the EO components by any of the numerous methods discussed above for 3-D imaging and for diffraction control. This is because hyperopia, caused by a shortened path in the eye and/or a flatter than normal cornea (where ~70% of the eye's refraction occurs) requires additional refraction (more diopter fractions) to bring the image to a focal point early—since the retina is being encountered prior to the effective focal point. Similarly, and inversely, the myope requires that his vision system's effective diopters of refraction be reduced to bring the image to a focal point later since the retina is further away (due to an elongated eye) or due to an excessively curved cornea. Presbyopia requires similar adjustments responsive to the instant POI which may require refractive adjustments in either direction.

To emulate a given prescription for these conditions, a general shift in the vision system's focal range is the solution. This is normally effected by the insertion in the vision path of a concave lens (for myopia, to increase the divergence of entering light so that it doesn't reach a focal point until the light has reached the retina in the elongated or under-refractive eye) or a convex lens (to decrease the divergence/increase the convergence of entering light so that it reaches a focal point faster to correct the shorter or over-refractive eye).

These general adjustments can be made in a different manner (backwards), as in the current invention, by creating light from a viewed display whose divergence is already selected to be appropriate for both the virtual distance and the subject's vision system (or, where desirable, just one of the two). For the myope, viewing, for example, an image of a large virtual movie screen 2 M feet in front of him, the desired divergence of the light is calculated based on the virtual POI distance (here, 2 M) using calculations similar to or having adequately similar results with those described above in the discussions of diffraction managed divergence, image placement and 3-D imaging.

The adjustment to this POI-driven divergence for the subject's vision system is not limited to a single applicable method. Some implementers will prefer calculations, well understood by those skilled in the art, to appropriately increase or decrease this divergence to match the simple additive divergence or convergence of the prescription lens. Others will simply provide an additive value (or an array of range-driven values) to be added to the POI distance. For myopes they will be negative numbers to achieve the more-easily viewed divergence associated with a nearer object. (This adjusted value that uses the POI distance does not, of course, change the POI distance that is used for binocular overlap considerations.) Thus, when the divergence selection logic chooses a "POI-driven" divergence, its result will be increased or decreased for myopes or hyperopes respectively. E.g., for a hyperope, a positive value appropriate to the subject's prescription, D', would be added to the POI distance before selecting the EO component for that distance.

To tune closer to a range, the distance addition/subtraction value may also be an array of values each keyed to a distance or any distance adjustment algorithm e.g., $D=P*d' *a$ where D is the distance used in the selection of EO elements, P is the true POI distance, d' is a value (>1 for hyperopes and <1 for myopes). In either case, the desired divergence is accomplished by any of the methods already discussed.

Self-Adjustment: The subject can also, optionally, manually adjust this with an adjustment screw or knob or, using a PC having communications with the processor(s). Here, the subject views the image while adjusting a knob, computer slider or other approach for communicating a degree and direction of change. As the adjusted value increases or decreases, the adjustment factors just discussed and others are increased or decreased causing the instant display image to reflect the changes until a satisfactory accommodation range is accomplished.

Strabismus:

Many strabismics can be coached to train the lazy eye to stay in coordination with the strong eye. However, the time and caregiver support required is often expensive and prohibitively time consuming. Also the treatment is intermittent and thus often ineffective. The primary current treatment options are 1) chemically paralyze the working eye to make the lazy eye exercise, 2) Numb the working eye to force the lazy eye to practice tracking or 3) block the strong eye (e.g., a patch) to force the lazy eye to behave. An ET-enabled embodiment of the current invention can also be used to treat strabismus without these extreme and cosmetically prohibitive measures by training the user to control the "lazy eye" with immediately responsive negative feedback thus forcing the brain to keep the straying eye on target. It is normative in strabismus for the strong eye to provide the dominant image to the brain when the lazy eye strays. While this does allow the patient to see, it robs him of the negative feedback needed to train himself to stay on target—which is why doctors are paralyzing good eyes.

Figure 12:
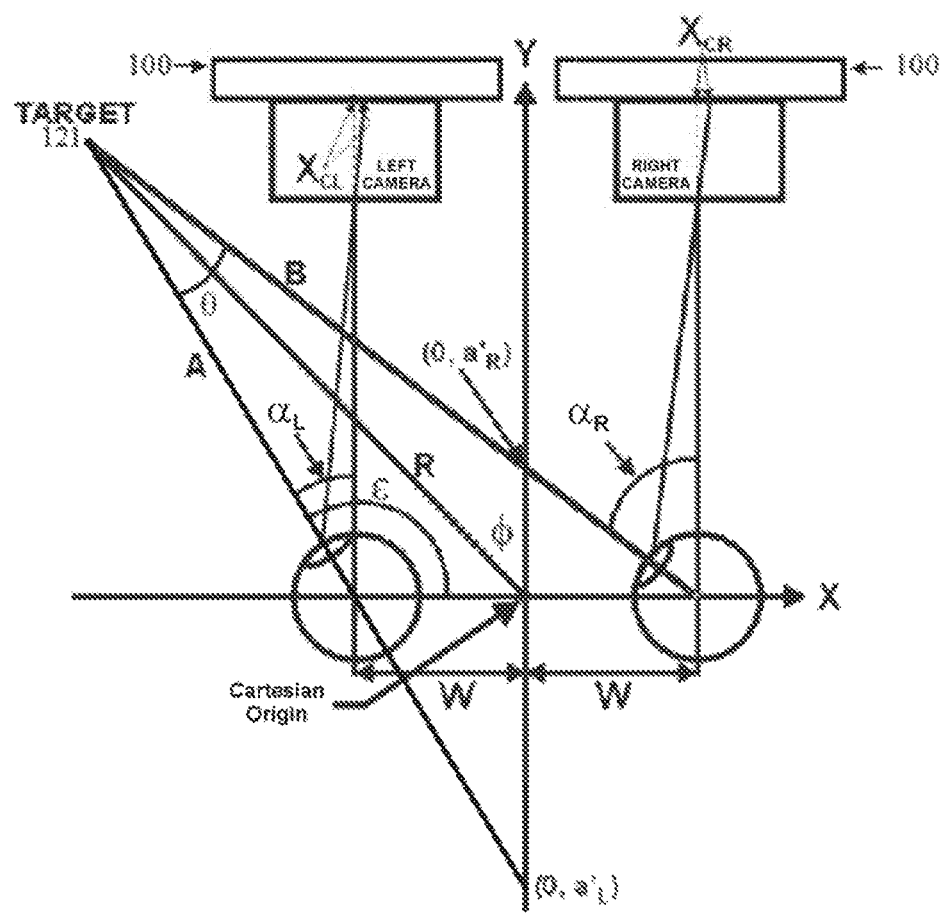
FIG. 12 illustrates some of the geometry associated with an eye-tracking assembly.

The example embodiment sketched in FIG. 12 is not spatially proportional in order to allow the distant target to fit into the drawing. Also, the plate assemblies, 100, are drawn only as dotted lines. Their positions can be imagined since the ET is normally attached to it or the rims that house it. If FIG. 12 is thought of as a top view (looking down on the wearer) then, if the ET is mounted just below or at the bottom of the plate, the plate can be seen as just above the CCD, 121. Of course, ET's can be placed in a number of places around the eye's normal vision area but this is exemplary. Normally, at least one of the lines A or B will pass through at least one of the plates, 100. Thus, the plates, 100, and cameras (normally the combination of the CCD, 121 and the lens(122) will normally be much further from the target (point of interest, POI), 123.

Thus, the ET assembly, powered by onboard battery not shown, in this embodiment is shown as processing element(s) and 2 cameras, one for each eye (other forms of ET are also applicable to the current invention). Both cameras are operatively connected to a processor. This connection is by simple wire in the preferred embodiment (where an onboard rather than a remote processor is used for locally used data such as this distance calculation and response; wire and processor not shown), or wireless via a frame-mounted battery powered transmitter on board, not shown, to a processor which provides response commands by return transmission. Regardless of which primary processor approach is selected by implementers for the current invention, the ET is imaging or otherwise measuring the attitude or position of each eye from its location largely outside the area of each eye's likely optical axis.

For example, in embodiments where the ET captures the position of each eye (typically relative to the base position of the eye, i.e. the position when the user is looking straight ahead), this lateral shift can be identified as values $X_{CL}$ and $X_{CR}$, as labeled in FIG. 12. These can be ascertained by the magnitude of image displacement of the center of the iris (or other eye landmark) on the camera's CCD (as illustrated with offsets labeled $X_{CL}$ and $X_{CR}$) from its base position. Said processor then calculates the intersection of the optical axes of the two eyes, 123 (they intersect at the patient's approximate point of focus, i.e. his point of interest). The distance R (as labeled in FIG. 12) from between the user's eyes to said target (point of intersection, 123) is calculated. Anyone skilled in the art can, of course, calculate the value R based on trigonometry and the drawing in FIG. 12, which is one acceptable, but not the preferred, method. In this calculation embodiment, the distance is simply the value of R. Although this can be calculated as:

$$\alpha_J = \sin^{-1}\{[f\psi(x_{CJ}) \pm X_{CJ}(f^2 + X^2_{CJ} - \psi^2(x_{CJ}))^{1/2}]/(X^2_{CJ} + f^2)\}$$

where $\psi(x_{CJ}) = [(DX_{CJ} - f(W_J - W))/r]$ and $J = L, R.$ $\tan \alpha_L = (R \sin \phi + w)/R \cos \phi$ and $\tan \alpha_R = (R \sin \phi - w)/R \cos \phi$ Thus: $w = \tan \alpha_L R \cos \phi - R \sin \phi = R \sin \phi - \tan \alpha_R R \cos \phi$ $-2R \sin \phi = R \cos \phi(-\tan \alpha_R - \tan \alpha_L)$ $\tan \phi = \frac{1}{2}(\tan \alpha_R + \tan \alpha_L)$ $\phi = \tan^{-1}[\frac{1}{2}(\tan \alpha_R + \tan \alpha a_L)]$ $A = 2W \sin \Gamma_R/\sin \theta$ where $\theta = \alpha_L - \alpha_R$ $\Gamma_R = \pi/2 + \alpha_R$ and $\Gamma_L = \pi/2 - \alpha_L$ Thus: $A = 2W \sin(\pi/2 - \alpha_R)/\sin(\alpha_R - \alpha_L)$ and (by *law* of cosines): $R = (A^2 + W^2 - 2WA \cos \Gamma_L)^{1/2}$ it is, in practice not the preferred embodiment because of the significant and sometimes undocumented effects of ET assembly lenses as angles changed, actual magnifications once installed and the difficulty of placing elements in perfect form for wearing on a person's uniquely shaped head (all heads are different). Also, of course, it is normative for many ET devices to reduce the image on the CCD with the lens. Thus, the relative $X_{CL}$ and $X_{CR}$ must normally be used for the spatial calculation which is an adjusted value representative of the lens-unreduced $X_{CJ}$ (where J is L or R for the left or right eye as is appropriate) shown in FIG. 12. For example, when the ET software operating on the processor identifies the pixel associated with the instant center of the iris image on the CCD, the number of pixels of offset from the pixel associated with the base position will be calibrated to represent the distance between the locations of the instant center of the iris image and the base position of the iris image.

Subsequent specific distance reading calibration was always necessary because even the slightest asymmetry of the face of the wearer or variance of the height of an ear or a slight misalignment of a lens from the alignment presumed in the trigonometric calculation, etc. introduced error. Since calibration improved results so much, it was found easier to base the distance calculation itself on a single distance calibration which serves to correct all alignment and positional errors at once.

Thus, the now described preferred embodiment was found to greatly improve the accuracy beyond simple trigonometry, to bypass the trigonometric calculation above completely and simply have the user look at several known distances (prompted by the system either using a PC connected to the ET during setup or by prompting the user on the display of the current invention directly e.g., prompted by the onboard processor) for a couple of seconds each to make a table of at least distance vs. captured $X_{CL}$ (and for the right eye, $X_{CR}$). This short table (which in practice has in each record a pixel location (where the center of the pupil was observed) vs. a distance associated with that pixel value) can then be curve-fitted by normal means (including the well-known curve fitting techniques commonly used in Excel) to create a calibration curve of $X_{CJ}$ vs. Distance. The resulting curve may be in the form of:

Distance $= a_1 x^{n1} + a_2 x^{n2} \ldots + ax + b$ where the a's and b are constants and the n's are powers of x. Or where a linear fit is used, the familiar Distance $= mx + b$.

The captured runtime values for actual $X_{CL}$ and $X_{CR}$ values can then be simply entered into the equation in place of the x values to resolve distance as a single process that accommodated a number of fitting and adjustment issues.

Although pupil displacement from base can be used (as well as angle of pupil) in any direction, simply noting lateral travel (based on azimuth with no concern for elevation), i.e. left and right, provides good results.

The long periods of time strabismics spend looking at computer monitors and TV may exacerbate the symptoms of strabismus but, with the current invention, can be a powerful means to treat it. For example, when the user is sitting at a computer monitor he may inform the software user interface to begin a session whereupon the software calculates the distance of the user's initial look (the distance to the screen). The user may also, optionally, using the user interface, tell the software how far away the current POI is. However, before long, one eye may begin to move away from the POI and, because the strong eye continues to feed the dominant image, the user is not prompted or required to correct it.

Rather than, for example, paralyzing the strong eye, the software compares the ET-based calculation of distance with the known approximate distance from the start of the session. When a lazy eye wanders off, the intersection of the vision axes can move from, say, 18" to multiple feet away very quickly. When this distance comparison results in a difference above a chosen threshold value chosen by experience, the software initiates a correction.

This correction may be in the form of:
A) A dotted display. The current invention, able to light every pixel in the user's field of view, can display any kind of video image and can, over the user's view through the glasses, overlay an array of dots on the view forward. This can begin as few dots for a small disparity between the known distance and the calculated distance spread over may pixels (perhaps 1 pixel lit dimly every 50 pixels. This can proceed to extremes of disparity to very substantial image blockage with high brightness. However, the image itself is, in the preferred method, never blocked so much that the user cannot make out the image because the image facilitates rapid recovery.
B) A message or image on the display with the letters of text warning him to get back on track.
C) A refractive blurring of the image e.g., by effecting a focus in embodiments where LDE's are SLM's using the methods well known for adjusting/creating refraction in SLM-based arrays.
D) A selective blocking of pixels to darken the image. Like the dotted display but progressively dimming the display responsive to increased distance disparity.
E) Combinations of the above.

Patients vary and different methods benefit different patients. The software can optionally, either by user selection, doctor instructions or product design, apply these stimuli in the strong eye, the weak eye or both and in varying degrees for both. In the preferred embodiment, at least the strong eye is provided the image interference. Research has shown that perception of vision input is an extremely high priority for the brain and that it will plastically do whatever it can to "see". That includes making the lazy eye behave when the strong eye image is negatively affected even very temporally.

The software has a degree of image interference associated with each disparity value or range of disparity values so, as the lazy eye starts coming back, the lesser disparity results in a lesser interference created and the image begins to get brighter and/or clearer. When the continuously monitored distance disparity is within the tolerance (i.e. when abs(calculated distance—known distance))<=threshold distance) the forward image is undisturbed.

The user does not have to be in a "session" to benefit from the treatment.

The software can continuously monitor for multiple magnitude-providing indicators of strabismus:
A) Distance disparity (described above)
B) Movement of one eye without movement in the other.
C) Movement of one eye in a different lateral direction that the simultaneous motion of the other.
D) Movement of one eye in a different vertical (elevation) direction that the simultaneous motion of the other.
E) Any distance calculation significantly greater than the values for effective infinity in the human eye which will occur at least when the optical axes of the two eyes are divergent (e.g., when $180-\Gamma_L-\Gamma_R<0$).

To eliminate noise, and in particular here the momentary irregularities of the saccading eyes, and to recognize motion as the change in the values between frames, the software optionally considers these movements and conditions over an implementer or user-decided number of frames. Thus, for example, the movement of an eye in an apparently erroneous direction as described above, may be tolerated for a small number of frames but, if it continues for a chosen threshold number of frames, the software will execute one of the corrections above as chosen by implementers and the user will respond and then see a clear, satisfying image.

Diagnosis of Strabismus:

The description above demonstrates the ability of the current invention to recognize symptoms of strabismus in real time. Thus, it also has great use as a means to diagnose both the presence and magnitude of the problem. The software can also keep a history of each time-stamped correction and its magnitude. These results can be displayed via the plate, 100, or by external display. Ratings such as the area under the corrections curve (time vs. magnitude of correction) or simply corrections/hour can be included. Also, in all embodiments of the current invention there is the intended option of stored data either on board, externally by communication connection or both as a means for applying the resources of personal computers to broadening the capacity and 2-way functionality of the current invention. Thus software on an external computer or computer device can direct the onboard software with responses received by the onboard software. Here, the statistics can be software offloaded by the communication methods already discussed as well as the obvious memory chip physical transfer from the glasses frame to a PC chip reader. Once on the PC, any number of diagnostic and recommended response statistics can be further rendered based on the key information thus captured.

Astigmatism:

Consider a cylindrical lens, 802 in FIG. 8A (seen from above but not drawn geometrically). To correct an astigmatism of the eye, 106, the lens refracts the ray extending from 800 to exit the lens as the ray 804 (rather than the natural path, 801, from POI, 800). For a given prescription corrective lens in a known spatial relationship between eye and lens, these corrective vector shifts (e.g., 801 to 804 so that 800 appears where it should even with the astigmatism) are quickly calculated both manually and in ray-tracing systems. Of course, ophthalmologists also capture in examination the same data or data convertible to such vector shifts but it is simpler to explain and visualize looking at the physical lens that we are emulating.

The current invention can, from this corrected vector data, e.g., the vector coordinates of 804 (whether it is calculated in real time or using a table-based lookup from initial calculations), reproduce light along the corrected vector, 804, as illustrated in FIG. 8C. A BS, 104, is visible because it is activated to reflect the light 103 along the path 804. This will be perceived as coming from the spatial location associated with POI, 800. Of course, when the software is required to display a pixel, e.g. to appear as the POI 800, knowing the vector of light that needs to proceed towards the eye is not enough. To reproduce that vector, the proper EO component must be selected or arrived at by calculation. The preferred method for quickly selecting the right EO component to create the vector is described in "EO Component Mapping for Calibration and Mass-Production" above. There, the table based recall of which conductor contacts need to be activated to power a specific EO component is also described.

Thus in one example embodiment, to display a pixel representative of a POI, e.g. 800, the vector shift from the original path, e.g., 801 to the corrected path, e.g., 804 is spatially calculated (either based on the lens prescription or ophthalmologist eye geometry captured data) or table recalled. This vector's coordinates, potentially rounded to key-based precision levels, are retrieved from a factory or more recent calibration table relating, ultimately, the vector that the light is to follow to the conductor contacts that need to be activated to power the appropriate EO component to send that light. The table can also contain, of course, similar data for more complex light directions like the ones in FIG. 10 and FIG. 14.

Moving Virtual Lens and Other Eye-Tracking Enhancements:

There are, additionally, a number of good reasons to, optionally, cause the virtual lens being emulated to move with the eye and separately, also optionally, to select more carefully which vectors we select to send light along to represent a POI.

For example, it is useful, where possible, to select, for reflected light, vectors that go through the center of the pupil. Recalling from FIG. 4B that, to light any given pixel, there are potentially any number of EO components, like the two indicated by 403, that can do so. Even for near-collimated, very discrete (narrow) beams, any two of these preserve focal depth and depth perception. Thus, in some embodiments, implementers will want to choose, based on ET-gained eye position data, rays more like 409 (which would require another BS between the two indicated by 403) which would paint the same virtual POI but with less distortion. Rays entering near the center of the pupil are not only less vulnerable to corneal refraction error (where approximately 70% of the eye's refraction occurs) but incur less pupil diffraction and, when narrow, contribute less to the outer boundaries of the circle of confusion on the retina.

Also, astigmatism is also not always fully correctable with toric lens (or a virtual toric lens being emulated). Often scratches and/or asymettrical deformations are not all corrected by a cylindrical lens. Also, where a combination of corneal and lenticular astigmaticm exist, they may "warp" each other with their combined irregular refractions in a way that no cylindrical lens can correct. Even in less complex corrections, it is not unusual for a subject to feel that "the floor is tilted". The typical cylindrical shape can be modified to be better optimized to irregular shapes. This can be most effective when the subject's eyes' instant vision axes cross the optical center of the complex and/or asymmetrical lens—but this is often not the case.

If the eye was always looking directly through the center of a lens, that lens could be marvelously complex, taking into account every corneal scratch and even compound distortions from contributing corneal and lenticular astigmatisms. However, the eye does move so it's always been easier to predistort the entering wavefront with a necessary general and orderly lens. However, with the addition of ET to one embodiment, those vectors can be based on the instant-ideal position of the virtual lens. In other words, the virtual lens (which is idealized for an irregular surface when the eye's vision axis crosses the center of the lens) appears to move when the eye does. Thus, the eye is always looking through the center of the virtual lens and more complex correction is enabled by the enduring virtual-spatial relationship.

One way to envision the process, and a simple-to-explain embodiment of the many applicable embodiments, is to follow the following steps:

1. In software, position the virtual lens being emulated at a given distance in front of the virtual position of the eye with the vision axis of the instant virtual eye at the center of the lens and normal to a transverse plane of the virtual lens.

2. Responsive to ET data returning the attitude of the eye, rotate in VR the eye and lens together on the central rotational axis of the virtual eye. Now as the real eye rotates, the virtual eye does too and the virtual lens follows at the same distance in front of the virtual eye.

3. Now, to display a given virtual POI, calculate the vector from that virtual point in space (for a 2-D application this may be a point on a virtual screen a couple of meters in front of the subject or, for 3-D, it is a specific, depth-loaded POI) in front of the subject to the known related spatial location of the eye.

4. Calculate the shift of light following this vector as it encounters the virtual lens (using well known VR positional calculations and, from the angles of incidence at boundary layers, Snell's law) to obtain the shifted vector, e.g., 801.

5. As described above, select and activate the EO component that will send light along this vector. The pixel is seen by the subject in its proper position without a physical lens.

There is, of course, no chromatic aberration or edge distortion since the virtual lens is always "centered" on the vision axis. Using, where practical, narrow beams of light for each pixel, provides the general vision advantages of a greatly reduced effective aperture (even with a large pupil) reducing diffraction and minimizing the envelope of the circle of confusion.

Treating multiple simultaneous conditions: It may be observed that treating astigmatism with virtual lenses is best done with narrow bands of near-collimated light while treatment for focal-length conditions would ordinarily create specific divergence for focal distance and, for 3-D applications, depth perception enablement. However, when treating both astigmatism and a focal-length condition simultaneously (e.g., myopia, hyperopia or presbyopia), the depth loading can be softened (range of divergences over the full range of distances can be compressed into a narrower range) or depth enablement can be accomplished by the same narrow and near-collimated types of beams as shown in FIG. 4.

Then, whether the subject is wearing the current invention to view virtual images over a scene, just to see a displayed image, to see a displayed image better (cataracts, myopia/hyperopia/presbyopia etc.) or to see the scene better by way of redisplay from a scene camera, this can be accomplished without corrective lenses via remapping. Both the displayed image (e.g., text and graphics) and a captured scene provided via a displayed image can, then, include correction for vision defects without lenses.

Holographic Imaging Embodiments:

Diffraction control has been addressed above including a list of "Diffraction-driven divergence control elements" and a discussion of "3-D imaging" both describing embodiments where diffraction is both accommodated and used (both for focus and depth enabled display and for control of diffraction). Beyond those, there is provided here, for even higher resolution applications (even in the presence of very long wavelengths), a number of other holograph-related embodiments benefitting from diffraction both as a part of the display process and as a diffraction control measure.

Good optics equipment is often described as "diffraction limited" meaning that other issues detrimental to good imaging have been taken care of leaving only the immovable diffraction limits on high-resolution. However, grating technology, associated with holographic imaging and a growing number of emerging imaging advances, provides important elements in multiple embodiments of the current invention that not only fight diffraction with diffraction while enabling very high resolution but additionally provide an eminently inexpensive alternative solution that is also a mass-producible, "stamp-able" display mechanism and diffraction control measure.

Background on Holograph Stamping and Other Processes:

By bleaching a silver halide hologram or using dicromated gelatin, etc. holographers regularly create transparent holograms whose diffraction patterns are solely controlled by clear shapes whose differences in RI provides the diffraction-driven image. There is also a well developed process of treating extremely high-resolution diffraction patterns from collapsed silver halide hologram patterns rendered to molds for mass produced stamped holograms. This is extremely cost effective in mass production. Also, computer driven diamond and chemical etched holograms also appear able to deal with the scales desired. Contrast-based computer-generated film images can also be created which can then be treated to become transparent. In the preferred embodiments, the transparent hologram EO material has or can attain the default RI.

Holographic gratings can contain rings separated by $1/5000^{th}$ of a mm which creates no small amount of diffraction. However, in a recreated holograph (of, for example, what was, at exposure time, a reasonably distant and tiny isotropic reflector) instead of a grating-width-predicted diffractive bright angle (Airy disc) of roughly a radian exiting the microscopic grating, we get a tiny, discrete and largely non-divergent packet of light that is sent to the eye. Its divergence is, of course, comparable to the light that would have come from the distant virtual image.

This "masking" around the most central portion of the diffraction pattern is due to destructive interference with all but the bright center of the pattern. The precisely organized destructive interference from cooperating related rings creates a blanking effect that is concentrically arrayed around the central point leaving nothing but a discrete shaft of light in the middle. In other words, destructive interference eliminates most of the unwanted diffraction-driven expansion of our desired tiny and collimated beam.

Note, though the word hologram is used fairly loosely herein to also include a wide variety of grating, scratch array and holograph-like processes. Some of them, like scratch holographs, Benton rainbow holographs and other diffraction-based approaches work better with different embodiments and design goals. Scratch holograms and some other human/computer generated patterns work on somewhat different principles than classical holograms but this can actually be used to simplify the process and use fewer rings.

Despite their differences, they are all usefully applicable embodiments and all permit mass-produced holographic elements that, using the "invisible until needed" process, can be selectively activated to create very discrete packets of essentially parallel light as a depth and color controlled image to an eye.

Element-Level Holographic Beam Control:

Example: a placed, printed, photographically created, or stamped array of holographic forms in an EO layer across each "lens" plate creates an array of optionally discrete holographic elements that each act like bleached, clear holograms or other holographic forms where the imaging diffraction is effected by differences in RI rather than contrast. Of course, for stamping embodiments, there are numerous means for creating a holographic stamping master. Examples include computer-directed diamond scratches in an EO medium or scratches in a mold used to create an EO medium and computer driven film exposures followed by processing the silver halide film to collapse into mold form (the collapsed portions create ridges out of the uncollapsed portions). Other processes for creating physical ridges and RI-driven patterns from film holograms are also applicable. Regardless of how they are mastered, one quick process for mass production is pressing a pattern originating thus into either one or many electro-optic elements, layers of elements or entire layers representing a compositie element. This can be done separately for each eye or as a continuous wavefront reconstructor to be shared by both eyes. At the other extreme, they may be imprinted one "single pixel" producing pattern at a time. These EO component materials are selected for their RI range and thus can attain the default RI and, with proper conductor stimulation, an adjusted RI which activates the previously transparent and non-diffracting EO component into an active hologram with the potential for extremely discrete packets of light for very high resolution.

In one embodiment, one layer so pressed can potentially create at once all the "rows" analogous to FIG. 3B's rows in one layer. However, to provide more area for better and brighter pixels, multiple layers in the plate will normatively be stamped. Then, on each side of each such layer, conductor lines can be added as a layer to produce a charge across the EO pattern thus activating it. Gaps in EO and, where present, conductor gaps (between the EO elements and conductors) can be covered or filled with a poured, sublimated, plated, printed or otherwise applied non-conductive layer (with the system default RI) followed, optionally, by more stamped EO layers. As above, the holographic EO elements have effectively the same default (inactivated) RI as the surrounding media and any encountered wiring until activated. Thus, the refractive and reflective boundary layers only exist when they are needed by electro-optically managed RI matching as the default. Of course, if the image display electronics are damaged or even destroyed, the wearer still has a clear scene view since the combined elements default back to the same RI.

One Very Simplified Example of the Process:

The simplest way to visualize this approach for the first time is to think of a single BS in the FIG. 1 assembly as being a fragment of a hologram whose ordinary output is a discrete shaft of near-collimated light (e.g., a hologram of a distant, discrete point). Place it at the proper angle in the path of the aforementioned laser beam for emission of image light to the eye analogous to the paths shown in FIG. 1. The essentially collimated or controlled-divergence light to the eye is provided via reference-beam holographic reconstruction.

The hologram in this particular example, however it is created, is a hologram of a tiny and discrete shaft of light or, visualized differently, a holograph of a reasonably distant and small isotropic reflector/emitter (whose light can be near-collimated and unassociated with diffractive divergence). Any fragment of this hologram could be cut out, and when placed close to the eye and in the path of the reference beam, would present the eye with an image of that dot (pixel) of light at the apparent distance which is easily recognized by the eye (even if the eye is less than an inch from the hologram fragment as it is in this worn display device). (Of course, if the theoretical fragment, in this illustrative sub-comment, is taken from a portion of the hologram with a different perspective of the emitter than a true spatial recreation of the hologram, the image would be shifted but this provides an insightful look at how a tiny hologram fragment can produce a very discrete and predictable packet of light.) If you position the hologram such that the orthoscopic packet terminates at the pupil then the pseudoscopic image can be directed to miss the eye.

Thus we first consider the most easily understood of the holographic embodiments: an array of such holographic fragments each of which is positioned to present a single pixel in the FOV. Although a mass-stamped layer of thousands of these is a practical embodiment, a simpler one to visualize first is the placement of many rectangular holograph fragments like 904 in the left side of FIG. 9B. A portion of the hologram of a singular and distant point's diffraction pattern from that singular, tiny object light source is cut out and bleached to make a common transparent, RI-based hologram and placed as shown (e.g., 904) to provide a pixel of the FOV. Of course, in practice, it is more cost effective to press thousands of such holograms into an EO material but this is also a viable example and one that is easily understood. Conductor traces are added which apply a charge to the hologram which will be explained with FIG. 9D. Thus, the laser beam from laser and decollimating optics, 903, becomes the reference beam for the hologram sending a pixel or more of data to the eye, 106. The divergent laser, while not the only embodiment (collimated beams are also illustrated herein), provides a useful array of different reference beam angles for different pixels which allows the implementer to choose a reference beam angle best suited for the direction of the beam to the eye simply by choosing, by placement, which part of the divergent beam provides the best suited reference beam angle of incidence.

Understanding, now, the left side exemplary layout, it is obvious that larger hologram fragments like 905 (on the right side) would accomplish the same objective with more surface area thus requiring less substrate base resolution while embodying a large "aperture" of reflection favorable to control of unwanted boundary diffraction. In such embodiments, it is visually apparent that, ideally, stamping would not be in horizontal (as drawn) rows but in angular layers.

Of course, rather than this tedious process, large arrays of these can be computer generated or assembled hologram modeled and then mass stamped. There can also be many layers to make sequential and complex arrays. This can include providing multiple individually selectable holograms for each pixel with the same azimuth and elevation with respect to the eye's central vision axis. These redundant elements can be included in the depth of the plate to allow the selection of varying and selectable perceived depths for each pixel. They also enable larger hologram segments since there may be many stacked close together separated only by insulation layers and conductor traces. These redundantly positioned pixels can also be used to pass on to the eye and/or respond to different laser wavelengths. That is, different grating patterns on different holograph segments can provide to the eye different wavelengths from the same source (which may also be white light). Also, when multiple sequential wavelengths of collimated source light are used, the selection of one holograph segment from a group of many for the same pixel may be made to best accommodate or apply the chosen or current wavelength.

It will be seen shortly that much higher capacity with less fabrication labor is practical and, for many embodiments, preferable.

Figure 9A:
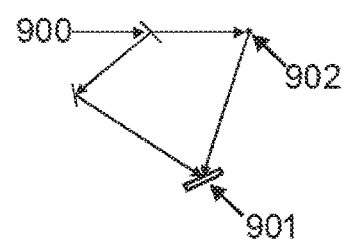
FIG. 9A illustrates an embodiment using holographic fragments.
Figure 9B:
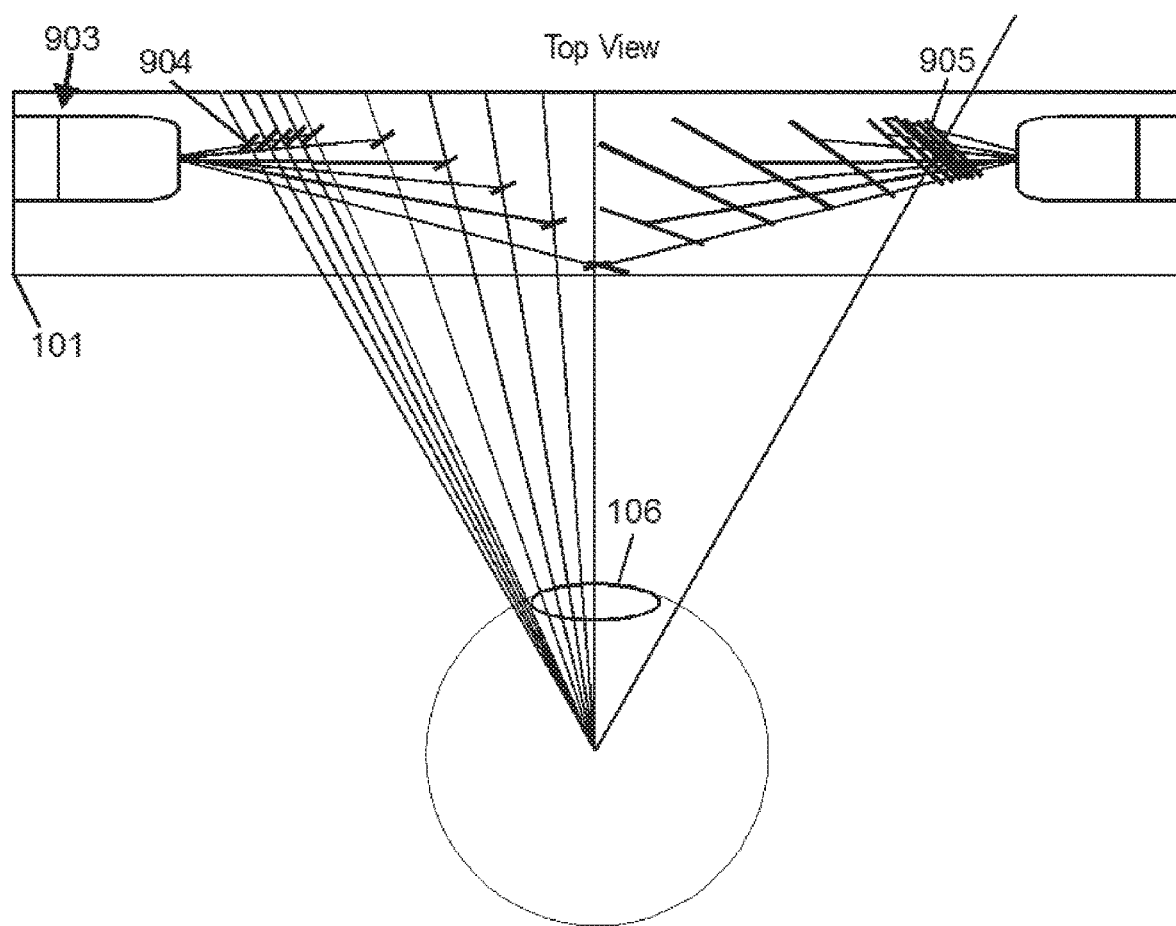
FIG. 9B places a number of these holographic elements in a plate, 101.
Figure 9C:
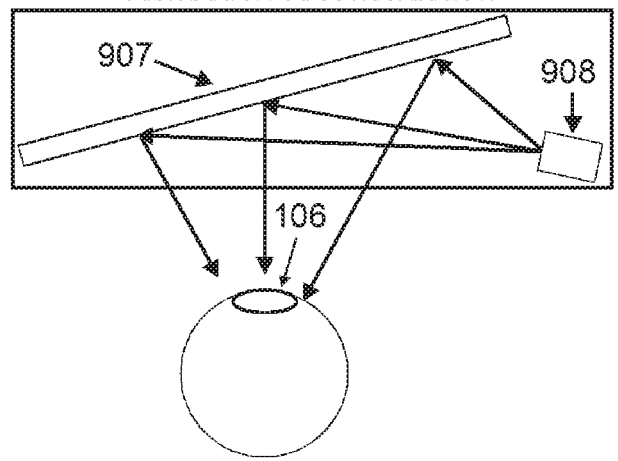
FIG. 9C illustrates one embodiment of a single flat hologram version. In this example a reflection hologram, reflecting only when and where activated, is used.
Figure 9D:
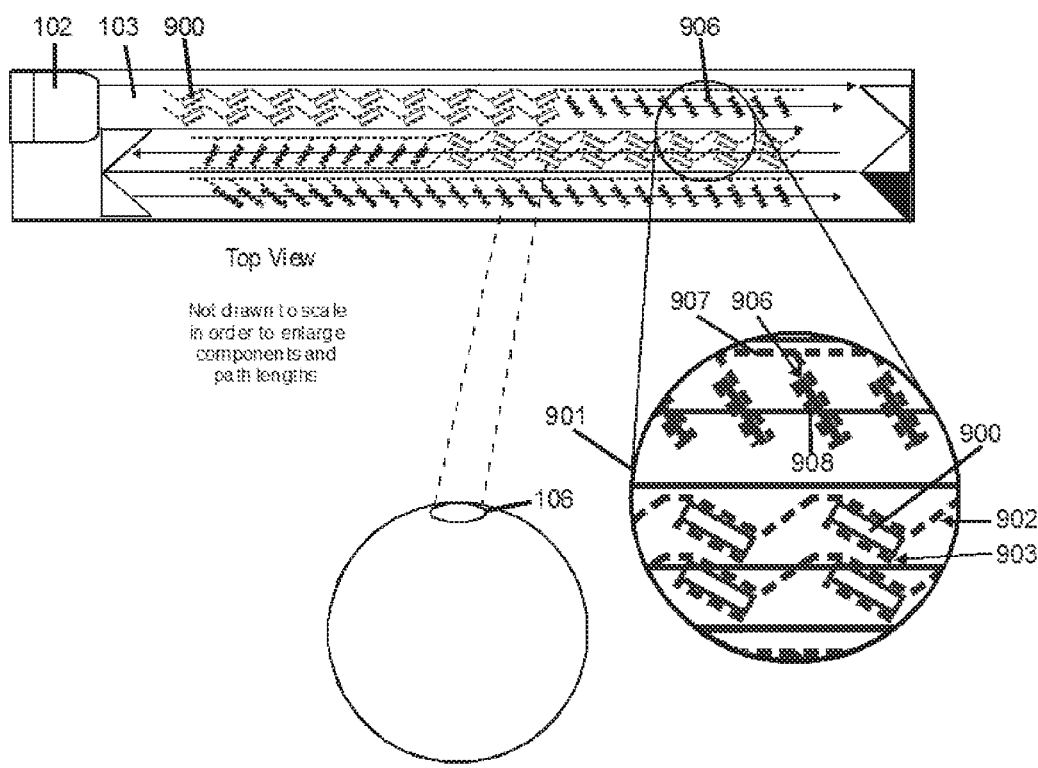
FIG. 9D further illustrates conductor traces which are added and apply a charge to the hologram.

Assembly Summary and Another Example Embodiment:

FIG. 9D illustrates a number of possible components of different or the same embodiment. A laser beam 103 from laser 102 proceeds to the right in what will be referred to as the top row. It first encounters a 2-layer deep array of mechanically mass pressed holograms, 900. Another hologram, 900, can also be seen in enlarged form in enlargement, 901. Here it can be seen that there is a layer of conductor, 902 (the upper dotted line, normal to the paper but irregular in surface) laid down. Upon the layer containing the conductor traces, the holograms are added. This can be by simple placement or mold pressed EO holograms formed into holograms as they are pressed. However, it is not necessary to shape them into little rectangles as they are pressed as illustrated. For example, a layer of EO material (e.g., liquid crystal, lithium niobate, or any EO material) may also be laid down over the entire conductor trace layer, 902, and stamped with a holographic pattern. Then the conductor trace layer, 903, corresponding to 902 for effecting a charge across 900, is laid down. Here it is illustrated as the trace layer, 903, being linear and normal to the paper. The familiar matrix selection method (where one wire from a row and one from a column together select an individual node) is one applicable embodiment and is illustrated here. When a complete layer of EO material is deposited, it will be the portion that is between the conductor nodes that is activated. The rest will continue to be invisible. Another layer of default RI filler is added before beginning the process again for the next layer of holograms.

It can also be seen that a mixed environment is practical. Here, ordinary BSs, e.g., 906, coexist in the same assembly. They can also share the same broad array stamping process. One layer contains the conductor traces, 907 (which may be applied in two steps, including a default RI form layer for the diagonal to be deposited upon). The next layer is the hologram which may, as described above, be formed in any manner including placement of a pre-existing hologram or a subsequent layer of EO material that is stamped into a hologram in which only the portion proximal to the next layer of conductor traces will be activated. Thus, selecting the shape of the conductor traces themselves is an effective means for determining the shape and dimensions of the hologram surface (e.g. round or, as shown here, rectangular and large or small). FIG. 9D also illustrates the mixing of unlike components to form a single pixel. While the holograms themselves are fully capable of providing the proper divergence and angle for proper focusing and depth perception (applicable to 3-D), nevertheless, for this example the two dotted lines entering the eye, 106, are slightly divergent with one coming from an ordinary BS and the other discrete beam is from a hologram. The two lines intersect in the scene view ahead of the subject where the pixel is perceived to be. If the subject does not focus at the right depth, this will be out of focus providing the brain depth information in addition to lens-exertion for accommodation. Of course, another one of the advantages of EO switchable holograms is that they may be also used to display multiple pixels at once.

Dealing with Low EO RI Variation and Other Manufacturing Issues.

EO RI shift is comparatively small. There are several individual approaches to managing the EO effect that can also be used in combination.

a.) Large power-to-need ratio: It is true for most embodiments of the current invention that by simply and inexpensively overpowering the laser (providing much more brightness in the beam than the eye needs to receive) a desired reflected brightness can be attained even with minor RI shift.

b.) Thin charge distribution: It is also true for most embodiments that the potential for RI shift can be substantially increased by simply applying the charge through a very thin EO media. Thus, many of the design criteria for a number of embodiments apply vapor, plating or other thin, controlled application methods for EO components to minimize the thickness of the EO component. In FIG. 9D it can be seen that, even in the rectangular solid embodiment illustrated (a deposited flat film with conductor-defined EO active boundaries is even easier than stamping structural shapes) the charge may be applied through the narrow depth rather than through the more substantive length.

c.) Charge control. Increasing the charge increases the EO effect.

d.) Wavelength shift. E.g., for exposure-created film holograms the exposures can be made with a very short wavelength light (even below the human-visible range). Then, collapsed silver halide hologram patterns thereof can be used to press a hologram in a clear EO material. By using a much longer reference beam (103) reconstructing wavelength (which, if the hologram is created with sub visible wavelength light may just mean visible light but could be red light for even larger results) more diffraction (applied to holographic imaging from a limited voltage) will occur with less voltage.

e.) Computer generated. Obviously, similar to the above, you can easily create computer generated holograms with patterns analogous to extremely short wavelengths (even shorter than is physically possible in the photographic process such as when diamond scratching, selective etching or other precise grating production methods create the diffraction pattern). Recreation with a longer wavelength reference beam light will then provide more diffraction for the same charge.

f.) Field-length minimization. As applied to potentially unique EO shapes, the shorter the distance between the electrodes, the less voltage is required. For example, in a computer generated set of rings, the approach in FIG. 11A can be effective at shortening the effective distance by making the charge range as thin as layer 119 (which can be a very thin layer with the longitudinal distribution of the charge being handled by the conductor areas, in the form of broken annuli). For this discussion of only one embodiment consider the pair of ring sets 113A and 113B to be electrically independent of each other having conductor areas that do not overlap. Conductor lead 115A applies a charge to annulus 117A while conductor lead 115B applies the other charge on the back side (to the viewer) of the displayed assembly to the annulus 117B applying the charge across the EO, pattern embedded annulus, 119.

In a modified embodiment, one side (either the top or bottom layer seen in the cross-sectional area) may be one embodiment of a flat conductor plane as explained above. For example, the top layer, serving as 117A and 117C in FIG. 11A, may both be replaced by or viewed as charged by a single layer of conductor. In that example, conductor annulus 117D would still be activated as shown by leads. The remainder of the discussion, rather than duplicating the discussion for multiple embodiments, considers the conductors as draw in FIG. 11A. Thus, 113A (and, the similarly wired and arrayed, 113B) represents a sandwich-like assembly with a thin, potentially stamped layer carrying a holographic pattern surrounded by flat conductor annuli fed by conductor leads. Of course, in this particular example, the annuli are broken, i.e. missing a portion where it would interfere with the other ring set. This allows for the conductor annuli to be electrically separated from each other where they would otherwise overlap which allows 113 A and B to be printed (or filled then stamped, etc.) in the same three layers (not counting any before or after insulation layers or optional additional layers for managing transparent conductor trace matrix overhead). While the area inside the annuli may be filled with default RI material separately, when the next layer is of such a material, the deposition of that subsequent layer will fill the void without an extra step in the layering process. Thus these two can be activated independently. Using this general approach, any number of concentric or column-row arrayed (or both) ring sets can be closely packed as well as overlapped by multiple other layers and be selected independently with high charge-path efficiency and, thus, maximum RI shift potential for a given charge potential.

g.) Charge reversal: The conductor annuli can, by reversal of charge on the leads or provision of additional leads, reverse the charge polarity to effect a larger total range of RI shift.

Figure 11A:
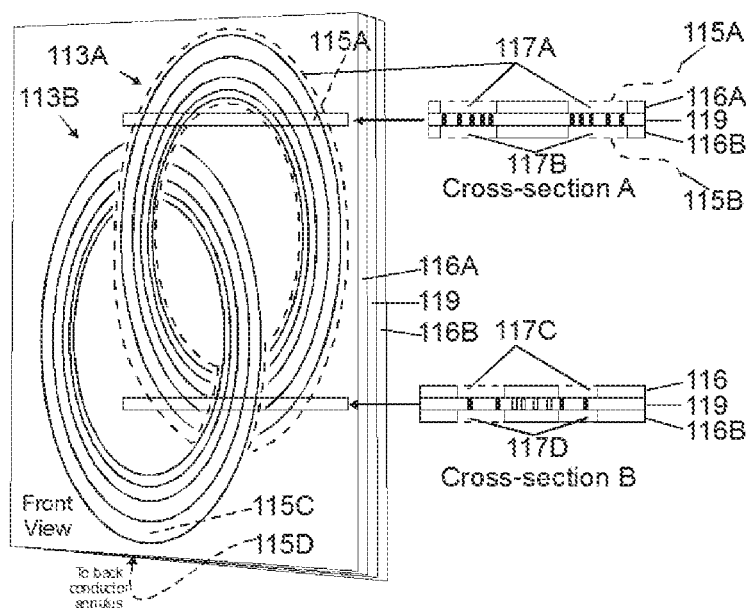
FIG. 11A also involves the use of an SLM illustrating here an arrangement for field-length minimization.
Figure 11B:
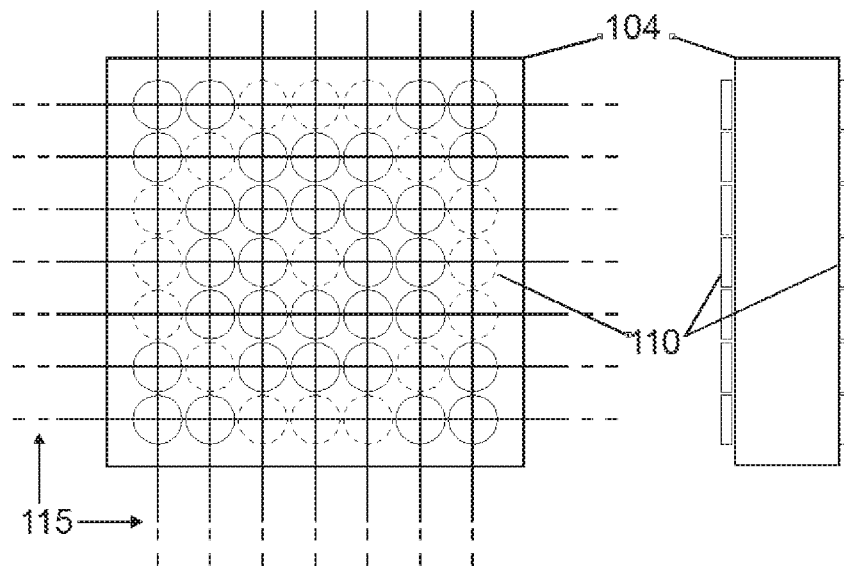
FIG. 11B illustrates that left a plan view of an array of spatial light modulators and, to the right, a profile view.

The FIG. 11A form also allows any RI change of the conductor itself (whether intentional or consequential), when charged, to be incorporated as part of the calculated desired change in the RI of the EO layer rather than potentially interfering with it.

Stackable sheet arrays: It is intuitive, and ideal for many embodiments, that the etched, printed, scratched, stamped, burned, molded or otherwise patterned EO material is the first recipient of said shape controlling factors. However, a non-EO substrate (a carrier material of default RI or, at least having a flat surface that does not substantially greatly affect light transmission) or even an interior surface of the plate itself (which, when relatively flat, does not necessarily have to have the default RI) can be etched, scratched, grooved, etc. or initially molded to have the "negative" shape of BSs, other EO components or any relative of diffraction gratings. Then, when an EO material is deposited upon or otherwise placed against that irregular surface (e.g., liquid crystal or any other EO material) the EO material can take on the desired positive shapes of ridges, rings, BSs and other EO components. Indeed, for some applications, thin sheets of transparent molded or cut plastic or glass with registration holes and pegs for easy stacking alignment and having ubiquitously the negative shape of any EO component or components shaped into them may receive a conductor layer and then stacked together with liquid crystal or other EO material between them and sealed with optical or, at peripheral edges, ordinary cement. Here, as the EO material flows or is pressured into accommodating to the irregularities of the substrate, the EO acquires the positive (desired) shape. Activating areas of the shaped material (rings, BSs, etc.)

with shaped conductors can further define the shape and character of the emitted light.

"Screen-Level" Holographic Beam Control.

Now that this simpler example of a matrix of tiny hologram segments and sets or ring-sets (which can be arrayed in rows, columns and in multiple layers) is understood, it's much easier to visualize very much larger individual holographs (such as the sparse subset shown on the right side of FIG. 9B) or even singular (one per plate/eye) computer generated (or carefully imaged) holographic EO ring-sets that create a wide matrix of points (pixels) at a virtual distance with individual rings (or portions of rings optionally segmented to prevent overlaps with other rings) activated selectively to create any virtual point/pixel or many simultaneous virtual points/pixels.

The left half of FIG. 9B illustrates an array of small holograms like 904 which are in the expanding beam of a laser and divergent lens assembly, 903, and, only when activated, send light towards the eye, 106. While it is initially simpler to think of these as producing a single discrete ray, since each of these can contain many selectively activated rings representative of many POI's, each can represent many points/pixels in the display by selecting, i.e. activating, a subset of the EO rings. Further, the right side of FIG. 9B illustrates that each of these small and potentially much more tightly stacked (both horizontally and vertically) holograms like 904 can be expanded to encounter the full beam width as 905 does. Now, it is easier to envision an array of much larger, multi-POI-pixel holograms that are always illuminated by the laser but, due to the effectively identical EO RI with the surrounding media, they allow light to pass through unaffected for those portions that are at the default (unselected) RI. However, selective ring excitement creates the appropriately divergent or parallel (as desired) beams on demand.

Of course, a single flat or shaped hologram, with many independently selectable rings and/or ring sets, can replace all of those shown in FIG. 9B. FIG. 9C illustrates one embodiment of a single flat hologram version. In this example a reflection hologram, reflecting only when and where activated, is used. Of course, embodiments that use the forms illustrated in FIGS. 9B and 9C will use EO and other elements that have or can achieve the default (unselected) RI of the surrounding media. However, the containing surfaces of the plate itself may be of another RI where necessary with minor consequences.

Health Applications

In addition to the health applications of Lenses for Vision Correction, above, the following are applied towards aiding human perception.

Night Vision:

This process of scene redisplay in natural-looking glasses with brightness control is also applicable to providing depth-perception-enabled night vision (brightness control) for those with reduced retinal sensitivity. This amplification of positionally managed light can also be mapped pixel by pixel to best address the irregular and subject-specific retinal map of sensitive/less-sensitive rods and cones. For driving glasses, areas of extreme brightness (e.g., headlights) can be software-governed (dimmed to a cap level). The assembly to accomplish this is simply a worn display embodiment of the current invention with a scene camera or cameras added.

2-D: A camera, normally directed along the cyclopic axis, captures scene images which are redisplayed in amplified form to coincide with the natural scene view. This allows "highlighting" of dark areas while, optionally, leaving bright areas like headlights alone thus making dim objects brighter and the pupil of the eye smaller. In addition to adding what can't be seen, this design can avoid adding to what can be seen (based on light level as easily read from the camera image's pixel brightness) for a "win only" condition. In other words, this is one method for mitigating the effects of partial image mis-registration. At the same time, the smaller pupil responsive to the brighter overall image, makes headlights less blinding and, in fact, more in line with background brightness. This also allows excellent depth perception for relatively bright areas and edges since it is the natural scene coming through the plate.

3-D: A 3-D capture camera, e.g., a pair of cameras, one over each eye, captures a stereoscopic image. Said image is slightly height adjusted for the actual position of each eye with respect to the capturing camera and displayed to the eye via a worn display embodiment providing stereoscopic reproduction and the option of eliminating the natural scene view (blocking the scene view). Where true depth-enabled image capture is present, the pixel or pixel-group enabled divergence responsive to said actual depths of the points in the scene image provides eye-accommodation-related depth perception. One very useful such embodiment involves ET which captures the distance to the instant POI and allows the current invention to apply, as described above, the proper divergence for that distance. This is most useful and precise for the instant foveal view for each eye and, thus, another optional embodiment that only depth enables the portion of the image associated with the instant POI requires that the scene POI's position be located in the captured image (as will be understood by those skilled in the art) and, when those pixels for said locations with known ranges are displayed, the divergence is responsive to the proper depth to be perceived. Here as in the previous example, it is possible to simply tip the scales in favor of dimmer areas of the FOV without displaying anything over the natural scene view for adequately bright subjects. With good camera quality, alignment and display-provided depth perception, however, it is also possible to block the natural scene view with shaded or black lenses.

Macular Degeneration (MD):

Some of the elements in the current invention have application to enhancing the vision for the growing population suffering from macular degeneration. With the capacity to recreate a depth-enabled scene view from a scene camera that accurately reflects the actual scene view for the instant head attitude and with full peripheral vision and light conditioning, several perception enhancements become possible. While this is a natural vision enhancement for worn display delivery, it is also highly applicable to large screen displays. Even in the scene stabilization option, below, stabilizing an action video image can help MD sufferers with perception.

Saccade Temporary Stabilization:

It is problematic that a person with MD will sense a POI in a peripheral area of the retina that still functions and, unconsciously, immediately center the fovea over the POI, removing it from vision and making good perception and orientation difficult. MD subjects complain that objects move, become blurred or simply become "invisible" because the brain processing is confused by the continual bait and switch images. By providing an optional ET camera e.g. 509 in FIG. 14D (similar or amended placement is applicable to all embodiments), the instant cyclopic (central) vision axis can be tracked based on positional and approximate (or calibration corrected) subject cephaolmetric data (e.g. a distance between the eye centers of 62 mm). Then, during brief fixation periods, when the subject is trying to analyze something in the scene, the fixation can be sensed triggering a stabilization or the subject can trigger a stabilization through a user interface such as a "clicker" (which sends an ideally wireless signal received and forwarded to the processor) whereupon the software "freezes" the image briefly. The freeze is long enough to read or grasp what is viewed (or until the clicker is released) but short enough to prevent any significant loss of "brightness" resulting from what may appear to the brain be a frustrated saccade. In the preferred embodiment, eye vibrations that may be 60 Hz do not result in a shift but only significant saccades. Thus, the loss of image is minimized or eliminated.

This temporary stabilization is provided as the software moves the image (the image that was current at the time of the stabilization request) responsive to the eye-tracked and software calculated changes in the ET measured azimuth and elevation of the vision system (which may be based upon the azimuth and elevation of the instant cyclopic vision axis. Thus, during a stabilization period, when the subject unconsciously moves the eyes during a freeze, the image moves with it and the brain perceives a stable image. This is most easily visualized and, indeed, often best suited for a worn display embodiment.

However, for video monitor (no worn display) applications, the ET camera may be screen mounted and the shifted image adjustment, responsive to eye motion as capturable by some many ET and security systems, is in the form of a stabilized video image. The temporary stabilization, again, can be on command from a subject user interface (which can be an ordinary remote control code or a one way square wave RF clicker). This, of course, requires either an interface to shift the image in the circuitry of the monitor itself responsive to ET-captured head shifts or a modular "black box" between the incoming video signal and the monitor input port that decodes and interprets the image, shifts it and then recreates an output video signal with the shift incorporated. While less intuitive than incorporating it into the monitor/TV circuitry (particularly if every set needed it), it is probably the most practical way to create a plug-and-play add on that is needed only by a subset of the TV market. Thus both a worn embodiment that stabilizes anything viewed and an external, potentially large-screen, display that stabilizes only the video image for the subject wearing no embodiment are disclosed.

Scene Stabilization:

Additionally or alternatively, the image from the scene camera embedded in the frames of a worn embodiment can be adjusted to, during punctuated software-sensed or subject-initiated (optionally a separate subject key or signal) scene stabilized periods, remove unwanted motion in the displayed view resulting caused by subject motion, tics or other instability. Thus, the display of the virtual scene removes vibrational image shifts using the same techniques used with many image-stabilization enabled cameras including the recognition of the amplitude and reciprocity of a change in recognized image borders and shifting the image to register with a previous frame. While this functionality is well understood in cameras and can function solely on edge-detected image shift, one of the optional equipment additions associated with enhancing this function is a glasses-frame accelerometer or other system known in the art to more accurately return to the operatively connected software of the current invention data indicative of head motion. From this measured change in head attitude, the change in instant cyclopic axis is geometrically rendered and the software then moves the center of the projected image responsive to the degrees of change in the actual default cyclopic axis due to head motion. Thus, during a software term-based recognition of a vision fixation or a subject user interface input initiating a stabilization period, head motions such as tics or bumping result in a shifting of the scene to offset the change allowing the subject a more persistent image to study and understand.

Very similar to the saccade stabilization above, there is also a stand-up (not worn) video monitor/TV display embodiment that captures the head motion from a screen (or nearby) mounted camera and responsively stabilizes the video image itself while allowing the video motion to proceed. As the head moves, the image on the screen moves. However, extremes of head motion will result in black portions of the screen as the image moves off the screen.

Note, only one camera is required for this application of ET since the azimuth and elevation of one eye can be geometrically associated with the subject's cyclopic azimuth. However, 2 cameras can provide better performance and add the additional value of true POI depth measurement which is applicable to other enhancements.

Contrast Enhancement:

Worn embodiments only: Software-driven contrast enhancement or edge detection or both (as is commonly performed in imaging applications) of the scene-captured image is effected as the recreated image is here provided to the eye via the worn display with increased contrast for better perception. Also, while the dark areas are made darker, the diffusion (that comes from even those darkened areas) is diminished and less light for bright areas is needed for contrast. This allows production of more rhodopsin responsive to a net reduction in illumination while still perceiving a bright image. Where shutters and ET are part of the assembly, light from areas that will fall on dead areas of the retina and light from peripheral areas may be blocked to reduce even low-grade cataract diffusion (often accompanying MD) and glare for better vision and more rhodopsin production.

Color Substitution and/or Morphing.

Subjects with macular degeneration gradually lose color perception as the photoreceptor cone cells, responsible for color vision and most dense in the disease-reduced macula, become unresponsive due to the degeneration.

When the cones are weakened, they lose sensitivity to the lower-intensity wavelengths and are unable to send proper signals. The spectral colors, blue, green, and red are the easiest to see. Thus, as the virtual scene (an enhanced image from the scene camera) is produced, non-spectral colors (which are a combination/blending of the spectral colors and detrimental to complex color contrast) are shifted towards the nearest spectral range. This shifting is accomplished by any means known to those skilled in the art including numerically locating the nearest spectral color to each pixel's scene camera pixel and displaying that spectral color, or a color nearer to it than the scene camera pixel color. In a non pixel-specific embodiment, an HOE, proximal to the subject, may be used to shift colors of the entire displayed image.

Image Concentration/Expansion (Instantly Targeted Zoom Imaging).

It is extremely hard for a person with macular degeneration to read. The text needs to be at a minimum threshold size to be perceived but headlines, fine print and pictures all require different magnification. Thus, in order to fill the visible area of the retina (perhaps a corner) with the most profitably framed/zoomed portion being studied at present, constant "zooming" is needed but unavailable in conventional optics.

The current invention, using a scene camera for the only image (normally blocking the natural, non-electronic, scene view), has a unique facility for changing the size and the apparent depth of elements. By modifying the displayed image to each eye for enlargement/reduction of size and modifying the binocular overlap of the displayed images to the two eyes and switching, for each pixel, to different EO component or components, a genuine memory zoom (as opposed to optical zoom) is provided by well understood means.

However, for MD sufferers such a general zoom can be more trouble than it is worth. As you zoom closer, the peripheral areas don't become easier to see but rather go away altogether as they disappear beyond the limits of the display (while the dark center becomes larger). The subject can provide the corrective factor by continually turning the head as the zoom progresses to keep the retreating image area of interest on the screen. However, this can require a lot of coordination and conscious effort.

An alternative embodiment includes ET hardware, like the cameras represented by 509 in FIG. 14D, and essentially typical ET software. In the configuration process, the azimuth and elevation of "sweet spots", typically one in each quadrant of the scene view is ascertained. This is because typical zooming moves the center of the enlarged area nearer to the center of the displayed image but this is the worst place for the MD sufferer. Thus, the ET either identifies the approximate area being looked at (which may be an adjusted value from experience and calibration of how much off-axis the subject has to look) or the subject identifies it with an HMI (e.g., a mouse). Then, through the HMI (perhaps an up/down rocker switch) the subject indicates a desire to enlarge or reduce while the button is pressed. The resulting zoom or reduction is centered not around the optical axis of the camera but around the adjusted area of the image associated with the subject's "sweet" spot (much as a typical system does around the image center). Because an enlarged, real-time video image from a head mounted camera tends to move more with head vibration, more significant enlargement will be tolerated when zoom is accompanied by the scene and/or eye stabilization options described above.

Retinal Flat Fielding:

As the plate feeds the display image (which, here, is the reproduced scene image) to the eye, each pixel's brightness can be amplified or attenuated to match the weakness or strength, respectively, of the area of the retina where that pixel will image. This can be adjusted by the subject with an HMI to a computer running software that displays a flat-fielded white screen at sequentially varying levels of luminance. The subject can move the HMI cursor to a dark area and hold down the mouse as the "dark" (only because the subject's vision is dark there) area is lightened with increased illumination. These changes in pixel location illumination enhancement is recorded and, in post-calibration display, the pixels feeding darker areas of the retina provide a proportionately higher intensity. Thus, the subject's view is largely flat-fielded (should he look at a lighting-balanced wall it will, except where there is no response at all, be flat fielded. This can also increase the vision area by making insensitive areas that were black before now visible.

However, since the subject is not always looking straight ahead, a superior optional embodiment adds ET. The ET software then calculates (by the azimuth and elevation of the eye with respect to the known spatial location of the plate) the point in the display matrix associated with the subject's physical vision axis for that eye. Then, rather than flat fielding the display image by centering the typical plus/minus adjustment pixel data matrix at the center of the display, it is centered at the point the ET calculation indicated as the point of fixation in the image. Thus, the flat fielding moves with the eye so that the display flat fielding is in sync with eye motion.

More brightness is then provided where needed without blinding or damaging healthier areas of the retina and the brain is provided a more flat fielded image as rods and cones are helped to appear to be more equally sensitive.

Cataracts:

Some discussion of applications related to cataracts have already been discussed. Although other embodiments described further below can be much more effective for improved display imaging and, ultimately, vision for those with cataracts than this first illustration, the following advantages of even this limited example are listed below.

The incoming beam from the BS is analogous to the central subset of the virtual cone of light from a virtual point. In the example above, the radius, r, of the BS' divergent beam near the eye lens (not counting the convergent refraction of the cornea which makes it even smaller) is:

$$r=\beta^*\tan(\alpha)$$

or 35*tan(0.79)=0.48 mm. The area illuminated is, then, 0.72 mm².

The comparative radius of an actual object at the virtual object distance would, in the same calculation, be $$r=\Delta^*\tan(\alpha)$$

or 300*tan(0.79)=4.14. The larger area illuminated by a full cone of light from the virtual POI is, then, 53.85 mm. The ratio of the two areas (which is independent of the earlier-ignored corneal refraction) is approximately 75:1.

Thus, this approach has the potential to represent a virtual scene with pixels whose light passes through roughly $\frac{1}{75}^{th}$ as much turbid media for an individual pixel. By also reducing off-axis light and excessive entry of ambient scene light, the eyes will allow an even lower intensity of these narrow beams as rhodopsin is produced responsive to the consistently controlled light entry.

Further, in embodiments where the through-the-plate natural scene is itself replaced by a displayed scene image captured by a tiny scene camera (or 2 cameras for capture of binocular separation indicators) in the frame of the IVV glasses, this control of light and image is substantially enhanced.

Thus:

A displayed image may be more easily viewed by persons with cataracts than an ordinary screen.

A displayed image can replace the scene view and make it more visible to the subject with cataracts. This is done by adding a scene camera and projecting its image to the eye in this form which is less vulnerable to turbid media. This may also involve restricting or eliminating (blocking) other incoming light from the scene.

Brightness control for maximum transmission through turbid media are especially efficient when the natural scene is replaced by a displayed scene image. Here the two images, the scene camera captured image and the display image are combined, by commonly practiced methods, and displayed together.

Depth perception, both binocular and lens-accommodation based, can be provided to the subject with cataracts.

Excessively turbid areas or areas with scarred or otherwise blocked elements may be mapped around. As explained above and illustrated in FIG. 4, a single virtual pixel can be represented by multiple BS'. Thus, software choice of BS based on the locations of worst turbidity in a subject's eye geometry can effect an optimal, least diffused, path.

Maximum corneal transmission with minimal scattering at the boundary layer is the potential benefit of the embodiment shown in FIG. 13 where all displayed light enters essentially normal to the cornea.

Minimum scattering as the image is reproduced (even the depth enabled embodiments e.g. FIG. 4). Since only narrow beams of essentially collimated light pass through only a minimal volume of turbid media for each pixel (rather than the typical full cone of light scattering through the full turbid area for each and every pixel), less scattering results.

Software-driven contrast enhancement as the recreated image is provided to the eye with increased contrast for better perception. Also, while the dark areas are made darker, the diffusion is diminished and less light for bright areas is needed for contrast. This allows production of more rhodopsin responsive to a net reduction in illumination while still perceiving a bright image.

Beam Splitter Helpers:

Post Laser Beam Emission Enhancement ("enhancers" for optional processing of the light anywhere between the laser and the eye): Photonic crystals or other EO RI-shift-enhancing layers may be inserted in the path of a beamsplitter(s) in a manner that does not add excessive noise or absorption. One such applicable embodiment places a photonic crystal between the laser and the first beamsplitter on the path to slow the light. This has been shown to increase the EO effect [Wallace, John, "NONLINEAR OPTICS: Slow light boosts electro-optic effect in lithium niobate". Laser Focus World. Http://www.laserfocusworld.com/display_article/294639/12/ARCHI/none/News/NONLINEAR-OPTICS:-Slow-light-boosts-electro-optic-effect-in-lithium-niobate].

Also, there are a number of coherency enhancing processes that have been shown effective at increasing the depth of focus (DOF) and these will be beneficial components of some embodiments where that improves the image perception by minimizing diffraction, enhancing DOF, depth of field, or simply enhancing the more collimated nature of a pixel's transmitted image. One example is Zeev et al's binary phase masks covered in Background above. While these patterns (often circles, lines, and mixtures of patterns) are sometimes calculated, they are also sometimes most effectively iteratively selected from computer programs that compare the net result of different combinations. Another example is U.S. Pat. No. 7,158,317's arrayed Fresnel elements serve a very similar function with a slightly different planar filter (also covered in Background above).

FIGS. 7A and B display a few of the logical positions for some of these. The shape of elements, 703 and 704, actually illustrate a phase mask while 705 looks like a generic filter, including any of the above. However, any of these illustrations of post-laser beam emission enhancement's may understood to represent obvious general placement locations for any of the conditioning elements. For example, 705 in FIG. 7C can be thought of as any of the beam enhancing filters, plates, media, etc. being placed just post laser emission (the laser beam, 103 has just emitted from the laser, not shown, from the left). This placement has the advantage of serving all the beamsplitters in a row with a single enhancer. This, however, when the shared path of thus-processed light is sufficiently long compared to the enhancer's effective range, can reduce the beneficial effect. In such cases, 704 in FIG. 7A illustrates an optionally preferable placement of an enhancer which is, in fact for most applications, the preferred embodiment.

This is particularly the case when the enhancer itself is LDE based. Recalling that any material or assembly that effectively changes RI on command is included in the current invention even in descriptions where only one of the many LDE's is specifically discussed, view 704 in FIG. 7 as an EO element whose default or standard RI is the same as the surrounding media and the RI of the beamsplitter.

Edge Diffusion:

103 in FIG. 1D illustrates that for many embodiments a single broad beam can cross many beamsplitters at different depths in the plate (3 depths shown here). 103 in FIG. 1D can also be thought of as 3 discrete beams. One difference in the two interpretations, both of which are appropriate but for different embodiments, is the potential for edge diffusion and significant diffraction in the case of one broad beam that crosses the edges of smaller bss within its path. One method for minimizing the effects of this is to create a gradient of charge across the beamsplitter so that the greatest charge is at the center of the beamsplitter and, by the time you get to the edges of the beamsplitter, the RI is equal to the media and thus less refraction or reflection occurs. Any means of creating this gradient is a qualified embodiment of the current invention as long as the center of the beamsplitter receives a significant charge and its effect is substantially lessened at the perimeter of the beamsplitter. A smooth, naturally field/range-dissipated graduated reduction in charge over distance from a centrally delivered charge is one method for minimizing issues at the edge of the beamsplitters as the edges become invisible to the passing light.

The AIDS epidemic has been greatly contained not because of a single "silver bullet" that heals it (no such silver bullet remedy has been discovered) but because scientists applied a "cocktail" of multiple components that each in its own way helped oppose the viral insult. Similarly, age related macular degeneration (AMD), genetic macular degeneration, general low vision, cataracts and other perception-limiting conditions can be the result of the combined effects of multiple factors. So, it is useful to apply a variety of ways to address as many as possible of those factors. Balanced illumination displays, already discussed, provide more light where the retina is less sensitive. This is applicable to many forms of low vision particularly where sensitivity variations exist. This can be thought of as flat fielding the response of the retina (not by selectively increasing the gain of the sensor where needed as with a CCD but by increasing effective brightness where needed). Retina optimizing displays, already discussed, provide light that the retina is more sensitive to (by substituting selective colors in place of colors whose wavelengths the retina is less sensitive to). But, though these can be used both independently and in combinations to greatly improve perception, there is much more we can do. Any "solution" that does not address all of the contributing perception-limiting factors is likely limited to being only a partial provider of what can actually be accomplished for the patient. Therefore, by adding, for example, distortion remapping and multiple devices for better effective dynamic range control to a number of these displays, further improvements in visual perception are possible due to those enhancements addressing more of the contributory causes of poor vision.

Distortion Remapping Display (DRD):

DRDs will use an eye-tracking assembly (ETA) to identify where an eye is looking and provide data for other functions. There are numerous technologies for ETAs with some of them already discussed, most of them available off the shelf and all of them applicable to the current invention. ETAs may include any mechanism for identifying positions of the eye and/or where an eye is looking. Some measure non-optical phenomena but most involve at least some form of camera and processor. Thus, whenever an embodiment contains a processor with a camera that images the eye, it is understood that the processor is capable of executing code to provide eye-tracking data based on the relative positions and alignments of sensor and eye. Similarly, whenever an assembly is described as having an ETA, that can include the capacity to both measure ambient light levels (by ETA-captured image brightness of the eye, bright glints on the surface of the eye and/or pupil diameter) and trigonometrically identify the location and brightness of points in the field of view (FOV) of an eye being tracked.

DRDs also use a smart display which is a display for displaying an image but under the control of a processor capable of modifying an image to be displayed. Both ETAs and smart displays, as already discussed and applied above, are now of further benefit in a DRD embodiment applicable to reducing viewer perceived distortion. The benefits of this distortion reducing display (DRD) seem more striking for worn DRDs due to their applicability with worn foreground cameras to improve viewer perception of the viewer's forward view (displayed as the image). However, benefits are also substantial for a viewer of a freestanding DRD. Distortion is a problem associated with a number of often concurrent pathologies from astigmatism to AMD (age-related macular degeneration). For those suffering with AMD, distortions can be due to drusen buildup around the retinal pigment epithelium, abnormal vascularization associated with wet and "soon to be wet" AMD as well as co-pathological corneal and lens curvature irregularities. There are also other conditions applicable to the DRD.

Figure 16A:
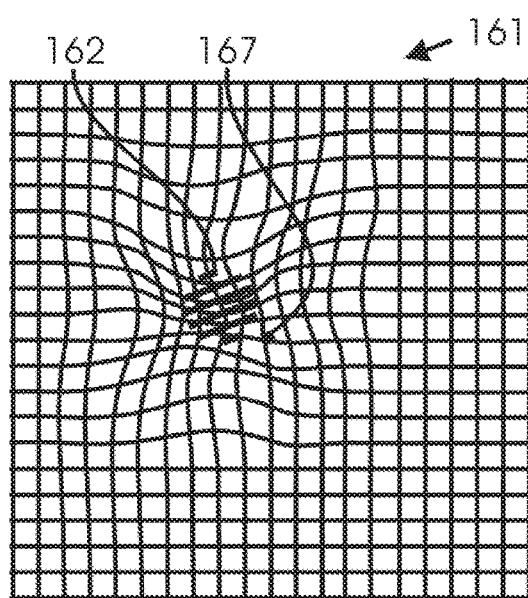
FIG. 16A illustrates how an ordinary grid can appear to someone with distorted vision.

Together these can combine to make a scrambled mess of the perceived image that it can be eminently difficult to unscramble into a clear image with a medical device. Distortion can be a particularly unfortunate symptom of and problem with AMD because it can compromise both the peripheral rod perception that the patient heavily relies so heavily upon and the perception from the outer macular area that needs to blend into it). The devastating impact of even minor distortion in and around the foveola on subconscious processing (e.g., facial recognition, edge detection, depth perception and reading) has not in the past been fully understood. Consider, for example, that the foveola can process only 3-4 characters at a time when we read and the subconscious pattern recognition that must process so quickly as we scan the page crumbles under such distortion. Also, when a person with AMD looks at the Amsler grid (which looks like a sheet of Cartesian graph paper with a dot in the middle for you to focus on) it can, in the perception of a viewer with an image-distorting condition, look something like what is illustrated in 161 of FIG. 16A. The dot in the middle, 167, is, in this example, surrounded by distortion (the wavy lines of the grid). FIG. 16 is exemplary only and not drawn to scale. Rather than the sharply orthogonal and straight lines of the Amsler grid, distortions can be seen not only as the wavy lines of 161 but the patterns they make in groups are graphically indicative of distortion topology. A warping or shape-changing of the retinal shape causes a sensor (e.g., a rod, a cone or even a light-sensitive ganglion) associated with one location in a viewer's field of view to receive light that should have arrived at the location of another sensor. Thus, even if the rest of the eye (e.g. cornea and lens) is emmetropic, shifting positions of retinal sensors (e.g., rods, cones and light sensitive ganglions) scrambles the image.

When displaying an image on a DRD its associated processor tracks in real time, via a linked ETA (typically requiring normal viewer calibration for best results) where on the displayed image on the display the eye is looking. (Here we discuss one eye but preferred embodiments apply the same elements to both eyes and this improves the processor identification of eye to display distance which is better using 2-eye vergence than using eye-separation and iris image diameter.) It also calculates, based on known eye-distortion data (the capture and determination of which is discussed at some length further below), the instant positional relationships between the eyes and the display; where on the display each pixel of that image should be displayed to be seen most normally (i.e. with less distortion) and displays it there (instead of where it would normally display on the screen according to the unmodified image). It does this for each image even as the eye almost continually moves requiring the remapping of many of the pixels before the image is displayed. As those in the industry know, a given image file can be displayed on a wide variety of display formats and resolutions by well-known steps even though a raw image file may have more or less pixels than the screen does. For convenience here we will discuss it with accommodations already made so that a given x,y (or row, column) pixel location in the image corresponds to a spatially analogous x,y location on the display.

Consider for example a distortion example (e.g., caused by an irregularly shaped retina due to drusen buildup at the retinal pigment epithelium, etc.) that is going to cause (based on the instant spatial relationships between eye(s) and display) light from a particular pixel at some exemplary point (Ximg, Yimg) in the image that is intended to arrive at one retinal location to arrive at another retinal location. In this retinal distortion example the intended retinal location suffered shift. One example of a table structure shown in FIG. 18 includes the names of the values used in this description.

For example, consider rows and columns of shapes (let's use little circles in this example) aligned in a grid formation (with these circular shapes placed at locations analogous to the intersections of the lines of an Amsler grid). When these are displayed on a display they might appear, to someone with retinal distortions, like FIG. 16B. The blinking location, 165, is being perceived to be above and very slightly to the right of where it should be located to be aligned with the perceivable rows and columns of the undistorted areas less central to FIG. 16B. For illustration, if the viewer suffering this distortion could move the location on the display of the blinking circle, 165, mostly downward until it appeared in line with its row and very slightly to the left until it appeared to be aligned with its column, that one shape (that circle) would appear closer to where it should to the viewer. Also, the amount of shift in the x (left-right) and y (up-down) directions (in this example spatial shifts are being counted in pixels) required to make 165 appear aligned with the overall grid represent the image shift correction values referred herein as Xshift and Yshift respectively. The location (Ximg+Xshift, Yimg+Yshift) is the shifted display location (SDL) which is the value stored in the FIG. 18 values SDLx for the SDL x value and SDLy for the SDL y value. In this example, had the circle identified been displayed at the SDL on the display instead of at (Ximg, Yimg) it would appear more properly aligned. In the example table structure of FIG. 18 (which is explained in detail further below), SDLx=Ximg+Xshift and SLDy=Yimg+Yshift.

The extended explanation of a number of approaches for attaining the known eye-distortion data knowledge that enables the use of Xshift and Yshift values to display an image that appears to a viewer to be less distorted is provided at length elsewhere herein. The above summarizes a display embodiment wherein the location of an image pixel's display on a display medium is shifted based upon know distortion values. The DRD processor (based on that known eye-distortion data and the instant positional relationships between the eyes and the display) will, in preparation of displaying an image, associate the image characteristics (e.g., color, intensity attributes, etc.) of pixels needing to be positionally shifted for display (i.e. having shift values Xshift and/or Yshift) and display those attributes at the SDLx and SDLy locations. For each pixel needing to be moved to an SDL there is something already there in the image. Although implementers will streamline down to more elegant databases than this example, in one example embodiment every pixel in the display has a record in the table of FIG. 18A. In this example embodiment there is one table for one person and the values identify FOV-segment-shifting needs of that person i.e. which portions of that viewer's FOV need to be moved where. Though the values the table contains are shift-able by common means, the table is most easily thought of as being representative of the pixel array of a person looking essentially at the center pixel of a display at a chosen distance (realizing that there isn't a center pixel in resolution maps with even numbers of pixels in rows and/or columns; thus "essentially"). Thus, the pixel attributes of any location in the image equivalent to (Ximg, Yimg) should be displayed at the (SDLx, SDLy) location in the LUT of FIG. 18 for the record with that (Ximg,Yimg) value. This can be done by any number of fully applicable means but one is reading in the pixel attributes of the instant image to be displayed, finding for each pixel its locationally equivalent (e.g., pulled up by LUT Ximg and Yimg values that are equal to that pixel's row and column values) record in the LUT, placing it's attributes, into a working image file, at the location of the (SDLx, SDLy) value for that thus-accessed record and, when finished with all pixels (or at least those having non-zero SDLx and SDLy values in a more streamlined LUT than this example) displaying the working image that was thus assembled in memory. Of course, not all embodiments will have such individual pixel-level and may group pixels into groups of any size and process them in those groups.

When, according to the ETA, the viewer is not looking at the center of the display, the LUT is still used in the same way except that the x and y distance (in pixels as described in this portion of the discussion) between the instant POI and the center of the display is used to call up an image pixel's equivalent location by an Ximg and Yimg value that is adjusted based on x and y respectively and display its attributes at an SDLx and SDLy adjusted based on x and y. (Much more detail is provided elsewhere herein.) However, if a viewer is looking at, for example, the top left hand corner of the display it is likely that there is no LUT value for the locations in the bottom right hand corner of the display and these locations (which are typically too peripheral to be represented in this example of a FOV pixel-shifting map in the form of FIG. 18's table) will typically just be displayed as they are in the original unprocessed image.

A purely exemplary database structure for an exemplary table-based embodiment might look like FIG. 18. This is one exemplary embodiment but, as those skilled in the field are aware, lookup tables (LUTs) can be replaced by algorithms, equations and/or programmatic logic and these are all acceptable and effective alternative embodiments of the current invention. In this example, the structure defines rows by "x" position and columns by "y" position as is common practice. One convention, the one used herein, starts with the first pixel at the top left of the display (from the viewer's perspective) as (1,1), the pixel to the right of it as (1,2) and the pixel below the top left as (2,1), etc. Although some implementers will create such data records only for pixels that need to be shifted (due to the data efficiency) we will herein discuss a record for each pixel. This allows us to easily envision a data structure where the location of each pixel in the original image is identified as (Ximg,Yimg) and that it will be displayed at (SDLx,SDLy) which is different (shifted) from where it normally appears in the image by Xshift laterally and Yshift vertically (these shift variables are normally signed to identify direction of shift).

Since all eyes are different, in the preferred embodiment there is a table (or separable records in a single table) for each eye (or separable records for each eye in a single table). Capturing pixel by pixel original location data (Ximg, Yimg), move-to location (SDLx, SDLy) and positional shift to get there (Xshift, Yshift) is easily explained (and, because of its didactic nature, is used for explaining in some detail herein). Those skilled in the art do not need instruction on how to deal with eye-to-display distance shifts that may occur between capture of this data and later display and require calculation adjustments. However, while this is easily accomplished without all the fields provided in FIG. 18 (particularly the last 6 fields that are so trigonometry friendly), a brief explanation using these values makes a more easily communicated conceptual structure that doesn't require the reader to already know the calculation shortcuts. Of course, with worn displays, dealing with different distances between the eye and the display isn't necessarily a factor beyond keeping the worn assembly in position.

The LUT of FIG. 18 can be thought of as the data or information underlying a spatial map of eye issues (or data indicative of the nature of such a map). Preferably there are separate values for each eye. This provides a set of information that is at least indicative of locations of portions of the eye's FOV (regardless of where it is currently looking) that need to be shifted so that it will be seen elsewhere in that eye's FOV for reduced distortion. It also identifies where that elsewhere is for each of those portions in terms at least convertible to associated pixel locations on the display. Effected pixel by pixel and/or effectively in groups of pixels (optionally using the trig-friendly LUT values discussed next), the processor, according to ETA data and that set of information, identifies which pixels on the display currently exist at a point in the viewer's instant FOV that, according to the LUT need to be displayed at an alternative portion of the display associated with an identified alternative location in that instant FOV. The processor, then displays the image with those shifts already included. The distortions that resulted in the capture of the information are thus offset in the displayed image.

Experts will see in FIG. 18 too much data (more than they need to do the job, perhaps almost twice as much as needed) and using only some of them should be adequate to enable any implementers. However, some will pick and choose which portions of this superset of needed data they will use and some embodiments will actually include them all, though it is certainly not necessary. One example is now discussed using the more trigonometry-friendly values (the last 6 values in the table of FIG. 18). Note: while what happens to be in the eye's FOV changes all the time, these trigonometry-friendly fields are applicable to identifying at any time what portions of the display (e.g., what pixels are currently in an area centered at xAzimuth and yElevation and subtending the angles SubFOVminutesX and SubFOVminutesY in the eye's FOV) currently need to be displayed where in the eye's FOV (i.e. what pixels should receive the shifted pixel data e.g., those in an area centered at a location defined by SDLxAzimuth and SDLyElevation which is subtending the angles SubFOVminutesX and SubFOVminutesY in the eye's FOV).

For example, consider the hypothetical condition of an eye with a single flaw that requires that whatever is seen by the eye within an area centered at xAzimuth and yElevation (in the preferred embodiment these are measured from the center of that eye's FOV) with that area subtending angles SubFOVminutesX and SubFOVminutesY (when what is represented is the solid angle of a steradian these two values are equal), needs to be displayed instead at an identified alternative portion of the eye's FOV. That identified alternative portion of the eye's FOV is defined as being centered at SDLxAzimuth and SDLyElevation (which, in the preferred embodiment are measured from the center of the eye's FOV). The angular scope of that portion of the eye's FOV that will receive the relocated pixels is the same (using SubFOVminutesX and SubFOVminutesY). These angularly defined portions of the eye's FOV can be described as solid angle (or a similar measure as used herein) locations in the FOV. For a classical solid angle measured in steradians, the values for SubFOVminutesx and SubFOVminutesY in the Table of FIG. 18 would be equal (since the degrees in one direction and in the other are the same for steradians). Thus, in this optional calculation, many pixels at a time can be grouped for shifting when they all fall in the same portion of the eye's FOV that is identified by, for example, LUT information, for relocation to a LUT-indicated location. However, the exemplary LUT contains two values (instead of 1) for optionally identifying the angular scope of an FOV (e.g., SubFOVminutesX and SubFOVminutesY) to optionally allow the easy identification of FOV portions subtended by areas of the display that are not square or circular (don't have the same azimuth and elevation dimensions) can be used.

The processor has access to the distances and other orientation details between the eye and display (which can also be measured by the ETA in real time, may be available as known stored measurements, obtained by other real-time distance calculations, etc. although it doesn't change anyway in well-attached worn displays). In one calculation example, the processor, after identifying from ETA data the location on the screen that is at an xAzimuth and yElevation from the center of the eye's FOV, it then identifies the area around that screen location (at least when there is more than one pixel to be identified and shifted) as the screen area currently subtending the angles SubFOVminutesX and SubFOVminutesY around that screen location. It then takes the image attributes from the image pixel data for that now-defined area and places them into the part of the image data for locations in the area of the image that when displayed will subtend the angles SubFOVminutesX and SubFOVminutesY around a point on the display that is SDLxAzimuth minutes and SDLyElevation minutes from the center of the eye's FOV. The image data (or a second version of it for storing the thus-modified version of it) is displayed on the display so that the distortion is offset by the locational offset.

Of course, only the non-trigonometric values of the LUT can be used (using, as those in the field understand, the current eye-to-display distance compared to the LUT value for the distance that existed at capture time (the field "distance"). Also, even using the trigonometric fields, a single pixel could be moved. There, the area within the pixel's perimeter subtends the angles SubFOVminutesX and SubFOVminutesY around the center of the pixel's location at xAzimuth and yElevation. This solid angle comes in pretty handy when the eye-to-display distance at display time is significantly different from the eye-to-display distance at database capture time.

However, in that unrealistic and simplified example, unlike a real spatial distortion, there is no distortion-shifted pixel to replace the only 1 moved pixel. If this 1 pixel moved example were for some reason actually used, the hole the moved pixel left behind would be replaced by interlacing, blending with surrounding colors, etc. However, normal distortion patterns move both nodes and the pixels between them in groups that, while they involve compressions and expansions, as described above, leave no holes behind. In practice, many such portions of the image will be shifted to many locations (as is described herein regarding the capture of the LUT data) and, distortions will normatively require that some areas of the displayed image are compressed (e.g., when a pixel above it is to be "shifted down") and others expanded (e.g., when a pixel above it is "shifted up"). Those familiar with such work will see that these trig-friendly data can be useful as 1) an alternative calculation, 2) calculations that refer to a plurality of pixels represented in those solid angles in a single record for faster processing and less data storage and 3) for trigonometric ease in dealing with changes in the distance between eye and display (though that's not normally an issue with worn embodiments).

Whichever of the database values are used (or when using any alternative calculations to capture effectively the same data), we are in essence storing information in this LUT (which may be in the form of any memory data storage or it may be contained as part of programmatic or algorithmic logic or a combination of the two), that directly or indirectly identify portions of the eye's FOV (regardless of which way the eye is currently oriented) that need to be shifted and where in the eye's FOV it needs to be shifted to with all of these being in terms convertible to pixel locations on the display.

Of course, acquiring that "known eye-distortion data" is no simple matter since it is both the sum of a number of mechanical flaws/pathologies and a subjective interpretation skewed by all the other bad perception data responsive to distortion of the raw image. Though other devices and/or methods for acquiring this data are applicable to a functional embodiment, two in particular will be discussed to better communicate the nature of the data and how it relates to the corrective response. Those two are 1) Viewer Perception-based mapping and 2) Imaging-Based mapping.

1. Viewer Perception-Based Mapping: As an alternative to the image-based mapping (explained further below) or as a clean-up/image-sharpening process to follow it, viewer perception-based mapping deals with the sum of all combined distortions and errors and attempts to correct them all based on the viewer's net perception itself. Thus, rather than dealing with one pathology and then trying to adjust for the detrimental effects of co-pathological elements also preventing emmetropy, dealing with the sum of all causes can best deal with their interactive contributions. Viewer perception-based mapping also is best explained first since it communicates an understanding of the process in easily envisioned terms. Here we capture viewer response to where displayed elements appear with respect to a perceivable visible framework. Although there are many applicable and scalable formats (including some that, unlike the familiar Amsler grid, are not Cartesian but polar) one example approach uses the simple Cartesian "graph paper" layout of the Amsler grid which has been used as an early diagnosis tool for many years.

Figure 16B:
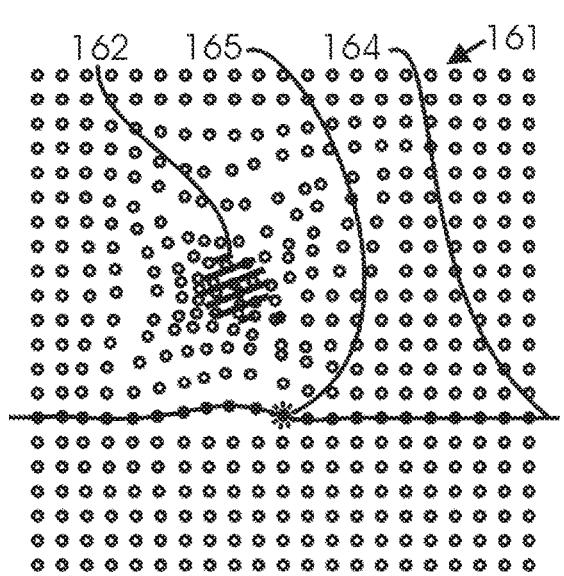
FIG. 16B is an illustration of how one display screen test image can appear to someone with distorted vision. A straight line, 164 has been drawn on the display screen but appears curved according to the distortion illustrated. A location currently being prompted to a viewer, 165, is blinking.

In one very simple embodiment the grid is displayed on the screen in front of the viewer with an operatively connected computer controlling the display of a testing screen image. For one example of such an image let's illustrate with rows and columns of shapes (little circles in this example which we will call "nodes" having a central point associated with a pixel location) aligned in a grid formation (with these shapes placed at locations analogous to the intersections of the lines of an Amsler grid). FIG. 16B is the image of what this might look like for a viewer with distorted vision. In one embodiment provided purely as an example, there are 24 pixels between nodes both in the x and y dimensions thus there is a node every 25 pixels in each direction as approximately illustrated.

The viewer is provided a user interface. This will vary by implementer but can include mice, trackballs, touchpads, joysticks, digitizing pads, voice commands, recognized gestures, muscle sensing, arrow keys, brain machine interfaces (BMI) and any other means of communicating viewer preferences with the computer. The viewer is prompted to fixate on the point 167 and communicate to the computer (via the viewer interface) which changes are needed. There are a number of applicable orders and steps to accomplish this task with this assembly but one used in this particular illustrative discussion incorporates sequences of adapting nodes of a row at a time and a column at a time (but it could instead be in any sequence or completely random). For example, starting with the bottom right corner of the bottom row, a selected node (circle) is caused by the computer to blink and preferably to have a bright color. Any displayed circle to the left or right of the blinking circle may also have a distinguishing and bright (though different from the blinking circle) color to accentuate perception of the point of alignment currently under consideration. Also, a colored curve, like 164 can also be optionally displayed on the screen preferably through and behind the middle of the dots of the rows to make the straightness of the rows and columns more easily perceptible to the viewer.

If the blinking circle appears to the viewer to be aligned with the row (which it does in the bottom 6 rows of the illustration in FIG. 16B) the viewer can signal to pass on to the next circle on the left (or wait for the computer to progress to the next one on the left after a period of inactivity). When arriving at the end of the row it starts on the right side of the next row up. This process is illustrated in FIG. 16A where the bottom 6 rows have been processed (with no changes in this example so far due to the centricity of the illustrated distortion which is common with AMD). The first 10 rightmost nodes of the $7^{th}$ row from the bottom have been similarly processed (and left alone due to their essential alignment) and the node 165 whose circle is illustrated to be blinking is ready for viewer response.

The viewer, via whichever interface method or device, indicates that the currently active (blinking) node, 165, should be displayed lower (as illustrated by 165 appearing too high). To keep this illustration short we'll describe only one interface option so the user clicks the down arrow and the blinking node moves down a notch (which is some number of pixels which can be one pixel at a time or, particularly for a very high resolution monitor, some number of pixels). However, for brevity we'll use an example where one arrow click implies a movement magnitude of one pixel. So, when the viewer hit the down arrow the signed value of Yshift (which starts out as zero at the beginning of the session) is adjusted by −1 (so after that first downward click the value of Yshift is −1. (Had it been an up-arrow click, of course, it would be +1.) Similarly, the adjusted location for display of the current pixel (SDLy) becomes equal to Yimg (the original y value for the location in the image of the pixel) plus the new signed value for Yshift (after this $1^{st}$ down arrow click SDLy=Yimg−1). And, of course, the computer adjusts the display of the circle, 165, lower by one notch (again, in this simple example that's a pixel). This continues until the vertical positioning of 165 looks right (aligned with the row) to the viewer. The viewer then either signals to move to the next node (e.g., with a spacebar) or waits for the current node to time out and shift to the next one to the left. If, for example, it requires 5 down arrow clicks for 165 to appear aligned with its row, then Yshift=−5 and SDLy=Yimg−5

This process can continue for the rest of the rows above followed by processing each column (e.g., starting with the leftmost column of circles and working right). With the process for correction or rows now understood, the process for columns becomes obvious in that it is analogous to the process for rows albeit rotated 90 degrees. For example, when adjusting left-right positioning one column at a time the $1^{st}$ node to blink and invite viewer adjustment can be the top left node followed by the one below it, etc. and lateral adjustments (left and right) are made with the left and right arrow keys respectively resulting in increasing or decreasing (responsive to right or left clicks respectively) the values of Xshift and SDLx.

Thus all the rows and columns of nodes and all the pixels in between them can be processed to populate the distortion adjustment database to enable the display of a subsequent image (e.g., watching TV) in a form that is better perceivable by displaying the image pixels at their LUT-adjusted (SDLx, SDLy) locations. One applicable approach to capturing the needed database values for the pixels between the nodes is simply repeating the above process multiple times and shifting the positions of the node array or displayed portions thereof (preferably in both x and y) each time until each pixel needing a shift has been shifted. Normally, when starting with a new viewer, the values for SDLx and SDLy are equal to Ximg and Yimg respectively and the values for Xshift and Yshift are 0 to start with a clean slate and have a usable value for SDLx and SDLy for displaying a corrected image even if that record isn't modified by the viewer. However, that embodiment is tedious.

It will be obvious to those skilled in the area that, for example, a downward shift in one node suggests at least a downward shift in those below it . . . especially those pixels nearest the node. It also suggests a likely downward shift in those above it but at least in this particular example (where we're going from bottom row to top row sequentially) that can be left to being done when processing the next row up. Some implementers will prefer shifting all of the pixels below the node pixel in the same amount for the simplicity. However, in general it is best to affect the pixels closest to the "moved" node the most and a typical scaling algorithm to effect that will be used. Recall that "moving" a pixel down (as used here) really means giving its database record an SDLy value indicative of a lower display pixel row. Also we note that, when "moving" these intermediate (between nodes) SDLs down towards the node below there may be a crowding effect below. One of the simplest ways to deal with this is to, as described above, just capture the SDLx and SDLy values for each pixel (responsive to the viewer, imaging options described below and/or programmatic blending, smoothing and macro execution like the curve-based multi-pixel adjustments described below). We capture them knowing full well that, when finished, there may be two or more records for the same eye having the same SDLx and SDLy. When this is the case, the attributes of all the image pixels associated with that singular location (SDLx, SDLy) can be combined or adjusted by the processor before displaying the resulting adjusted attributes according to typical or adapted rules for combining image pixels for compression. Of course, the above example specifically describes user-directed shifts of a node in the downward direction but analogous directed and/or algorithmic shifts upward, to the left and to the right will also be analogously understood. Managing "expansions" when, for example, the above discussed node instead needs to be moved upwards (thus expanding the area below) may result in one pixel having more than one record with each having the same (Ximg, Yimg) but different (SDLx, SDLy)s. One of many applicable and alternative responses is to display the pixel image associated with that (Ximg, Yimg) at each of the (SDLx, SDLy) locations thus filling the expanded area.

There are also other equally applicable alternative or additive procedural embodiments that add ease and enhance viewer perception for more effective corrective display. For example, though doing all the rows and then all the columns is intuitive, in practice things can get perceptually dicey as you get a little closer to the center of the scatoma (illustrated by 162 in FIG. 16B) and nodes are close together. For this reason, it's better for the system to start at one edge of the test pattern (e.g., the bottom row) and, when positional adjustments become substantial while processing the next higher rows (a measure of "traffic"), begin at another edge (e.g., from the top row working down where rows appear more linear) until adjustments become substantial. Similarly. column adjustments can begin starting from the left until large adjustments are required and then from the right and leftward until large adjustments are required. In general, this can have the effect of pulling the nodes away from the center of the scatoma and into straight rows in the perception of the viewer. With that accomplished, the yet unadjusted nodes nearer scatoma central can be dealt with in the same row and column manner via the example user interface just described.

However it would be very tedious for the user to thus adjust each pixel individually (although an individual pixel-level adjustment involving even a single pixel node is one applicable embodiment). In fact, in the instant example, each node's required adjustment is intended to be used to adjust the locational variables of a plurality of pixels existing between the center of each node (the above example adjustments were for the pixel at the center of the currently blinking node) and the pixels at the center of its nearest neighbor nodes. Consider the example embodiment with 25 pixels between the central pixel of each node and its nearest neighbors (e.g., any neighboring node to the left, right, above and below it). Though implementers will vary environments significantly, this can be used with a test pattern display about 50 cm from the viewer's eyes on a typical display (e.g., 1920×1080).

There will be as many implementer variations in the way the pixels between moved nodes will be shifted responsive to viewer input as there are implementer bellybuttons. For example, when the viewer moves a node (the instant node) down 5 pixels (so that its location of display is lowered) until it looks aligned with its row, the pixels between it and the node below it can be compressed (their Yshift and SDLy values are adjusted accordingly) using well known calculations for such compressions (including but not limited to shifting each intermediate pixel the same amount or a different-for-each-intermediate-pixel scaled or curve/formula following amount and then processing the inevitable overlaps with typical or other pixel compression logic). Similarly, as a pre-response processor guess option, when the instant node is thus moved downward (continuing the same example), the node above it and/or below it can optionally be responsively moved upward or downward in an amount equal to or in an amount based on the magnitude and direction of the instant node's movement followed by similar spacing adjustments between that node above the instant node and the instant node. Similar column adaptations analogous to these (though rotated 90 degrees in direction) are easily understood.

However, other implementers will make the task even simpler for the viewer with many versions of algorithmic support. For example, again, using arrow keys as representative of any user input methods and devices, consider the viewer looking at FIG. 16B. Instead of necessarily waiting for each node in the long series to blink (requesting viewer shift input) the viewer opts for advanced user mode and uses the arrow keys to move (1 node shift per arrow key click) to the node just to the right of the node shown blinking (i.e. to the right of node 165, whereupon the computer software causes the node to the right of 165 to begin to blink). This node represents the right end of a visible distortion curve in that row. Pressing the space bar, the viewer identifies this (right) end of that distortion curve. Three more left-arrow clicks moves the blinking to the visible peak of the curve and the viewer again touches the spacebar. 4 more left-arrow clicks and the node representing the left end of the curve of distortion is caused by the software to blink and the viewer again presses the spacebar. With the ends and peak of the distortion segment thus verified, the user is prompted to hit the up or down arrow and the viewer presses the down arrow and at least the peak node (2 left of 165) moves downward until the viewer stops hitting down arrows. This (the number of down arrows to get the node looking in line with the row) defines the max point of the curve and, of course, the two end points thus identified define the ends of a curve that can be used by the software to create an equation for that curve. One of the most commonly used for this type of curve-fitting is a fairly high order polynomial (in the form of $y=a_n X^n + a_{n-1} X^{n-1} + \ldots + a_1 x + a_0$ where n is the order and a 0, . . . , a n {\displaystyle a_{0},\1 dots,a_{n}} $a_o$, . . . , $a_n$ are constants).

This is only one example but, using this as an example, it will be understood by those skilled in the field how the number of downward clicks indicated by the viewer for the peak node is, using the width gained from the node locations of the end points, convertible to an equation which applied in the inverse returns an amount that each node in the defined width as well as the pixels in between the center points of these nodes can be lowered to more nearly approach locations for those nodes that will be perceived as in line with the row. For a redundant explanation that also details the treatment of intermediate pixels, consider the leftmost node of the thus-identified curve as the origin of a Cartesian framework. Presuming our example of a node for every 25 pixels, the next node to the right's x value is 25, the one to its right is 50 and so on. To calculate for each pixel (including those between these curve-defining nodes) how much it should be shifted downward (or leftward or rightward in the obviously similar calculation for column adjustments that follows the logic, though rotated, of these row examples) substitute that pixel's x value into the equation, evaluate the equation and lower (in the inverse direction of this distortion curve fragment) that pixel (and adjust its Yshift and AJDy values) by that calculated amount. (Similar x-direction adjustments are analogous though rotated 90 degrees.)

Of course, as the viewer is suggesting positional changes to make their perception better, the computer will normally be moving the node responsive to the inputs (e.g., moving the node downward with each down arrow click and similarly to other directions) so the viewer knows where to stop. This opens up a number of options in viewer-leveraged inputs like the curve-based adjustments above. E.g., after defining the width of the curve as above and after the first down arrow click in the example above (at the point where the user is lowering the peak) the computer processor running the software doesn't know the peak amplitude value (it won't know that until the viewer indicates that he or she is finished adjusting it). However, the entire width of the curve can, and in the preferred embodiment will, be adjusted with each click. Most implementers will simply calculate a curve after each keystroke and adjust all the nodes in that user defined range before accepting the next keystroke simply by presuming for the moment that that single keystroke defines the peak and continuing (e.g., after the $2^{nd}$ keystroke) that process assuming that this last keystroke (the $2$nd) defines the max, etc., etc. For those implementers choosing to also adjust the nearest node in the next row (or, analogously, column), these changes can also be shown in real time.

Though there are perceptual advantages to showing a full array of nodes (better sensing of overall distortion and where things go awry), displaying and adjusting individual rows and/or columns as well as segments of rows and/or columns, especially when flashed for short durations, can have the advantage of gaining a viewer response with less masking of the problem by cognitive correction. Thus, while there are embodiments that do only one or two of these, in the preferred embodiment several different options are usable to refine the viewer's perception and this can also be confirmed and calibrated by perception performance tests measuring, for example, how well the viewer, with the current adjustments, scores on recognition and/or reading scoring. If the viewer is not scoring well, continued refinement runs may be accomplished. Thus, it is preferred to have several of these procedural options available to use till better general results are achieved.

If the dots overlap, a larger scale of Cartesian separation is indicated (dots further apart). If, for example in embodiments and user procedures when moving the dots by starting at the bottom row and doing row by row upwards, the dots being moved begin to crowd the row above, the row(s) above and even the row(s) below it can be undisplayed (hidden) or colored in gray or another color to allow the viewer to clearly distinguish between rows (and, in particular, which row we're currently interested in). In the preferred embodiment, the row being adjusted has a different color and/or brightness and/or blinking nature to distinguish it from other dots and the instant dot being adjusted is blinking for a clearer sense of mission and how straight the line is despite all the other rows being displayed. Of course, the same logic can be applied to top-to-bottom column-by-column adjustment. For each row being calculated (here from bottom up) the far right dot blinks until the viewer either adjusts it (here up and down although both could be done). Also, while in the embodiment described here we start at the bottom row and work all the way upward to the top row (before adjusting the columns), it may be preferred by some to, for example start from the bottom until running into larger needed changes as we near the scatoma and then work from the top row down to the row where we left off. This has been shown to be more easily visualized by the user. The use of an undulating stimulus (slight shifting of the stimulus at quick intervals (e.g. $\frac{1}{30}$ sec.) seems to give better peripheral perception. The brain can probably learn to do even better with practice. For example, when the viewer is entering corrections to a row, the stimulus node may undulate laterally in the row and, when entering corrections to a column, the stimulus node may undulate vertically.

There are also a number of ways to increase the quality of adjustment. For example, after a row or column is completed as above or even during the process of capturing a row or column's adjustments, the preferred embodiment will smooth the curve mathematically using well known methods which results in changes to the recorded change values (e.g., Ximg,Yimg,SDLx and SDLy) to fit the smoother curve. If the viewer doesn't like the results of that smoother curve, as redisplayed by the processor, then the viewer can revert to the actual changes instead.

It is also a helpful option to "flash" rows and/or columns, or simply segments thereof (even just a single dot), individually. The pulsed light (occurring for a short enough period for the viewer to recognize the position of a point in a reference frame before the eye saccades to center on the pulsed/blinking point) is an effective means for helping the viewer to accurately ascertain where in the eye's FOV the stimulus occurs. As in the above examples, the, viewer is normally prompted to fixate on a certain point (like 167). Some embodiments will locate a blinking dot where the viewer should focus and/or add screen motion towards or arrows indicating where it is or even concentric shapes surrounding the desired POI. With that accomplished the stimulus (e.g., a lone, i.e. single) row or column or segment thereof) is flashed. The current node to be moved or left alone by the viewer can be flashing, larger, a different color or all of the above as well as the next and prior node having easily distinguishing markings to aid in quick perception of whether and how much the instant node should be moved.

While these are part of applicable embodiments of this device and process, a more advanced embodiment includes an eye-tracking assembly (ETA) wherein the controlling software identifies the location of the current gaze from ETA data and then locates the stimulus with respect to that current position. For example, in the capture of distortion data as illustrated in FIG. 16B, the displayed stimulus (e.g., a single row or row segment of FIG. 16B with the blinking dot or all of the nodes of FIG. 16B with one node and optionally it's immediate 2 neighbors in the same row or column being tested blinking and/or otherwise distinguished) will be lit (displayed) in its proper position only when, and optionally only while, the instant POI is at least reasonably close to the desired point of focal vergence 167. In the example of FIG. 16B, the viewer is still normally prompted to look at 167 but the stimuli are only presented when the POI is adequately proximal to 167 as verified by the ETA. Full row, column or segmental stimuli are flashed quickly enough to prevent the mind from having time to adapt the perception and to prevent the eye from moving away from the desired POI (e.g., 167) before the perception is apprehended.

In such an alternative embodiment, there doesn't absolutely need to be a focal dot, 167. When the instant POI happens to be there, the stimulus is lit (displayed).

In an alternative embodiment, the processor can light a stimulus and record data responsive to a viewer response regardless of where the viewer is looking. For the distortion data capture steps described above, we typically presume, like caregivers administering the Amsler grid test, that the viewer is being good and focusing on the "spot" (e.g., 167 in FIG. 16B). However, that isn't always the case and the tests are both slower and less accurate as we wait for the viewer to stabilize at what we only hope is the right point. When the ETA is in use and reporting POI we can apply a stimulus (e.g., a single row with a blinking or color-highlighted node) and simply offset the data we capture based on how far from the "spot" the POI is in each direction as is commonly done in such perspective shift calculations. This process should need no description to those experienced in the field but perhaps one location-shift calculation that is easiest to understand is one that is relative to a POI at the center of the screen like 167 which we'll identify as being at the Center of the screen at a location we'll call (Cx, Cy) where Cx is the number of pixels from the left to 167 and Cy is the number of pixels from the top to 167. This central-centric approach (thinking of distances from the middle and converting to row/column) makes sense since, for example, it is easy to visualize a stimulus that appears 250 pixels to the right of the viewer's instant POI, when that POI is at 167, represents a stimulus location 250 pixels to the right of the center of the viewers FOV (some embodiments will calculate this first in degrees of vision from center but the objective and result are the same when identifying the spatial location in pixels from 167). If the viewer never looked elsewhere, we could just update the record with Ximg=Cx+250 and Yimg=Cy to record the viewer's requested change for that pixel in the fields SDLx and SDLy. However, though a chinrest and a thus-stabilized system is an applicable embodiment, use of the ETA allows motion and can improve both speed and accuracy.

For example, when the viewer's POI is shifted to 50 pixels to the right of (Cx,Cy) (instead of right on it as in the previous example), the same stimulus, at (Cx+250,Cy), represents a location only 250−50=200 pixels to the right of the center of the viewer's FOV. Recording any viewer changes to stimulus location (e.g., SDLx and SDLy) to the record whose Ximg=Cx200 and Yimg=Cy thus captures, again using pixels as one applicable spatial measure, the relationship between this portion of the viewer's FOV (about 200 pixels to the right of 167 and on the same line, e.g., Yimg=Cy). Those skilled in the art already know how to apply this process for other POIs and stimulus locations following the same logic. Thus, regardless of the instant POI, we can then display a distortion-corrected image by relocating the attributes of a pixel on the display using this data in the LUT based on ETA data. This is a handy, though not required form of notation, then, for identifying a value representative of a stimulus' distance from the center of the instant FOV (and distortion-removing changes for that stimulus location) regardless of the instant POI (even in terms of pixels as a spatial measure of distance as optionally illustrated here).

Although it is not a required feature, some implementers will make small adjustments to accommodate the fact that pixels far from the central vision axis appear slightly smaller. These adjustments, a well known process, can be fully algorithmic or be based on modifications to the LUT process above. Alternatively, a simple to explain zone approximation alternative for these small factors can also be used wherein a central zone surrounds the central point on the display (Cx,Cy) having a chosen radius (e.g., the pixel equivalent of 10 degrees for a viewer 50 cm from a screen) and 9 equally sized rectangular screen segments: a top left, top middle and top right box (boxes 1,2 and 3 respectively), a middle row of boxes 4,5 and 6 (with 5 typically centered at (Cx,Cy) and at least considered to be within the central zone, even when it exceeds it) and a bottom row of boxes 7 (bottom left), 8 and 9 (bottom right). In one such approximation adaptation when the POI is anywhere in the central zone (in the circle), no adaptation beyond the above description is performed. When the POI is in box 2 or 8 and outside the central zone pixels are treated as very slightly smaller in the y dimension. When the POI is in box 4 or 6 and outside the central zone pixels are treated as very slightly smaller in the x dimension. When the POI is in boxes 1,3,7 or 9 and outside the central circle, pixel calculations reflect slightly smaller effective pixels in both the x and y directions.

In a display embodiment to display a DRD image each pixel of an image has a record (can have more than one as explained elsewhere) based on its native image location (Ximg,Yimg) and we display each pixel of each image at a location identified by (SDLx,SDLy) in those records. This is, however, not only a process for viewing TV or other images with reduced distortion. It is also the preferred way to continually update the capture of ongoing distortion data to the LUT. I.e., the first time the computer displays the array of nodes, the values for Ximg and SDLx start out the same (i.e. the natural pixel location). Similarly, Yimg and SDLy start out the same. So, the computer, which displays the pixel attributes of each pixel at its (SDLx,SDLy) location, can display the continually adjusted image (here the array of nodes) even while it's being adjusted based on the viewer adjusted (SDLx,SDLy) field data. As we update the LUT responsive to viewer input and redisplay based on the now-adjusted (SDLx, SDLy), this will naturally reposition the nodes as they are being positionally adjusted. For a cleaner image the processor can locate based only on the single pixel at the center of each node and place a circle around that point in order to minimize processing time and compression error during the process.

The descriptions thus far can be read to apply to the binocular vision system since that is how our net perceptions work. Thus this "one-measure for both eyes" process alone is a fully valid embodiment of the current invention. However, the reason the example data structure in FIG. 18 includes a field for "Eye" (values are L for left, R for right and B for binocular) is that there is great value in individual eye values. With many vision conditions a good eye can cover for a bad eye masking the problem. The single-eye capture information and process can be the same as above except that the viewer is prompted by the processor (e.g., via text message or displayed prompt) to cover one eye (or the view for the non-selected eye is otherwise blocked) and, while the viewer tests with that eye, records are updated that have an L or an R in the Eye field (based, of course, on the mode of testing). Thus it is possible to have 3 records for each pixel of the display i.e. 1) the binocular record captured with both eyes active wherein Eye=B, 2) a record captured with the left eye active wherein Eye=L and 3) a record captured with the right active wherein Eye=R.

Because of the individual nature of human perception, some viewers will see better when viewing the image pixels when they are located at their (SDLx, SDLy) values in the Eye=B records. Others will do better viewing through the records where Eye=L or records where Eye=R. A particularly valuable optional embodiment is where the left eye sees the image pixels placed based on the (SDLx, SDLy) values in the Eye=L and the right eye sees the image pixels placed based on the (SDLx, SDLy) values in the Eye=R records. This is possible because these embodiments are either worn DRD embodiments (where each eye gets its own image) or they use shutter glasses or other means for viewing a separate image for each eye via a non-worn display.

The DRD used for the capture of distortion data and/or for the DRD that is used after this data is established for display of images with reduced distortion can be worn displays. Indeed, where the same display is used for both capture and distortion-reduced display is a near ideal embodiment for both tasks. Also, an optional forward view camera mounted on or in the worn display provides a image of the view ahead of the viewer that the DRD can display in distortion-reduced form in real time as the processor (either worn or remote via data connection) shifts the live image's display pixels according to the SDLx and SDLy values that identify how much shifting is required for each portion of at least part of the viewer's FOV.

During capture of distortion data as described above, the viewer is best positioned at a consistent distance from the screen (change of POI accommodation is already discussed above). Embodiments may use a chin rest or other controlling element to help with this. In the worn embodiments (where the display is a worn display with a forward camera view being displayed on it) the distance is easily controlled by the elements securing the viewer to the head. However, the processor, based on the ETA data when used, can, alternatively or in a separate embodiment, accommodate distance changes by calculating and adjusting for that change in distance (actually, most ETA's already do the $1^{st}$ part of the calculation for you in the form of vergence data). With that distance data, the processor can adjust the capture process by commonly known means e.g., by a) modifying the zoom (size) of the test image on the display so that, for example, the centers of the nodes are at the same locations in the viewer's FOV as they would be if he'd stayed at a fixed location, b) leaving the displayed image as is and updating any viewer-indicated change on a record whose Ximg and Yimg are adjusted to the pixel that would be associated with the active node's position had the viewer stayed at a fixed location, c) the more granular "zone picking" option wherein a POI in that zone determines the adjustment amount responsive to a change in viewer distance to screen or any practical option for adapting to changes in the relation of viewer to screen. While the adaptations for viewer motion are briefly illustrated here they, and combinations of them, are understood by those in the industry and other methods not mentioned to thus adapt for viewer movement are applicable to the current invention.

Implementers may alternatively choose to display a row (or column) with a pre-existing distortion hoping that the retinal location near where that pre-existing distortion lands has a larger distortion that the pre-existing distortion trusting that the brain will select the greater of the distortions in the perceived lines. This, however, is an applicable available option and not a requirement.

This process can also be applied to helping those with eye-focusing element curvature issues like astigmatism. Since it is the patient's perceptions that drive this process, it the viewer perception-based mapping can be used to reduce the effects of, for example, irregular corneal or lens curvature, etc.

2. Imaging-Based Mapping.

The distortion values can also be arrived at by ray tracing paths of light through the cornea and lens to the retina based on those paths and the shape, curvature and irregularities of the retinal terrain. There are numerous means in ophthalmology for measuring and mapping the retina. Photography (sometimes dye-enhanced e.g., fluorescein), stereoscopic macularcolor photography, selected wavelength illumination and volumetric (including radiologic) imaging are just a few. However the "terrain" of the retina is mapped, the paths of light from points in the eye's FOV to points on the retina are modeled. Then, where, e.g., due to surface irregularities or drusenwarping, the ray will arrive at the wrong location on the retina, displacement factors (our familiar SDLx and SDLy) are calculated for (to use the pixel-based spatial explanation used above for simplicity of explanation) recording the relative pixel location where the attributes of the virtual pixel associated with the instant ray being traced should be displayed to appear where the errant ray should have landed. Ideally, the imaging based mapping would be accomplished first since such imaging frequently precedes treatment anyway and ray-tracing the volumetric virtual version of the patient's eyes provides at least a helpfully adjusted version of the SDLx and SDLy values for each angular portion of the patient's FOV (here denominated in pixels but we could also have used minutes of arc). Following this image based mapping with the viewer perception-based mapping described above is a good second step since the first pattern the viewer sees is already using the SDLx and SDLy values from the imaging based mapping which makes the viewer's job easier (mostly fine-tuning). However, of course, these different processes of identifying the adjustment values may be alternatives instead of co-participating steps in a joint process.

Thus, there are a number of things that are "indicative of at least one portion of the field of view of an eye that needs to appear at an identified alternative location in that field of view". For example, a pair of solid angles with one being subtended by some portion of a display's screen that needs to be displayed elsewhere and the other subtended by a portion of that display screen where elsewhere is. These are "indicative of at least one portion of the field of view of an eye that needs to appear at an identified alternative location in that field of view" So are row, column references based on non-trigonometric values as discussed. When the term "indicative of" is used herein, it is referring not so much to any one calculation that takes us to the exact same place as a number of other approaches but refers to any known calculation steps using any data available to the instant embodiment that is clearly, to anyone skilled in the art, indicative of the object of the calculation which, here, is a pair of locations.

As illustrated in FIG. 16A (from the distorted perspective of a viewer suffering from distortion) and discussed above, the Cartesian grid 161 doesn't look so much like a Cartesian grid of orthogonal rows and columns due to the warping of the viewer's visual perception. To make matters worse, the scatoma results in a dark spot 162 on the viewer's perception of the grid making the image even harder to perceive. As described herein balanced illumination displays (let's abbreviate these as BIDs to save some ink) place more light at retinal locations where it's needed. When these place augmentative light where it is needed (here, for example, a scatoma and also any area of low retinal insensitivity including retinitis pigmentosa, etc.) this will, to whatever extent any retinal sensitivity at that location still exists, reduce or eliminate the visible darker area illustrated as 162.

Also described herein, retina optimizing displays make the eye more sensitive to their light by using wavelengths that the retina is particularly sensitive to (the retina is likely to absorb a higher percentage of incident photons that it would for light of other wavelengths). These retina optimizing displays (RODs for short) allow the use of perceivably extra-bright light in displays using the ROD design without harming the retina with high energy radiation. While the DTR may also possess the ROD and/or BID design elements and while these additional elements will both reduce or remove the appearance of the scatoma, 162, it is not a requirement that these be used in combination since the simple act of the DTR adapting for viewer distortion from a number of causes is a useful perception-enhancing device and process.

Not everyone with AMD can be helped by BIDS and for those whose scatoma is made up of completely dead sensor cells, more light won't help at all. However, for those whose cones are less sensitive (slow to hyperpolarize, inadequately vascularized or chemically challenged for the vision transduction cycle) or those scatomas interspersed with at least some responsive cells, BIDs may help. Bids are also helpful for other low vision conditions. One is in some ways the mirror image of some AMD issues. For patients with retinitis pigmentosa the BID still sends more light to the weaker area but, in cases where rod degeneration has preceded or exceeded cone degeneration, that weaker area is where rods are most prevalent (largely extra-macular). Some of the various AMD symptoms can include the combined effects of drusen, new vascular growth, blood from leaking veins, retinal shape distortion responsive to all of the above, phototoxic endogenous components, low O2 and its consequences as well as hyper-bleaching of photopigments, feedback interference with horizontal cells, reductions in opsin availability and other impediments to the chemistry of phototransduction responsive to even ordinary ambient light. The effects of all of this on the brain's perception processing can be a big, and perhaps the biggest, factor in autoperceptive processes like reading and facial recognition. For this reason, seemingly small improvements in retinal sensitivity can have larger than expected benefits when their sensitivity reaches a threshold that allows the brain to "get" the image just enough to meet the requirements of its powerful pattern recognition processes.

The retina also loses effective dynamic range making perception in difficult lighting conditions (e.g., evening driving) more difficult. BIDS can be a powerful tool for these but sometimes you come up with a solution that creates another significant problem. For example, BIDs are beneficial for a number of applications from macular degeneration to low vision to evening driving by seemingly tending to "flatten" the huge disparities between the sensitivity of normal and weak retinal sensors (with augmented brightness for the weak). But, in providing substantially increased lumens to weak areas, we potentially create another substantial problem: additional ocular radiation. This is dealt with by light level control (e.g., less light to sensitive areas of the retina, dark adaptation by control of other light reaching the retina and/or the use of RODs as discussed further below. Pupil diameter, normally measured by the ETA, is taken into account and used in calculation of minimum light levels needed as is common practice.

Cumulative Retinal Sensitivity Accommodation (CRSA): A new device and process applicable to improving the net usable dynamic range of eyes watching displays, including displays like RODs, BIDs, DRDs and other displays is now discussed. Here the light levels to the eye over time (at least those from the display although ambient light may also be included) are processor tracked. From that time-based data and known rates of dark accommodation and reversal thereof, it calculates the approximate level of general dark adaptation and/or individual dark adaptation for rods and/or cones (in the preferred embodiment it is both). Thus, a substantially superior measure of instant retinal sensitivity for rods and/or cones is available to the processor. Responsive to the now-estimated adaptation, the processor accommodates instant retinal sensitivity limitations by directing lowered general light levels to more dark-adapted eyes and higher general light levels to less adapted eyes. The CRSA-capable BID takes it yet another step and accommodates instant retinal sensitivity limitations by adapting light sent to individual parts of the eye based on both their area sensitivity (sensitive vs. less sensitive) and current changes in it due to changes in lighting over time (dark adaptation).

Sources of that CRSA instant retinal sensitivity data include but aren't limited to ETA-measured pupil diameter, ETA-camera-captured illuminance on the surface of the eye, calculated luminous flux of the display based on images displayed and display settings, photocell-measured illuminance on the general eye area and any combinations thereof. Thus, unlike a typical monitor that flashes images by with no regard to instant retinal sensitivity, this allows the display (including BIDs, RODs and DRDs) to use a more accurately calculated maximum (and minimum and appropriate levels in between) amount of light to use for any point on the retina or in general. Thus, the processor can direct a display that maximizes the real net dynamic range for the instant adaptive condition of the eye by presenting each frame with light levels specifically matched to the sensitivity range(s) of the retina at the moment. By neither exceeding a maximum perceivable level or failing to meet the minimum thresholds of the eye in its current level of adaptation, the eye is presented with an image tailored to its instant level of adaptation for maximum benefit of dynamic range.

An extended embodiment of the CRSA facility actually uses that CRSA instant sensitivity data to slowly and at a progressive and comfortable rate, move the adaptation of at least some of the sensors towards dark adaptation preferably to a fairly low photopic or high mesopic level. The actual level of dark adaptation directed by the processor can and will vary both by implementer and viewer preferences which may then change again with the environment or task objectives (those preferences input via any user or implementer interface). By dark adapting the eye(s) to at least some level at a gradual programmed rate, the processor is now in a position to provide the viewer with imaging that requires less or no delay in dark adaptation. When scene lighting suddenly changes, e.g., from bright sunlight to a tunnel while driving while wearing a worn embodiment, the eyes can require 20+minutes to fully adapt. An ordinary processor-controlled display could, of course, simply increase the gain above the normal brightness of its display. Unfortunately, to achieve the shift needed, this normally goes well beyond the display's effective brightness and the image can become "snowy". However, a CRSA-capable display and the processor that has already led the viewer's eye(s) into dark adaptation, did so by displaying a comfortably lower brightness level (e.g., on the low end of the comfortable display brightness range). Thus, there is now plenty of range room for the processor to increase the brightness (without overdriving the image to snow-perhaps raising the brightness to the middle or higher end of the comfortable display brightness range). Also, the eyes are also particularly sensitive to those changes since, in the adapted stage, the less photon-busied visual transduction process has left a high percentage of unbleached chromophores. Thus, less responsive display brightness is required. Other advantages to program-controlled adaptation include much lower radiation to the eye and zero periods of poor vision while accommodating.

Of course, for a BID this process and the CRSA sensitivity data will be different for sensitive and insensitive areas of the retina. This is not just because different areas have different sensitivities but also because different sensors (rods vs. cones) have vastly different dark adaptation over time (and the reverse thereof). By taking into account the instant sensitivity (which is a factor of both the natural sensitivity of the area of the retina and how much light it's been getting) the BID can provide the maximum in dynamic range that the eye can currently apprehend. RODs can also be programmed to be CRSA-capable both for a display that, as described above, maximizes the real net dynamic range to best accommodate the instant adaptive condition of the eye and invisibly (to the viewer) adapts the retina to be more sensitive. It does all this while allowing the display to operate at a lower portion of its effective brightness range with room to increase and retinal sensitivity that doesn't require as much of an increase in the first place.

In all of the BIDs described herein, the portion of the image whose light will be reaching a weak part of the retina will be displayed to be proportionately brighter than light coming from a portion of the image being displayed whose emitted light will reach a portion of the retina that doesn't need help (brightness). The only exception is that for a known part of the retina known to be completely insensitive, the preferred embodiments of the BID will send no light at all there. This sends less useless light to only be scattered by cataracts, degraded lens envelopes and corneal irregularities.

The processor knows which areas of the retina are insensitive either generally (by the portion of the retina typically weakened by the pathology being treated e.g., the macula for AMD) or specifically (by known values for the sensitivity of certain parts of the individual viewer's eyes). By providing more perceivable light to parts of the retina where it is needed and, optionally, less perceivable light where it is not needed, this balanced illumination display (BID) enables a viewer to see an image less confused by shaded, dark and fuzzy areas.

The display technology can be any TV technology, monitor or technology whether worn or fixed (herein we will refer to "TV" for brevity but that term can be used herein to include monitors, projectors, worn displays, etc.). However, the directional pixels of directional pixel embodiments of the current invention or any technology directing discrete portions of an image in a specific direction have further benefits ranging from 3-D imaging to selecting routes to the retina that evade locations of cataract density. In these embodiments, more than one light directing element can reach the same point on the retina and the processor, when needed, picks one(s) that will avoid a location of a known area of cataract density or other ocular imaging problem area.

One useful embodiment is a DRD whose display uses at least some (and preferably all) of the ROD SMWs thus a DRD+ROD embodiment.

One embodiment is a DRD whose display uses at least some (and preferably all) of the ROD SMWs and adapts the brightness of pixels based on where on the retina they will end up (thus a DRD+ROD+BID embodiment).

Another embodiment is a ROD+BID embodiment (having no DRD distortion correction).

As described above, when the processor using the eye-tracking (ET) data determines that light from a given pixel will display to a weak portion of the retina, the perceived brightness for that pixel is increased. It can also work as an internet service or other remote service where the ET assembly is with the viewer but sends ETA data to a remote image source/service where the image is adapted to brighten points on the viewer's screen that will reach weak points on a viewer retina. In this useful embodiment the ETA's function can optionally be performed by a simple camera viewing the viewer (e.g., a laptop-embedded camera) and sending information (either the camera image or processed data therefrom) to the remote location where the image to be sent to the viewer is modified for brightness and/or color at the locations so indicated by the ETA-related data and the sensitivity of different areas of the retina (which may be general or specific to the individual viewer being effectively known by the service even if only by provided parameters). Alternatively, the ETA data may be processed by programming logic at the viewer's site (which can optionally be a web applet; all of this being applicable to a viewer looking at the display of a smartphone or tablet) thus BID-adapting the image prior to its display using local code. Also, if the viewer's monitor is equipped to display with wavelengths the eye is particularly sensitive to (e.g., substituting retinally more sensitive wavelengths for those ordinarily used) this use of wavelengths more easily seen can be used to brighten the perceived image, even selectively only for pixels whose light will reach a weak area, without increasing radiation to the eye.

Also, as a powerful option, the perceived brightness for pixels whose light will arrive at more sensitive portions of the retina can be reduced (by adjusting pixel display brightness, image color lightness, displayed wavelength selection to a wavelength the eye is less sensitive to or any combination thereof) to adjust down the brightness of light headed for strong areas compared to light headed for weak areas of the retina. This provides a heightened capacity for contrast with less light and also allows the retina to be more adapted to darkness (more sensitive to light). For example, cones can adapt to become as much as 100 times more sensitive after adaptation. Still, very weak areas of the retina can require a lot more light to, for example, make dim areas in the sight of a person with AMD look more normal and a lot more light can create problems of its own as is now discussed.

There are three general kinds of light toxicity known to damage the retina: photothermal, photomechanical and photochemical. Unfortunately, more than one of those can be occurring at the same time. Also, after middle age the production of antioxidants and antioxidant enzymes that protect the eye from phototoxins is decreased. At the same time, protective pigments are being modified chemically making them less effective. To make things worse the complement system when not in perfect balance can cause inflammation-related damage responsive to light and the complement system's alternative pathway is self-perpetuating. It was previously thought that only bright light and/or high energy (UV) light or infrared (IR) caused such damage. However, it is becoming well known in ophthalmic research circles that even small amounts of excess radiation (even in low energy wavelengths) is harmful to the retina and thus vision. This is particularly true for extended periods of exposure. Of the 3 types of phototoxicity, photochemical damage (which doesn't appear to need high energy or even above room lighting brightness to cause irreversible damage) is thought to be the most common mechanism by which light exposure causes retinal damage. Research by Noell et all in 1966 suggests that continuous exposure to normal ambient light even in the natural light spectrum may cause irreversible retinal damage.

Basically, damage towards low vision can occur any time there are more photons/second than the retina can handle. Based on all of the above, those with AMD (and those not wanting it) are advised by their ophthalmologists to wear sunglasses and avoid even extended exposure to bright TV or computer monitors. However, if the chromophore absorbs a photon (initiating the photoisomerization, signal transduction cascades and the completion of the vision cycle), that photon does no harm whatever. Thus, for a capacity for perception of brightness without excessive radiation, it is advantageous to use wavelengths of light in the display's image whose photons are most likely to be absorbed by the retinal pigment (e.g., opsins in rods and cones) while requiring fewer photons to strike the retina in order to hyperpolarize the light-sensitive cell. These are the wavelengths of light that are the easiest to see as discussed above (whose photons are most likely to be absorbed by retinal pigments and contributing to hyperpolarization of the cell rather than interfering with its visual transduction chemistry).

For all of the above reasons, even healthy individuals are advised to wear sunglasses. And, for the same reasons, the balanced Illumination of the BID seems to, in solving one problem, create a very significant secondary problem. That is, while increasing brightness in a displayed image only for portions of that image that will encounter a less sensitive portion of the retina can help "flatten the field" of visual perception and improve perception (so far, so good), that increased photon energy may also advance the progression of AMD and otherwise desensitize the retina. Thus, to provide much-increased brightness where needed without increased radiation, the ROD, uses sensitivity maxima wavelengths (SMWs). These wavelengths of light are among the easiest to see (wavelengths that the retina is particularly sensitive to). This is due to high retinal pigment absorption rates for these wavelengths. Thus it takes less potentially damaging radiation (fewer photons and less watts of energy) to the retina to stimulate sight. SMWs can be illustrated as wavelength ranges at and very near to the peaks in the well-known relative response curves for the absorption spectra of photopsins (cone opsins) and rhodopsin (rod opsin). A photon at or near an SMW is, when striking a chromophore in a photoreceptor cell, substantially more likely to be absorbed and result in the photoisomerization, signal transduction cascades and the hyperpolarization of the photoreceptor cell that sends the signal to the brain that we "see" as light.

The actual wavelengths reported by researchers for SMWs vary because of different research environments and different people just being different. Further, the actual SMWs best for a given TV or other display to use vary by display, light source, environment, color quality goals, display brightness requirements, viewer factors and the subjectivity of perception. Thus it is an exercise in futility to try and describe all of possible SMW values that somebody might want to use so, herein, we will simply refer to SMWs. However, used here only as an example set, one SMW set used in displaying an ROD image can include wavelengths around 445, 545 and 575 nm. Some familiar with optics may wonder why these are not closer to the well-taught absorption maxima for chromophores (typically near 420 nm for blue, 533 nm for green and 563 nm for red even though 563 nm doesn't look red). The reason for this is that by using these values in this example we are accounting for the absorbance of lens, ocular media, and macula. In other words, these SMWs are just exemplary values for sensitivity maxima in the real world environment of the retina. Some embodiments will simply use SMWs selected for general purpose use and others will be amendable to accommodate the specific SMSs of an individual.

In any number of applicable embodiments (which can include any display technology capable of any degree of selective wavelength provision) these SMWs can be used independently in displaying an image or as part of a gamut that includes other colors. However, in a preferred embodiment they are used as the primary colors for the gamut of a display. These SMW primaries are then used in any kind of combination to create the perception of colors as is commonly understood by those in the field. The color perceived by the viewer for an area of the display is the result of the relative signal magnitudes from the different cones which can be controlled at the display by wavelength choice and relative magnitudes of each wavelength which are managed by how long a pixel is "lit", with what intensity and even with which ganglionic excitation frequencies (discussed elsewhere herein) are activated. Because, at least in a preferred embodiment, all of these colors in the resulting gamut are made up of SMWs, all the primary-blended colors, consisting of chosen ratios of SMW primaries, are easy to see without being accompanied by a lot of unabsorbed photons to possibly interfere with the visual transduction chemistry and radiate the retinal pigment epithelium (RPE).

In the preferred embodiment the light emanating from the display is made up of spectral colors which are rather discrete (narrow) wavelength bands of SMWs (though they don't have to be a delta function precisely restricted to a single nanometer wavelength). However, each of these bands should be narrow enough to provide wavelengths sufficiently close to the sensitivity maxima (the peak wavelengths of the sensitivity curves) associated with the SMWs to enjoy the benefits of better retinal sensitivity. The spectral nature of such light, being very narrow (bandwidth) and near the maxima for the sensitivity curves, enables the light to be light that the retina is especially sensitive to. At the very same time they should be wide enough for adequate energy and speckle prevention. For example, if the full width half maximum (FWHM) of the light source providing an SMW is too wide (includes too many wavelengths for each primary color as typical monitors do) it will include parts of the absorption response curves for cones and rods that are far from the peak sensitivity wavelengths and thus lose the SMW advantages. This is tempered by the needs to avoid throwing away too much light from the light source (by using only a small portion of the light source's available light for that "color") or incurring speckle from light sources with hyper-narrow ranges. Implementers will not only choose different wavelength band ranges for different embodiments, they will also frequently choose different wavelength band ranges for different primaries. For example, if implementers feel that the light source is not getting enough red through the display to the eye, they can make the red wavelength band range wider (e.g., with a wider light source FWHM for that primary) (and including potentially longer wavelengths) than the wavelength band ranges for other primary wavelengths. Or, if, for example, even previously considered safe portions of the non-UV blue spectrum need to be avoided or attenuated, the blue wavelength band range may be made much more narrow than other primaries in order to be most efficient (i.e. to require the least radiation to accomplish hyperpolarization of a cone or rod cell by limiting the wavelength band range to only the wavelengths right at the peak of the absorption response curve). And/or a wavelength band range may be shifted to center at a nearby wavelength to avoid a particular range.

In effect, the ROD process makes the eye more sensitive to light from the display (via use of a gamut at least partially defined by more discreet SMW primaries) rather than having to have such a high radiation/bright image. Thus efficacy (lumens/watt) is increased by achieving high lumens (photometric magnitude) with low energy/watts (radiometric magnitude). So, SMWs can be thus selected with the priority being retinal sensitivity as opposed to the objective of perfect representation of every perceivable color. However, the gamut can be expanded for additional beauty and/or to incorporate more colors by adding additional colors to the gamut. For example, to better display distinguishable red between the color-identification readings of m (medium length; green) and l (long; yellow-red) cones (whose comparative ratios of sensor magnitude are key to separating red from green in human perception) an additional long red wavelength of light can be added to the exemplary SMWs listed above (e.g., a red such as, as an example only, 650 nm) that increases the signal ratio of l cones/m cones. Alternatively or in combination, color separations can be enhanced by choices in centering of SMW ranges. For example, to better separate red from green (a predominant issue in tristimulus perception), where a bandwidth for red and green have been chosen to be 10 nm (implementers will vary here) and the real-world (pre-chromophore absorption adapted) maximum for green is considered to be 545 and, for red, is 575 (implementers will vary here) then the range for the green (instead of 540-550) may be shifted (to be more distal to the red) to 535-545. Similarly the red range can be selected to be 575-585. By selecting the short (in nm) side of the green peak (of the sensitivity curve) and the long side of the red peak, we enhance perceptual separation between the colors. Also, perception of color separation can be enhanced in all of the display embodiments herein by selective background and/or border coloring. For example, to better distinguish red in an image, a border placed around the image is made greener and/or bluer to diminish the perception of green and heighten the perception of red.

How do implementers produce and control-to-image these SWMs with these wavelength band ranges? The short answer is "by numerous means known to those skilled in the field" since there are so many and they are so well known in the industry and even by many consumers. However, a brief description of some of the many applicable light source and imaging mechanics should provide a more satisfying though general answer. Consider, as an illustrative embodiment, an LED TV whose backlighting passes through a typical liquid crystal array. These standard liquid crystal arrays determine how much of that light passes through each color filter of each pixel. However, in place of the normally used broad spectrum backlighting LED's, we place a light source providing relatively discrete SMW ranges as discussed above. Even with the existing filters used today for each TV pixel (broad frequency r,g,b filters) some of the SMW light will get through the RGB filter (depending on the color of the filter). Since current TV filter arrays might not (read that "will not", according to Murphy's law) pass as much as wanted or too much of a given SMW, brightness and color balance can then be augmented or attenuated via any method. Some of these include, for example, adjusting the light source (choosing the light-source-provided backlighting intensity of each of the SMW ranges), adjusting the timing of the liquid crystal gate which may be effected via displaying an image modified to be lighter or darker or by direct (or zone) pixel control and/or, of course, simply by proper selection of the filters (e.g., filter-permitted wavelengths and the relative amounts thereof) and light-source FWHMs used in the first place. Thus, one applicable embodiment that is easy to understand is an LED display using backlighting LEDs that provide SMW light in significantly discrete wavelength ranges and/or a filter array whose filters permit the bandwidth range near SMWs. Of course, if the wavelength range of a SMW provided by the light source is already adequately discrete, the filter does not have to be selected to enforce the discrete wavelength range within a color. In one example embodiment there is (as with typical LCD displays), for each pixel, a filter for each of the primaries. In this embodiment example, however, if either the light source primaries are pre-selected to be near SMWs or the filters are selected to enforce SMW ranges (or both), the retina will be especially sensitive to what is emitted by the display. Of course, worn displays are a particularly useful embodiment of this invention. A foreground camera on a worn embodiment can also provide the image on the worn display allowing the viewer to look all around and have improved vision of all surroundings and enjoy the BID and/or ROD and/or DRD benefits in a portable embodiment.

That functional illustration notwithstanding, some embodiments will include filters (unlike, for example, the less discrete and non-retinal-sensitivity idealized RGB filter arrays typically used in current TVs) that pass the desired amounts of desired wavelengths in the first place (requiring no further special brightness adjustment). Thus one example embodiment looks and works like a typical LCD TV arrangement (backlit through liquid a crystal array and then through an array of colored filters) sending primarily wavelengths that are centered near the maxima to the eye.

However, the current invention is not limited to any display illumination scheme. Light can come from discrete sources (e.g., lasers or discrete filters) or from other light sources (e.g., white light source) that is passed by filters selecting the right wavelengths and light-source FWHMs. And/or the light source to the TV can include wavelengths (often in blue ranges in emerging quantum dot TV developments) that excite quantum dots and those quantum dots can replace the filters so that, when activated by those exciting wavelengths through a liquid crystal array or other light control components, the quantum dots put out a chosen discrete SMW. One embodiment of this involves blue backlighting (in a wavelength that excites quantum dots to emit at or near at least one of the maxima wavelengths) behind a typical liquid crystal array. A typical liquid crystal array, that is, except that the filters that filter the light after passing the liquid crystal gates are replaced by quantum dots.

Other TV light sources need no backlighting (e.g., emissive systems like OLED, TOLED and quantum dots). For emissive pixels whose light is sufficiently discrete (narrow bandwidth) and sufficiently close to an SMW, no additive filtering is necessary. For example, a display with quantum dots emitting SMWs, the narrow bandwidth of such quantum dots (often measured by the FWHM of each color band contributing to the gamut) normally requires no further filtering. Otherwise, an array of filters or other assemblies to select "colors" for these emissive pixels is also an effective embodiment of the current invention. The controller's software can also, in embodiments that include eye tracking like BIDs and BID+RODs (balanced illumination displays using SMWs at least for eye locations where greater perceived brightness is required), selectively control pixel color mixing customized to where on the retina a pixel's light will land (e.g., on a cone or rod as well as in consideration of the sensitivity of a particular cone or rod location).

In AMD and some other forms of low vision, it is the cones that are insensitive. However, sufferers of retinitis pigmentosa and other pathologies affecting the rods, particularly in the early stages of rod degeneration (e.g., for retinitis pigmentosa rod degeneration often precedes and/or exceeds cone degeneration), may be similarly helped by 1) more brightness to rods in the retina that are weaker, 2) less brightness to rods and/or cones that are more sensitive, 3) using wavelengths that the rods are more sensitive to. E.g., rods are particularly sensitive, under conditions from scotopic through photopic, to the range of 500-550 nm respectively).

For both AMD and retinitis pigmentosa sufferers, the wavelengths that the rods and/or cones are most sensitive to can vary by person and by the instant light environment. Embodiments of the current invention for this use wavelengths (where needed a plurality of them) that are near those sensitive wavelengths. Where the variance is by person, that person (who varies from a norm far enough to require special treatment) may be tested to find the colors that the person's retinas are most sensitive to and, optionally, under a variety of environmental conditions. Similarly, the actual sensitivity map of the retina, whether gained by imaging or by patient interaction, will be used in some embodiments to customize BID light. Thus, in these cases, the controller has data allowing it to know the relative sensitivity of portions of the retina so it can provide (via pixels whose light will go there or the arc minute of visual FOV equivalent) provide the right amount of light.

As described above at length, RODs can also be programmed to be CRSA-capable both for a display that, as described above, maximizes the real net dynamic range to best accommodate the instant adaptive condition of the eye and invisibly (to the viewer) adapts the retina to be more sensitive. It does all this while allowing the display to operate at a lower portion of its effective brightness range with room to increase and retinal sensitivity that, when an increase is needed, doesn't require as much of an increase.

Wavelength and wavelength combinations may also be selected by the controller to control other factors like pupil diameter and sense of brightness (in addition to cone and rod lumen response). This can be part of a useful embodiment maximizing the sense of brightness and contrast particularly for parts of the retina affected by low vision (e.g., AMD). For example, to at least achieve a higher perception of brightness in a part of the displayed image than otherwise possible with a given display technology, implementers may independently provide or color-mix in a frequency into the light source or other (e.g., emissive) display technology that intrinsically photosensitive Retinal Ganglion Cells (ipRGCs) are particularly sensitive to. This has the effect of creating, for parts of the display displaying these ipRGC-sensitive wavelengths, an increased perception of brightness. For example, if the wavelength added to the display's light at points of desired brightness (which can be a single pixel or a group thereof) based on ganglionic response is 480 nm (a wavelength found in research to cause the ganglionic perception of light even when the viewer has no rods or cones), this blue-greenish wavelength can be a) provided by itself for this display area, b) mixed with the primary colors using methods known to experts in the field to achieve the image's desired color for that area of the monitor or c) used in place of a primary color (in this example in place of at least some of the blue primary and/or green primary). To increase visual acuity ganglia-sensitive wavelengths may also be added and/or the relative amounts of component primary colors (e.g., blues) may be modified (e.g., to contract the pupil via response of melanopsin in ganglia particularly to blues) for better perception.

The ROD is also in an unusually good position to provide phototherapy. Scientists like Dotson et al in U.S. Pat. No. 7,479,136 (e.g., promoting healing of damaged and/or diseased eye tissue including beaming 590 nm light into the eye to treat corneal trauma) and Dotson et al in US20160166850 (e.g., strengthening corneal tissue) have made good use of the application of frequencies of light to the eyes for medicinal purposes. Perhaps the largest shortfall in these and other well-conceived applications is that the treatment times are short and thus, perhaps necessitated by the short in-office treatment times, more intense than they might be if treatment times were longer and optionally processor timed and managed for By providing therapeutic wavelengths, preferably in narrow bandwidths centered on frequencies known to have the maximum therapeutic value, the ROD will provide therapy over the potentially long periods of ROD use as opposed to office visit treatment times. These bandwidths can be included in the gamut of the ROD by, where necessary, an additional LED or laser in the backlighting or and additional quantum dot in a quantum dot ROD implementation and a LED display with a color filter array including therapeutic wavelengths. A number of therapeutic wavelengths can be administered at once; for example, when a filter in a LED display filter array permits a plurality of narrow frequency bands in a single filter element. Thus, even a non-ROD display embodiment for therapeutic light administration is disclosed composed of an ordinary LED display with at least one of the filters in the array making up the gamut being a therapeutic filter and thus permissive of therapeutic wavelength(s) possibly in addition to a primary color. Just for example, consider 1 single therapeutic filter for each pixel (in an LCD filter array type that typically includes the primaries red, green and blue). However, that special therapeutic filter can selectively transmit, just for example, an SMW of blue in a narrow band of wavelengths as well as one or two other narrow bands of therapeutic wavelengths. In that example, for every bit of display luminous flux for blue in the TV images or other images a viewer watches on this standing or worn display, provides a dose of therapeutic light. Thus, one embodiment independent of any other features is simply an LCD display with at least one of the filters in its RGB filter set for each pixel having a therapeutic wavelength component. The processor can, of course, by observing (just in this example) the blue content in the image and the brightness setting of the display, calculate how much therapeutic luminous flux came through the filter array to the eye.

Of course, blue was just an exemplary choice. In another exemplary embodiment, consider all of the filters in the pixel array as being therapeutic pixels. In the preferred embodiment of even this non-ROD embodiment (a rather ordinary display) consider at least relatively narrow bands of primary colors. Instead of, for example, a red filter that allows a wide range of red wavelengths (even though that is not required for good color) lets limit all of these primary color wavelength ranges to a FWHM of about 40 nm for each primary color. However, each of these primary color filter types (one for each of red, blue and green) are multi-bandpass filters permitting passage of, in addition to the narrow (here 40 nm) primary color for each primary, as much as 100% of a therapeutic wavelength. Of course, the percentage throughput for the therapeutic wavelengths is determined by how much treatment is needed and how much excess might be harmful. The point is that, for one therapeutic filter added to the mix of those in an otherwise ordinary display pixel filter group or for any number of multi-bandpass filters doing double duty by displaying a primary color as well as a therapeutic wavelength, the processor can measure dosage and deliver while a viewer watches any video or still content. In another example a "still" test image is continuously displayed for a fixed period because that test image's color content determines a pre-known therapeutic dosage over a given time for one or many therapeutic wavelengths. That is because there is a known amount of luminous flux from each pixel for each such therapeutic frequency to the eye (calculable from the image pixel attributes and the brightness settings of the display). Another example is an image with a single hue for the entire image wherein the display screen's luminance content for the therapeutic wavelength(s) is (are) known.

There is, of course, a ROD embodiment and, in the preferred such embodiment, there are 3 SMW primaries (very narrow bandwidths for each) coming through the filter array and at least one of the filter types (for at least one of the three hues) also permits another preferably narrow band of therapeutic light.

Increasing the retina's effective dynamic range and image subcomponent brightness control: A perceptual loss of dynamic range (e.g., some of the sensitivity range of a healthy eye, particularly at low light levels at least at certain locations) can be symptoms for those with low vision. With AMD some parts of the scotoma may be completely dark and unresponsive to light. However, sometimes others are not and these are responsive to both ROD and BID and, in some embodiments, the effective combination of the two.

These reduced sensitivity areas can experience an expanded effective dynamic range using RODs and BIDs together. To do this it may be necessary to overcome a threshold. To lower this threshold the BID provides enough light to overcome the threshold of perception (enough for the patient to see it) and then can add more brightness as needed (optionally with the most efficient SMW the ROD has when the display is also a ROD).

The quality of these displays may be enhanced by a number of applicable factors, not all of which are listed here. To increase sharpness of perception (even if only for certain images or certain portions of an image) the amount of the blue component can be increased. To control the diameter of the viewer's pupil the display controller controls the blue levels in the colors used to display the image. For example, by decreasing the diameter of the pupil responsive to blue light from the display, the image may be made to be perceived with more sharpness (based on the smaller aperture of the visual optics). Excitation of light-sensitive ganglions w/specific wavelengths they are most sensitive is a specific application of this process for managing pupil diameter (as is brightening the overall display). When the display is a BID the processor can also selectively apply the blue to parts of the image whose light will reach parts of the retina that are most effective at stimulating the desired response. Also, as with the RODs above, particular wavelengths of light may also be administered with a mixture of primary and or other colors to apply blue wavelengths in pixels that can be seen as another color due the brain's perception of color based on relative readings from 1, m and s cones.

Figure 17A:
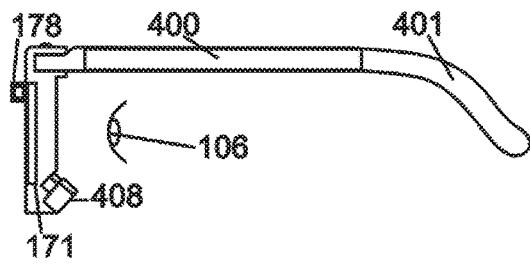
FIG. 17A is an illustration of a general embodiment of a worn assembly. Multiple components are displayed but not all are required in every embodiment.

Actively passive BIDs (APBIDs) will usually be a worn BID device (the windshield and pull-down see-through sun-visor alternative described further below being notable exceptions) looking much like an ordinary pair of clear or slightly darkened glasses. FIGS. 17A, B and C illustrate a few embodiments with a gate array, 171 controlled by a processor (preferably located, along with power and other connections, in the side frames like 400 but alternatively by remote connection in which case the communication elements are still preferably in the two 400s). When the gate array, 171, is in the form of a liquid crystal array, the orientation of the liquid crystal array's first polarizer can be chosen (by simple rotation of the array or by other means) for preliminary and partial glare reduction.

The processor controls, by selectively controlling individual gates, how much light from different points in the FOV of the eye, 106, reaches points in that eye. As disclosed for the ordinary BID, an ETA, 408 (shown here with an optional infrared, IR, light adjoining it to provide light for the ETA that won't affect the viewer's perception), provides what the processor needs to identify which gates permit light that will arrive at what points on the retina. Any embodiment may also include a lens, 174 in FIG. 17B, useful for size control (e.g., appearing nearer or further away and including the option of compound lenses), focusing, providing prescription optics to correct eye defects and/or simply to offset diffractive expansion in some gate arrays.

As the last 3 letters of APBID imply, one key function is to let less light in for portions of the eye that are sensitive (another way of saying providing more light to insensitive areas of the eye that need it). Thus, these are extremely similar to the worn BID embodiment described above which has a more traditional kind of "display". The BID display screen is, in an APBID, replaced with a gate array (e.g., a liquid crystal gate-array). A gate array (or references to an individual gate in such an array) as used herein is intended to include any device that has individually addressable areas whose light passage can be controlled by a processor. These include but are not limited to liquid crystal arrays, shutter-based spatial light modulators, electro-optic based spatial light modulators, arrays whose individual areas darken or lighten when activated, and, though not the preferred embodiment due to a diverted view path, even moving-mirror-based spatial light modulators (in an embodiment where the forward view comes to the eye by reflection off of a processor-controlled mirror array). This isn't that much different from the BID since the BID often has a gate array like a liquid crystal array) The "D" in APBID is still for "display" because this is still an active display for displaying an active image-it is simply a different kind of display. The "image" for the APBID is the natural scene light passing through the individually processor-controlled (or optionally processor gate-group controlled) gates of the gate array. The locations in the image (analogous to pixels) are the locations of the gates in the gate array. It is just a special kind of display and it doesn't require color filters since the colors are already provided by the scene ahead. Thus, explanations of the BID and its components herein are easily applied to APBIDs by reading BID descriptions with the understanding that, for APBIDs, the replacement for the BID display screen is the gate array and the image pixels of that BID display are, in the APBID, the gates of the gate array. Thus, the image is of the view of what's in front of the viewer (sometimes referred to herein as the "user") which, in this first described embodiment, is the natural color of the objects in that view.

Such gate arrays can reduce the amount of light passing through the gates by reducing transmissiveness (e.g., with liquid crystal arrays by controlling the change in polarization shift) and/or just reducing the amount of time the gate is open in a given time period. APBIDS are active in the sense that the array, like the display of the BID, is actively controlled by the processor to at least provide more brightness at points in the eye where it's needed. They are passive in that they do not emit internally generated light but only let external scene light pass through (albeit selectively).

Similar to the display-dependent BID, the APBID controls the brightness of each part of the image (here represented, for example, by a gate location instead of a display pixel) based at least in part on which parts of the viewer's retina each part of the image will encounter (brighter light for weaker parts of the retina) based on an ETA. Of course, with APBIDs the "light source" is light from the world in front of the viewer. The APBID ETA, 408, like the BID ETA, watches the viewer's eyes. The processor still uses that ETA data to identify where various portions of the instant image (e.g., light through analogous gates) will arrive on the viewer's retina preferably using the same approach as the ordinary BID as described herein. Based on that, the processor, analogous to the BID steps, directs the gates to allow more light to the weaker portions of the eye.

In fact, by thinking of the gate array with the world behind it as being analogous to an ordinary BID's display, the rest of the process is analogous to an ordinary BID and this description is less lengthy based on this already described process. The processor still identifies locations on the display (here the "pixels" of the shutter array) and controls the brightness thereof by allowing selected amounts of light to pass through the shutter locations (analogous to controlling the brightness of a pixel of an ordinary display based on where its light will strike the retina).

APBIDS are easily combined with other embodiments.

For example, an APBID is more affective when SAGA spike removal is processed by the same processor using either the ETA's image or another camera image thus describing an APBID+SAGA embodiment.

In another embodiment, an APBID processor directs a gradual dark adaptation by attenuating the gates in the gate array. Progress in this CDAM process can optionally be monitored by the already provided ETA camera or other camera or light sensor thus describing an APBID+CDAM embodiment.

In another embodiment, an APBID processor, responsive to any of the above mentioned light sensitive data sources including the already provided ETA camera, maintains a chosen "level" of dark adaptation (e.g., a measure of luminance to the eye or an equivalent "light climate measure" like "low photopic" or other measures) so that the viewer has "Instant Accommodation" to even sudden changes in ambient light thus describing an APBID+Instant Accommodation embodiment.

Of course other combinations like APBID+SAGA+CDAM and APBID+CDAM+Instant Adaptation, APBID+Instant Adaptation, APBID+PROD (just add either an SMW filter or filter array), SAGA (without need of APBID or APROD or with either or both of them)+CDAM and SAGA+Instant Adaptation, are good and useful embodiments.

APROD+APBID are a foundational combination wherein the processor selects brightness using APBID logic and effects that brightness as well as the mix of APROD SMWs at the same time.

APRODs can determine the levels of light to the eye (and the SMW nature of it as well) and thus APROD+CDAM, APROD+CDAM+Instant Accommodation (maintaining a level), APROD+Instant Accommodation In APROD embodiments with a forward looking camera or with an ETA, the embodiments APROD+CDAM+SAGA, APROD+SAGA and APROD+CDAM+Instant Accommodation (maintaining a level) are valid embodiments.

Also, with perceived color separation (PCP), the APROD filter array improves the eye's perceived separation of colors by permitting light to pass through selected gates in the array of light gates to filters in the filter array that permit the transmission of at least two wavelengths representative of two colors that the eyes of some have great difficulty distinguishing between. One good example is red and green which might be presented as 550 for green and 630 for red. By instead providing APROD-selectable filters transmissive of 515 for green and 650 for red (these are just exemplary numbers) and the APROD processor selecting to open the gates behind them to let red and green light through from the view ahead, improved separation of red and green is enabled and some cases of colorblindness aided. APROD can, as is extremely helpful, modify the color mix based on ambient light by choosing alternative filters (for example, red is harder to see in twilight (the Purkinje effect). In this specific case, APROD can attenuate the gates in front of green slightly (favoring red) and/or unattenuated the gates in front or red more. Dark accommodation (CDAM) makes this even more effective by having gates partially attenuated for CDAM that we can open to effect a bias).

That said, APROD+PCP, APROD+PCP+CDAM and APROD+PCP+CDAM+Instant Accommodation are useful embodiments.

PRODs work with any of the above with the addition of a filter layer. Thus SAGA (independent of any need for APROD or APBID functions)+PROD is an applicable embodiment.

Gate arrays are also useful in enabling an active passive retinal optimization display (APROD) which requires no display and provides a 3-D natural view of the foreground. Here, a filter array is placed either before or after and preferably adjoining a gate array with the elements of one essentially matched to the individual elements of the other. The filter is in the form of an array of filters including but not limited to approaches illustrated in FIG. 17E. In one embodiment the ratios of filtered light transmission of the SMWs with respect to each other are selected so that white light appears as white light to a viewer looking through the filter matrix by itself. Any embodiment may also include a lens, 174 in FIG. 17B, useful for size control (e.g., appearing nearer or further away and including the option of compound lenses), focusing, providing prescription optics to correct eye defects and/or simply to offset diffractive expansion in some gate arrays.

Without need for an ETA or a display, the processor can, by controlling how much light passes through individual elements of the gate array, control the amount of light passing through the individual elements of the filter matrix array. In this way, the processor can control the nature of the filter as a whole and the nature of light passing through it. This can be responsive in real time to user input or processor directed changes in response to ambient light detected via any light sensor and/or camera image (e.g., camera, 178, in FIG. 17B or CCD, 172, in FIG. 17C). In FIG. 17E's drawn example, SMW filters and the white (or missing) filters are arrayed to match the locations of gates in the gate array so that the processor can select the amount and makeup of the light passing through the gate array to be any combination of SMW-filtered and natural light. The locations of the white (or empty) filter locations in FIG. 17E may also be used to describe less restrictive filters, filters permitting broad bands of wavelengths which will look more like white light or just filters or transparent elements that transmit at least some of most wavelengths. In general, these are less restrictive elements in the array. The SMW-permitting filters, in the preferred embodiment, permit narrow bands of SMWs thus being somewhat restrictive.

In 177 of FIG. 17E a matrix of SMW filters and white (or vacant) locations is illustrated. In the preferred 177 embodiment each of the SMW filters permits three SMW bandwidths (one for each cone type; l, m and s) generally balanced according to ROD objectives discussed herein. In the preferred 179 filter array embodiment of FIG. 17E, "Red", "Blue" and "Green" are either individual SMWs or only distanced from them enough to broaden the gamut). Other colors/wavelengths may be included such as a longer wavelength red to extend the gamut and better distinguish red from green for those with color vision limitations. Recall that a 'pixel' here can be thought of as a group of gates that include filters for the all the colors. For example, in FIG. 17E a square area containing the leftmost 2 squares in the top two rows of 179 (being made up of 4 pixel elements; the SMW filters red, blue, green and white) can be discussed here as a pixel. 177 and similar filter arrangements over the gate array allows the processor to selectively control via the gate array how much light passes through and how much of it is made up of SMWs. These can be controlled programmatically and/or via viewer control as with "slider" control on the outside of 400, not shown). Of course, gate arrays and filter arrays are not always perfectly sized such that there is exactly 1 gate for every pixel element. Groups of either can be matched to one of the other but, for simplicity herein, they will be described as being matched 1:1.

The processor and/or viewer can thus control a number of factors just by controlling light permissiveness through the gates matched to or associated with the various kinds of pixel elements of 179 including the following or combinations thereof:

1) A brightness level determined by the light permissiveness of gates over (i.e. associated with) white and/or SMS pixel elements.

2) A retinal sensitivity level (e.g., lumens/watt or photopic efficacy) enhanced, for example, by increasing the ratio of light passed through gates matched to SMW pixel elements to light passed through gates matched to white pixel elements. The ratio is shifted in the other direction to reduce retinal sensitivity to the light. For a higher percentage of SMWs (and thus light passed that the retina is more sensitive to) the white gates are preferably dimmed while the SMW gates (gates with SMW filters over them) are more open.

3) A combination of 1 and 2. Controlling perceived brightness with selected combinations. The perception of brightness to the eye can be controlled by a combination of SMW gate permissiveness and white gate permissiveness. This processor controlled management of perceived brightness to the eye can involve the closing and opening (often based on how long gates are open) of both gates matched to white not-filters and gates matched to SMW filters. In the preferred embodiment (one that favors a high ratio of SMW to white although the opposite is an acceptable embodiment), as perceived brightness is being reduced, white is reduced first and (to continue reducing perceived brightness) only after most white gates are largely closed, are SMWs dimmed. Brightening is the opposite: opening gates over SMWs first (or at least most) followed, when gates over SMWs are nearly fully transmissive, by opening or further opening of gates over white elements.

4) A color temperature based on the processor and/or user-directed permissiveness of the various pixel elements associated with the various types of filters. Both filters permitting SMWs and those permitting different wavelengths are applicable here as desired. However, in the preferred embodiments the majority of the light passing the gates are SMSs.

5. Color separation perception. 179 in FIG. 17E illustrates a rectangular filter matrix embodiment (rather than other of the many equally applicable arrangements like columnar wherein a narrow column of "red" is followed by a column of "blue" which is followed by a column of "green" followed by "blue", etc. as is common). However, any layout for these filters is applicable including those that include not just one representation of a color (like red) but at least 2 different wavelengths for one or more colors. E.g., a shorter red and a longer red (wherein, for example, the longer red, when a gate for it is open, can broaden the gamut and further bias in favor of macular brightness over rod brightness) interspersed in the matrix. By selecting, optionally in real time, by processor gate degree of opening selection, the processor can select for the viewer a broader gamut of color (even in dimmer light). Where a plurality of wavelengths for a color or colors exist in the matrix, the processor can select better separated colors (e.g., longer reds and shorter greens as discussed herein) to improve vision for those with color-impaired vision. Thus, the embodiment of 179 (which can be expanded to include other bandwidth segments) can accomplish all of the objectives of the filter illustrated in 177 (where all SWMs were managed through 1 kind of SMW filter) and additional objectives as well.

6. Rod vs. Cone brightness Bias. Also, an optional bias applicable to AMD and other low vision can be applied which favors perceived brightness for cones over rods or vice versa. To effect a bias in favor of cone perception of brightness, the processor can reduce the transmission of light through gates over filter elements whose permissive wavelength tends to favor rods (i.e., blue or green) and/or reduce any gate restrictions for gates in pixels over red and/or white filters. An opposite bias that favors insensitive rods (such as for retinitis pigmentosa in cases where rod degeneration has preceded or exceeded cone degeneration) may also be enforced.

7. Dark adaptation support. To accomplish cumulative retinal sensitivity accommodation (CDAM) (as described at length herein) the processor can, in response to a light sensor, camera or user input, cause its gate selection to not only favor SMWs (typically, when darkening a pixel, diminishing the passage through the white gate first and diminishing it more than the SMW gates). The processor can also bias against rod response by selecting to restrict passage of gates whose matched filters permit wavelengths most proximal to those that the rods are sensitive to. Thus, this APROD is ideal for a CDAM strategy as described above.

The APROD and the PROD (PRO is described below) are also in a good position to add phototherapeutic benefits as described at some length above for therapeutic light using both RODs, ordinary fixed displays and worn displays. Also, where necessary, facial recognition via ETA is a good device for the processor to use to decide whose regimen should be implemented and for how long (since the processor can also determine by facial recognition the dosage plan for the thus-recognized patient).

The filter array component here does not actually have to be any different from the ones already described for LED displays (with modified filter components) so this will be abbreviated by reference here to that content. Any type of filter for any hue can be replaced by one potentially heavily permissive of a therapeutic wavelength or it can be a type that transmits any mix of bandwidths including SMW primaries and therapeutic wavelengths. Consider the filter array of 177 in FIG. 17E in an APROD where, at least in the case of this example, the arrayed SMW filters are all the same multi-bandpass filters permitting narrow bands of SMWs and any desired amount (percentage throughput) of narrow bands of therapeutic light. The percentage throughput for each therapeutic wavelength will be decided by dosage and, of course, how much is too much of a good thing. The processor can calculate how much dosage is administered using ambient light (from any sensor including photocell, ETA, camera, etc.) and the processor's system clock.

The filter of 179 in FIG. 17E can be seen as an array of 3 primary wavelength filter types (e.g., one type for red, green and blue; all of which may be narrow SMW ranges—which is the case we will presume here), an SMW type filter (which permits narrow bands of all 3 SMWs as well as at least one therapeutic wavelength) and a white (or clear non-filter or neutral density filter or one that is permissive of most wavelengths of light)). Thus, the APROD processor can pick and choose which gates behind which filters to accrete or attenuate passage of light and thus can provide therapeutic light only in the amounts prescribed, only for the periods of time desired and can even provide the wearer of a device with these filters while managing dark adaptation and instant darkness adaptation (as described above). When the dosage is done, rather than overdose, the processor can simply start using (alternatively opening the gates behind) non-therapeutic wavelength-transmitting filters. For example, to reduce or stop the dosage in this example it could stop opening or open less respectively gates behind the multi-bandpass (labeled "SMW" in 179) filters that were permitting the therapeutic light along with SMW colors and, instead, use (open the gates behind) the other filters for red, blue and green (which, in the preferred embodiment are individual narrow SMW bandwidths).

The processor can thus administer any number of therapeutic wavelengths only at times desired, only in amounts desired and discontinue and restart transparently to the viewer. Mixed dosages are easily dealt with. In the last example, the filters labeled SMW allowed SMWs (in any ratio implementers want to configure) as well as therapeutic wavelengths. If you want, for example, 3 therapeutic wavelengths to be used in 3 different amounts (say twice as much of therapeutic wavelength B as A and 3 times as much C as A then the light permissive percentage for B is twice that of A and C's light permissive percentage is 3 times that of A. Choosing the light permissive percentage of A determines how long the processor will want to use these filters but the comparative dosages can easily be determined by the ratios of the permissive percentages. In a worn embodiment these "smart sunglasses" protect from UV and IR while administering therapeutic light only as needed and only for as long as needed and in any light. As described for other applications, to darken the array (whether just adjusting down bright ambient light or as part of the CDAM dark adaptation process described below for a higher retinal sensitivity level and instant adaptation to sudden changes), it is preferable that the gates behind white filters be closed first so that SMWs don't have to be cut until the light is very bright. Similarly, when wanting to raise the amounts of permitted light through the gate array, the processor would begin to open up gates behind the SMW filters first and the gates behind the white filters only after gates behind SMWs are wide open. Another embodiment does not require the use of filters favoring SMWs (and thus isn't technically an APROD) but simply uses the above device and process to with any primaries to protect the wearer while administering therapeutic light. In all uses of the term "therapeutic light" herein this includes the many other types of therapeutic light not mentioned here. For example, certain wavelengths that help us adjust (and/or set) and maintain our circadian rhythms are therapeutic light and can be administered by the processor based on the processor clock's time of day and the implementer's schedule for light components for different times of day. Thus, the wearer of any of the worn embodiments can wear the glasses all day with restfully lowered and controlled light levels (the assembly that optionally adjusts instantly to even drastic and sudden shifts in ambient light while removing spikes with a SAGA component).

Figure 17B:
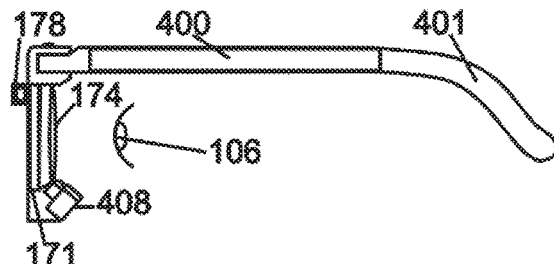
FIG. 17B is an illustration of a general embodiment of a worn assembly. Multiple components are displayed but not all are required in every embodiment.
Figure 17C:
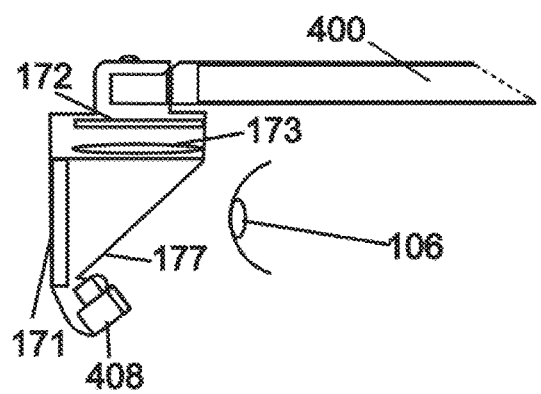
FIG. 17C is an illustration of a general embodiment of a worn assembly. Multiple components are displayed but not all are required in every embodiment.
Figure 17D:
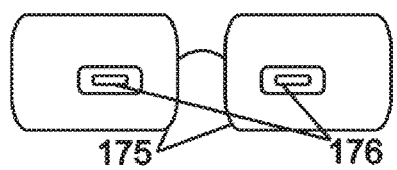
FIG. 17D illustrates the lenses of a worn assembly from the wearer's perspective. The lenses, 175, have portions, 176, with substantially less filtering than the surrounding lens, 175.
Figure 17E:
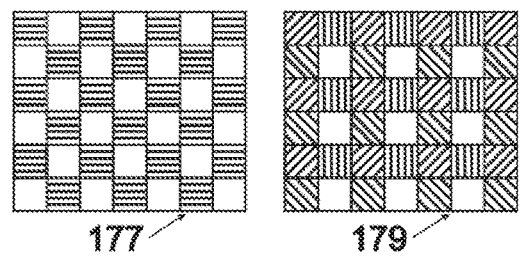
FIG. 17E illustrates a couple of options, 177 and 179, for filter arrays particularly useful in matched combinations with gate arrays for selecting a nature of light to send to a viewer's eyes.

With the addition of an ETA, like 408 in FIG. 17A-C, this processor capacity to selectively close individual gates allows the addition of APBID functions to the APROD. As with the APBID, the processor, according to the instant POI in the viewer's FOV (locations in that FOV being associated with locations in the gate array) are directed by the processor to permit the passage of more light to less sensitive portions of the eye. It does this by increasing the permissiveness of gates whose light will reach those less sensitive portions of the eye, etc. as already discussed for BIDs and APBIDs. Also, and optionally, using the ETA, the APROD can also partially darken areas not currently near the instant POI (at least for areas well outside the macular or at least foveal FOV) to effect a bias in favor of cone brightness and to reduce overall entry of light to low resolution and already adequately sensitive retinal areas (e.g., rods for AMD) reducing the amount of light to be scattered by cataracts and other intra-eye elements including a degraded lens envelope. Alternatively, in a reversal of that approach, it can effect a bias in favor of rod brightness (such as for retinitis pigmentosa in cases where rod degeneration has preceded or exceeded cone degeneration).

The presence of a camera or other sensory element (which can even be the camera image of an ETA based on locations of bright spots it detects on the cornea) can enable the gate array of an APBID, an APROD or a combined APROD+APBID to additively act as a spike attenuating gate array (which will herein be referred to by the acronym SAGA). Just one example is an APBID whose ETA camera image of the eye is used to trigonometrically ray-trace from camera CCD, based on the image, to eye and reflected to the gate in the gate array whose transmission of light needs to be attenuated. Thus, any embodiment with a processor, gate array and an ETA serves as a SAGA without need of a scene or forward camera. Of course, numerous other SAGA embodiments do use alternative cameras (like 178 in FIG. 17 A-B and the lens, 173, plus the CCD, 172, in FIG. 17 C or 192 in FIG. 19.

SAGAs, either as free-standing vision-enhancement embodiments or as enhancements to APBIDs and APRODs, attenuate light from sources that are pushing the high end of the visual system's dynamic range thus making it more difficult for the viewer to see dimmer portions of the view (reducing the viewer's net effective dynamic range). Thus, SAGAs reduce the detrimental effects of both light spikes (associated with headlights, the sun and/or reflected sunlight) as well as areas in the viewer's FOV that are simply brighter than needed. The processor matches gates on the gate array to locations of brightness in the viewer's instant FOV (that matching process is described in detail below), and directs the gate array to reduce light passing through each such gate in the gate array. The processor preferably contains rules regarding maximum tolerable brightness and those rules may take into account ambient light levels. Of course, for an APBID, when a thus-matched gate is receiving bright light, the amount of light the processor directs the matched gate to permit takes into account how much brightness the point on the retina it is destined for requires. If it is destined for a less-sensitive area that less-sensitive area will benefit from at least some of that extra light but, responsive to the extent that it will not, that gate permissiveness is reduced. Thus, for APBIDs, the maximum magnitude of light allowed to pass a given gate (and the dynamic range gradient continuum below that maximum) is, in the preferred embodiment, responsive by processor control to the sensitivity of the portion of the eye that light through that gate will impact. The degree of gate closure can be a servo process (closing in rapidly cycled steps until the sensor-read brightness is low enough) and/or a programmatic adjustment based on an estimated needed gate adjustment.

For APRODs the control of perceived brightness can be controlled, as described herein, based on either or both of shifting the permissiveness of gates (up or down to increase or decrease perceived brightness as needed) and managing the content ratios of SMW light to white light (which drives the perceived brightness). For both APBIDs and APRODs the amount of light passing the gates is at least limited to a ceiling (a maximum that the processor will allow. This at least largely removes blinding sources, glare and potentially even broader diffusion from cataracts and other diffusive elements. It also increases the perceived dynamic range of the viewer's eyes (w/blinding removed and the spikes area-concentrated burden on vision transduction chemistry at the point of the retina where it would have struck largely removed, unbleached chromophore concentrations naturally accrete allowing greater sensitivity to lower light levels as the brain's definition of "what is dark" is now changed). How a SAGA gate receiving excessive light is processor-identified will now be described.

Figure 19A:
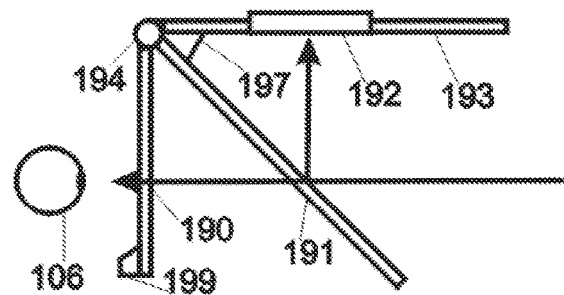
FIG. 19A illustrates the positional relationship between eye, 106, light gate array e.g., a liquid crystal array, 190, beamsplitter, 191, optional eye-tracking assembly (ETA), 199 and camera, 192.
Figure 19B:
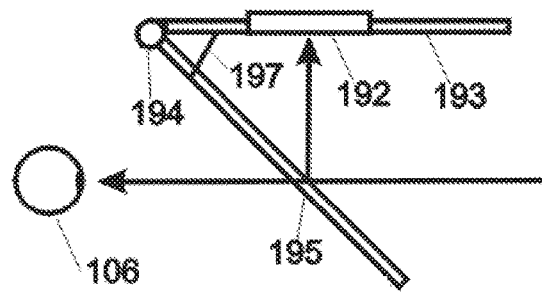
FIG. 19B illustrates with 195 a combination of the beamsplitter and the gate array (with the gate array preferably on the side proximal to the eye) and camera, 192.

A number of applicable methods, devices or combinations thereof for matching a bright light source in the viewer's instant FOV to a gate or gates in a gate array that should have light passage responsively adjusted exist. Several of the many applicable sensor and gate array frameworks for them are now mentioned. Preferred embodiments for each of these provide one assembly for each eye thus providing binocular input to the processor. While a single camera can in some embodiments (e.g., particularly where a distance sensor provides the processor with a distance value supportive of ray-trace calculations for points in the camera image, which is a valid embodiment) capture all of the information the processor needs to direct binocular embodiment, in other preferred embodiments there is preferably at least one camera for each eye.

a) One includes the beamsplitter (also viewable as a prism serving the same function), 177, combined with the lens, 173 and CCD, 172, in FIG. 17C receiving an in-line image of what the viewer sees that comes through a gate array, 171.

b) Another can be seen in FIG. 17C when 171 is seen as a clear plate of glass or is removed altogether and the gate array is between the beamsplitter (or prism), 177, and the eye. Preferably that gate array is attached to the beamsplitter, 177, on the side nearest the eye but it may also be separate and even vertical as the gate array 190 is in FIG. 19A.

c) Another can be seen in FIG. 19A having a camera, 192, observing the in-line image of what the eye sees via beamsplitter 191.

d) Another can be seen in FIG. 19B where the camera observes the eye's forward view reflected by a beamsplitter on the side of 195 distal to the eye (the gate array is on the side of 195 that is more proximal to the eye).

e) Another is the front-mounted camera assembly represented by 178 in FIG. 17B (also shown in FIG. 17A) with one being preferably mounted above each eye thus providing binocular input to the processor. The processes for matching points in these images with relative locations in space and thus their paths (e.g., through a gate array) are well understood.

f) An interesting new approach is a camera imaging an eye. Of course, in embodiments with an ETA this camera is normally already there. It is preferred to have a camera on each side of each eye but still functional with only one for an eye being protected), like 408 in FIG. 17 A-C or the ETA cameras represented by 199 in FIG. 19A (both, in the preferred embodiments representing multiple cameras), to enable the processor to identify a bright source's light path through the gate array and to the eye. It does this using processor-applied trigonometry (or other non-trig mathematical calculations) of the path from the relative location in the ETA camera (based on its captured image) to reflective points on the near semi-spherical portions of the cornea sclera (although they have different radii of curvature normally requiring separate math) and then to the gate through which the reflected light comes based on the relative locations of the gates in the gate array, the eye and the ETA camera. The different radii of curvature of the cornea (smaller) and the rest of the sclera (larger) are taken into account in the ray-tracing calculations. Thus, reverse-traced vectors of reflectance back to the gate(s) whose passage needs to be dimmed is one of the applicable calculations to identify which gates need to be attenuated (pass less light). How much each such gate will be directed to reduce transmission of light depends on the brightness of the point on the eye. Not all gates that need to permit less light are positioned to transmit bright spikes of light like oncoming headlights (locatable by bright spots on the eye). Gates around and very near gates attenuated for spikes can be partially attenuated to "feather" the edges thus both blending the transition along a processor directed gradient and dealing with light surrounding a bright source that is always there but might not be detected by the particular camera of the ETA. Also, some non-spike but brighter portions of the eye (based on the ETA camera image) are, beyond coloration effects, similarly indicative of brighter light coming through the gate array and the processor can similarly ray-trace back from bright area on eye to gate and direct the attenuation light coming through larger areas on the gate array (dimming very bright areas in the eye's FOV like sky). An excellent feedback loop is inherent in this embodiment particularly when a high frame rate permits much to be done in a very short time. For example, at a camera rate of 60 FPS (frames per second), if, for example, a spike occurs in frame 1 and gates are closed to attenuate it but it is not attenuated enough in frame 2 of the captured image, it can be corrected with additional attenuation only 17 milliseconds later. Similarly, if the math missed a bit, the darkened area won't be at the spike reflecting portion of the eye but will be nearby. Then, in the same few milliseconds, the central gate to be attenuated is relocated accordingly and, optionally, the scope of the feathering increased (wider area around the bright spot partially attenuated along a decreasing gradient away from that central gate-increasing until the brightness is down to processor tracked acceptable levels. This describes an embodiment that is independent of any APBID or APROD components but, instead just using a gate array, processor and ETA enables the use of lightweight and typically worn embodiment that greatly increases the effective dynamic range of the eye by removing the high end of the range that has overdriven the capacity of the retina to distinguish between levels. Thus, the viewer can then see things that are a lot less bright. Those with cataracts, floaters, degraded lens envelopes, etc. endure substantially decreased scattered light and thus blurring. However, while this is a fully functional device on its own, when adding this to an APROD and/or APBID assembly (including combinations), we remove multiple destructive elements than can actually overshadow the APROD and/or APBID benefits in environments where good vision is needed most.

g) 3-D capture in any of the devices and methods described herein provides the basis for well-known calculation of paths of light through the gate array. And, of course, any combination of any of these seven approaches is a valid embodiment.

Some information is always welcome to an engineer and POI distance is one of them. In the examples above (e) with its front mounted cameras benefits most while (a), (b), (α), (d), (f) and (g) fare well enough without it by relying on an in-line image or a ray trace to a known position (like the gate array of (f)). However, all of the above (a through g) with a distance sensor of any kind to identify a distance to a point or to points in the FOV of the eye(s) are fully applicable embodiments of the invention both as alternative calculations and as part of different calculations that improve accuracy.

In all SAGA and CRSA embodiments (including in combinations with other elements like APROD and APBID) the preferred embodiments not only identify the location of the gate in a gate array through which the extra-bright light comes When ray-tracing is the preferred method a couple of example traces are:

a) between the known location on the CCD of a camera imaging the eye to a bright spot on the eye (based on that image) and from the vector of where that reflection would have come from (thinking backwards using the reflected angle from the CCD off of the surface of the eye) to the gate array. The location of that intersection identifies the gate the extra bright light would be coming from.

b) between the location in an in line camera foreground image where the angles are directly calculable in one ray and the intersection of that ray with a location on the known position on the gate array identifies the source or c) both a and b. A superior calculation can be made when both views are available.

It is not only important that we identify a good light path to identify the right gate. In the preferred embodiments we measure the magnitude of the brightness of points in the eye's FOV to identify the magnitude of the required solution or even if one is necessary. For example, less gate attenuation is needed to correct for light from a tail light than from the focused and direct light from headlights on bright. For this, the image brightness of points in the image (for either or both of forward view cameras or cameras imaging bright spots on the eyeball). A scaled response (based on, for example, implementer preference, task and time of day) is, in the preferred embodiment considered against a standard (also chosen relative to implementer preference, task and time of day). As subjective as standards or the levels of light that those standards quantify can be, luminance is one useful measure of light level. On a sunny day the luminance of a white highway (candellas/square meter of highway) is bright and scene luminance is one good unit of measure for light level (as well as, when available, measures of illuminance, luminous flux, luminous intensity, etc.). However, it is perfectly scientific to test subjects and record how bright the spots are on the camera image when perception is negatively affected (which, though subjective, is the bottom line we're actually dealing with anyway). By whatever measure, an acceptable level is established.

For CDAM (controlled dark adaptation management) discussed below, the processor gradually reduces the available light down to a chosen level (chosen by user and/or implanter and/or processor code). In the preferred CDAM embodiment it then maintains this level once achieved (perhaps low photopic) by opening up or attenuating the gate array responsive to suddenly darker or lighter ambient light respectively. Thus the assembly modifies light passing through the gate array to maintain a stable light level. What a stable light level is will vary by viewer, implementer and task and may vary more by environment (e.g., how fast things change and by how much). It will also vary by the presence or absence of SAGA operation since it protects from some rapid changes. One ballpark measurement might be that a stable light level is a level attained and maintained within plus or minus 40% in field luminance but that is just an exemplary suggestion and not a requirement.

All of the above SAGA elements can function independently from APROD and APBID functions. These independent SAGA units can be made up of just a processor, gate array and ETA as explained in option (f) just above wherein the ETA camera image is interpreted to identify what gates to adjust and how much. FIG. 17A and FIG. 17B can be seen as that SAGA unit with the ETA, 408, observing the eye, 106, so the processor in 400 can identify which gates in the gate array, 171, to adjust. (The forward camera, 178, is not included in this example embodiment since the ETA camera suffices.) The ETA camera of 408 shows an eye-illuminating light source (in FIG. 17 A-C it is shown attached and above 408). This is optional but frequently assumed to be part of any good worn ETA. In every mention of ETA herein, the optional presence of such illumination is presumed. Typically, this light is outside the range of human vision in order to be non-distracting. Most often infrared LEDs are used.

Another independent SAGA unit can be understood to be represented using foreground cameras like 178 in FIG. 17 A and B or the combination of lens, 173 and CCD, 172 in FIG. 17C as well as 192 in FIG. 19. Just a forward camera, gate array and processor provide all that's needed to be a SAGA unit (blocking excessive brightness via the gate array according to the image as described herein). (ETAs 408 and 199 are not included in this example since the camera suffices.

Adding an ETA to this embodiment enables real-time correction of even substantive changes in position between eye and gate array (it provides the processor with the data to adjust the gate selection calculation as described herein). This is highly amenable to a worn embodiment (like FIG. 17 A-C) or a pull-down sun-visor (FIG. 19 can be seen as a pull-down sun visor as well as an example of general eye and optics positioning.)

As useful as independent SAGA units are, when added to an APBID and/or an APROD, that new assembly is able to provide substantially better perception than any of them alone.

All of the above SAGA elements work best with the eye(s) properly positioned with respect to the gate array which is easily accomplished in a worn embodiment or a static viewer. Although multiple calculations are practical (and applicable), in one the processor effectively identifies potential path(s) of light through the gate array and to the eye based on the known spatial relationships between camera, gate and eye to identify which gate(s) (e.g., those gates crossed by those paths) need to be attenuated and by how much (based on image location brightness). "Feathering" around the gate location(s) to be attenuated allows a view that is more forgiving of small positional shifts and scattering of light around bright areas. In other embodiments and for less disciplined viewers and more rugged environmental conditions where the spatial positioning and alignments of the eye and the gate array are prone to shifting (for example the eye 106 in FIG. 19 could even move quite a lot) or even just to more precisely accommodate for significant shifts due to eye rotational travel, the processor for such embodiments uses ETA data (and/or any other means of identifying the instant spatial relationships between an eye and a gate array). For example, since the gate array and camera are normally fixed in their spatial relationships to each other, a bright spot ray path calculation through gate array to the new ETA-identified position of the eye allows real-time correctable identification of gates intersecting those paths that lead into the eye (thus identifying gates to be properly attenuated).

In unusual embodiments where the spatial relationships between gate array and camera are allowed to shift, that shift can be dealt with by the option (f) feedback loop described above (e.g., by ETA camera recognition of a bright reflection on a cornea that is uncorrected between frames) which can then be corrected in calculation based on the location of that bright reflection (presuming no automated alignment equipment is provided which is another solution).

The processor decreases the light passing through gates thus-identified as passing more light than prescribed to the eye according to its set of rules and/or brightness maximum levels and/or ambient light conditions and/or user input via any user interface. For (a) and (f) above (the others don't need it), it is useful to provide reference frames (a short frame making up a tiny slice of a relatively high camera frame rate) where the gate array passage is not thus-reduced or is reduced less. Alternatively, and preferably, during these reference frames a uniformly restrictive gate array transmits, just as an example, ⅓ of incoming light (either by partial gate closures or timesliced passage). Either of these short reference frame approaches provides the sensors behind the gate arrays with a feedback-loop view of bright areas without significantly affecting the viewer's view. For all of them it is also useful to "feather" a less restrictive gate area around those gates that are restrictive due to bright light sources and do so along a gradient (less restrictive the further from the bright spot's actual area) to smooth the edges of the corrected view and forgive small positional and latency-based error. Adjustments to all of these controls can be programmatically responsive to conditions (like ambient light level) and/or user input (e.g., via a slider on 400 or any user interface).

One lean embodiment only removes brighter areas as just described. That is, it has no APBID or APROD functions. This effectively clear SAGA display for use in bright sunlight and night driving can be illustrated by looking at a couple of worn embodiments of this SAGA-only assembly in the images of FIG. 17C and FIG. 19A (where FIG. 19A is imagined as a worn assembly just for this example). The paths from bright lights ahead and through the gate array (190 in FIG. 19A or, in FIG. 17C preferably located on the side of the beamsplitter, 177 nearest the eye) to the eye are calculated based on the camera image as described herein. The SAGA only embodiments have all the SAGA benefits as described anywhere herein except that they do not perform APROD bandwidth selection or APBID brightness bias in favor of weak areas of the retina. Another clear SAGA assembly (which can also have an APBID and/or APROD functionality added to it as should now be apparent) is described in FIG. 19 when seen as a sun visor (optionally with pull-down components in order to function like an ordinary sun visor albeit a transparent one). While transparent, both of these embodiments can also respond immediately to changes in ambient light by general attenuation of the gate array as a whole (preferably uniformly except for locations requiring even more reduction for bright spots). In the preferred embodiment, a slider on the assembly (not shown) or other user interface allows the viewer to adjust the general level of permissiveness of the gate array (e.g., high, medium and low and points in between). However, the processor still can adjust the light level up and down (by attenuating the gate array less and more respectively) around this viewer-chosen general level as ambient light goes up and down. Thus, a viewer can choose a general level and the processor will effectively keep it there by adjusting the gate array responsive to changes in ambient light while continuing to simultaneously further attenuate gates in the path of bright light to the eyes. Obviously, it is a small matter (a software adaptation) to go from attenuating spikes to further increasing effective retinal dynamic range by reducing even large bright-ish areas enough to allow the viewer to perceive less bright areas better. For example, when driving west in the late afternoon, it is nice that any SAGA-enabled system will diminish the sun's actual footprint but it is also preferable that areas of much higher brightness than other areas in the FOV (e.g., the sky around the sun) be somewhat diminished as well. Anyone who, on a cloudy dark day, has seen a beam of sunlight come through a break in the clouds to illuminate the landscape while the clouds above protect from the bright sky understands the value of this. Like the clouds, the SAGA, when dealing not only with spikes but appropriately dimming very bright areas as well (though not as much of course, according to implementer rules in processor software) can greatly enhance the visibility of even much darker areas. This applies to all SAGAs whether having APROD and/or APBID functions or not.

Embodiments having the basic approach of FIG. 19 may have a single assembly for both eyes i.e. a gate array wide enough to protect both eyes. Thus, gates attenuated will include any gate that would otherwise send unacceptably bright light to either eye. Another embodiment involves an assembly like any of those in FIG. 19 for each eye. In the sun-visor embodiments, these two would preferably share the same flat pull-down visor (and thus share a visor). Their distance apart (they can also be adjoining) and the widths of each (to the viewer) are chosen to provide a good wide binocular view ahead.

The gate array for the APBID is between the eye or eyes of the viewer and the view the viewer is looking at. In various other embodiments that means it is in or on the windshield of a vehicle, a clear (when all gates are open which, in the preferred embodiment is the unpowered default condition for safety) pull-down sun visor in a car (as mentioned above; one that you can see through in bright sunlight or dark e.g., as shown in FIG. 19) or the visor of a helmet or a worn glasses-like assembly like FIG. 17A or FIG. 17B. It can also, as above described, be any worn device. In all of these embodiments, other unwanted light that doesn't come through the array can also be blocked or masked by ordinary devices included but not limited to light-blocking forms (like panels, such as 196 in FIG. 19C, or light shrouding particularly around the eyes for worn embodiments as is commonly used for virtual reality goggles) and transition films, lenses and plates (that darken responsive to brighter and/or higher UV level light). A gate's passage may also be limited according to an overall scene brightness based on the camera image output to the processor. This also allows the assembly to dark adapt with benefits described herein (see CDAM).

It is not necessary for each pixel of a camera-captured image to be associated with a single gate in the shutter array. Thus, some implementers will combine and or extend these associations beyond such a 1:1 matchup wherein 1 recognized bright camera pixel can represent a plurality of gates or 1 gate can represent a plurality of camera pixels. Based on this association, the processor identifies the brightness of each "pixel" of the viewer's FOV that is controlled by each shutter. The processor then controls that brightness of each "pixel" by how long its shutters remain open and/or the permissivity of the gate as is common practice for such shutter-driven brightness control. Color for APBIDS can be completely unmodified and natural. Additively, color can be controlled by a an APROD or PROD assembly described further below.

Figure 19C:
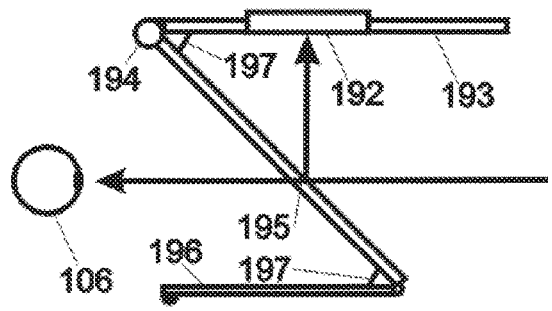
FIG. 19C adds to the device of FIG. 19B an ambient light-blocking component, 196.
Figure 19D:
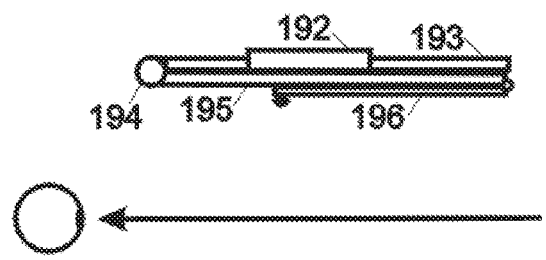
FIG. 19D illustrates how the device of FIG. 19C can fold up like an automobile sun visor.

So the auto sun visor of FIG. 19A uses a SAGA assembly including the gate array, 190, to remove bright spots (as described above) and areas of excessive light (like headlights and sun) that reduce the viewer's capacity to see less bright objects like pedestrians. In FIG. 19A the beamsplitter, 191, provides a reflection of the viewer's view ahead to the camera, 192. The assembly is mounted on a mounting plate, 193, optionally rotates on hinge, 194 and the motion of 191 is limited by the band, 197. 190's position is managed by the friction of 194 to provide viewer adjustment. The processor and power are not illustrated but may be located with the camera, 192. 195 In FIG. 19B is a beamsplitting surface with a gate array located on the side of 195 proximal to the eye 106. The reflected image from that reflective surface to the camera causes the connected processor to reduce light passage in gates matched to bright spots in the camera image as described above. In FIG. 19C another embodiment that pulls down from the roof mount is shown with the optional addition of a black anti-reflectance panel, 196, to block reflected light from below from reflecting off of 195 and into the viewer's eye, 106. The downward travel of the assembly is limited by the bands, 197. In FIG. 19D it is shown folded to the roof.

Not pictured is the camera-less embodiment that matches gate location with level of brightness by a transparent light sensitive layer of arrayed sensors positioned (preferably physically against) and matched to the gates of the gate array 190 as discussed herein. Gates thus matched to a sensor in that array that is reporting to the processor a brightness in excess of processor-controlled goals are directed by the processor to reduce light passage to meet those goals.

The viewer dynamic range enhancing and spike protective elements of FIG. 19 are applicable embodiments, even those that have no BID, ROD, APBID or APROD components. However, the assembly as drawn additively becomes an APBID when the processor code additively adds an ETA like 199 or uses the camera, 192 (and/or a pair of cameras arrayed in an ETA layout) to identify where light though the gates will arrive on the retina and directs the already described APBID bias (more light to less sensitive areas). And/or adding a passive SMW filter (like a PROD that is described below) adds ROD features. Similarly, the assembly as drawn becomes an APROD (described further below) when the gate array (either 190 or the one on 195) is matched to (and preferably mounted against) an SMW filter like the ones described in FIG. 17E and in the APROD description below.

APBIDs and APRODs can also be programmed to control the levels of light facilitative of dark adaptation and enabling processor-driven auto-adaptation The APROD can, as discussed above, without need of an ETA component, control the light passing through the gate array (which may be responsive to a light sensor or camera as discussed) to facilitate dark adaptation. This is preferably progressive along a scheduled darkening so that the eyes adapt but without there being blind periods where the eye hasn't "caught up yet". When the APROD embodiment includes any form of light sensor (as discussed for APBIDS) APRODs can also auto-adapt effectively in real time to even very sudden shifts in ambient light levels.

Further improvements in making the retina more sensitive and/or improving the viewer's perception by good light management and expansion of net effective dynamic range are made possible by controlled dark adaptation management (CDAM). The difference between CDAM and CRSA is that CRSA controls dark adaptation for a display (actually any display, not just a BID or a ROD) and CDAM is applicable to any embodiment where a gate array in the viewer's line of sight of the natural view ahead has replaced the display. Thus, omissions regarding one herein may be applied to the other except as regards the obvious distinctions between the image source.

In BID and APBID embodiments, light headed for areas of the retina that can tolerate lower light for stimulation will already receive reduced light (compared to less sensitive areas) to provide a bias in favor of less sensitive areas. However, one family of embodiments of the current invention, including RODs, BIDs, APRODs and APBIDs will intentionally reduce light for other reasons. In any of these cases, the processor's sources of information on instant light levels can come from any photosensors and/or camera(s) in the assembly. In fact, in any CDAM or SAGA embodiment, including those having no APBID or APROD functions, information needed by their processors regarding ambient light levels or particular points or areas of bright light in the viewer's FOV can come from any camera (not just those like 178 and the combination of 173 and 172 in FIGS. 17 and 192 in FIG. 19) or any ETA viewing an eye (not just those like 408 in FIGS. 17 and 199 in FIG. 19). For example, posterior-facing cameras like ETA cameras (e.g., 408 in FIGS. 17A, B and C and 199 in FIG. 19) can measure ambient light based on the brightness of the captured image of the eyes and surrounding areas, brightness of reflected glints on the eye and almost all (perhaps all) ETAs measure pupil diameter which is yet another indication of ambient light. As described above for SAGA, ETA cameras can, with no other camera than the posterior-facing ETA camera, direct the blockage of bright lights which substantially enhances the capacity to dark adapt while the same camera image provides indications of ambient light from a) image brightness, b) bright spot intensities and 3) pupil diameter. Thus, for example, an APBID or an APROD (or a combination thereof) embodiment having a gate array and ETA has the capacity to perform CDAM.

Both rods and cones adapt to reduced light (the cones become as much as 100 times as sensitive in darkness than in daylight and the rods at least 10,000 times more sensitive in darkness than in sunlight). Also, melanopsin-containing ganglion cells exhibit both light and dark adaptation based on the recent history (typically measured in minutes) of light exposure. Thus, one important, though optional, strategy for maximizing brightness perception with less radiation is to, in RODs and APRODs (and the PRODs described further below) permit selected passage of wavelengths that the light sensitive ganglions known to increase perception of brightness at their locations in the eye's FOV are maximally sensitive to (they have sensitivity curves too). Lockley et al. in 2003 ("*High sensitivity of the human circadian melatonin rhythm to resetting by short wavelength light*". *The Journal of Clinical Endocrinology and Metabolism.* 88 (9): 4502-5. *PMID* 12970330) showed that 460 nm (violet) wavelengths of light most affect the photosensitive melanopsin-containing ganglia. In the fovea (center of the retina), a single ganglion cell will communicate with as few as five photoreceptors compared to more peripheral ganglia having to service thousands of them. This is an effective means to facilitate and increase a brightness bias in favor of cones. However, ideal wavelengths for ganglia-based brightness perception enhancement will vary by person somewhat and even in classes of persons based on selective wavelength absorption of lens, cornea and intraocular components. This is done while the filter is still selective for SMWs.

Light sensitive ganglions are also part of the brain's perception of brightness at their areas of the retina and their dark adaptation makes them more sensitive as well. Another factor that is not as generally promulgated as other factors is that higher levels of radiation to the retina increases the oxygen demands of the vision transduction system. So, avoiding excess radiation (i.e. any more than is needed for perception and certainly any more than the existing chromophore concentration can fully absorb) by limiting light to each sensor type to the minimum needed for perception provides a number of advantages.

Also, in worn embodiments non-display light (any light that isn't coming from your desired FOV, e.g., peripheral light) can be blocked by parts of the worn assembly. For an ordinary display, the room lights can be minimized. Lower incoming radiation of all kinds can additionally extend effective dynamic range since a higher unbleached pigment content enables sensitivity to lower ranges (and human perception changes the perception of "what is black".

Multiple embodiments of APRODs, APBIDs, APBID+APROD combinations and fully independent CDAM Units (that have no APROD or APBID functions but are independent devices on their own) will accomplish and apply CDAM applying and/or enabling any of (or combinations of):

a) General light reduction to facilitate dark adaptation. By reducing the amount of overall light to the eye, adaptation associated with augmented unbleached pigment levels (ordinary dark adaptation) is accomplished which makes the retina even more sensitive to light from the display and able to function with significantly reduced radiation to the eye. It also reduces magnitudes of luminous intensity to the retina that must pass through (and scatter from) cataracts, degraded lens envelopes, intra-ocular floaters and corneal irregularities.

b) Scheduled Adaptive rate-based (timed) and ambient light responsive controls to keep brightness levels in line with the current levels of sensor adaptation (cones, rods and light-sensitive ganglia). In one embodiment with no light sensors (just a gate array in front of the eye controlled by a processor), a gradual progressive attenuation of light passing through the gate array will gradually attain eye adaptation. However, in a more sensitive embodiment, a light sensor enables the processor to control the brightness levels to the eyes taking into account ambient light and temporal changes therein. Applicable sensor examples include but are not limited to a front-facing light sensor or photocell, a readout from the ETA camera that is watching an eye and/or a forward camera. (Some CDAM embodiments already have a forward camera e.g., an independent CDAM Unit, an APBID or an APROD having a forward camera with one example being the lens, 173, and CCD, 172, of FIG. 17C as well as the camera 178 in FIG. 17A and FIG. 17B). Of course, for a ROD or BID display, the display output levels can simply be reduced over time, as some will do, but matching that displayed brightness to the actual ambient light is a better reproduction of the forward view.

There is also preferably a set of rules for the processor code to follow for different light environments. The BID processor, watching the progress of time on the processor clock while noting ambient light levels over time, can thus reduce the light much more maximally for light that will reach the rods and with more precision by tracking the current level of rod and cone adaptation according to known cone and/or rod adaptation calculations based on ambient light over a period of time. Thus based on the instant processor-estimated degree of adaptation for rods and cones, the BID processor, knowing how much more sensitive a cone and/or rod is at the moment, calculates a reduced brightness level for dark adapted areas in an amount driven by that degree of adaptation. Thus, by adjusting the brightness to send to the eye based on instant retinal sensitivity, the processor can better flat field the image for improved perception. This is also extremely helpful in capitalizing on dark adaptation. Calculating the instant sensitivity of the retina enables the processor to best provide the viewer with a level of light that is adequately perceivable while still gaining and maintaining adaptation.

One CDAM embodiment requires only a processor, gate array and light sensor of any kind. Here, the processor progressively leads the eye to adaptation responsive to the programmatically considered rates of eye dark adaptation by gradually reducing light to the eye via the gate array. The array is uniformly darkened rather than being location specific in the preferred embodiment of this lean CDAM example since it doesn't require any BID or ROD related functions. When the light sensor indicates a shift in light level, the processor directs a shift (in either direction as needed) to keep the eye's adaptation to a comfortable level of adaptation. Thus, the eyes are not as vulnerable to sudden light changes. SAGA-enabling this CDAM-only assembly (to attenuate spikes and bright areas) requires only the addition of a camera to provide the processor with information indicative of which gates need to have light passage reduced as is discussed herein.

c) SAGA-enabled APBID, APROD and APBID+APROD combination embodiments (as described herein) will also contribute as part of overall brightness reduction to the eye facilitative of dark adaptation by largely removing spikes (down to acceptable but optionally still perceivable levels) and/or reducing the brightness from areas (e.g., the sky) in the viewer's FOV whose brightness is above an implementer or user input limit or set of rules.

We can help the viewer (e.g., in evening driving) further by reducing the dynamic range requirements (e.g., by dimming image spikes and other bright areas that diminish perception of less bright components). For example, in the worn display embodiment displaying a foreground image from a foreground camera, an image brightness cap is placed on light that reduces, e.g., headlights to minimally perceivable levels while, by doing so, reveals details of less bright portions of the viewers FOV. This, of course, by slowing the rate of opsin isomerization also increases the ratio of unbleached chromophores to bleached chromophores in the retina making the entire retina more sensitive to light. These evening vision controls can also be part of a BID, ROD, DRD, or any combination thereof. Contrary to some publications, the cones are, in fact, operational in large if not all portions of the mesopic range and all of the BID, ROD and DRD functions are also applicable there. However, the worn embodiments of BID, ROD and DRD can be the most effective in daytime by both controlling the above but also managing ambient light reaching the eyes (e.g., with blocking of light that's not from the desired FOV). Not only providing a better means, particularly in daytime, for limiting the view's dynamic range, these allow dark adaptation that expands the effective dynamic range even in daytime of the retina.

d) Up and Down adjustment. The "light source" for APRODs and APBIDs is the luminance of the scene ahead (the viewer's FOV) and the image is the scene itself. Though it is obviously possible to attenuate "pixel-like" sections of that FOV (by at least partially closing a gate), it is difficult to add brightness where it was not in the scene FOV. However, with sufficient dark adaptation (wherein the gates are partially closed to support adaptation), it is possible to add brightness at a "pixel" (gate) by reducing the amount of that closure (because of the processor-directed gradual eye adaptation that permitted that closure without discomfort or blind periods).

Using that facility and with sufficient ambient light, one optional and applicable approach to both favoring dark adaptation and improving viewer perception for some low vision conditions can actually include reversing displayed images (reversing dark and light). Sometimes referred to as "reverse video" according to the known levels of adaptation e) Instant Adaptation Facilitation Sudden changes in lighting that are too fast for the eye to adapt to are problematic for all but, for those with low vision (as well as healthy drivers and pilots), it leaves them in a dangerous slow-adaptation hiatus (and, sometimes, there isn't time to wait 20 minutes for the eyes to adapt). While gate arrays are great for reducing throughput of ambient light instantly, they can't make more light when there isn't enough. An embodiment that enables the viewer to go from dark to light with effectively instantaneous dark and light adaptation is now discussed. This APBID (and the APROD as well) may be programmed to favor dark adaptation by the processor gradually reducing the throughput of the gates over time. This is preferably performed on a schedule based on the physiological progression of eye-adaptation over time. In a more advanced embodiment, this is made more effective by sensing ambient light level with a light level sensor (normally a light sensor located facing forward or the camera image from any camera in the embodiment potentially including the ETA camera like 408 in FIG. 17A viewing the reflected light from the eyes). With this feature, the processor can better apply the programmed rate or schedule for gradual reduction in light to the viewer's eyes. The goal is to cause the eyes to adapt, responsive to gradually less light reaching the eyes through the gate array, at a processor-controllable rate based on how quickly the eye can accommodate without periods of low vision. Thus, it facilitates eye dark adaptation. Some implementers will take this adaptation down as far as some point in the mesopic range or even into the scotopic range but, for daytime use, it is more practical to gradually brings the eyes to an adaptation level roughly between low photopic and high mesopic.

Auto-adaptation facility: It can do this even when ambient light shifts drastically up and/or down for implementers who have the processor direct the gates to, in response to sudden increases in ambient light, reduce the brightness (ideally down to the scheduled/programmed brightness for the instant point in the adaptation schedule) and to increase the brightness transmitted in response to ambient darkening. Both in terms of reactive gate opening to sudden darkness (while the retina is already sensitized via adaptation even though there has been bright ambient light before) and reactive gate closing when ambient brightness suddenly increases) the retina is kept in a "ready" mode that can deal (with the help of the processor-driven gate array) with even sudden substantial shadows or flashes of light. These are applicable to pilot goggles and driving glasses as well since here sudden shifts in ambient light are a significant challenge to safety. Here especially a clear true-vision view of the world ahead (as opposed to even a high-quality 2-D redisplayed forward image) is prized.

With the eye thus adapted to an implementer-chosen level (which may be based on time of day which may also be based on the system clock associated with the processor) the viewer is always ready for shadows or sun with this capacity to react instantly to changes in ambient light rather than having to wait 20 minutes for the eyes to accommodate. A chosen level can be selected by the viewer to find the level of adaptation most individually acceptable to that viewer. The user interface can allow the viewer to, for example, slide a finger on a slider, not shown, and the glasses will darken (attenuate gate array) or lighten (open up or accrete the light through the gate array) based on the direction of the slide. Once a chosen level is located, the processor can remember it in any appropriate measure e.g., measured average luminance (candellas/square meter) or high-mesopic or low photopic (and any number of alternative measures of the light climate of the eye behind the gate array at the level the viewer was most satisfied (i.e., the chosen level). The processor can also make programmatic adjustments to chosen level based on time of day or ambient light levels. Implementers may also enter data for identification of chosen level to be used by the processor.

Achieving some level of dark adaptation (even in bright sunlight) so that the cones are much more sensitive enables the cones to be more sensitive and to have a better dynamic range. Yes, the more light that we send there (ideally minimized by the removal of bright light sources as described herein), the less the eye is adapted and using this adapted leverage too much will spend some of the advantage. However, just by thus slowing the demands on visual transduction chemistry by adapting to and staying at lower light levels, a maintainably higher ratio of unbleached chromophores to bleached chromophores is achieved. Also, challenges to the supply systems of visual transduction (like mitochondrial oxygen demands that may encourage damaging revascularization and drusen buildup responsive to too many photons too fast) are reduced for safety and slowed progression of AMD and other low vision pathologies.

These adjustments to at least general brightness are, in the APBID, not in competition with the BID functions of more light to parts of the retina where it's needed. The BID-based brightness bias in favor of weak retinal areas is still enforced while the overall brightness through the gate array is maintained. Similarly, in embodiments where bright-spot removal is included, most implementers will program the processor to adapt the general brightness taking into account the essentially simultaneous removal of the bright spots ("essentially" was used here because some implementers will, instead of a 1-shot calculated correction, use a servo process for bright spot removal i.e. dimming a bright spot in steps until it reaches the desired level).

APBIDs and APBID+APROD combinations can treat dark adapt rod areas and cone areas separately by managing overall light to areas dense with rods differently than overall light to areas with high cone density.

One independent CDAM embodiment (not necessarily a part of a APROD or APBID) is made up of only a gate array, a light sensor (preferably measuring either ambient light or light off of the face or eyes of the viewer) and a processor. Here, as described herein, the processor gradually leads the eye to dark adapt by slowly lowering the level of light to the eye over time by attenuating the light passing through the gate array more over time so that there are no blind periods while adapting. That can be hard to do with ambient light going up and down all the time so the processor keeps light levels from substantive fluctuation by closing the gate array up some or opening it up some responsive to more ambient light or less ambient light respectively. Once attaining a desired light level (e.g., high mesopic or low photopic) selected by implementers and/or user adjustment via any user interface, it maintains that All of these dark adaptation control and facilitation processes and advantages are also applicable to other embodiments including some discussed further below. For example, the active passive retinal optimization display (APROD) that is discussed next also has the ability to control brightness through a gate array. So, the same approach and process can be used with the APROD to facilitate dark accommodation according to a schedule that leaves no "blind" periods of inadequate adaptation and then reactively and effectively instantly auto-adapt for the eye. The only significant difference in this and the APBID dark adaption and APBID auto-adaptation is that the APROD does not need to simultaneously take into account the BID brightness bias when calculating gate openings for the next time cycle (where "the next time cycle" can be analogous to the next frame of a video when these steps are sequential in nature).

The above apply to APRODs, APBIDs and combinations thereof.

By limiting light particularly to areas of the eye that need it less, BID and APBID goals are better met. With AMD and retinitis pigmentosa (at least in those cases where degrading of rods precedes or exceeds cone degeneration) there is a brightness bias in favor of the cones (more light to them). To selectively help balance the difference in the adaptive capacities of cones and rods, using the ETA data, the BID processor can provide less light to portions of the retina (e.g., extra-macular) where there are mostly rods and more to cones. Of course the bias is switched to more light to areas of rod concentration in retinitis pigmentosa cases where rod degeneration has preceded or exceeded cone degeneration (more common). In any case, the processor can also blend implementation of that bias along a gradient at the boundaries of the sensitivity differences to make the adaptation more invisible to the viewer.

The APBID performing these adaptation-related functions can also selectively sensitize one area more than another. For example, the general adaptation-facilitative darkening of the extra-macular areas of the retina can be managed by the processor to be substantially less than the adaptation-facilitative darkening of the cone-dense areas so that the cones are kept at a more sensitive level than the rods (or the opposite for low vision caused by insensitivity in rods or implementer preference). Thus, the processor-calculated amounts of and schedules for auto-adaptation for areas associated with cones (based on implementer choices) can be different due to their different instant sensitivity levels as calculated by the processor according to the amount of light striking over time. The area chosen for more dark adaptation can be the shape of the scatoma on the retina. Also, different portions of an area (like rods, cones and/or scatoma shape) can have both different levels of adaptation and different levels of brightness bias since sensitivity usually varies within such areas.

RODS can effect a favorable bias by using very narrow bandwidths around SMWs for the gamut used favorable to the cones (whose maximum sensitivity peaks are idealized right at those SMWs).

Color controls to minimize rod sense of brightness and/or effect a bias in favor of the less sensitive sensors. All forms of RODs (including APRODs and PROD glasses) have the ability to bias against, for example, rods and in favor of cones. Regular ROD implementers can choose SMWs and the general relative levels for the 3 "color" components therof e.g., making reds brighter than normal and blue and/or green more severely filtered (which can simply mean their permitted wavelength bandwidths are narrower than for red) to filter out most of the rod's sensitive wavelengths thus effecting a bias. The Purkinje effect, a symptom for and indicator of the eye's natural bias towards rods in low mesopic and scotopic light, is thus ameliorated as the ROD favors the retina's longer cone sensor's best absorbed wavelengths which are distal to the absorption/sensitivity peak of rods. The APROD can be even more selective in terms of chosen wavelengths. This balancing the brightness of light to rods and cones also helps to minimize perceived distortion caused by large shifts in perceived brightness due to shifts in sensor sensitivity in different areas.

Most RODs and APRODs also predominantly limit light passage to SMWs which require less light for perception, less light to stimulate light sensitive ganglia for rods and also less light making it through to be diffused in the eye by cataracts and degrading lens capsules.

Dark adaptation and auto-adaptation: As already described above, APROD embodiments having a light sensor of any kind (which can be the camera discussed above, a photocell or even the ETA camera by watching the reflections on the eye and/or face) are also capable of facilitating dark adaptation (preferably according to a processor directed schedule based on the rates of eye adaptation). Ambient light can be estimated by measuring light level before passage through the gate array or by measuring how much light is coming through the gates (according to a light sensor and/or a camera viewing light after it passes through the array). The processor progressively dims the net light to the eye at a desired rate for smooth adaptation without a period of blindness as the eyes try to "catch up". APRODs can effect that dimming both by degree of closure of gate array elements and/or by selecting gates that are at least partially open to be SMWs or other wavelengths that the eye is less sensitive to. In the preferred embodiment with this feature, the processor will have a programmed rate or schedule for gradual reduction in light to the viewer's eyes. Most implementers will allow this scheduled and processor-controlled adaptation to proceed until the eyes have had time (at the known light levels per the sensor(s)) to adapt to low photopic to high mesopic levels (particularly good for daytime use). Some will, at least for certain conditions selectable by user input and/or ambient light conditions, select to adapt to a level in the scotopic range. Once this adaptation level is achieved it is called the cruising level because the processor will in most embodiments seek to maintain adaptation (by controlling entering light) to this cruising level.

Auto-adaptation: When the eyes are adapted (preferably to a cruising level), high percentages of retinal chromophores are unbleached and the retina is more sensitive to light. With light being reduced to the now-accommodated eyes, a sudden loss of ambient light can be mitigated for the viewer as the processor then, responsive to light sensor(s), opens the gates. Similarly, when ambient light suddenly increases, the gates are proportionately opened. Thus the APROD performs auto-adaptation effectively instantly removing the blind period eyes usually suffer in such suddenly shifted conditions. Thus, the retina is kept in a "ready" mode that can deal (with the help of the APROD) with even sudden substantial shadows or flashes of light. These are applicable to pilot goggles as well where this is a significant problem and where a clear true-vision of the world ahead (as opposed to a redisplayed forward image) is prized.

In the preferred combination of APBID and APROD the processor, armed with data from the ETA, 408 in FIG. 17 (some ETA processing components and power for them may be stored in 400), directs the degree of closure of pixels/gates in the gate array, 171. The filter array segments (like those illustrated in 179 in FIG. 17D) are matched to gate array gates in 171). The processor, based on ETA data calculates a value associated with how much light each gate should permit based on BID objectives and the relative sensitivities of the retina (whether they are general in nature according to physiological statistics or specific to a particular person's eye). One applicable method for this is for the processor to refer to a normalization map for the eye (general or specific to one eye and based on the viewer looking straight ahead) wherein each area has a value less than or equal to 1. Thus, if the eye of the viewer currently being calculated for is looking straight ahead, a pixel whose light will reach a very insensitive (but still alive) location on the retina might be very high (like 0.9) while a pixel whose light will reach a healthy area might have a map value of 0.2. Thus, much more light would go to the weak area (in this example the scotoma). When the eye is located at a POI that is not straight ahead the processor locates the location central to that instant POI on the pixels of the gate array, shifts the locations with their map values as is common practice so that map values are kept properly associated with the right pixels on the gate array.

Other applicable embodiments will be used but, in the one described here, the 3 SMW filters in the 4 element pixel are balanced to pass white light as white light. That is, after white light passes through the wide open gates of the 3 SMW filters in any pixel, it still appears as white light to the viewer. This represents a ratio of the 3 SMS "colors" that the brain perceives as white (preferably not a combination like blue and yellow which can spoof the brain into thinking it has a full tricolor-based gamut making real white). This true white passage ratio (wide open gate) provides a natural view of the scene ahead and this is the embodiment example described now. However, some implementers will modify this ratio to be shifted slightly to change overall color. While the SMW ROD effect will still work when color perception is thus shifted (these are, after all, still made up of primarily SMWs), the color ratios can be shifted to make the image through the shutter glasses, for example, less bluish or more like another color. To make things more complicated, some implementers with nothing better to do will accomplish this white balance programmatically instead of or in combination with specifically selected filter characteristics. This hybrid of natural filter transmission percentages of wavelengths that effect the desired open gate ratio and programmatic tweaks (either by control of percentage of gate passage, or how long a gate is open or both) does have some advantages in better matching the assembly to different viewers and environments.

In a simple world (and this is one applicable embodiment) if a pixel is matched to an instant normalization map value of 0.2 (as above), the gates for that pixel will be 20% open (or open for a time having an equivalent effect or a combination of the two processes). If light through a pixel is, per the ETA, destined to hit a portion of the retina that needs some BID-like help, and the instant normalization map value is thus 0.9 (as in the above example), then the gates for that pixel will be 90% open (or timed opening equivalent). However, experts in the field will immediately see advantages to them in modifying this simplicity to raise or lower general brightness, expand perceived dynamic range, etc. But this is still a didactic explanation of an embodiment. Other applicable calculation steps can calculate a similar result. Since we're about to complicate this even more now, let's simplify the above by assuming that implementers modifying that simple approach do so by simply modifying the values of the normalization map (which is a perfectly good way to accomplish that) so we can at least start the next step with a simple foundation.

This next part is not a requirement but, in a preferred embodiment applicable to both indoor and outdoor use, it is useful to adjust those values responsive to the instant lighting. Since no two ambient lighting environments are the same, that next complication is selecting, for our current pixel (let's use the 0.9 map value pixel) an environment adapted normalization map value. Let's normalize lighting environments as bright sunlight as 1.0 and absolute darkness as 0.0. Responsive to user input, a front-mounted photocell, one of the camera-using embodiments or any combination of these indications of ambient light, the processor adapts our 0.9 value that was based on 0.5 lighting based on an instant lighting value of 0.8. If the values are structured to be linear and scalable then one adaptive calculation is as simple as reducing the throughput by multiplying the 0.9 by 0.5/0.8=0.56 which, if we keep this simple can mean the gates for the pixel are 56% open (where they would have been 90% open in a room lighting of 0.5).

There are sufficient alternative calculations to make those specific calculations above moot except as a didactic example. However, the key point here is that the processor reduces the permissiveness of the gates responsive to increases in ambient light and decreases it responsive to reduced light. When it is necessary to reduce the throughput, it is preferable that the white gate element is reduced first until it can be closed no more. Then, to further restrict light responsive to ambient brightness, the SMW gates can be diminished as already described or by any practical manner. Similarly, when, responsive to less ambient light, more permissiveness is desired, it should be the SMWs whose gates are first opened more until they can be opened no more and only then, to get more gate throughput (as in dim room), begin opening the white gates. Thus a continuous gradient from darkest to most clear can be accomplished with SMWs providing as much of that light as possible. In another embodiment there are no white elements and, in one of those embodiments, there are multiple bandwidth elements for the same general color as described herein (e.g., a short green and a long green where the long green can be selected without sending a strong signal to the rods. To facilitate the dark adaptation of a CDAM strategy, this ability to gradually and consistently control the viewer-perceived ambient light without the perturbations of sudden changes in lighting is of key importance. And, of course, this helps the viewer respond to sudden changes in lighting.

Of course, this APBID and APROD combination also has the capacity for the processor to favor rods or cones by additively restricting, in the 4 color pixel (including white) example above, for example, the gate for blue and/or green to dim the rod perception, etc. In the case where there is more than one filter with more than one wavelength for a given color (e.g., a shorter and a longer wavelength red), the processor, by selecting to provide throughput predominantly through gates whose associated wavelengths are far from the absorption sensitivity peaks for rods, effects a bias in favor of cones which has the effect of helping those with low cone sensitivity.

An embodiment is now discussed (below) that combines the benefits of many of the features above into a single preferred combination embodiment. These can all function together in the same embodiment. Any of them can also be used as a fully independent unit and, of course, any combination of them can function as a functional unit. Either FIG. 17B or FIG. 17C can be used to illustrate the worn version of this embodiment. 171 is seen here as a gate array with a matched filter array like 177 or 179 in FIG. 17E for controlling, as directed by the processor, both how much light gets in and it's SMW and white component mix as discussed above for APRODs. The processor can be located in the frame 400 or connected using a wireless assembly in 400. The order of all the controls described as enforced below can be changed since any sequence of image/light conditioning is an applicable embodiment of the invention. Also, though there is plenty of time to change them one at a time in real time, all adjustments can alternatively be made in a single processor response with calculations. Here, an approach that is an applicable hybrid of the two is described: a first correction followed by a list of calculations followed by a single display execution. Any other order or any combinations of the calculations or components or subsets of them are also applicable to covered embodiments. Thus any combination of any or all of the elements listed below is a useful and applicable embodiment of the current invention.

1. SAGA Dynamic range control and spike removal: Using spike attenuating gate arrays (SAGAs) to reduce spikes to greatly reduced brightness levels and darken areas in the FOV (via SAGA) that are brighter than required per a set of processor rules. The processor, responsive to recognized locations of unacceptably bright light (like headlights at night or directly reflected sunlight in day) directs the reduction of light passage at gates in the gate array that are matched to those recognized locations. This is a first and significant effective expansion of the dynamic range that the brain can actually see (having removed a potentially large but useless portion of the available dynamic range so that dimmer lights can now be seen).

2) APROD: selectively attenuating gates in the gate array over filters in an array like 179 in FIG. 17E to selectively permit predominantly SMWs and/or SMWs with a controlled amount of white thus permitting light that the retina is particularly sensitive to without requiring high radiation to scatter by cataracts or damage the retina over time. (3 below is an alternative to this.)

3) PROD: An alternative to (2) is a single filter (e.g., on the eye-side surface of 171 in FIG. 17A or 177 in FIG. 17C) primarily permissive of SMWs and, optionally, light sensitive ganglion-stimulating wavelengths (wavelengths at least near the peaks of the light-sensitive ganglion sensitivity curve) to permit light that the brain perceives as brighter even with lower intensities of light entering the eye 4) Ganglion-stimulating wavelength permissiveness. Like the APROD (and/or as part of it) this limits attenuation of gates in the gate array over filters in that array that permit wavelengths that are particularly favorable to stimulating light-sensitive ganglions to send signals to the brain that will be interpreted as brighter light with less light intensity to the eye required.

5) APBID: With the addition to the assembly already described of an ETA, the processor now is less restrictive of light passing through gates that will reach less sensitive portions of the retina 6) CDAM: Dark adaptation. The processor tracks the approximate light levels striking the eye (e.g., via any camera image, light sensor or just the ETA camera image of the eye which provides both a brightness measure and pupil diameter either of which can be used as a measure if light level, etc.) over time and, using calculations based on known rates of photosensor adaptation, causes the overall gate array permissiveness to attenuate at a gradual rate so that the eye gradually adapts to darkness without periods of adaption shortfall (night blindness). The viewer and/or processor may select a desired level of adaptation to reach and preferably maintain. A high mesopic or preferably a low photopic adaptation level, for example, allows good perception with restfully low radiation to the retina. In embodiments with an ETA the adaptation and stimulation of rods and cones can be managed separately for desired results discussed herein. When APROD (3) is in the combination, the dark accommodation accomplished by selective SMW filtering can be even more effective in terms of reducing light radiation while providing high perception.

7) Instant dark adaption facilitation: In combination with the dark adaptation of 6 and after its accomplishment to a suitable level, the processor responds immediately to even sudden and short changes in visible light levels by further reducing gate array permissiveness in response to sudden increases in ambient light (according to the processor-monitored goals) and increasing it in response to a sudden decrease in ambient light) to keep the light levels to the eye in a healthy and continuing high-sensitivity state with no blind or blinding periods.

The components can be switched by user input and/or responsive to the environment. For each of the gate related operations above, it can be seen that the processor can simply calculate the concatenated effects of each of the gate attenuating factors for each gate before effecting any of them. However, step 1 (and optionally others) may be implementer-selected exceptions. For example, step 1 (SAGA) provides an image to the processor with potentially extreme scattering removed which can provide a better starting point for all of the other vision improvement measures and actions.

Together, combinations of any and especially all of the above provide superior vision even for those with no vision conditions (and especially for pilots, soldiers and police who must deal with rapid changes in ambient light) and potentially protects the viewer from long term retinal damage.

A passive BID (PBID) is now disclosed which shares objectives with APBIDS but without need of processor or ETA. One useful embodiment in a worn assembly has lenses which may look like 175 in FIG. 17D, and which may have a brightness attenuation component (e.g., neutral density filter layer, etc.). So far, these could be sunglasses and they may also be polarized and wavelength selective. However, an area in each lens has at least an unattenuated foveal port.

This foveal port is an area of the lens where there is little or no light attenuation at all (e.g., no neutral density filter). This foveal port (visualize it as a hole in the lens for the moment) is located in the area of the lens that the fovea would be looking through when the viewer is looking straight ahead. Let's first consider a simple embodiment where this is in the shape of a circle with a diameter based on the foveal FOV as it passes through the lens. If, for example, a lens was 25 mm from an eye and the foveal FOV is 5 degrees, a workable diameter for this foveal port is about 2½ mm. In practice however, this space is typically widened, like 176 in FIG. 17D, to accommodate binocular overlap azimuth shift as the eyes look at different distances. Even though the viewer is looking at an object "straight ahead" with both eyes, the convergence angles and thus the path through the lens changes with distance. Thus, a preferred embodiment has ports that are more rectangular in shape. A good working width is at least 7 mm wide (although 11 mm will be preferred for some repetitive operations like reading lines of text).

This unattenuated foveal port is ideally surrounded by a partially attenuated macular port which can be seen surrounding 176. Then, if the macular FOV is 18 degrees this can have a height of roughly 8 mm having the foveal port within it. (Again, it's widened to allow azimuth shift.) Preferably, light through the foveal port is completely unattenuated (there might as well be a hole there). Outside of the foveal port but still within the macular port, light is attenuated but not nearly as substantially as the rest of the lens (outside the perimeter of the macular port).

Thus is described 3 levels of light attenuation with the lenses, 175, outside the macular port being the "darkest" (most attenuated), the foveal being the least "dark" (almost unattenuated) and the area between inside the macular port and outside the foveal port being less attenuated than the lens outside the macular port perimeter. Of course, most implementers will, to mask transitions at the two boundaries (between 176 and the macular port and between the macular port outer perimeter and the rest of 175) implement a gradual gradient instead of a sudden change in brightness at these boundaries. Thus, for example, they will begin to lighten the attenuation of 175 as you near (moving centrally) the perimeter of the macular port and, also effect a gradient that becomes lighter from there to the foveal port, 176, at which (at the perimeter of the foveal port) the attenuation is preferably zero or very close to it. Of course, for sunglasses, the entire lens, 175, including the foveal and macular ports, can have a polarized, darkening and/or wavelength restrictive layer (e.g., an SMW-permitting filter).

Widening the macular port to accommodate reasonable POI distance shifts works well with a rectangular (though with rounded edges) macular port that is at least 13 mm wide (although 20 mm wide is better for reading and is thus preferred) and still 8 mm high. In some embodiments both the macular port and the foveal port will be completely transparent essentially meaning there's only a macular port since it includes the foveal port area and they now have the same (at least near zero) attenuation. Some will additively widen one of both of the ports. There is, however, a spatial filtering advantage to the foveal port being the only clear port and the widths and heights being kept relatively small (especially when the boundaries are replaced by smoothly graduated attenuation).

Another PBID alternative port shape approximates the shape of the scatoma oriented to pass more light through an otherwise darker lens from parts of the scene whose light will reach the macula. An even more open area inside that scatoma-shaped area may permit even more light to the fovea. The viewer would, of course, have to be looking through this port shape to receive any advantage. Also, a larger area around the port can, from the periphery of the shape outward, gradually become less light permissive to accommodate changes in distance to POI and viewer alignment. For other conditions where the rods may be less sensitive than the cones (some patients with retinitis pigmentosa), the port is backwards to the above. That is, for example, a circular port (sized to approximate the solid angle of the macular FOV) or a slot-shaped port like 176 in FIG. 17D wherein the "port" is darker than the surrounding area to provide for the viewer looking through it a bias in favor of rods for better rod sensitivity. Preferably an area surrounding this "reverse port" becomes clearer (less restrictive) from the perimeter of the reverse port outward along a gradient to forgive viewer misposition and different POI distances.

To reduce the progression of AMD and, in at least some measure, to prevent it in the first place, it is becoming more well known that radiation control, especially to the retina but also to the lens for cataract control, is a key factor. A worn passive ROD (PROD) achieves this protection (without necessity of an ETA) as well as providing ROD-like improvements in perception. The PROD is a worn filter or filter set that ideally permits only predominantly SMW light in relatively narrow/specular bandwidths to pass through it. One example filter that virtually eliminates short and damaging high-energy and long (heating) wavelengths while providing SMWs in narrow enough bandwidths to block much of incoming light while still perceiving very adequate brightness is now discussed. It reduces damage with less reduction in perceived brightness by increasing the lumens/watts ratio using SMWs. Adding a neutral density (or any layer or component that primarily just reduces general light amplitude like any of the many kinds of sunglasses) is an acceptable option since the perceived brightness for SMWs is excellent and dark accommodation (responsive to reduced light) further increases the sensitivity. However, embodiments that further darken the incoming light by narrowing the bandwidth of SMWs is preferable since, in addition to reducing the magnitude of incoming energy, it further maximizes the retinal sensitivity of the retina to the more maximal wavelengths (chosen at sensitivity maxima). One embodiment that works well is a multi-frequency bandpass filter with the following approximate specifications: 98% average passage near the range 415-445 nm (permitting a range including the s cone maximum) and 525-575 (capturing a range including m and l cone maxima). Roughly 5% was permitted for wavelengths between 200-405 nm, 445-520 and 580-1000 nm. In another embodiment the comparative ratios of transmitted light for each of the SMW colors is selected so that white light appears to the viewer looking through the filter to be white. Other embodiments with be shifted away from this perception of white from the combined colors and towards, for example, transmitting less light near the sensitivity maximum (on the wavelength absorption curve) for rods.

These work well both indoors and outdoors. However, narrower bands (e.g., 440-450, 535-545 and 575-585 nm) describe an embodiment that eliminates more light while making the light transmitted to be light that the retina is even more sensitive to in order to preserve more perceived brightness with even more significantly reduced radiation. Also note that, when considering the SMWs (after adaptation for absorbance of lens, ocular media, and macula) to be 445, 545 and 575, the above ranges shift the green SWM range towards the left (towards shorter wavelengths) to include the left (shorter wavelength) side of the tip of the green sensitivity curve. It also selects the right side of the "red" (1 cone) sensitivity curve. Thus, better separation of "red" and green is possible. By preserving the SWMs that the retina is most sensitive to by selecting out so much of the other light (as well as the completely optional addition of a neutral density filter, shutter array, etc. to additionally manage brightness) the PROD delivers light that the retina is extra sensitive to while reducing the overall brightness required for perception thus reducing scattered light due to both normative and cataract-caused scattering of light to locations on the retina where it's not needed, all of which is facilitative of dark adaptation which can even further increase retinal sensitivity.

Of course, by selecting discrete wavelengths at the maxima (maximum sensitivity wavelengths) we can with these PRODs (as well as APRODs and RODs) completely avoid the wavelengths that cause and exacerbate photokeratitis and damage not only the cornea but also the lens and retina.

A different and passive embodiment now described is a Passive BID (a PBID, which by its name indicates that it has no active component (e.g., a processor driven gate array). In one embodiment this will include filtering lenses (like 175 in FIG. 17D). In the preferred such embodiment, the entire lenses, 175, are filtered to permit primarily only SMWs. Although some implementers will add neutral density darkening to the lenses, in the preferred embodiment at least most darkening is accomplished by the narrowness of the bandwidths of permitted SMWs. Each lens, 175, has a central zone, 176, that preferably has no neutral density filter (or other darkening element) nor quite as tight a wavelength bandwidth as the rest of the lens (which significantly increases the amount of light passing through 176). Though it will vary, of course, by the distance of each filter from each eye, viewing is aided when the height of that lowest light resistance space is approximately 2-3 mm and the width of 176 tends to be around 6 mm (176 is not drawn to strict proportion). Here, a brighter approximate foveal view (and, optionally with a slightly larger opening, a macular view) is accomplished through 176 which effects, when the foveas of an eye is looking in a preferred line of sight, that is, looking right through, preferably, the central zone, 176, (one for each eye ideally), a BID-like foveal bias. Thus, the central zone, 176, preferably occupies a location in the media that would intersect with a preferred line of sight. Preferably that preferred line of sight is a line of sight where the viewer frequently looks, like straight ahead, realizing that as the viewer looks from closer and farther away even at an object centrally located in the viewer's field of view, lateral travel of the eyes ensues responsive to binocular convergence. Thus, the central zone is wider than it is high to accommodate binocular overlap azimuth shift as the eyes look at different distances. This preferred line of sight will vary by implementers and viewers and sometimes by viewer task (e.g., higher for birdwatchers and perhaps lower for fishermen). Thus, a preferred line of sight may be better described as a chosen line of sight. This is also appropriate since in the preferred embodiment a chosen line of sight can be changed via any user interface (e. g., positional adjustment screws in the housing assembly that shift a worn position of the filter for worn embodiments). 176 is shown as being surrounded by a rectangle representative of an area that permits less light than 176 (either by a neutral density or, preferably, by simply permitting narrower SMW bandwidths than 176 has). Outside of this darker rectangle is the remainder of the lens, 175, which is still darker. There is practical benefit in these progressively (from the outer areas of the lenses, 175, progressively towards the inside, 176) less light-restrictive zones. The viewer's edge detection of the edges of these zones helps the viewer instinctively center 175 over the portion of the FOV where the greatest sharpness of vision is desired. However, some implementers will simply apply darkening elements (areas of narrow bandwidth SMW-permissive filtering and/or neutral density or color filters) along a gradient that makes the outer lens uniformly the darkest, the areas of the larger rectangles around the 176s less dark and the 176s the least dark (preferably less darkened due to the bandwidths of SMWs permitted there being wider).

This provides more brightness in the general area of the retina, for example, where those with AMD need it. Of course, where the viewer suffers from insensitive rods (e.g., retinitis pigmentosa in cases where rod degeneration has preceded or exceeded cone degeneration), the bias is reversed (i.e. 176 is the darkest with progressively less darkening towards the periphery of the lenses, 175). With the right darkening and selection, this also facilitates dark accommodation in the retina. Of course, the viewer can see through all of the plate, just better through the less light-attenuated space. In one extended embodiment a lens or flat clear plate (analogous to 175 though much larger) becomes a pull-down sun visor in an automobile for better night and day driving (as the viewer looks through the visor and through the central zone. Of course, due the greater distance between eye and central zone, the portion of the transparent pull-down sun visor analogous to 176 is larger to contain a largely foveal view through the central zone (though some implementers will size the central zone for a macular view).

In one windshield embodiment of SAGA-enabled APBIDs and APRODs, at least a portion of the driver's side windshield has a clear (clear is preferably the default off position for safety) shutter array (or any form of gate array). Since ideally each of these shutters (or gates in a gate array) in the array should be individually addressable by the processor, some implementers will use liquid crystal arrays as the shutter array (gate array) component but any medium that can attenuate the passage of light at a plurality of individual locations is fully applicable. The "light source" of the other (typical video display) illustrations is now light from the real world outside. A foreground camera (and, in the preferred embodiment now disclosed, preferably at least 2 cameras for binocular image separation) optionally assisted by image distance sensors (FLIR, radar, etc.) and/or in-line optics (as described in FIG. 17C, all of FIG. 19 and in the lengthy discussion of the SAGA support framework above) identifies the location of points in the "image" ahead of the car with gates in the array). Matching elements in the gate array with locations in the camera image(s) will be understood by those in the field and applicable embodiments will include any devices and methods for positionally locating elements in the view with respect to the spatial positioning of the gate array and the viewer.

A processor, based on an ETA (preferably one of the ETAs using NIR or IR light for pupil location) that is watching the eyes of the viewer (now "the driver"), calculates the spatial relationships between the eyes, the gate array and the view ahead to recognize which "pixels" (alternatively identified by arc minutes of viewer FOV) of the view ahead should be reduced in intensity. It also determines how much attenuation is needed for each arc minute (of viewer FOV which it relates by spatial geometry to specific gates in the array) to achieve the above objectives of reduced dynamic range requirements and enhanced retinal dynamic range sensitivity. In so doing, spikes like headlights are attenuated to substantially narrow the dynamic range of the view of the outside world while, by this and other attenuations (some mentioned in the discussion of BID above) dimmer view elements are now revealed and dark adaptation is allowed for improved retinal sensitivity. The gate array can, of course, also be separate from the windshield such as a pull-down array from the sun visor for both daytime and evening use.

While this windshield-based (or otherwise located) control of light to the eye is applicable to healthy viewers in photopic, mesopic and even scotopic environments, it is particularly helpful for those with vision too low to drive.

The PROD is also a useful device for providing therapeutic light. Here, the bandpass filter permits narrow ranges of SMWs and up to 100% transmission of a number of therapeutic wavelengths. When the therapeutic application is management of circadian rhythms, one set of glasses will be the best for mornings and another for mid-day and another for night.

Nomenclature herein: In all references to a processor, data, information, memory or programmatic code herein it is stated with the recognition that their functions overlap and can often be exchanged for each other. Use of one term is not meant to imply that what is claimed doesn't cover the others. For example, a LUT function can be completely replaced/substituted by programmatic code whose functions incorporate the elements in the LUT. Thus, mention of one (like information or data) is not to the exclusion of another (like code). It seems that all processor's use data and execute code all of which is information. Also, code on hard drives can easily be replaced by any number of other memory devices. Similarly, there are many different ways to do the exact same thing. Example: if the task is to "identify a portion of the field of view of an eye", this can be done by identifying a solid angle subtended by some portion of a display's screen. Let's say that solid angle is a fraction of a steradian and that subtending display portion is equal to the size of one pixel on the display at the viewer's current distance from the screen with the viewer looking at the center of the screen and is located R rows down and C columns over from the top left-hand corner of the display. This R,C location is, in other terms, x minutes to the left and y minutes above the center of the eye's FOV. Thus, we can identify this "portion of the field of view of an eye" as being, at a given distance and when looking at the center of the display, located at R,C on the display sized as the area of one pixel (and some will do it this way). Others, perhaps most (because, when the eyes move and/or the distance changes, the shifting math in that method becomes tedious) would accomplish what is really the same thing by identifying that "portion" as being that solid angle portion of the eye's FOV (which is short of 2*pi steradians due to facial structure and eye-range limits) whose center is located at an azimuth of −x minutes and an elevation (or altitude) of y minutes. It's intended to mean the same thing and that solid angle is subtended by the same pixel at the same distance of the other descriptive method. Thus, in a phrase like "information indicative of a portion of the field of view", that information could be either of those sets of values (or any other mathematical or geometric approach with equivalent purpose and results). In any case, the information in that example is indicative of the thus-identified portion of the FOV or any measures from which it could be deduced.

What is claimed is:

1. A device to protect an eye of a viewer while allowing perception of a plurality of colors, the eye having different types of sensors with potentially different ranges of wavelengths of light to which each of the different types of sensors are especially sensitive, by reducing the radiation required for sight, comprising:
   at least one filter positioned to filter light before the light reaches the eye of the viewer;
   said at least one filter configured to favor passage of wavelengths from at least one of the potentially different ranges of wavelengths of light to which the different types of sensors are especially sensitive;
   wherein the viewer is able to distinguish between the plurality of colors; and
   wherein at least one of the different types of sensors in the eye of the viewer is especially sensitive to light that has passed through said at least one filter.

2. The device of claim 1 wherein
   a portion of said at least one filter is configured to be less restrictive to at least a selected group of wavelengths and to be positioned to intersect a chosen line of sight of the eye and sized to permit at least a less-restricted path of light from the field of view of the eye to one of the group:
   1) the fovea of the eye,
   2) at least one part of the macula of the eye,
   3) the macula and fovea of the eye.

3. The device of claim 1 further comprising:
   at least one light-sensing component configured to capture data that are at least indicative of the brightness of light coming from at least one portion of a field of view of the eye;
   at least one light gate to adjust passage of light to the eye; and
   a processor; wherein said processor using said data from said at least one light-sensing component is configured to do one of the group:
   1) direct said at least one light gate to, at least during some periods wherein light to the eye is more than is required for sufficient vision, reduce at least the level of light to at least part of the eye whereby the eye is induced to attain heightened sensitivity;
   2) direct said at least one light gate to reduce detrimental effects of changes in environmental light by increasing how much light passes said at least one light gate responsive to a decrease in environmental light;
   3) direct said at least one light gate to reduce detrimental effects of changes in environmental light by decreasing how much light passes said at least one light gate responsive to an increase in environmental light;
   4) direct said at least one light gate to attenuate light passing through it responsive to operations of said processor indicating that said at least one light gate is on a path towards the eye from a location in the field of view of the eye whose brightness is above a chosen level;
   5) any combination of 1,2, 3 and 4.

4. The device of claim 3 wherein said at least one light-sensing component is chosen from the group:
   1) a camera,
   2) a sensor to measure light coming from at least one portion of the field of view,
   3) a sensor to measure light coming from at least one portion of said field of view working in combination with a distance sensor,
   4) any combination of 1, 2 and 3; and
   wherein said at least one light gate is one of the group:

1) a single light gate located in a line of sight of the eye,
2) a plurality of light gates with at least some of them located in different lines of sight of the eye.

5. The device of claim 3 wherein said processor, based on output of said at least one light-sensing component, estimates light exposure of the eye over time to identify how much light is currently needed for the sufficient vision; whereby
   current dark adaption of the eye is a factor in said processor's calculation of how much light is currently needed for the sufficient vision.

6. The device of claim 1 further comprising:
   a plurality of light gates;
   an image capture component configured to capture an image of at least one portion of the field of view of the eye; and
   at least one processor configured to, responsive to at least one point in the image having a brightness outside a range, perform operations that identify at least one light gate that is located on a path between the eye and a location in the field of view of the eye that corresponds to the at least one point in the image and cause said at least one light gate to at least adjust passage of light through said at least one light gate.

7. The device of claim 1 wherein one of the types of sensors being especially sensitive to one of the ranges of wavelengths indicates one of the group:
   1) the one of the ranges of wavelengths is near the peak, that is the maximum, of a sensitivity curve for the one of the types of sensors,
   2) the one of the ranges of wavelengths is near the peak, that is the maximum, of a sensitivity curve for the one of the types of sensors after the sensitivity curve has been adjusted for changes in at least some of the light on the way to reaching the one of the types of sensors,
   3) wavelengths in the one of the ranges of wavelengths are among those wavelengths that the one of the types of sensors will be most responsive to,
   4) any combination of 1, 2 and 3; and wherein
      at least some of the types of sensors are from the group: 1) a type of cone, 2) a rod, 3) a light-sensitive component that is not a rod and is not a cone.

8. A device for an eye comprising:
   an image capture component configured to capture an image of at least part of the field of view of the eye;
   a plurality of light gates; and
   at least one processor configured to, responsive to at least one portion of the image having a brightness outside a range, perform operations that identify at least one light gate of said plurality of light gates that is located on a path between the eye and a location in the field of view of the eye that corresponds to the at least one portion of the image and cause said at least one light gate of said plurality of light gates to at least adjust passage of light through said at least one light gate of said plurality of light gates.

9. The device of claim 8 wherein said at least one processor is configured to do one of the group:
   1) decrease passage of light through said at least one light gate of said plurality of light gates from at least one portion of the field of view of the eye that is brighter than desired;
   2) increase passage of light through said at least one light gate of said plurality of light gates from at least one portion of the field of view of the eye that is dimmer than desired;
   3) direct adjustments in the passage of light through light gates in said plurality of light gates that are near said at least one light gate of said plurality of light gates;
   4) any combination of 1, 2 and 3.

10. The device of claim 9 further comprising:
    an eye-tracking component wherein said at least one processor is configured to do one of the group:
    1) using at least data from said eye-tracking component and from the image, manage adjustments to passage of light through at least some of said plurality of light gates based on the location of the eye;
    2) using at least data from said eye-tracking component and from the image, manage adjustments to passage of light through at least some of said plurality of light gates based on which direction the eye is looking;
    3) reduce the restriction of light by gates in at least some of said plurality of light gates whose transmitted light would reach portions of the retina that are less sensitive than at least some other areas of the retina;
    4) any combination of 1, 2 and 3.

11. The device of claim 8 wherein
    said at least one processor is configured to do one of the group:
    1) direct at least one of said plurality of light gates to, at least during some periods wherein light to the eye is more than is required for sufficient vision, reduce passage of at least some of the light headed for the eye whereby the eye is induced to attain heightened sensitivity;
    2) direct at least one of said plurality of light gates to stabilize the level of light to the eye as changes to the light environment of the eye occur;
    3) both 1 and 2.

12. The device of claim 8 further comprising:
    at least one filter configured to at least favor transmission of wavelengths of light that are among the wavelengths of light that at least one portion of the eye will be very sensitive to; wherein
    said at least one processor is configured to do one of the group:
    1) control the passage of light through at least one of said plurality of light gates wherein the light passing through said at least one of said plurality of light gates also passes through said at least one filter on the way to the eye;
    2) control the passage of light through at least one of said plurality of light gates wherein the light passing through said at least one of said plurality of light gates does not pass through said at least one filter on the way to the eye;
    3) both 1 and 2.

13. A device to protect an eye of a viewer while improving perception comprising:
    at least one sensor configured to measure at least the brightness of light from at least one part of the field of view of the eye;
    at least one light control component configured to adjust how much light reaches the eye; and
    a processor; wherein the processor is configured to, responsive to data from said at least one sensor, direct said at least one light control component to reduce passage of light during at least some periods wherein less light through said at least one light control component is needed by the eye for sufficient vision and wherein said processor is configured to increase passage of light through said at least one light control component when more light to the eye is needed for sufficient vision; whereby
    the eye is induced to maintain an enhanced sensitivity level in a variety of lighting conditions.

14. The device of claim 13 wherein:
said at least one sensor is configured to obtain an image of at least part of the field of view of the eye;
a plurality of said at least one light control component is operatively connected to said processor; and
said processor is configured to, responsive to at least one portion of the image having a brightness outside of a range, perform operations that at least adjust passage of light through at least one of said plurality of said at least one light control component that is located on a path between the eye and a location in the field of view corresponding to the at least one portion of the image.

15. The device of claim 14 wherein
said at least one sensor is chosen from the group:
1) a camera,
2) a sensor to measure light coming from at least one portion of said field of view,
3) a sensor to measure light coming from at least one portion of said field of view working in combination with a distance sensor,
4) any combination of 1, 2 and 3; and
wherein said processor is configured to do one of the group:
1) direct adjustments to passage of light for said at least one of said plurality of said at least one light control component that is located on a path between the eye and a location in the field of view corresponding to the at least one portion of the image,
2) direct adjustments to passage of light for said at least one of said plurality of said at least one light control component that is located near a path between the eye and a location in the field of view corresponding to the at least one portion of the image
3) both 1 and 2.

16. The device of claim 14, further comprising:
an eye-tracking component; wherein
said processor is configured to direct adjustments to passage of light for at least some of said plurality of said at least one light control component based at least in part on one of:
1) at least a relative location of the eye,
2) which direction the eye is looking,
3) both 1 and 2.

17. The device of claim 13 to protect the eye of the viewer, the eye having different types of sensors with potentially different ranges of wavelengths of light to which each of the different types of sensors are especially sensitive, further comprising:
at least one filter positioned in a line of sight of the eye of the viewer;
said at least one filter configured to favor passage of wavelengths from at least one of the potentially different ranges of wavelengths of light to which the different types of sensors are especially sensitive;
whereby light reaching the eye is more comprised of wavelengths of light that at least one of the different types of sensors is especially sensitive to.

18. The device of claim 13 wherein said processor, using data from said at least one sensor, tracks at least part of the light exposure of the eye over time to calculate how much light is currently needed for the sufficient vision for at least parts of the eye.

* * * * *